United States Patent [19]

Bogan et al.

[11] Patent Number: 4,527,266
[45] Date of Patent: Jul. 2, 1985

[54] INTERFACE CIRCUIT FOR USE IN A DISTRIBUTED PROCESSING SWITCH UNIT

[75] Inventors: Leonard E. Bogan; Richard A. Hamersley, both of Columbus, Ohio

[73] Assignee: International Telephone and Telegraph Corporation, New York, N.Y.

[21] Appl. No.: 370,915

[22] Filed: Apr. 22, 1982

[51] Int. Cl.³ .......................... H04J 3/02; H04Q 11/04
[52] U.S. Cl. ........................................ 370/58; 370/85
[58] Field of Search .............................. 370/58, 88, 86

[56] References Cited

U.S. PATENT DOCUMENTS

| 4,305,148 | 12/1981 | Deglin | 370/58 |
| 4,354,262 | 10/1982 | Guézou et al. | 370/58 |
| 4,356,563 | 10/1982 | Viale | 370/58 |
| 4,379,950 | 4/1983 | Ahmed | 370/58 |

OTHER PUBLICATIONS

R. Leppanen et al., "Signalling and Control or the Facility Integrated Digital Switching System", *Intel Expo '81*, ITE&S, Sep. 14–17, 1980, pp. 51–55.
J. Smith, "The Subscriber Line Card in a Distributed Control Switching System", 1981 *ICC*, Jun. 14–18, 1981, pp. 1.1.1–1.1.4.
P. Desikan et al., "A Data Switching Technique for a Digital PABX", 1980 *ICC*, Jun. 8–12, 1980, pp. 19.5.1–19.5.5.
G. Dooley, "Line Circuit Interfaces for Digital Switching System", *IEEE Trans. on Comm.*, Com. 27, No. 7, Jul. 1979, pp. 978–982.
J. Kirtland et al., "System X: Architecture and Technology", *ISS 1979*, May 7–11, 1979, pp. 229–235.
G. Cochrane et al., "The Plessey PDX", *Systems Technology*, Apr. 1978, No. 28, pp. 2–6.

*Primary Examiner*—Douglas W. Olms
*Assistant Examiner*—Wellington Chin
*Attorney, Agent, or Firm*—John T. O'Halloran; Jeffrey P. Morris

[57] ABSTRACT

A line switch for a digital telephone switching system utilizes distributed processing. The line switch comprises one or more switch modules. Each switch module is coupled to a central office switching system via one or more PCM lines which utilize common channel signaling. Each switch module comprises groups of line circuits, each line circuit being coupled to a subscriber line. Three separate distributed processor functions are provided in each line switch module. A first processor is utilized to communicate with the central office switching system and to coordinate the operations within the line switch module. A second processor is provided to control clock generation and rate conversion circuits. Each group of line circuits includes a third processor to control the operations of the line circuits and to gather information from the line circuit. A busing arrangement is provided within the line switch such that both control information and PCM voice data are routed throughout the line switch.

Communication between all the processors is via common buses carrying time division multiplexed PCM data and control data. A standardized interface between each processor and the time-division multiplexed buses is provided.

29 Claims, 80 Drawing Figures

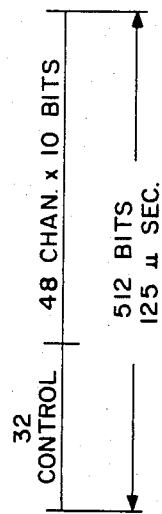
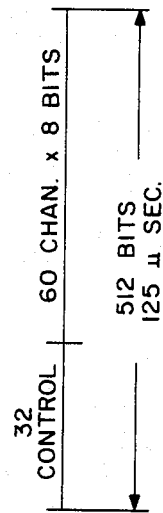
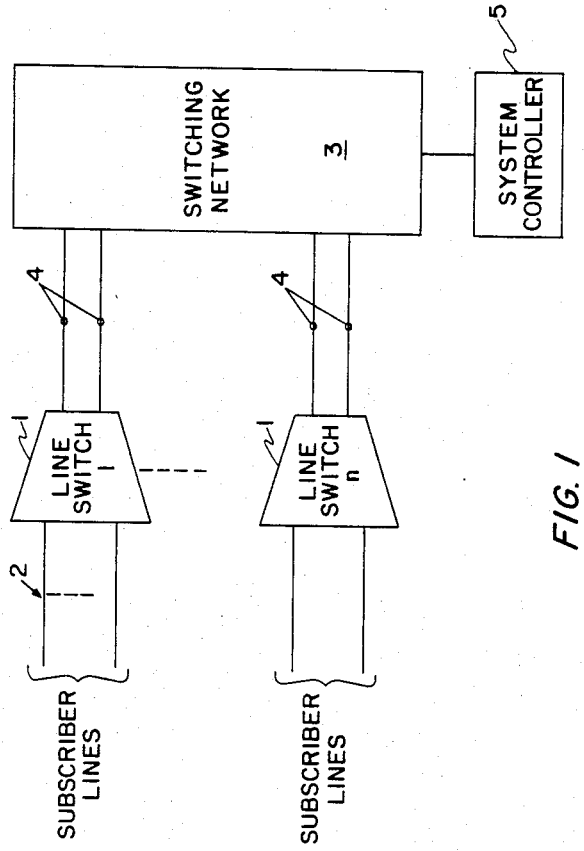
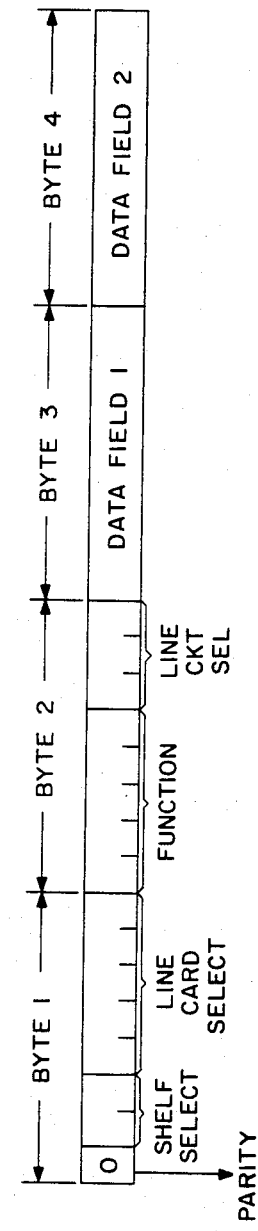

| LINE SWITCH CONFIGURATION | TRAFFIC | |
|---|---|---|
| | 24 CHANNEL | 32 CHANNEL |
| 160 SUBSCRIBER LINES — MODULE 1a / MODULE 1b — PCMA, PCMA — 160 SUBSCRIBER LINES | 32.2E TOTAL .1E./LINE | 42.3E TOTAL .132 E/LINE |
| 160 SUBSCRIBER LINES — MODULE 1a / MODULE 1b — PCMA, PCMB, PCMA — 160 SUBSCRIBER LINES | 52.7E TOTAL .164 E./LINE | 68.6E TOTAL .214 E./LINE |
| 160 SUBSCRIBER LINES — MODULE 1a / MODULE 1b — PCMA, PCMB, PCMA, PCMB — 160 SUBSCRIBER LINES | 73.9E TOTAL .23 E./LINE | 95.5E TOTAL .298E./LINE |

FIG. 3

| LINE SWITCH CONFIGURATION | TRAFFIC | |
|---|---|---|
| | 24 CHANNEL | 32 CHANNEL |
| 160 SUBSCRIBER LINES<br>192 SUBSCRIBER LINES<br>MODULE 1a — PCMA<br>MODULE 1c<br>MODULE 1b — PCMA<br>160 SUBSCRIBER LINES | 32.2E TOTAL<br>.063E/LINE | 42.3E TOTAL<br>0.83E/LINE |
| 160 SUBSCRIBER LINES<br>192 SUBSCRIBER LINES<br>MODULE 1a — PCMA, PCMB<br>MODULE 1c<br>MODULE 1b — PCMA<br>160 SUBSCRIBER LINES | 52.7E TOTAL<br>.103E/LINE | 68.6E TOTAL |
| 160 SUBSCRIBER LINES<br>192 SUBSCRIBER LINES<br>MODULE 1a — PCMA, PCMB<br>MODULE 1c<br>MODULE 1b — PCMA, PCMB<br>160 SUBSCRIBER LINES | 73.9E TOTAL<br>.144E/LINE | 95.5E TOTAL<br>.186E/LINE |

*FIG. 3A*

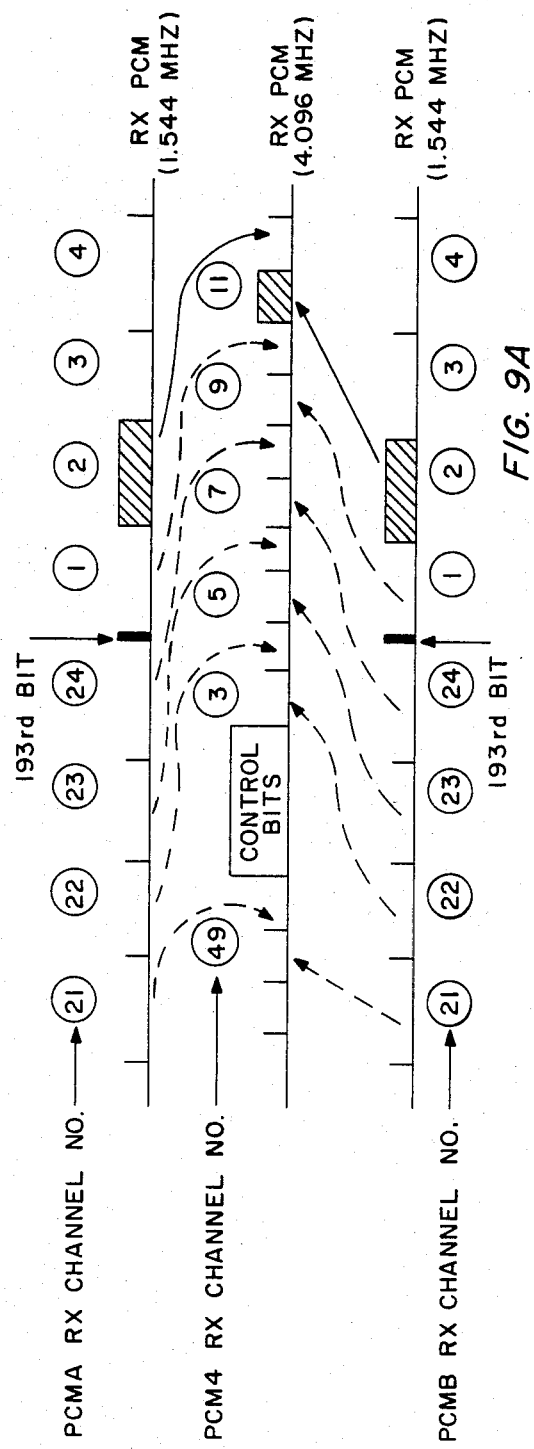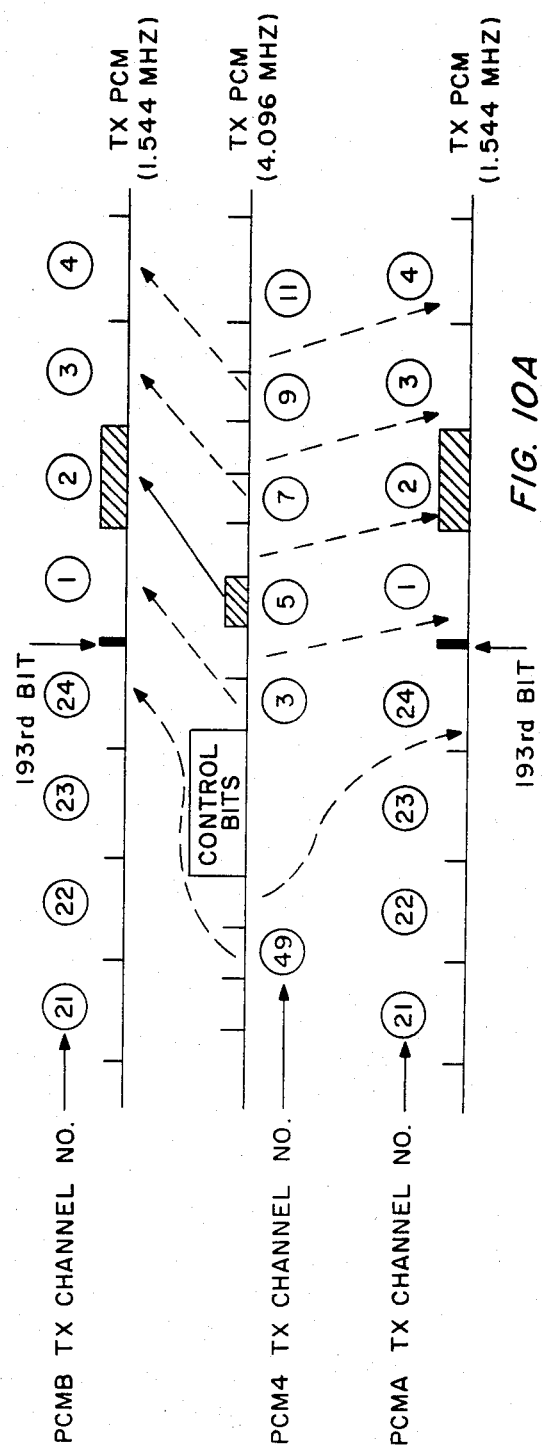

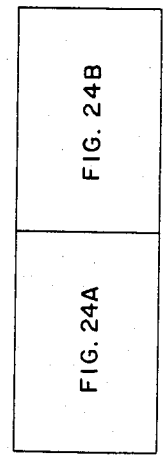
FIG. 24
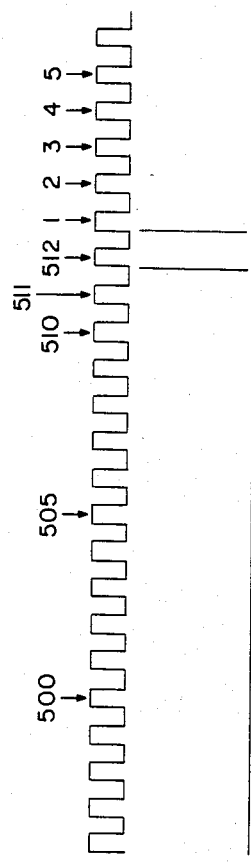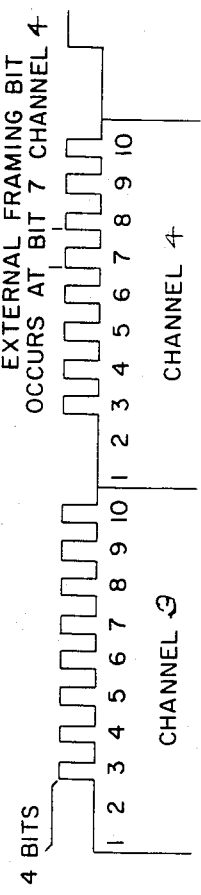
FIG. 24B

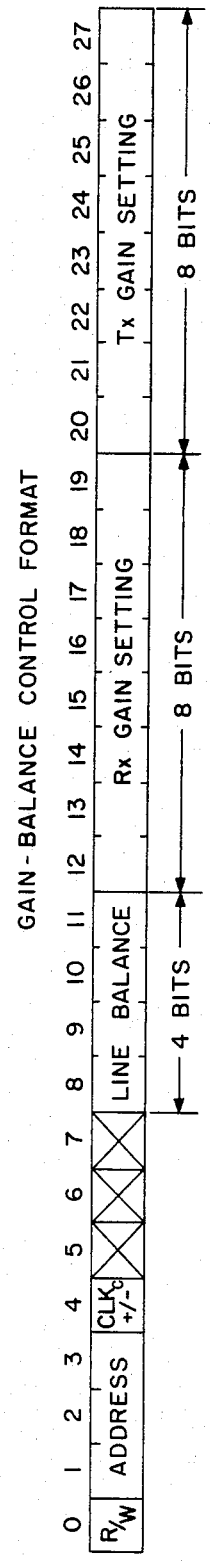
FIG. 26
FIG. 28
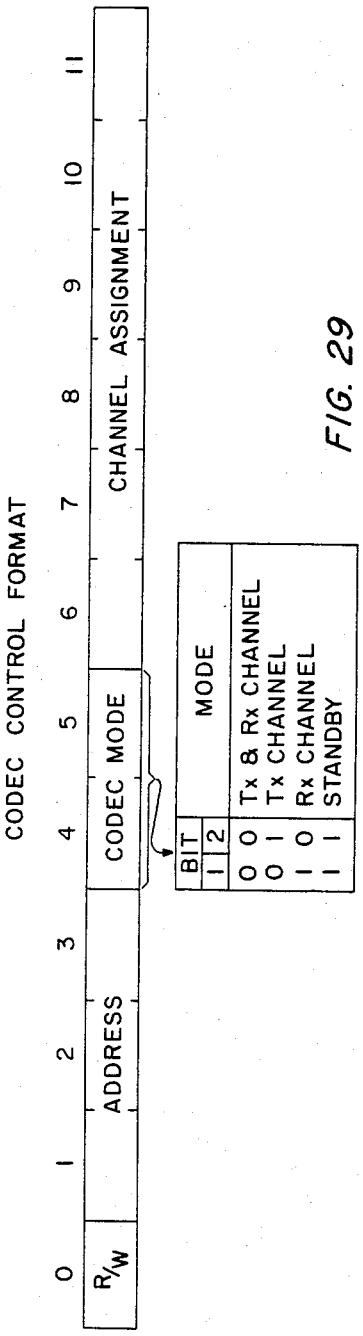
FIG. 29

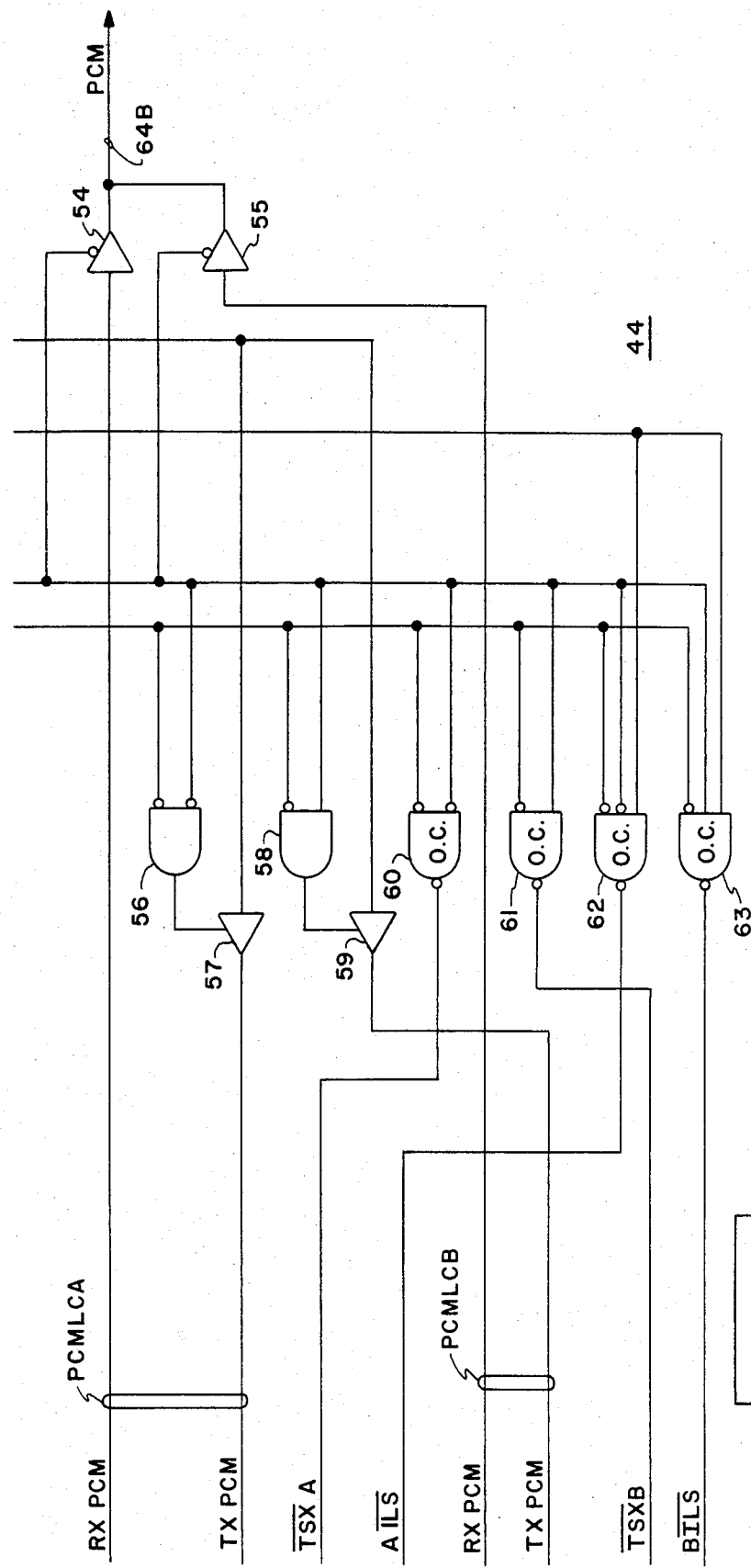

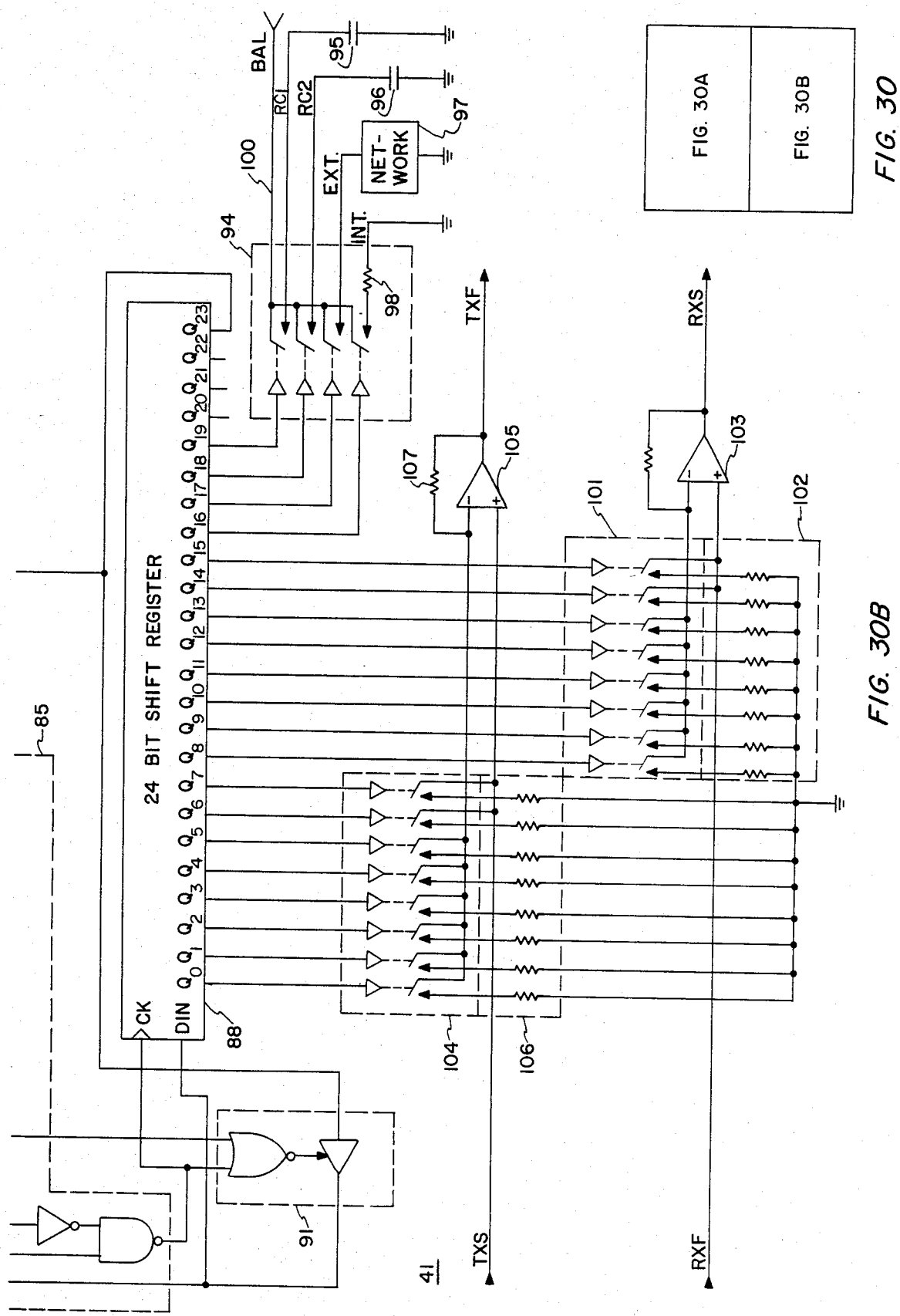

|  | 'A' CONTROL WORD REGISTER CONTENTS (HEX) | | | | 'B' CONTROL WORD REGISTER CONTENTS (HEX) | | | |
|---|---|---|---|---|---|---|---|---|
| FRAMES AFTER START OF TEST | BYTE 1 | BYTE 2 | BYTE 3 | BYTE 4 | BYTE 1 | BYTE 2 | BYTE 3 | BYTE 4 |
| 0 | 63 | C1 | F8 | 0F | XX | XX | XX | XX |
| 1 | 07 | E0 | 3D | 8F | 07 | E0 | 3D | 8F |
| 2 | 80 | F6 | 3C | 1F | 80 | F6 | 3C | 1F |
| 3 | D8 | F0 | 7E | 03 | D8 | F0 | 7E | 03 |
| 4 | C1 | F8 | 0F | 63 | C1 | F8 | 0F | 63 |
| 5 | E0 | 3D | 8F | 07 | E0 | 3D | 8F | 07 |
| 6 | F6 | 3C | 1F | 80 | F6 | 3C | 1F | 80 |
| 7 | F0 | 7E | 03 | D8 | F0 | 7E | 03 | D8 |
| 8 (FINAL DATA) | F8 | 0F | 63 | C1 | F8 | 0F | 63 | C1 |

MATCHES DATA LOADED INTO FIXED ADDRESS REGISTER AT START OF TEST

*FIG. 33*

```
VERIFIES SHIFT OPERATION OF 'A' & 'B' CONTROL WORD REGISTERS
USING THE TEST DATA FEEDBACK FEATURE OF THE PIC.

INITIALIZE MODE REGISTER (PIC INTERNAL REG. LOCATION 0DH)
        MOV     R0,#0DH
        MOV     R,#8BH
        MOVX    CR0,A    ; WRITE 8BH INTO MODE REG.

LOAD 'A' CONTROL WORD REG. WITH TEST DATA
        MOV     R0,#0EH
        CLR     A
        MOVX    CR0,A    ; WRITE 0 INTO PIC CONTROL REG. POINTER (CRP)
        INC     R0       ; R0 POINTS TO CCRP (PIC INTERNAL REG. LOCATION 0FH)
        MOV     R5,#63H  ; C/R TEST DATA BYTE 1 (R5)
        MOV     R4,#0C1H ; C/R TEST DATA BYTE 2 (R4)
        MOV     R3,#0F8H ; C/R TEST DATA BYTE 3 (R3)
        MOV     R2,#0FH  ; C/R TEST DATA BYTE 4 (R2)

MOV     R1,#5    ; INITIALIZE TEST DATA BYTE POINTER (R1)
        MOV     R7,#4    ; INITIALIZE TEST DATA BYTE COUNTER (R7)

LOOP 1: MOV     A,CR1       ; FETCH NEXT BYTE OF TEST DATA
        MOVX    CR0,A       ;   AND WRITE IT INTO NEXT BYTE OF 'A' C/R
        DEC     R1          ; ADJUST TEST DATA POINTER
        DJNZ    R7,LOOP1    ; REPEAT LOOP 1 FOR ALL 4 TEST DATA BYTES

LOAD FIXED ADDRESS REGISTER WITH C/R BYTE 3 TEST DATA
        MOV     R0,#08H  ; PIC FIXED ADDRESS REG. INTERNAL ADDR.
        MOV     A,R3
        MOVX    CR0,A

INITIALIZE FRAME COUNTER AND START DYNAMIC TEST
        STOP    TCNT
        MOV     A,0F6H   ; -10 IN 2'S COMPLEMENT
        MOV     T,A
        JTF     $+2      ; RESET TIMER FLAG
        STRT    CNT

LOOP 2: MOV     A,T
        ADD     A,#8
        JNZ     LOOP 2   ; REPEAT LOOP 2 UNTIL FRAME COUNT REACHES 0F8H (-8)

MOV     R0,#0DH
        MOV     A,#8FH   ; WRITE 8FH INTO MODE REGISTER (SET CONTROL SHIFT ENR)
        MOVX    CR0,A    ; ENABLE SELF-TEST CONTROL SHIFTING
```

FIG. 34

```
WAIT FOR 8 FRAMES TO PASS (TF=1), I.E. LET C/R CYCLE THRU 8 TIMES
                                        42 CLOCK PULSES PER FRAME
LOOP 3: JTF     $+4       ; SKIP NEXT INSTRUCTION WHEN TIMER FLAG (TF) = 1
        JMP     LOOP 3

DISABLE CONTROL REGISTER SHIFTING
        CLR     A
        MOVX    CR0,A     ; WRITE 0 INTO MODE REGISTER

VERIFY THAT BOTH 'A' & 'B' CARD ADDRESS COMPARATORS INDICATE
    AN ADDRESS MATCH OCCURRED AFTER 8 FRAMES
        MOV     R0,#0CH   ; PIC INTERNAL REG. ADDRESS OF STATUS REGISTER
        MOV     A,CR0     ; FETCH STATUS BYTE
        CPL     A
        JB0     CFAIL     ; JUMP TO ERROR ROUTINE (CFAIL) IF ADDRESS MATCH
        JB1     CFAIL     ;   IS NOT INDICATED BY EITHER CARD ADDRESS COMPARATOR

VERIFY CONTENTS OF 'A' & 'B' CONTROL WORD REGS. MATCH EXPECTED CONTENTS
        MOV     A,R5
        XCH     A,R3      ; 63H EXPECTED IN C/R BYTE 3 (R3)
        XCH     A,R5      ; F8H EXPECTED IN C/R BYTE 1 (R5)
        MOV     A,R4
        XCH     A,R2      ; C1H EXPECTED IN C/R BYTE 4 (R2)
        XCH     A,R4      ; 0FH EXPECTED IN C/R BYTE 2 (R4)

MOV     R0,#0FH   ; PIC INTERNAL ADDR. OF CCRP

MOV     R6,#2
LOOP 4: MOV     R1,#5     ; INITIALIZE TEST DATA BYTE POINTER
        MOV     R7,#4     ; INITIALIZE TEST DATA BYTE COUNTER

LOOP 5: MOVX    A,CR0     ; FETCH NEXT C/R DATA BYTE
        XRL     A,CR1     ;   & COMPARE WITH EXPECTED DATA
        JNZ     CFAIL     ; JUMP TO ERROR ROUTINE (CFAIL) IF ANY DATA MIS-MATCH
                          ;   IS DETECTED
        DEC     R1        ; ADJUST TEST DATA POINTER
        DJNZ    R7,LOOP5  ; REPEAT LOOP 5 FOR ALL 4 BYTES OF C/R

DJNZ    R6,LOOP4  ; REPEAT LOOP 4 FOR BOTH 'B' & 'A' C/R'S

END OF PIC DYNAMIC OPERATION TEST
```

*FIG. 35*

TX & RX GAIN AUTO-SET ROUTINE - FLOWCHART (CONT.)

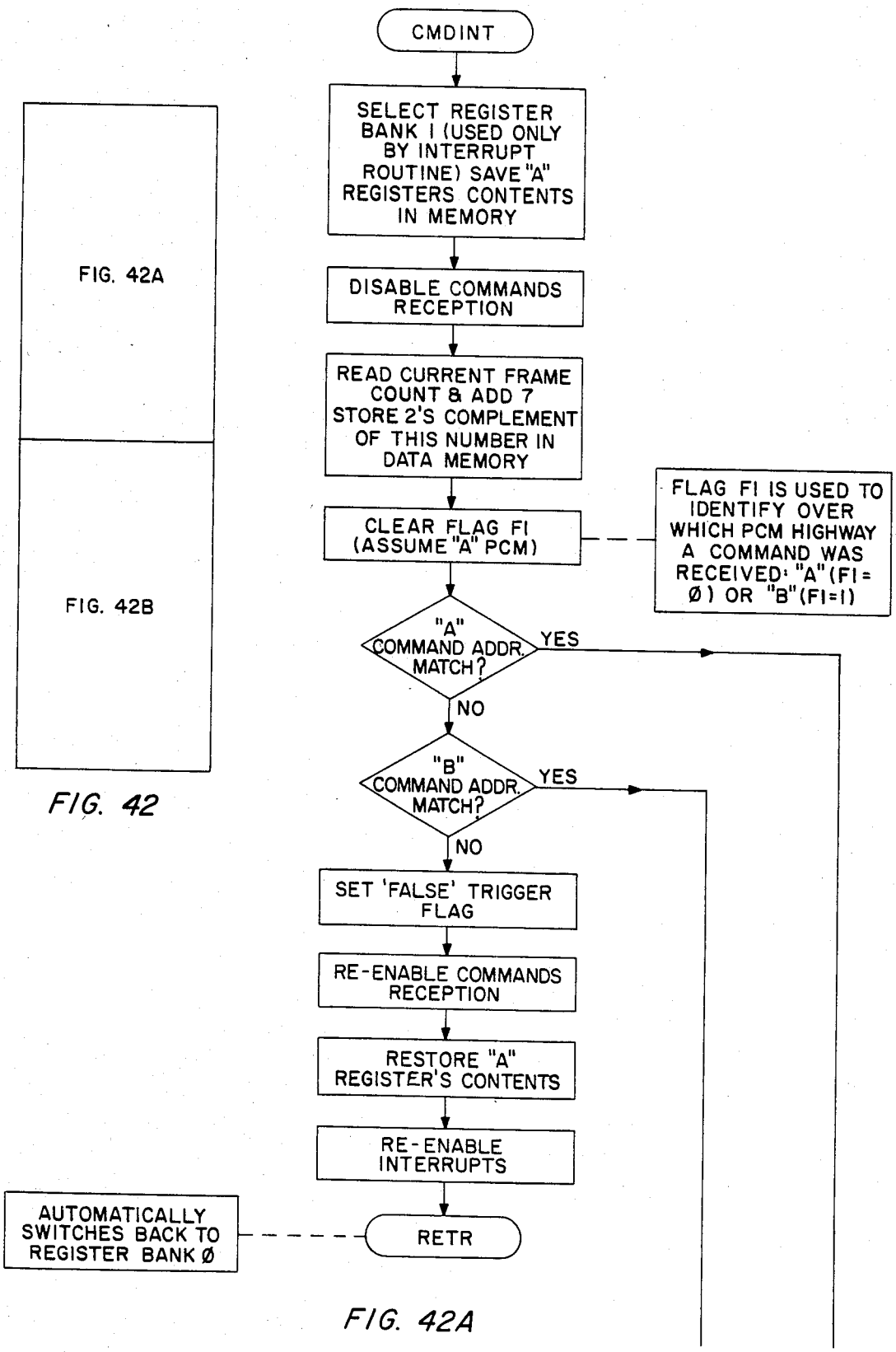

INTERFACE CIRCUIT FOR USE IN A DISTRIBUTED PROCESSING SWITCH UNIT

BACKGROUND OF THE INVENTION

This invention pertains to telephone switching systems in general, and to interfere circuits for interfacing processors to a common bus in distributed control digital telephone switching systems in particular.

The ITT 1210 is an advanced digital switching system manufactured in the United States by International Telephone and Telegraph Corporation. The ITT 1210, which was priorly identified as DSS-1, is described by C. G. Svala, "DSS-1, A Digital Local Switching System With Remote Line Switches", National Telecommunications Conference, 1977, pp. 39: 5–1 to 39: 5–7. As described by C. G. Svala, the ITT 1210 comprises three basic elements, i.e., line switches, a switching network, and a system control. A line switch interfaces with subscriber lines and to one or more PCM (pulse code modulation) lines. A line switch may be co-located with the switching network or may be located remoted therefrom. The switching network coupled to the line switches by the PCM lines comprises a number of digital switching modules called switch groups each of which includes a time-space-time network. The system control includes a pair of processors with associated program and data memories. The system control directs the operation of the switching network and the line switches. Communication of control information between the system control and a line switch is via a common channel superimposed on each PCM line. This common channel approach is described in U.S. Pat. No. 4,125,743, issued Nov. 14, 1978 to R. E. Steidl and assigned to a common assignee.

A large percentage of the equipment costs in a digital switching system is attributable to the line switches. Also the line switch design determines the transmission performance per subscriber line, traffic handling and line signaling functions of the switching system.

It is therefore desirable to provide an improved line switch having a low cost per subscriber line and improved transmission performance.

SUMMARY OF THE INVENTION

In accordance with the principles of the invention, a line switch is provided which has a low cost per subscriber line and improved transmission performance.

In an embodiment of the invention, a line switch comprises one or more line switch modules. Each module can terminate one or more PCM lines and each module interlaces PCM data from the PCM lines onto an internal PCM bus structure that operates at a higher data rate and has a greater number of channels per frame. Each line circuit of a module has access to all the channels of the internal PCM bus structure. Further, in accordance with the invention, a distributed processing control arrangement is provided wherein subscriber lines are arranged in groups and the line circuits associated with a group are controlled by a line group controller. A line switch processor contained in each line switch module is provided for communicating with the system control and for directing the operation of the line group controllers.

In accordance with one aspect of the invention, the internal PCM bus structure serves the dual functions of distributing time multiplexed PCM voice channels data and control data throughout the line switch. All control data exchanged between the line switch controller and the line group controller or any other circuit module is transmitted over the internal PCM bus structure. Thus, expansion of a module is easily accomplished by adding additional line circuit groups or other circuit modules and extending the PCM bus thereto.

Further, in accordance with the invention each line switch controller and line group controller includes a multifunctional interface circuit which provides an interface between a microcomputer and the internal PCM bus structure.

An illustrative embodiment of the invention is a line switch having one or more line switch modules each terminating one of more PCM lines which are connected to the system network. Each line switch module includes a line switch controller which communicates with the system controller via a common channel signaling arrangement over the PCM lines. The line switch controller directs the operation of the various circuits within the line switch module. Each PCM line carries frame organized PCM voice channels with "X" channels per frame. The internal PCM bus structure is arranged such that 2X channels are provided per frame. A rate converter circuit is provided for interlacing PCM channels from two lines onto the PCM bus structure and for demultiplexing PCM channels on the PCM bus structure to the PCM lines.

More specifically, a receive rate converter comprises memory into which PCM data from the PCM lines are stored at the PCM line rate. The memory is read at the PCM bus structure rate in such a fashion tht PCM voice channels data from the two PCM lines is alternately applied to the PCM bus Structure, i.e. first the PCM data for one channel from one PCM line is read and then the PCM data for one channel of the other PCM lines is read. A transmit rate converter likewise comprises memory into which PCM voice channel data from the internal PCM bus structure is stored at the PCM bus structure rate. The stored PCM voice channel data is read from the memory at the rate of the PCM line such that the stored PCM voice channels are read and alternately applied to the two PCM lines.

Additionally, the rate converter includes clock generator and phase-locked loop circuitry. The phase-locked loop permits clock signals which are generated in a line switch module to be in phase-locked synchronization with either of the PCM lines. When two or more lines switch modules are connected together to form a line switch, the phase-locked loop circuits of each module will utilize the same PCM line for phase-locking.

Buffer and distributor circuits are interposed in the PCM bus structure. One function the buffer and distributor circuits provide is that of connecting the PCM bus structure of the various line switch modules in a line switch. The buffer and distributor circuits include gates which permit intra-line switch calls to be connected within the line switch without utilizing the system switching network.

Further, in accordance with the principles of this invention, an arrangement is provided for automatic setting of the line circuits gain.

A further aspect of the invention is the provision of another interface circuit for interfacing each line circuit to its respective line group controller and to the PCM buses.

BRIEF DESCRIPTION OF THE DRAWINGS

Above-mentioned and other features and objects of this invention will become more apparent by reference to the following description taken in conjunction with the accompanying drawing, in which:

FIG. 1 illustrates in block diagram form a digital switching system in accordance with the principles of the present invention;

FIGS. 3 and 3A illustrate the traffic handling capability of the line switch of FIGS. 2 and 2A, respectively;

FIG. 4 illustrates the format of PCM frames that can be employed in the system of FIG. 1;

FIG. 5 illustrates an alternate PCM frame format that can be employed in the system of FIG. 1;

FIG. 9A illustrates the interleaving operation of the RX rate converter portion of interface logic 6 of FIG. 8;

FIG. 10A illustrates the demultiplexing operation of the TX rate converter of FIG. 8;

FIGS. 24A and 24B when arranged as shown in FIG. 24 are timing diagrams in the buffer and distributor 9 of FIG. 22;

FIG. 26 illustrates a command word format;

FIGS. 27A and 27B when arrnged as shown in FIG. 27 illustrate in block diagram form the per line control interface 44 of FIG. 25;

FIG. 28 illustrates the format of a control word directed to the per line control interface 44;

FIG. 29 illustrates the format of a control word directed to a CODEC 43 of FIG. 25;

FIGS. 30A and 30B when arranged as shown in FIG. 30 show in block diagram form the gain/balance circuit 41 of FIG. 25B;

FIG. 31 illustrates the format of a control word transmitted over buses PCMLCA, PCMLCB;

FIG. 33 illustrates the register status of interface 23 during a self-test operation FIGS. 34 and 35 are flow charts of the self-test operation of interface 33;

FIGS. 42A and 42B when arranged as shown in FIG. 42 and FIGS. 43A and 43B when arranged as shown in FIG. 43 are flow charts of programs for the line group processor 34.

DETAILED DESCRIPTION

1. GENERAL (FIGS. 1 and 2)

Figure 2:
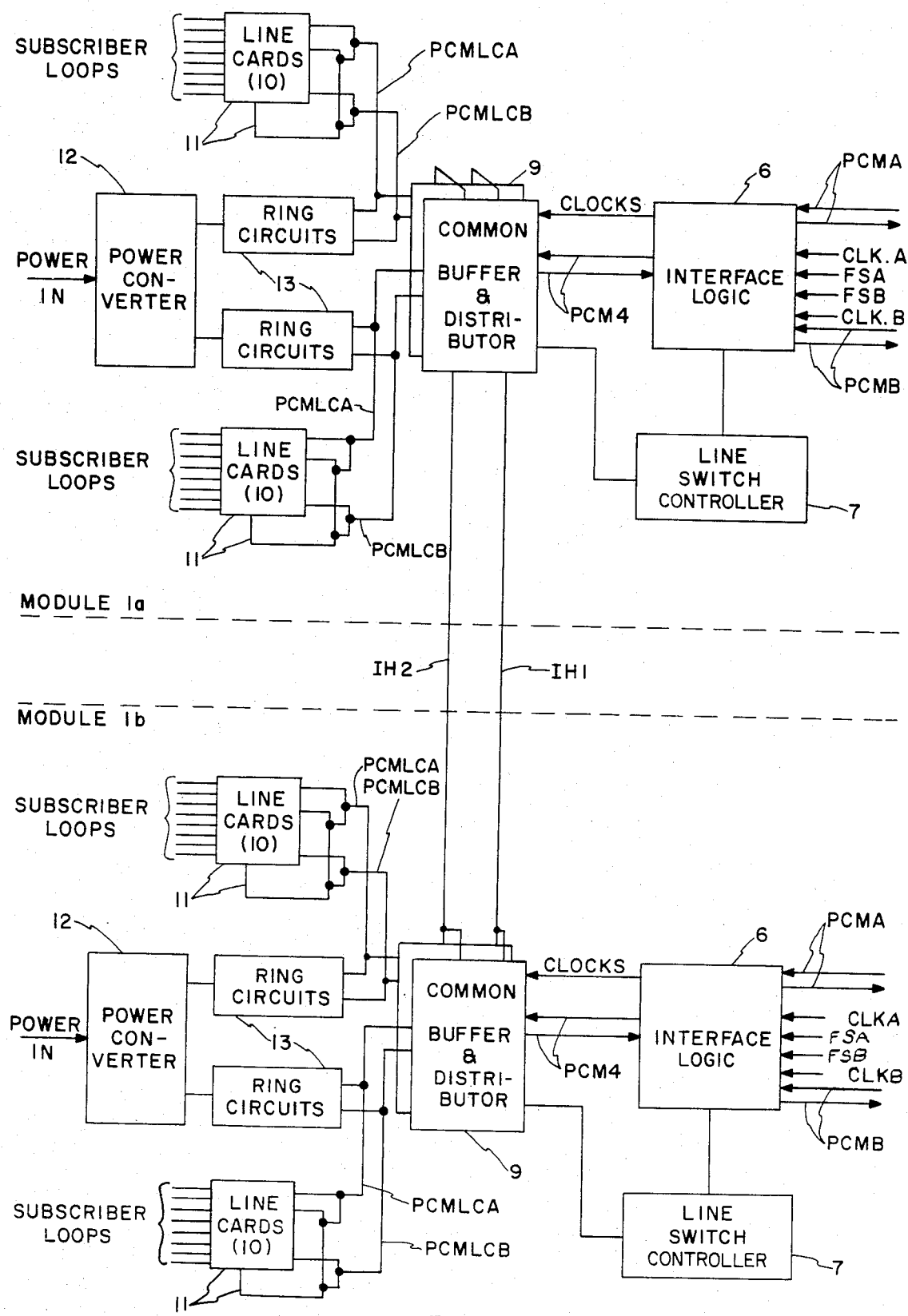
FIGS. 2 and 2A illustrate in block diagram form two embodiments of a line switch comprising two line modules that can be employed in the system of FIG. 1.
Figure 2A:
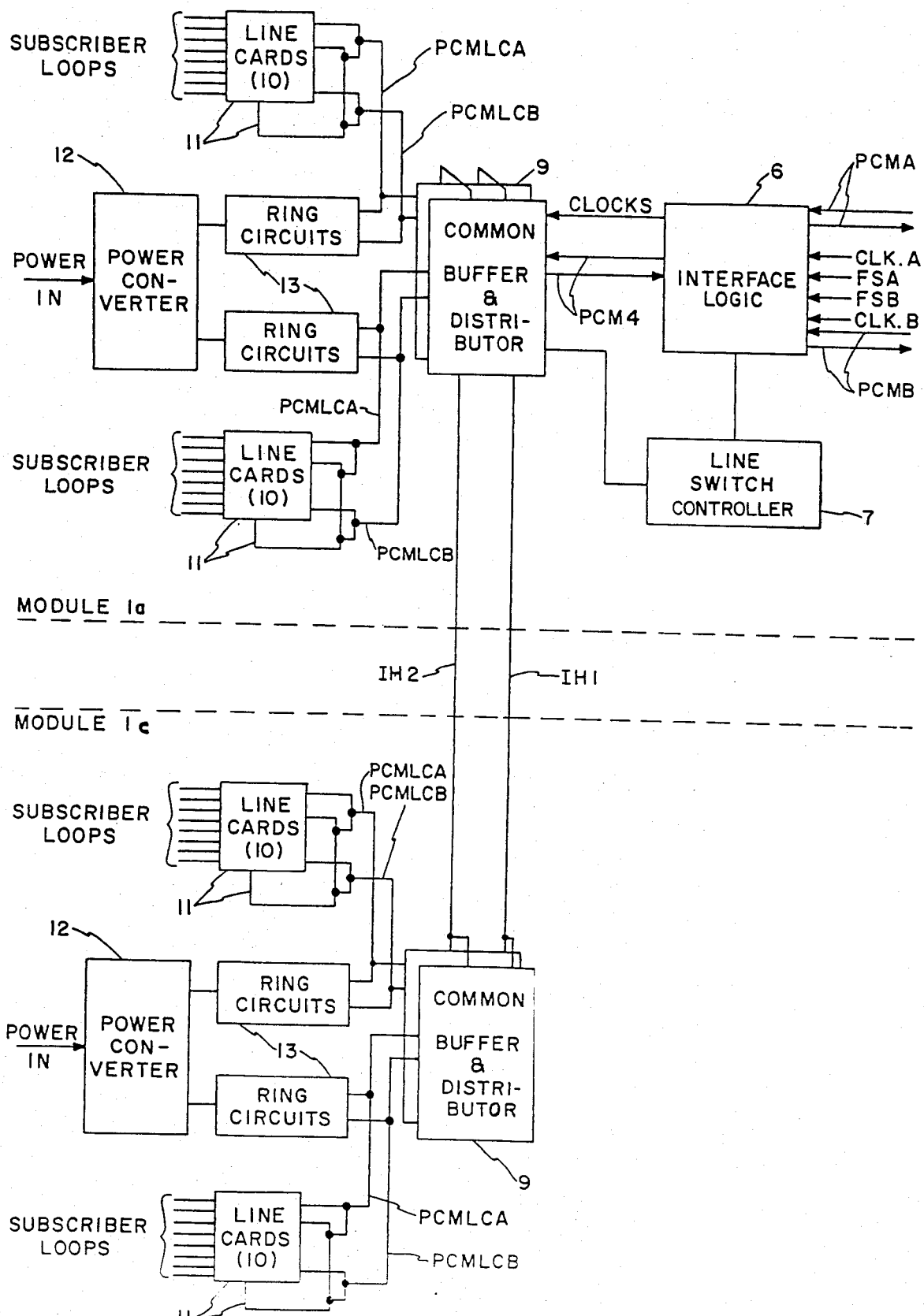

The stored program controlled switching system of FIG. 1 is a PCM-TDM digital switching system which includes a switching network 3 controlled by a system controller 5. A more detailed description of the system controller 5 and the switching network 3 is provided in the aforementioned C. G. Svala reference. The system further includes "n" line switches 1 each serving a number of subscriber lines 2. Each line switch is coupled to the switching network 3 via one or more PCM lines 4. PCM transmission between the line switches 1 and the switching network 3 takes place over the PCM lines 4. Each PCM line 4 includes, as is well understood, a path for PCM transmission from the switching network 3 to a line switch 1 and a second path for PCM transmission fom a line switch 1 to the switching network 3. Each PCM line 4 carries frame-organized data or speech at any conventional rate. Operation of the line switches 1 are controlled by the system controller 5. In one illustrative embodiment of the invention, a common channel signaling arrangement such as that taught in U.S. Pat. No. 4,125,743 issued Nov. 14, 1978 to R. E. Steidl is utilized such that control information between th system controller 5 and the lines switches 1 is transmitted over the PCM lines 4. Typical information is sent by a line switch to the system controller 5 including the following:
1. Report of line seizures which the line switch has detected; and
2. Report of a fault detected in the line switch.

Typical commands sent by the system control 5 to a line switch include the following:
1. Request for assignment of subscriber line to a channel or release of a line from a channel;
2. Request for ringing to a line;
3. Request for maintenance functions to be performed; and
4. Request for party test to identify the party on the line.

FIG. 2 illustrates one of the line switches in greater detail.

Reliability of operation and flexibility in expansion is provided by organizing the circuits of each line switch in clusters or "security blocks" of circuits that function as a unit. For any single fault, only the group of circuits within the security block containing the fault may be lost to service. Thus, a single fault will not cause a loss of service to the entire line switch. As will be evident to those skilled in the art, the various circuits in the illustrative line switch described herein may be organized without the security block arrangement shown or the size of the various security blocks may be changed.

In accordance with the security block organization of the line switch, the illustrative line switch is organized as two identical line switch modules. Each line switch module is self contained to the extent that it can operate as a line switch for a number of subscriber lines.

A further aspect of the novel line switch is that distributed processing is advantageously utilized. Three separate distributor processor functions are provided in each line switch module. First, one processor is utilized to communicate with the system controller 5 of FIG. 1 and to coordinate the operations within the line switch module. A second processor is provided within a line switch module to control clock generation and rate conversion circuits. A third processor is provided for a group of line circuits to control the operation of the line circuits and to gather information from the line circuits.

A further aspect of the line switch architecture is that an internal busing arrangement is provided wherein both conrol and PCM data are routed throughout the line switch. With this arrangement, a standardized interface between each processor and the PCM bus may be provided.

In addition to having the capability for establishing connections between subscriber lines connected to the line switch and the switching network 3, the present line switch has the capability of establishing intra-line switch connections without the switching network 3.

In accordance with the aforementioned security block organization the line switch 1 is organized as two identical line switch modules 1a, 1b. Each of the line switch modules 1a, 1b is self-contained to the extent that it can operate as a line switch and is connectable to up to 160 suscriber lines or loops. The 160 lines associated with a module are arranged as two clusters of lines. Each cluster is in turn divided into 10 groups of lines, each group includes 8 lines and in the illustrative embodiment each group of 8 lines has its associated line circuits arranged on one circuit card. It should be noted, that in other embodiments, a group may contain more or less lines and the lines may be arranged in one or more clusters.

Each line switch module 1a, 1b is coupled to the switching network 3 of FIG. 1 via two PCM lines PCMA, PCMB; bit clock lines CLKA, CLKB; and frame clock lines FSA, FSB. The PCM lines PCMA, PCMB operate at a 1.544 mbs. rate carrying 24 voice channels in a frame in the North American network or at a 2.048 mbs. rate carrying 30 voice channels in a frame in European and many foreign networks. Although two PCM lines are shown, the line switch module may be connected to only one PCM line.

The frame clock lines FSA, FSB each provide a 4 KHz signal from the switching network 3 of FIG. 1 and each is used to identify which incoming bit is a common channel signaling bit. The common channel signaling bits occur in the 193rd bit position of every other frame. The intermediate 193rd bits are synchronization bits and are used to determine the A and B signaling frames.

The bit clock lines CLKA, CLKB each provide a 1.544 mHz clock.

The interface logic 6 operates to derive various clocking signals for use in the line switch module. More significantly, interface logic 6 multiplexes and interlaces the PCM channels from the two PCM lines PCMA, PCMB onto bus PCM4 and demultiplexes and separates PCM channels from bus PCM4 to the PCM lines PCMA, PCMB. More specifically, the bus PCM4 operates at a 4.096 mbs. rate. Data transmitted over bus PCM4 is arranged in frames of 512 bits, 480 of which are used for PCM. If the lines PCMA, PCMB operate at a 1.544 mbs. rate with 24 channels per frame, the channels on the lines PCMA, PCMB will be interlaced and rate converted to provide 48 channels each 10 bits wide at a 4.096 mbs rate on bus PCM4. If the lines PCMA, PCMB operate at a 2.048 mbs rate with 30 channels per frame, they will be interlaced and rate converted to provide 60 channels each 8 bits wide at a 4.096 mbs. rate on bus PCM4. The remaining thirty two bits of each 512 bit frame on PCM4 are used for internal control of the line switch module.

The line switch controller 7 receives common channel commands from the system controller 5 of FIG. 1 over the PCM lines PCMA, PCMB and via the interface logic 6. The line switch controller 7 communicates with and controls the various circuits of the line switch module via bus PCM4 by utilizing the aforementioned 32 bits.

Buffer and distributor circuits 9 are connected to the bus PCM4 and serve to buffer PCM signals between the bus PCM4 and the line cards 11, ring circuits 13, and other circuits. Two buffer and distributor circuits 9 in each line switch module are provided to partition the PCM buses into segments, i.e., security blocks, which are isolated from each other to prevent propagation of faults in the line switch and the impact of faults in a group of lines upon all other lines in the line switch. Both buffer and distributor circuits in a line switch module contain identical circuitry for buffering and distributing PCM signals and each is connected to one of two clusters of line circuits. Additionally, the buffer and distributor circuits 9 provide buffering to the PCM buses in the other line switch module of the line switch. Thus, each line switch controller 7 has access to all the line ciruits in both line switch modules of a line switch and PCM signals may be coupled to all circuits in a line switch. The buffer and distributor circuits 9 includes gating circuits which provide for intra-line switch calls between any two line circuits within the line switch without the need to route the calls through the switching network 3 of FIG. 1. Additionally, one of the buffer and distributors 9 of a line switch module includes circuitry for deriving various clocking signals from the various clock lines CLKA, CLKB, FSA and FSB.

Each buffer and distributor 9 is coupled to all th line and other circuits in a cluster by two PCM buses PCMLCA, PCMLCB each of which runs at a 4.096 mHz rate. One of the PCM buses, e.g. PCMLCA of line switch module 1a, is derived directly from the bus PCM4 in the same line switch module. The other of the PCM buses, e.g. PCMLCB of line switch module 1b, is derived from the bus PCM4 of the other module. In the North American Network each bus PCMLCA, PCMLCB will have 48 PCM channels at a 4.096 mHz rate. Thus each line circuit will have access to 96 PCM channels in the line switch.

As pointed out hereinabove, each group of 8 line circuits is arranged on a single circuit card. Each of group circuits is controlled by a microprocessor which is in turn controlled by the line switch controller 7 via the 32 control bits available during each frame. By providing a microprocessor on each line card the work load on the line switch controller 7 is reduced, flexibility of application is obtained, and maintenance functions may be more easily provided.

Ring cards or circuits 13 are provided in the line modules. The ring cards 13 also include microprocessors which reside on the ring cards. The ring cards contain their own ring frequency generator and a ring card is controlled by the line switch controller 7 via the 32 control bits available during each frame. Timing of the ringing is done via the microprocessors which reside on each line card and on each ring card.

Each line module also includes a power converter 12.

2.0 TRAFFIC HANDLING CAPACITY (FIG. 3)

The line switch shown in FIG. 2 can as noted above be configured such that each line switch module 1a, 1b is connected to the switching network 3 of FIG. 1 by one or more PCM lines PCMA, PCMB. Also, the line switch may be operated as either a 24 or 32 channel system. FIG. 3 illustrates the traffic handling capability of the line switch of FIG. 2 for different numbers of PCM lines in 24 or 34 channel systems.

3.0 PCM BUSES (FIGS. 4, 5, 6 and 7)

Each of the PCM buses PCMLCA, PCMLCB and PCM4 in the line switch of FIG. 2 carries information in frames of 125 microsec. in duration. One frame comprises 512 bits. Two alternate arrangements for formatting the 512 bit frame are shown in FIGS. 4 and 5 which may be found on the same sheet as FIG. 1. If the line switch is to be used in a 24 channel system, the frames will be arranged as shown in FIG. 4. Forty-eight channels of 10 bits each and 32 additional bits which are utilized as control bits for control of internal line switch functions are provided. By providing 10 bit channels, the line switch may be readily utilized in integrated digital switches proposed for the future wherin each channel will be arranged as shown in FIG. 5. FIG. 5 shows each frame arranged as sixty 8-bit channels and 32 control bits. Other formats may easily be utilized for use in other systems.

Figure 6:
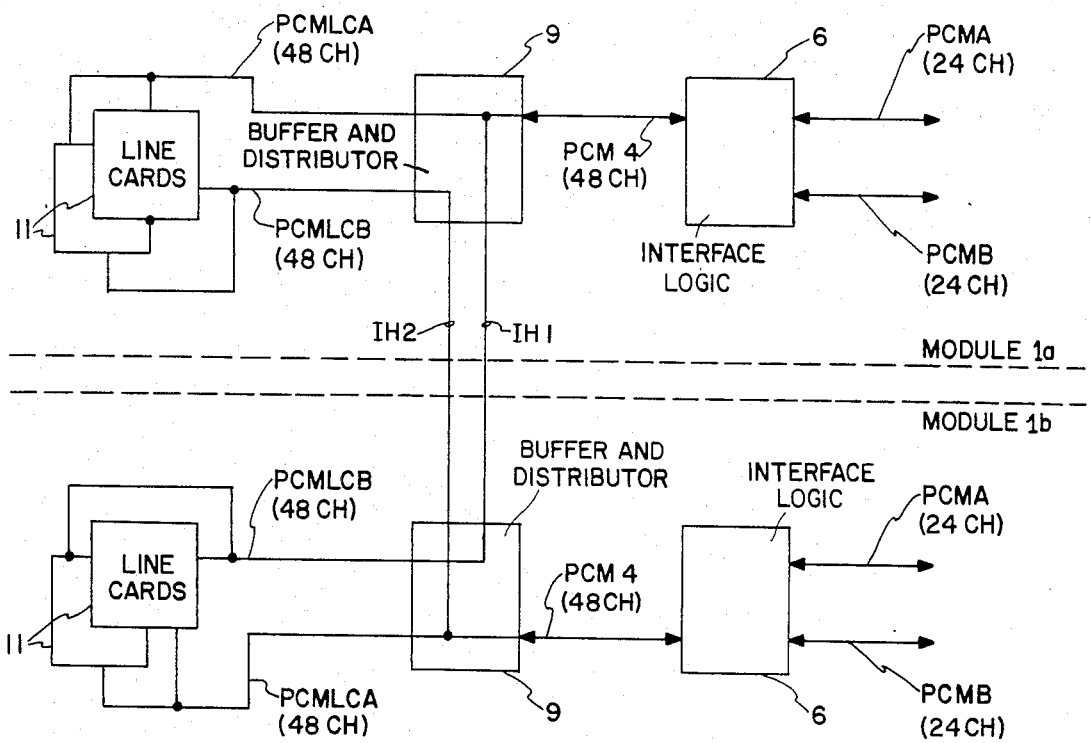
FIG. 6 illustrates in a general form the distribution of PCM channels within the two line modules of FIGS. 2 and 2A.

FIG. 6 illustrates the distribution of PCM channels in the line switch of FIG. 2 when used in a 24 channel system. To further simplify an understanding of the PCM channel distribution, only one cluster of line groups 11 and only one buffer and distributor 9 is shown for each line switch module 1a, 1b. The format of FIG. 4 is utilized. In each line switch module 1a, 1b two 24 channel, 1.544 mHz PCM lines PCMA, PCMB are connected to the interface logic 6. The interface logic 6 provides rate conversion and interlacing between th PCM lines PCMA, PCMB and the 48 channel, 4.096 mHz bus PCM4. The buffer and distributor 9 of each line module connects bus PCM4 to a 48 channel 4.096 mHz bus PCMLCA within the same module and via an inter highway bus 1H1 or 1H2 to a 48 channel, 4.096 mHz bus PCMLCB in the other module.

Therefore, each line circuit has access to a total of ninety-six 10 bit channels since PCMLCA and PCMLCB are each 48 channel buses. Further, with this configuration each line circuit has access to the two 24 channel PCM lines PCMA, PCMB in the same module and also to the two 24 channel PCM lines PCMA, PCMB in the other module.

Figure 7:
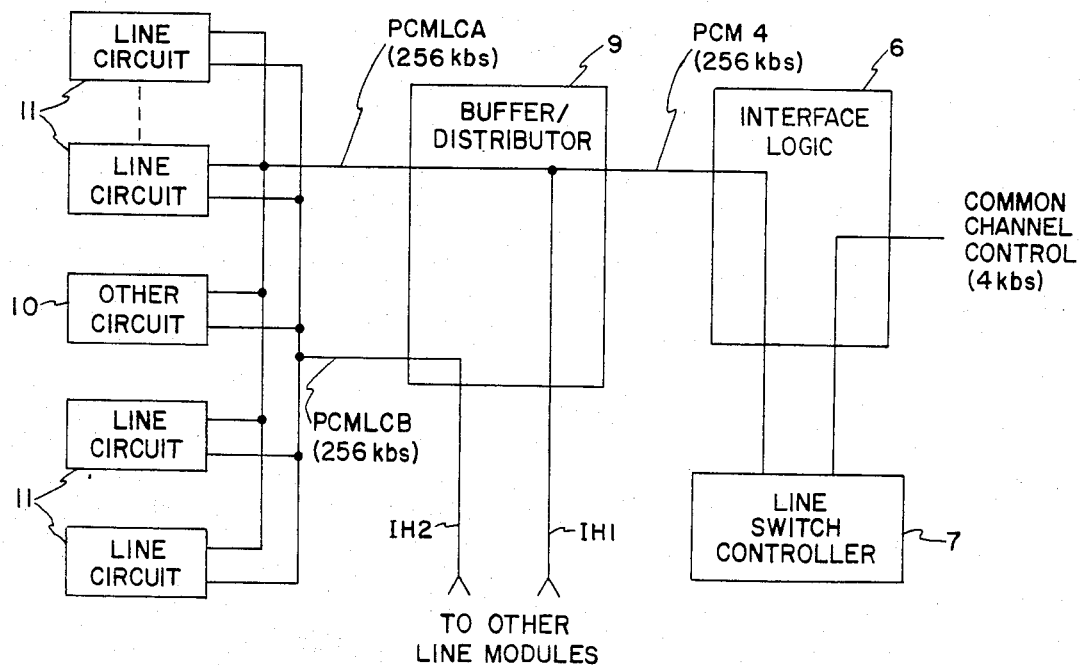
FIG. 7 illustrates in a general form the control communication paths within the line switch of FIG. 2.

As pointed out hereinabove, th line switches 1 are controlled by the system controller 5 of FIG. 1. The line switch controller 6, in turn control the operation of the line circuits 11 and other circuits within a line switch. Turning now to FIG. 7, the line switch controller 7 communicates with the system controller 5 via a common channel signaling arrangement over the PCM lines PCMA, PCMB as described in the aforementioned R. E. Steidl patent. If it is assumed that the PCM lines operate at a 1.544 mHz rate and one common channel signaling bit is provided in every other frame, then the common signaling channel operates at a 4 kbs rate, i.e. 1 bit/2 frames × 8000 frame/sec = 4 kbs. The buses PCM4, PCMLCA, PCMLCB are used to transmit 32 bits of control data per frame, each frame being 125 microsec. in duration. The buses PCM4, PCMLCA, PCMLCB operate as 256 kbs control data channels, i.e., 32 bits/frame × 8000 frames/sec = 256 kbs. A line switch controller 7 thus provides a common 256 kbs control channel to each line circuit 11 or other circuit (which may be the ring circuit 13 or power converter circuit 12 of FIG. 2) via buses PCM4 and PCMLCA in a line switch module and additionally provides via bus 1H1 or 1H2 the same 256 kbs control data channel to other line switch modules in a line switch. Furthermore, bus 1H2 or 1H1 via bus PCMLCB provides a 256 kbs control channel from the other line switch modules in a line switch to the line circuits of the line switch module shown in FIG. 7.

4.0 INTERFACE LOGIC 6 (FIG. 8)

4.1 General

Figure 8:
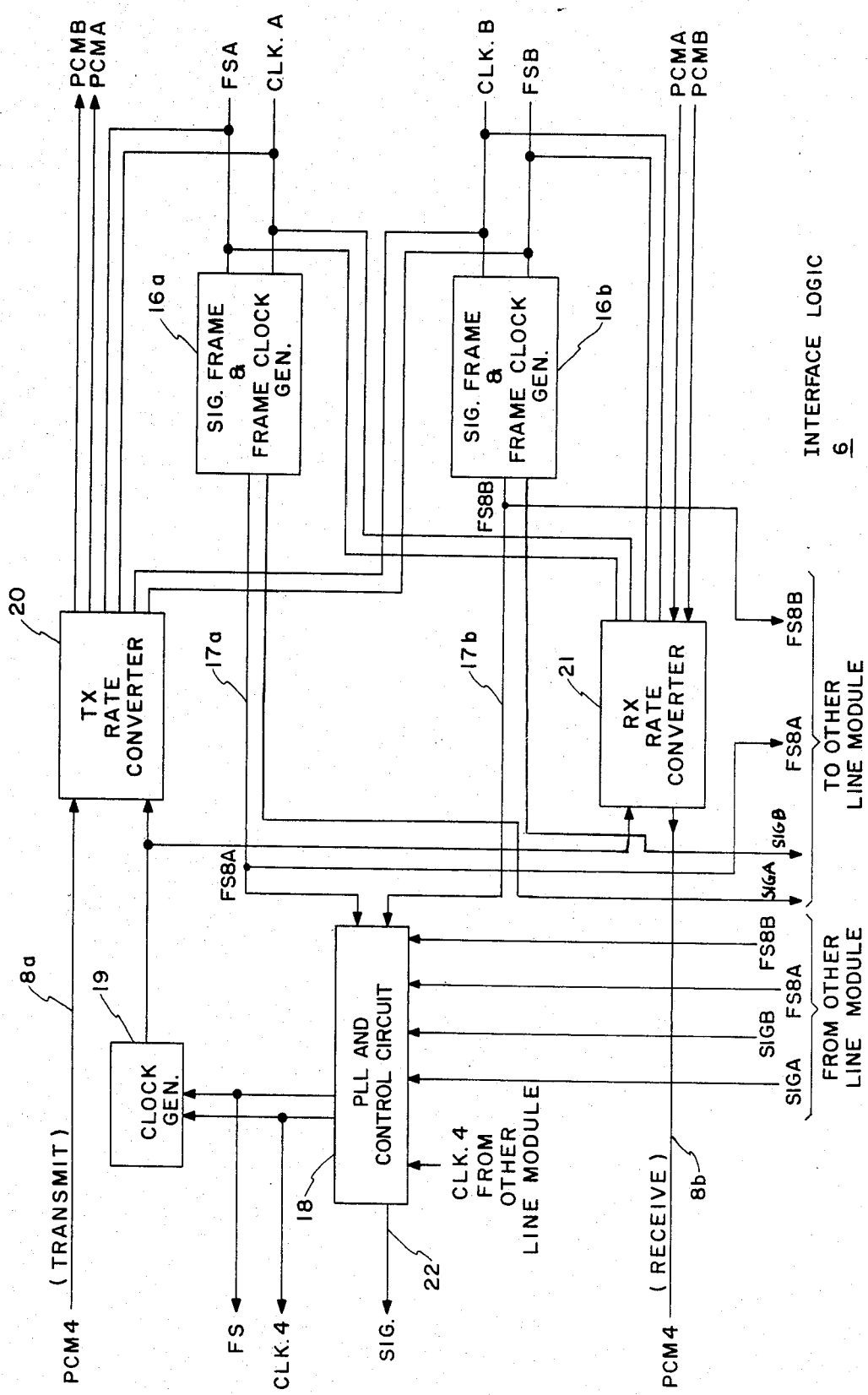
FIG. 8 illustrates in block diagram form the interface logic 6 of FIG. 2.

The interface logic 6 shown in block diagram form of FIG. 8 provides rate conversion and interlacing/demultiplexing of data between the two PCM lines PCMA, PCMB and the bus PCM4. Bus PCM4 and other PCM buses in the line switch are clocked at a 4.096 mHz bit rate. These buses must interface to the PCM lines PCMA, PCMB which clock PCM at a 1.544 mHz bit rate (or a 2.048 mHz bit rate in other applications). The interface logic 6 provides for the line switch internal clocks to be synchronized to the PCM line clocks CLKA, CLKB at frame boundaries such that no PCM bits are lost during rate conversion. This is accomplished by phase locking the internal clock to a PCM line clock by means of phase-locked loop (PLL) circuitry.

The rate converter portion of interface logic 6 includes memory elements for the PCM bit streams. The PCM data from bus PCM4 are written into a memory in the rate converter as the data for PCM lines PCMA, PCMB are read from the memory. Likewise, PCM data from lines PCMA, PCMB are written into a memory as the data for bus PCM4 is read from the memory.

Each of the two PCM lines PCMA, PCMB is connected to one of two corresponding identical signaling frame and frame clock generator circuits 16a, 16b. Each generator 16a, 16b derives an 8 khz clock signal on leads 17a, 17b, respectively, from the bit clock signal received via the respective bit clock leads CLKA and CLKB and determines the presence of a signaling frame, and generates a signaling frame signal. The 8 kHz clock is applied to a phase-locked loop and control circuit 18 and is supplied to a corresponding phase-locked loop and control circuit 18 in another interface logic 6 via leads FS8A or FS8B. The phase-locked loop and control circuit 18 generates a 4.096 mHz clock which is phase-locked to a selected 8 kHz clock on leads 17a, 17b or on the leads FS8A, FS8B which come from an interface logic circuit 6 of another line switch module. Thus, the phase-locked loop 18 of a line switch module may be locked to any one of four 8 kHz clocks. The 4.096 mHz clock is provided on lead CLK4 and also to a clock generator circuit 19. The generator 19 provides a framing signal at an 8 kHz rate and clock signals at a 4.096 mHz rate for the transmit (TX) and receive (RX) rate converter circuits 20 and 21 respectively.

The PLL and Control Circuit 18 selects which one of the four 8 kHz clocks on lead 17a, 17b, FS8A and FS8B is to be used as a master clock of the line switch. The phase-locked loop and control circuit 18 contains failure detection circuitry for all the 8 kHz clocks. When the absence of a clock pulse occurs the failure detector will insert a pulse to maintain the oscillation frequency of PLL, and another one of the remaining working 8 kHz clocks will be selected as a master.

Additionally, there is cooperation between the PLL and control circuits 18 in the modules of a line switch such that all will operate to select the same 8 kHz derived clock as a master. This assures that the PLL's of all line switch modules are synchronized to the same clock source.

Each PLL further includes self-check circuitry such that, if a PLL fails, the PLL will automatically disconnect itself from the 4.096 mHz line CLK4 and connect the line CLK4 to the output of the PLL in the other line switch module.

4.2 RX RATE CONVERTER (FIGS. 8, A-D)

Rate conversion and interlacing/demultiplexing are provided primarily by the TX rate converter 20 and the RX rate converter 21. The bus PCM4 includes a transmit path 8a and a receive path 8b. Likewise, the PCM lines PCMA, PCMB have both transmit and receive paths.

Incoming PCM signals from the switching network 3 over lines PCMA, PCMB are applied to the RX rate converter 21. The RX rate converter 21 operates as a FIFO type memory. Information received over the PCM lines PCMA, PCMB is stored at the rate of the PCM lines, i.e. 1.544 mHz for the North American Network of 2.048 mHz for the other systems. More specifically for the North American Network data from PCM line PCMA is clocked into RX rate converter 21 at a 1.544 mbs rate as determined by the 1.544 mHz PCM clock line CLKA of PCM line PCMA. Likewise, data from PCM line PCMB is clocked into the RX rate converter 21 as determined by CLKB. The data stored in the RX rate converter 21 is read at a 4.096 mbs rate as determined by the 4.096 mHz output of clock generator 19. The 1.544 mHz clocks signals received over CLKA, CLKB are not necessarily synchronized. However, the 4.096 mHz clock signals are phase locked to the clock signals of one of the PCM lines connected to a line switch.

Data from the two PCM lines PCMA, PCMB is alternately read from the RX rate converter and applied to the receive portion of bus PCM4, i.e., path 8b. FIG. 9A illustrates the interleaving of channels from the PCM lines PCMA, PCMB onto the bus PCM4.

Figure 9B:
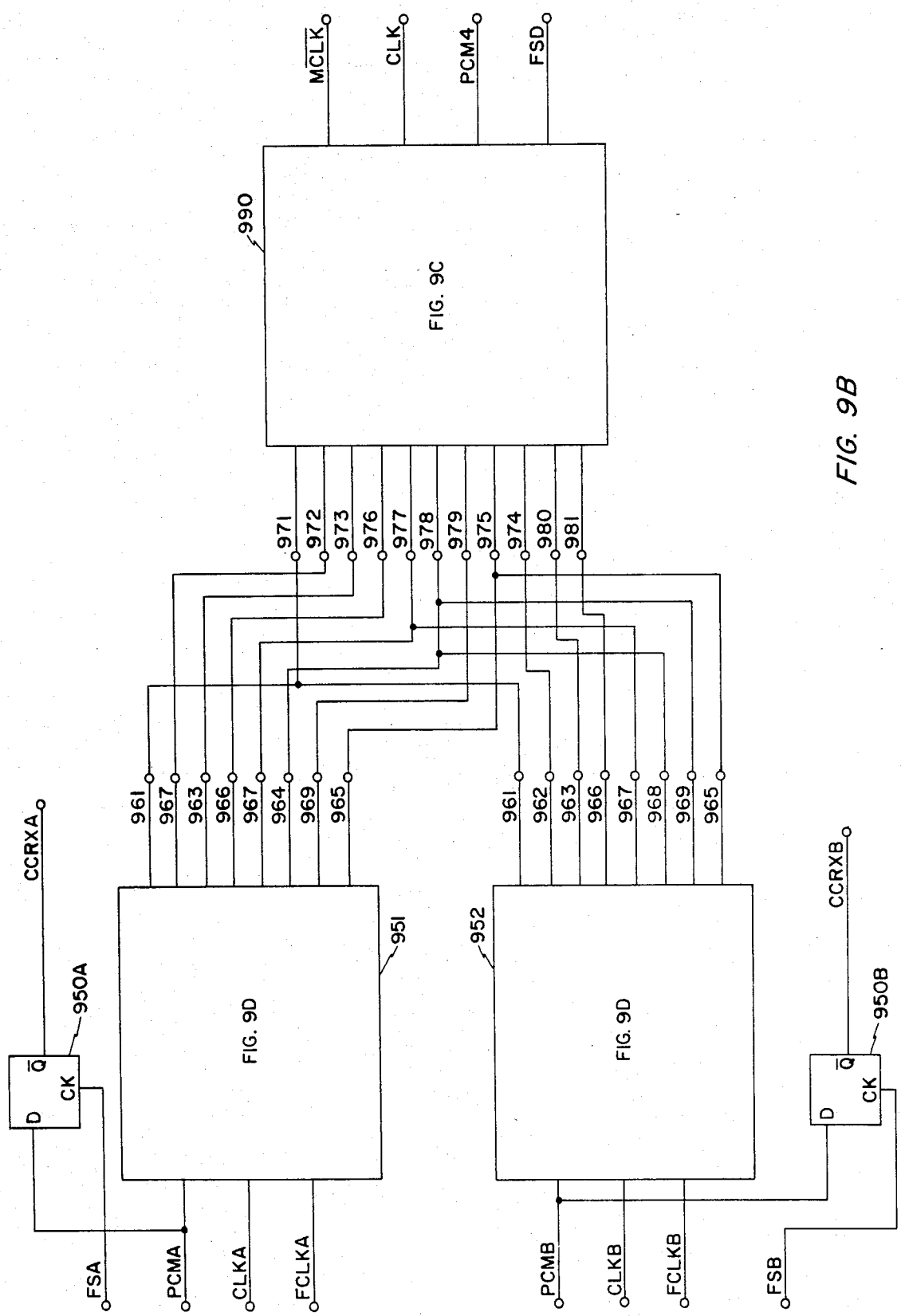
FIGS. 9B, 9C and 9D illustrate in block diagram form the RX rate converter 20 of FIG. 8.
Figure 9C:
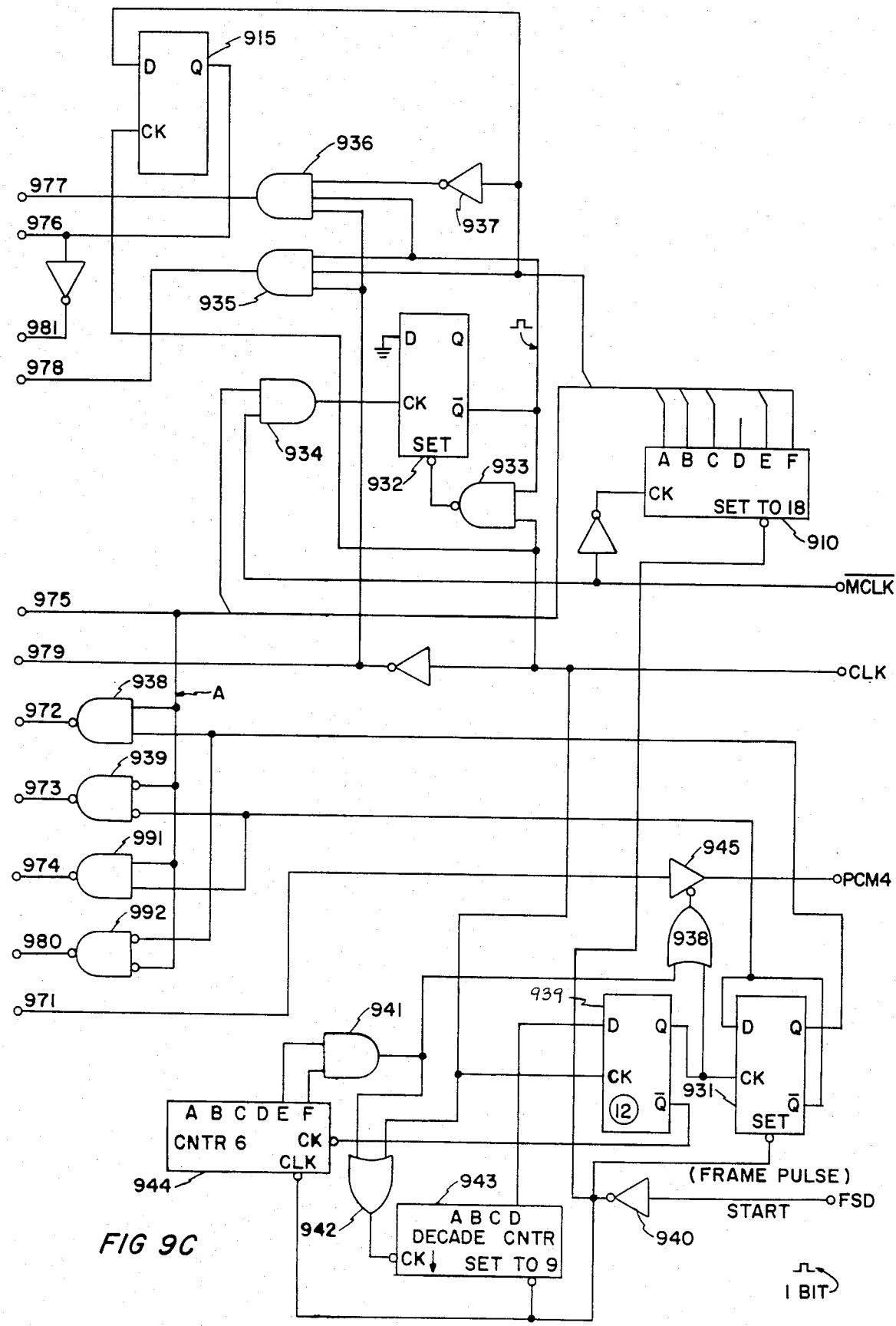
Figure 9D:
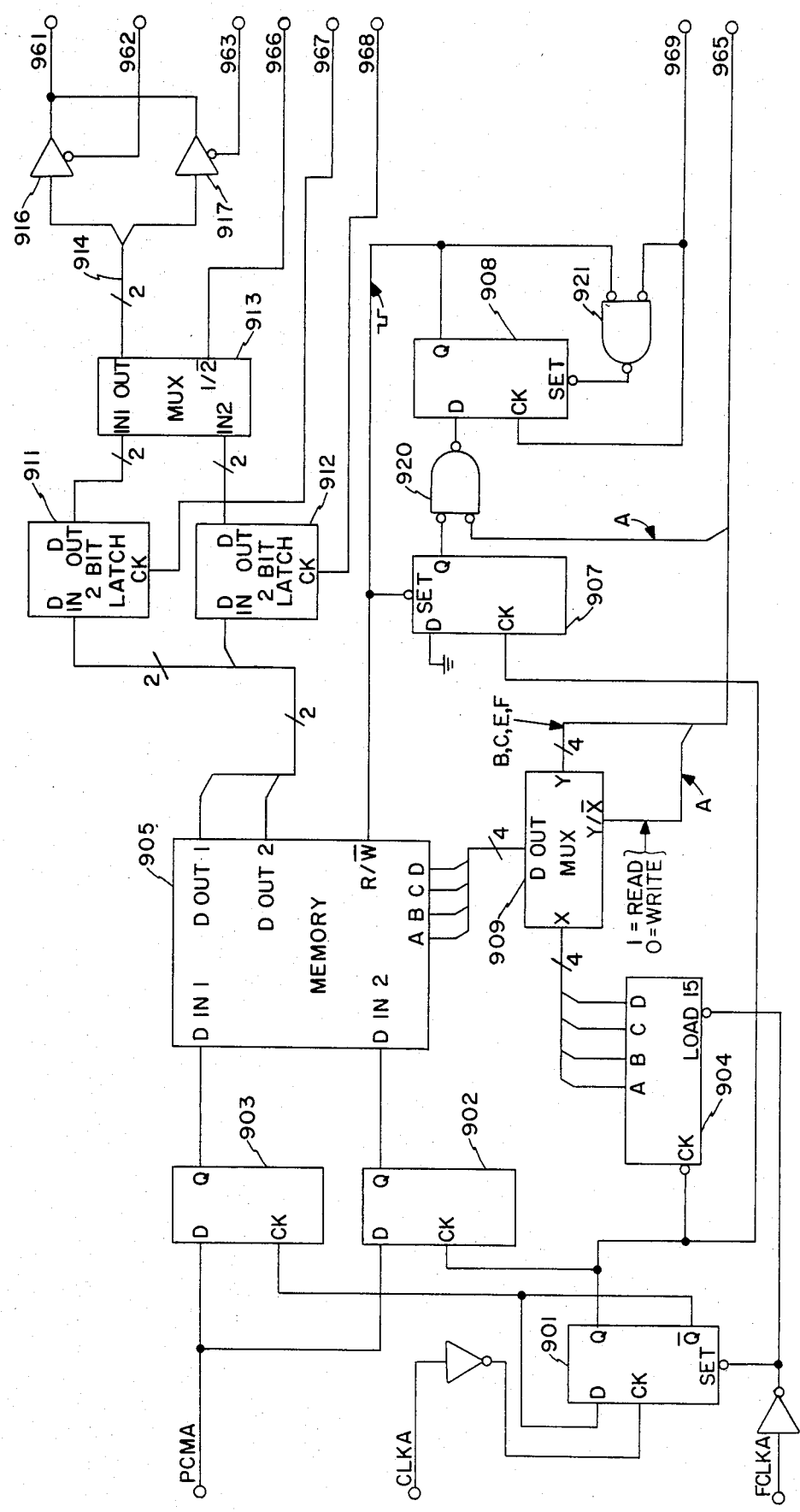

The RX rate converter 20 is shown in greater detail in FIGS. 9B, 9C and 9D. FIG. 9B illustrates the interconnection of the circuits of FIGS. 9C and 9D. The circuitry of box 951 for PCM line PCMA is duplicated in box 952 for PCM line PCMB and is shown in detail in FIG. 9D. FIG. 9C shows box 990 in detail. Turning now to FIGS. 9C and 9D, serial PCM data is received from PCM line PCMA. Alternately received bits are stored in buffer flip-flops 902 and 903 by flip-flop 901. After every other bit is stored in the flip-flops 902, 903, the write address counter 904 is advanced by one count and the two bits stored in flip-flops 902, 903 are stored in the memory 905. The flip flops 902, 903 act as a two bit serial to parallel converter and thus form two bit words for storing in the memory 905. Memory 905 is organized as sixteen 2 bit words and is a random access memory. Memory 905 includes four addresss bit inputs and read/write input. A read write control circuit comprising flip-flops 907, 908 and gates 920, 921 determines whether a read or write operation is to occur. An address selector 909 is used to select either a write address from counter 904 or a read address from counter 910.

When the data stored in flip-flops 902, 903 is to be stored in memory 905, the selector 909 selects the counter 904 as the source for the memory address and flip-flop 908 applies a write signal to the memory 905. When data is to be read from memory 905, selector 909 selects counter 910 as the source for the memory address and flip-flop 908 provides a read control signal to the memory 905. Data read from memory 905 is read as two bit words which are alternately stored in the two bit latches 911, 912. The flip flop 932 and gates 933, 934, 935, 936 and 937 control the loading of data read from memory 905 into the latches 911, 912. A selector 913 under control of flip-flop 915 alternately gates the outputs of the latches 911, 912 onto the two bit lines 914. Tri-state buffer gates 916, 917 controlld by gates 938, 939 alternately connect one of the lines 914 to the single line 961. The flip-flop 931 is used to select either the outputs from box 951 or 952 to be applied to the line 961. Flip-flop 931 changes its output state once for each voice channel on PCM4.

In effect, latches 911, 912; selector 913 and gates 916, 917 operate as a parallel to serial converter and flip-flop 931 operates to select either PCMA or PCMB as the source of data on PCM4. The read address counter 910 is driven by signal $\overline{MCLK}$ which as will be described below defines the format of PCM4. Pulses are provided by $\overline{MCLK}$ which correspond to the PCM voice bits on the bus PCM4.

The gates 938, 940, 941, 942, flip-flop 939, decade counter 943 and 6 bit counter 944 operate to control the tri-state buffer gate 945. Gate 945 is enabled when PCM data from either PCM line PCMA or PCMB is to be transmitted over PCM4. In accordance with the format for PCM4 shown in FIG. 4, gate 945 is enabled for the 8 PCM sample bit positions of each 10 bit channel and is disabled for the remaining two bits. Also, gate 945 is disabled for the 32 control bit positions in each frame.

4.3 TX RATE CONVERTER (FIGS. 8, 10A, B and C)

The TX rate converter 20 of FIG. 8 mirrors the operation of the RX rate converter 21. Specifically, the channels of data on the transmit portion 8a of bus PCM4 are stored in a FIFO memory of the TX rate converter 20. Information is received at a 4.096 mbs rate and stored under control of the 4.096 mHz clock signals of clock generator 19. Alternate channels of data stored by the TX rate converter are forwarded to the PCM lines PCMA, PCMB at a 1.544 mbs rate as determined by the respective clock signals CLKA, CLKB or the PCM lines. This demultiplexing operation is shown in FIG. A.

Figure 10B:
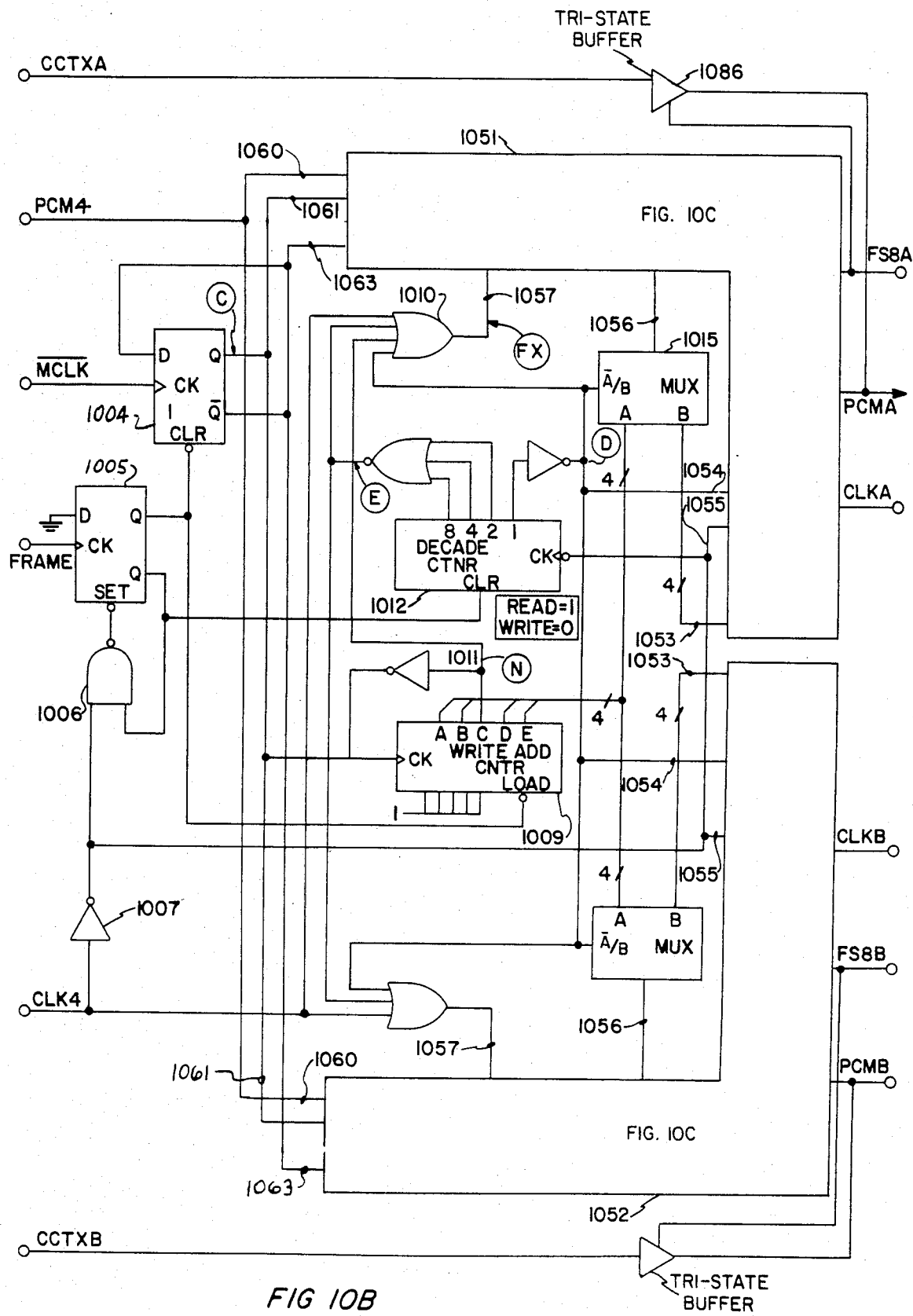
FIGS. 10B and 10C illustrate in block diagram form the TX rate converter 21 of FIG. 8.
Figure 10C:
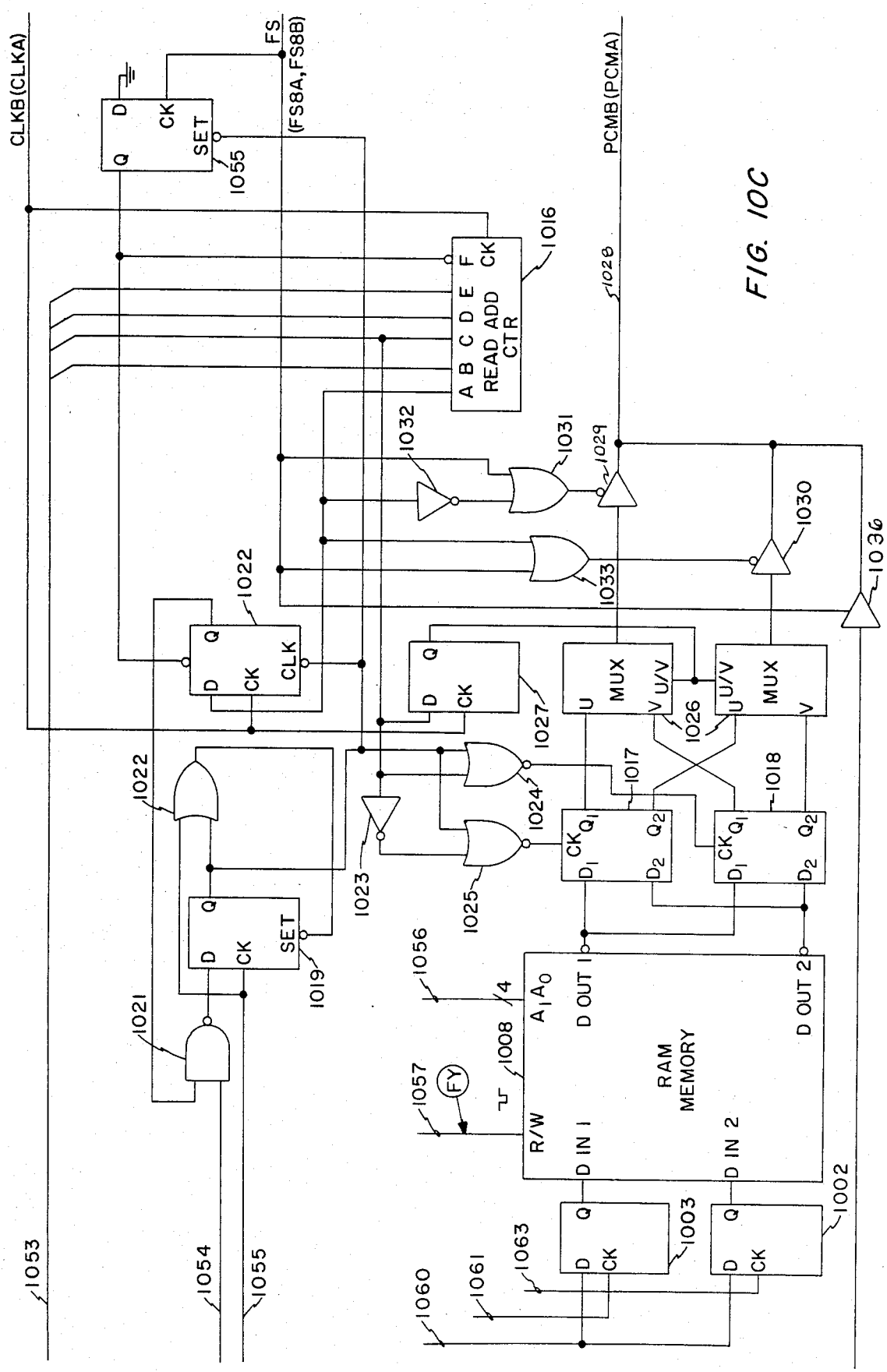

The TX rate converter 21 of FIG. 8 is shown in detail in FIGS. 10B and 10C. The circuitry in box 1051 for PCM line PCMA is duplicated in box 1052 for PCM line PCMB. Boxes 1051 and 1052 are shown in detail in FIG. 10C.

Serial PCM data is received over bus PCM4. Alternately received PCM sample bits are stored in the two buffer flip-flops 1002, 1003. Flip-flop 1004 which is clocked by the signal $\overline{MCLK}$ selects which of the flip-flops 1002 or 1003 into which a PCM bit is to be stored. The flop-flop 1005, and gates 1006, 1007 are used to synchronize the operation of flip-flop 1004 each frame. After every other bit is stored in the flip-flops 1002, 1003, the two stored bits are written into memory 1008. Memory 1008 is a random access memory organized as 16 words of two bits each. Memory write addresses are generated by the counter 1009. Counter 1009 is a 5 bit binary counter which is clocked at one half the rate of the $\overline{MCLK}$ signals by flip-flop 1004. The C output of the counter 1009 is used to control gate 1010 and through an inverter 1011 controls if the corresponding memory on box 1052 is to be written or read. Decode counter 1012 and gates 1013, 1014 control whether data is to be stored in or read from memory 1008 and also counts the number of bits (10) in each channel on bus PCM4.

When counter 1012 contains a count of 0 or 1, a memory write operation is inhibited. Address selector 1015 is used to select the address input to memory 1008. Specifically, the selector 1015 selects output from counter 1009 for memory write address and counter 1016 for a memory read address. Counter 1016 is a 5 bit binary counter and is clocked by the PCM line clock CLKA. When data is read from memory 1008, the two bit words are alternately stored in the two bit latches 1017, 1018. Flip-flops 1019, 1020 and gates 1021, 1022, 1024, 1025 provide control for gating the data into the latches 1017, 1018. Gate 1023 in combination with the "C" output of counter 1016 provides for alternately selecting the latches 1017, 1018 for storing the read data. The selector circuit 1026 under control of flip-flop 1027 alternately gates the contents of latches 1017 and 1018 on line 1028. Tri-state buffer gates 1029 and 1030 controlled by gates 1031, 1032, 1033 are alternately enabled to alternately connect the two outputs of the selector 1026 to PCM line PCMA. Latches 1017, 1018, selector 1026 and gates 1029, 1030 operate as a parallel to serial converter.

The flip-flop 1055 clears the counters 1016 whenever the framing bit position during a frame on the PCM line PCMA occurs.

Tri-state buffer gate 1036 is enabled during the framing bit position to permit common channel signaling or framing information to be gated onto line PCMA.

The above described interlacing and demultiplexing operations are premised upon the use of 24 channel 1.544 mHz PCM lines PCMA, PCMB and the bus PCM4 having the format of FIG. 4. If, however, the PCM lines PCMA, PCMB are 30 channel 2.048 mHz lines then the PCM clock lines CLKA, CLKB would operate at 2.048 mHz and the format of FIG. 5 would be used for bus PCM4.

4.4 PHASE-LOCKED LOOP AND CLOCK CIRCUIT (FIGS. 2,8,11–20)

The rate converters require that the clock frequency of bus PCM4, i.e., be exactly 512/193 times the clock frequency of the PCM lines PCMA, PCMB. The phase difference between the two clocks must be controlled such that it falls within the limits required by the rate converter hardware.

The maximum phase difference between the internal line switch clock and the PCM line clocks that is tolerable to the rate converter is limitd only by the amount of memory storage in the rate converter. However, a large tolerance for phase variation requires a larger amount of memory storage and causes a larger nominal delay in the rate converter.

The rate converter inherently causes 20 microseconds of nominal delay interfacing the 4.096 mHz PCM to 1.544 mHz PCM. Additional delay is designed into the rate converter to tolerate the phase variation in the internal line switch clock relative to the PCM line clocks CLKA, CLKB. To design the rate converter for minimum delay requires the phase variance of the clocks be tightly controlled.

The rate converter requires a specific relationship between the two clocks. This relationship is a defined sequence which repeats every frame (125 microseconds). At frame boundaries, (Bit 193 of the PCM line clocks) the rising edges of both clocks are synchronous when they are in phase. Any deviation is considered a phase error of the line switch clock.

In the illustrative embodiment of FIG. 2 two 4.096 mHz buses PCM4 are driven by the same clock, i.e. one bus in each of the line switch modules 1a, 1b. Up to four external PCM lines, PCMA, PCMB in both line switch modules, whose phase relative to one another can vary, will interface to the two buses PCM4. Since the 4.096 mHz clock will be phase-locked to an arbitrarily chosen PCM line, the rate converter must be capable of tolerating the phase difference relative to other PCM lines. Also, the failure of any one PCM line must not affect service on the other PCM lines. An extension of this philosophy requires that any single failure in the PLL circuitry not cause the loss of all four PCM liens. In summary, the PLL must have a phase error whose variance is minimized relative to the PCM lines;

The PLL must be capable of using any one of the PCM lines as a reference so that a failure of any PCM line doesn't affect service on the other PCM lines; and Two PLL circuits must exist that are independently selectable to ensure that a single failure in the PLL does not affect the PCM clock CLK4.

Figure 11:
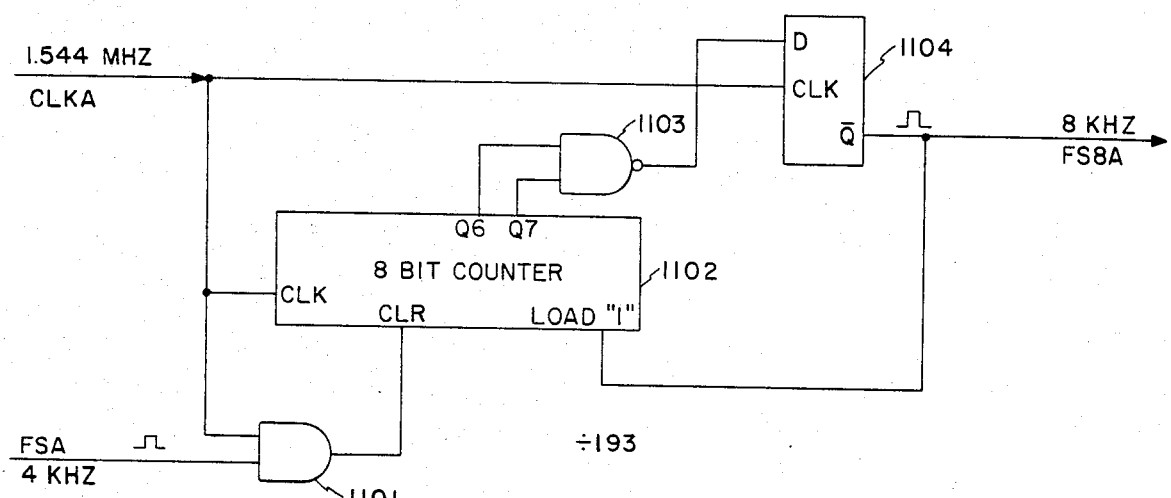
FIG. 11 illustrates in block diagram form a portion of generator 16a of FIG. 8.

The signaling frame and frame clock generators 16a, 16b of FIG. 8 includes a divider circuit to derive an 8 kHz signal from the 1.544 mHz PCM line clock and the signaling frame clock. The divider circuit for generator 16a is shown in detail in FIG. 11. The circuit includes gate 1101 connected to the input of an eight bit counter 1102. Decoder gate 1103 coupled to the eight bit counter provides an output to the "D" input of flip-flop 1104. Flip-flop 1104 has its clock input CLK connected to CLKA and its Q output provides an 8 kHz framing signal FS8A. The outputs FS8A and FS8B of generators 16a, 16b are provided as inputs to the PLLL and control circuit 18 of FIG. 8. Additionally these FS8A and FS8B outputs are provided to the other line switch module in a line switch. Similarly, FS8A and FS8B outputs from the other line switch module are provided as inputs to the PLL and control circuit 18 of FIG. 8. Thus, the PLL and control circuit has clock inputs derived from each of the four PCM lines connected to a line switch, i.e., the signals derived from CLKA and CLKB of line switch module 1a and those derived from CLKA and CLKB of line switch module 1b of FIG. 2. Additionally, each of the circuits 16a, 16b of FIG. 8 generates a signaling frame signal SIGA, SIGB respectively. The signaling frame signals are also supplied to the PLL and control circuit 18 from the circuits 16a, and 16b in both line switch modules.

Figures 12, 12B:
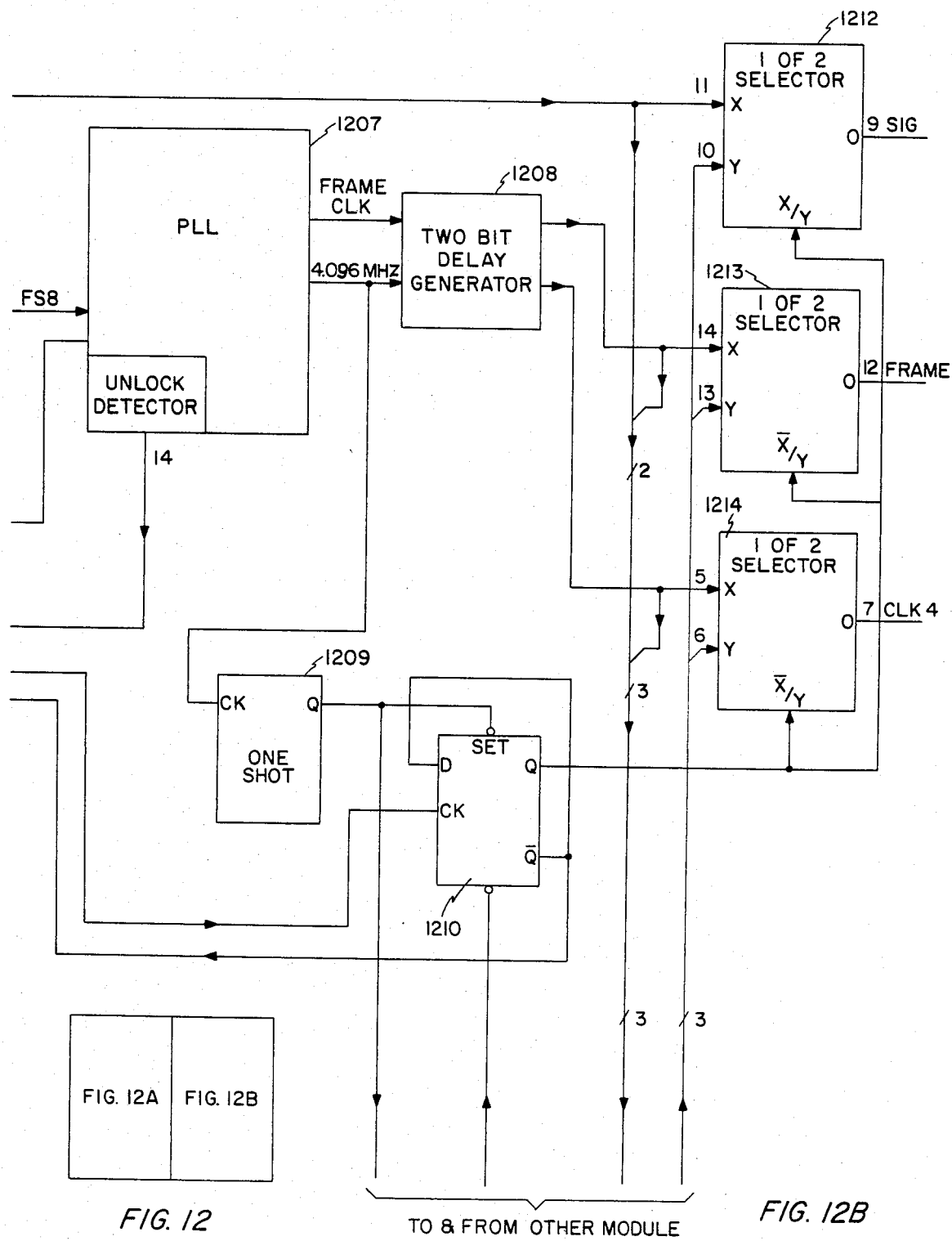
FIGS. 12A and 12B when arranged as shown in FIG. 12 illustrate in block diagram form the PLL and control circuit 18 of FIG. 8.
Figure 12A:
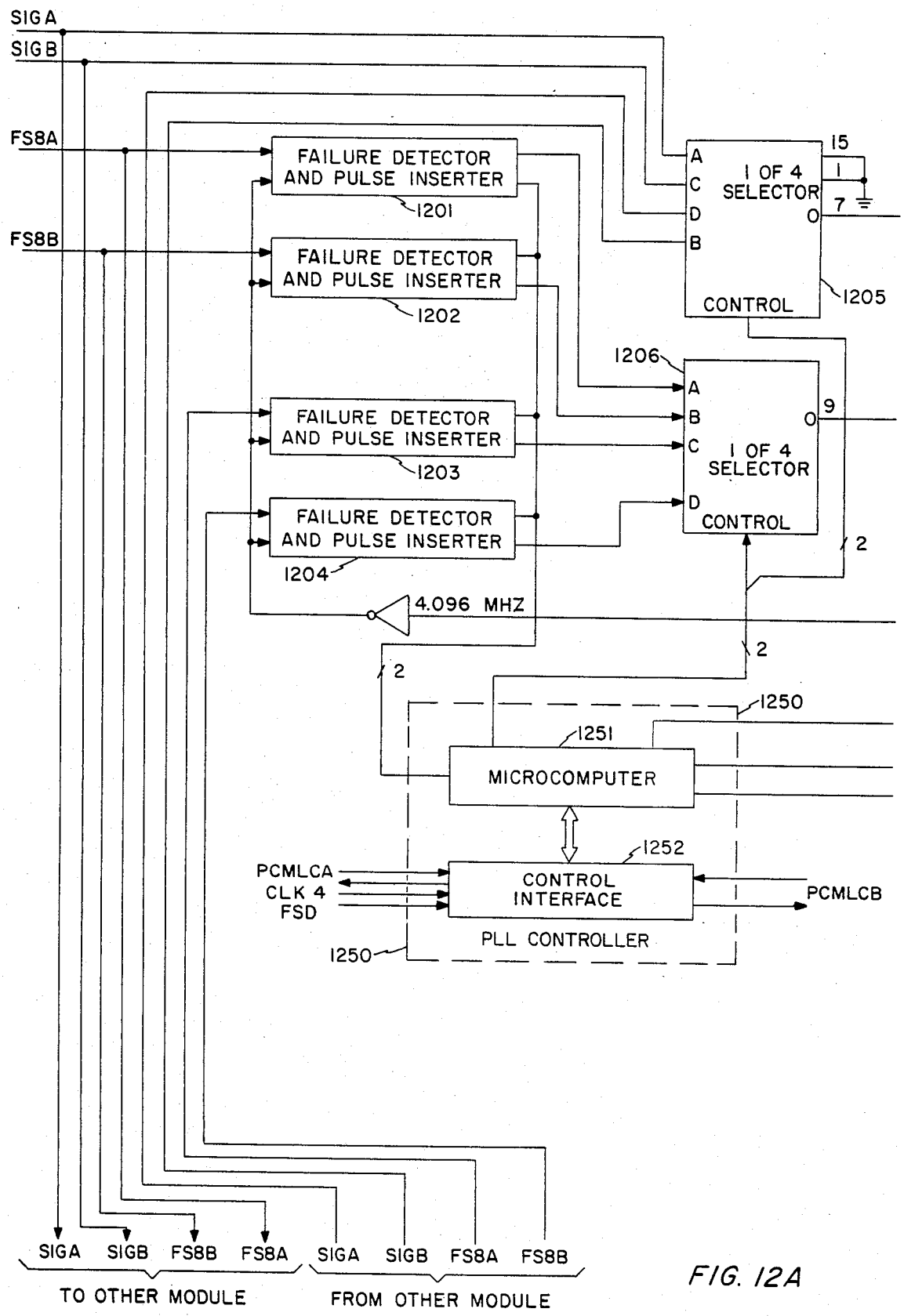
Figure 13:
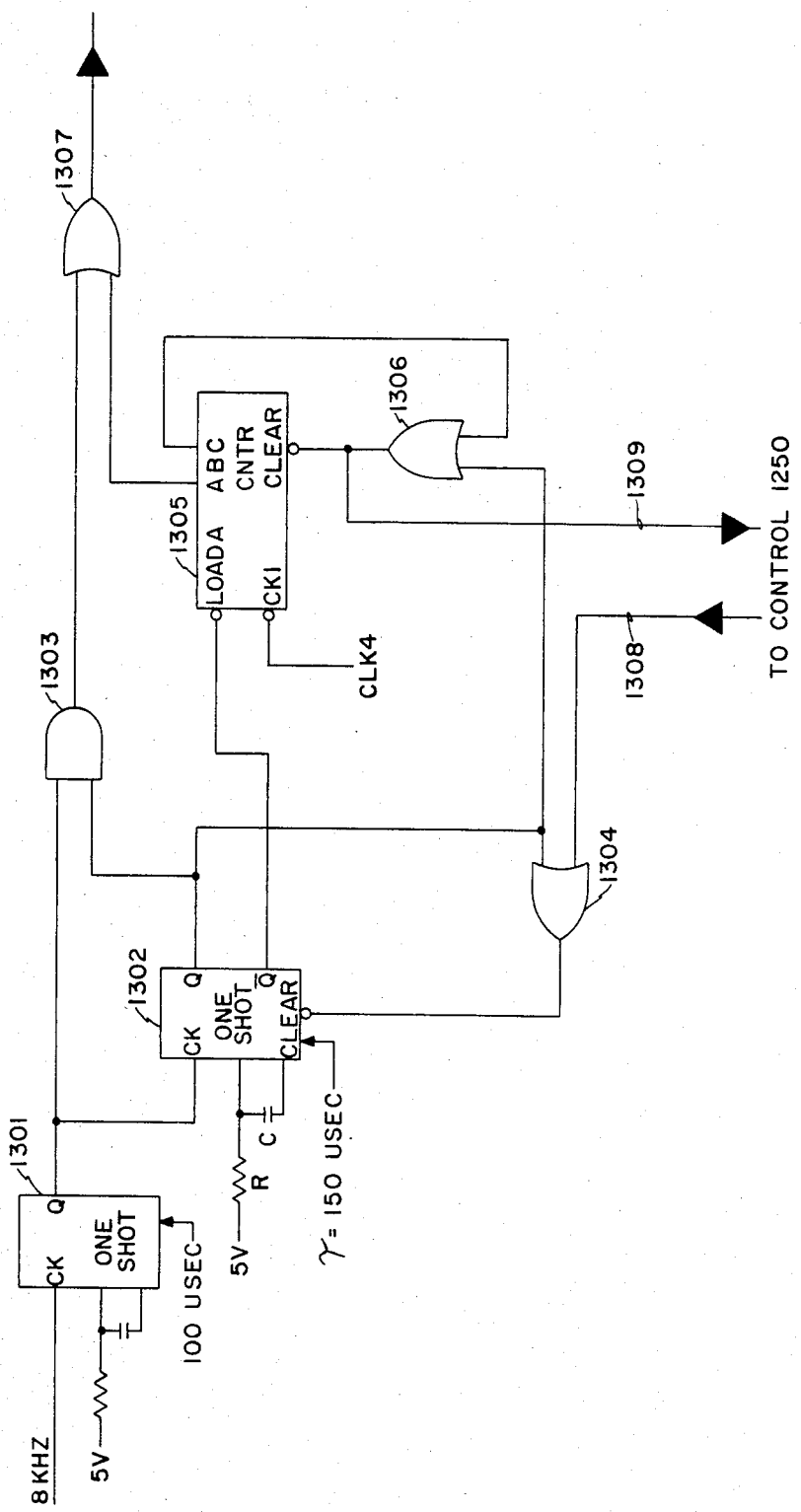
FIG. 13 illustrates in block diagram form failure detector 1201 of FIG. 12A.

Turning now to FIG. 12, the signaling frame signals SIGA and SIGB are coupled to a 1 of 4 selector 1205. Each of the four 8 kHz inputs FS8A, FS8B are individually connected to a failure detector circuit 1201, 1202, 1203, 1204. A 1 of 4 selector 1206 is to select one of the clock outputs from the failure detectors 1201, 1202, 1203, 1204 as the input FS8 to the phase-locked loop 1207. The selector 1206 as well as selector 1205 is controlled by the PLL controller 1250. The PLL 1207 is locked to the selected input. If a failure should occur in the PCM line from which the signal FS8 is derived, service to the other PCM lines would be interrupted if there was no capability of change from the PCM line to which it is phase-locked. The failure detectors 1201, 1202, 1203, 1204 detect failures in the PCM lines. FIG. 13 illustrates in detail the failure detector 1201. Normally, a clock pulse at the 8 kHz rate of FS8A arrives every 125 micorsec. If, however, the time between two pulses is less than a predetermine interval, i.e., 100 microsec., the one shot 1301 will prevent the fast pulse from being propagated. If the time interval between pulses is greater than 100 microseconds, (and less than a second predetermined interval as discussed below) the pulse wil be transmitted through gates 1303 and 1307. If the time interval between pulses is greater than the second predetermined interval, i.e., 150 microseconds, the one shot 1302 will time out, its Q output will go low inhibiting gate 1303. Additionally, the PLL controller 1250 will maintain a logic low on lead 1308 with the result that the clear input to one shot 1302 is low. With the clear input low, the output Q is maintained low. Thus, the one shot 1302 is "latched" in the low state. When Q is low, $\bar{Q}$ is high. Three bit binary counter 1305 is arranged such that when Q is low, a binary 4 (ABC=001) is loaded and when Q goes high, the counter 1305 may begin counting. Counter 1305 has a clock input coupled to the 4.096 mHz clock CLK4. When the counter reaches binary count 6 (ABC=011) a signal is provided at the output of gate 1307. The output signal will persist through a binary count of 7 (ABC=111) and will terminate at the next binary count (ABC=000) i.e., a binary count of 0. When a binary count 0 is reached, the output signal at gate 1307 is terminated, a low is applied to the clear input of counter 1305 causing counter 1305 to "latch-up".

Additionally, a signal is provided to the PLL controller 1250 on line 1309 indicating that a failure has occurred. Thus, if a pulse is absent for more than 150 microsec. a "phantom" pulse is provided and the PLL controller 1250 is informed of the failure. The PLL controller 1250 will select a different one of the PCM lines to use as a reference for the PLL 1207. The phantom pulse is required to insure that the PLL 1207 does not miss a pulse. If no pulse were to occur, the PLL 1207 would function as though it were an entire frame out of phase and would slow down the 4.096 mHz clock CLK4 to correct for this. This would result in the rate converter losing several frames of PCM before frame resynchronization had occurred. Since the phantom pulse is out of phase with a normal pulse stream, it does cause an aberration in the operation of PLL 1207. However, the PLL 1207 has a narrow loop bandwidth such that its output will be within the limits of the rate converter tolerance. The aberration in the PLL is less than 100 nanosec. of phase change.

Figure 14:
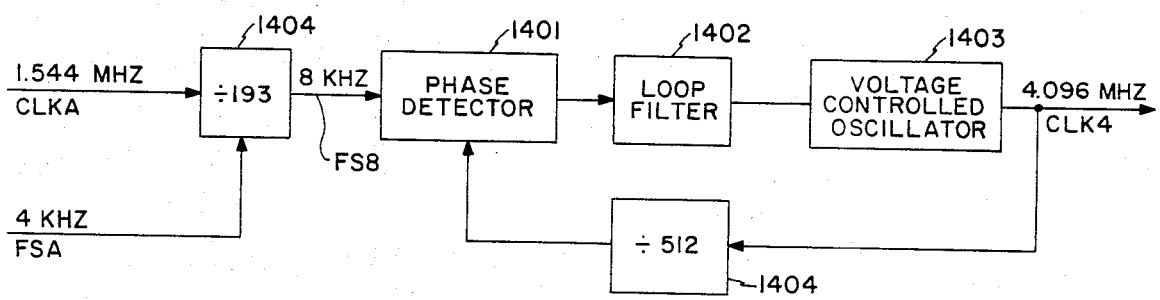
FIG. 14 is a block diagram of PLL 1207 of FIG. 12B.

A block diagram of the PLL 1207 is shown in FIG. 14.

The PLL 1207 comprises a clock input FS8 to which a voltage controlled oscillator (VCO) 1403 is slaved. This is accomplished by dividing both the output of the VCO and the input clock to get a common frequency, i.e. 8 kHz. The signaling frame and frame clock generator 16a of FIG. 8 divides the incoming 1.544 mHz PCM line clock CLKA to obtain an 8 kHz output FS8A which is in this example selected by selector 1206 of FIG. 12 to provide signals on FS8. The divider 1404 of FIG. 14 divides the 4.096 mHz output of VCO 1403 to also generate an 8 kHz signal. The phase detector 1401 generates an error current which is integrated by the loop filter 1402 to control VCO 1403. When CLK4 is phase-locked to FS8, the frequency of VCO 1403 is exactly 512/193 times CLKA.

Figure 15:
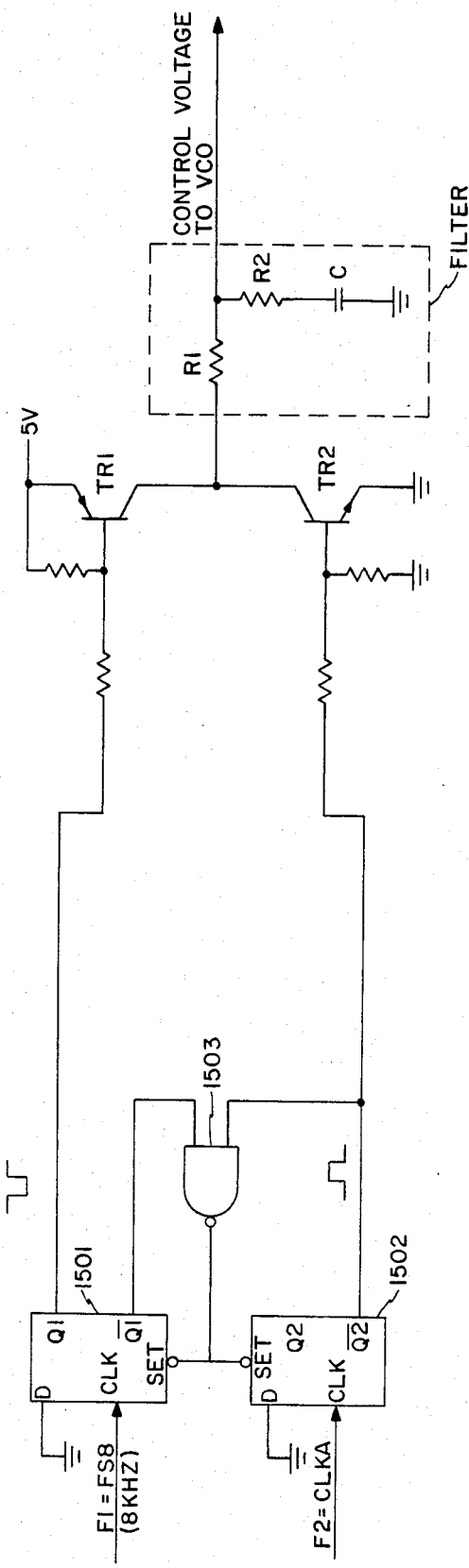
FIG. 15 illustrates in block diagram form the phase detector of FIG. 14.

In order to minimize the phase variance in the PLL 1207, a phase detector is provided that gives a phase error near zero under steady state conditions. A simple phase detector that meets this critical requirement is shown in FIG. 15.

This phase detector requires TTL compatible inputs and unlike a quadrature or an EXCLUSIVE-OR type of phase detector, it is not duty-cycle dependent on the inputs since it is strictly rising-edge sensitive which prevents phase lock from occurring on an integer multiple (harmonic) of the desired VCO frequency. It similarly rejects subharmonic phase lock.

Figure 16:
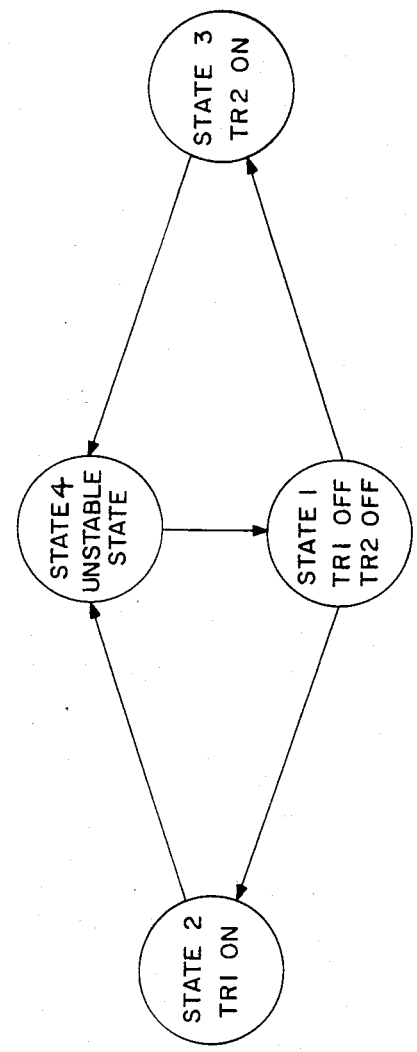
FIG. 16 is a state diagram for the phase detector of FIG. 14.

The outputs (Q1 and Q2) of flip-flops 1501, 1502 have the following four states:
State 1=Both Q1 and Q2 high
State 2=Q1 is low, Q2 is high
State 3=Q1 is high, Q2 is low
State 4=Both Q1 and Q2 low State 4 is an unstable condition since this causes a set pulse which returns the flip-flop pair to State 1. State 1 is the "off" state in that both transistor switches (TR1 and TR2) are turned off in that state. FIG. 16 shows the state diagram of the phase detector.

The phase detector cycles through the state diagram (FIG. 16) starting at State 1 progressing to either State 2 or 3, to State 4, and returns to State 1. It makes this cycle once every 125 microseconds staying in State 1 for a large duration of the cycle. If F2 lags F1 in phase, the detector cycles through State 2; if F2 leads F1, it cycles through State 3. The time it is in State 2 or 3 is equal to the phase difference between F1 and F2. Thus, the phase detector has a +360 degrees of phase error operating range. If the error exceeds 360 degrees in either direction or F2 is not equal to F1, the cycle time is not necessarily 125 microseconds (out of lock condition). However, the phase detector will always cycle through State 2 when F2 is less than F1 and through State 3 when F2 is greater than F1. Therefore, the phase detector will, in all cases, drive the control voltage toward a locked condition.

When in State 2 or 3, TR1 or TR2 is "on" causing current to be pumped into or out of the loop filter capacitor (C). When fed into an infinitely high impedance, the voltage on the capacitor represents the summation (or integral) of all past phase errors. This is extremely important, since different VCO's require different control voltages to oscillate at 4.096 mHz. The phase detector will operate at nearly zero phase error under steady state conditions independent of the DC voltage on the control voltage line. TR1 and TR2 need only to be turned on to correct for changes in PLL operating conditions and to replace the small amount of charge lost in the capacitor due to circuitry leakage during each 125 microsecond period. The phase error is independent of the vast majority of the PLL parameters including loop gain, supply voltage, loop filter values, and all VCO characteristics. In comparison, when using phase detectors in which the control line voltage is directly proportional to the phase error, the phase error is much mor difficult to control. With such phase detectors any required change in control voltage (due to part variance or temperature change) causes a proportional phase error change.

Figure 17:
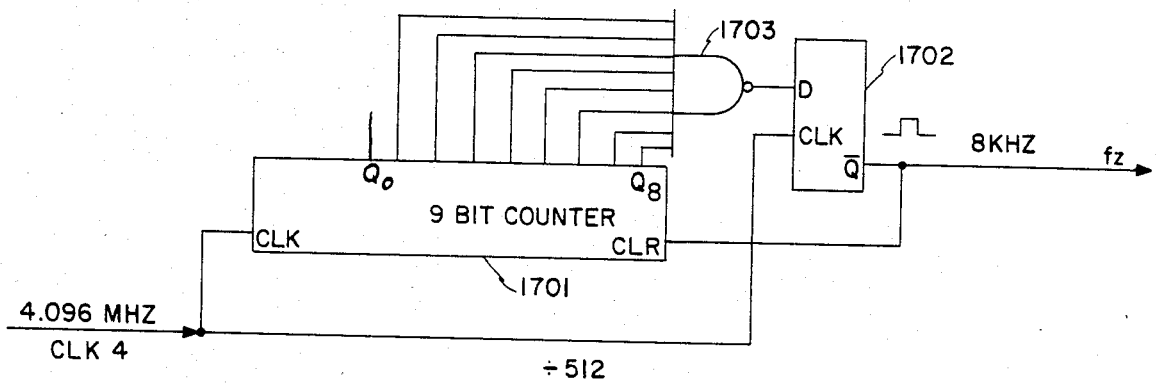
FIG. 17 is a block diagram of divider 1404 of FIG. 14.

Phase error between the VCO and its reference is dependent primarily on the propagation delay through the dividers (512 and 193) and the phase detector. The dividers were both designed with this consideration and have only one flip-flop delay from input to output. The ÷193 counter is that of FIG. 11 and the −512 counter is shown in FIG. 17. The phase detector uses two flip-flops that are inherently closely matched since they are in the same integrated circuit package.

The PLL has a measured nominal phase difference between F1 an F2 at the phase detector of 10 nanoseconds (less than 0.03 degrees). The total phase difference between CLK4 and CLKA or CLKB will be larger since there are additional circuit delay tolerances that affect the total phase difference. These include delay tolerances in the dividers, failure detector circuits, selectors and buffering circuits. The worst case phase difference between CLK4 and CLKA or CLKB is under 200 nanoseconds using LSI-TTL technology.

The phase/frequency discrimination attributes of the phase detector give the PLL a capture and lock range limited only by the frquency range of the VCO. This allows great flexibility in the design of the remaining portions of the PLL.

Figure 18:
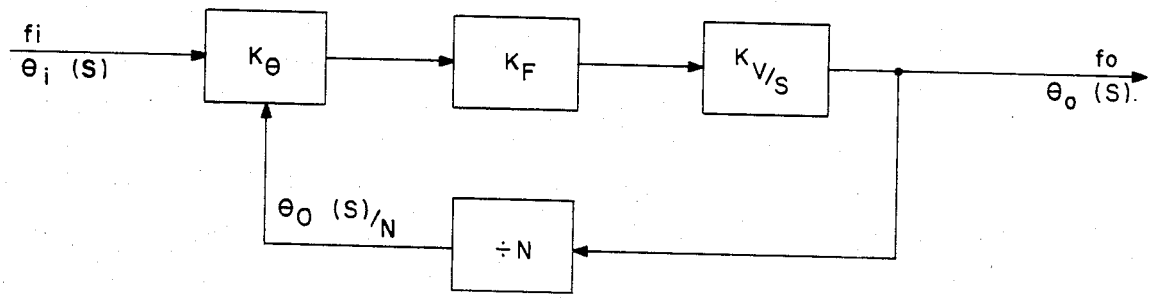
FIG. 18 is a block diagram of loop filter 1402 of FIG. 14.

The design of the loop filter 1402 of FIG. 14 involves several requirements. First, the loop must remain stable under all operating conditions. Secondly, the loop bandwidth must be selected such that the aberration in the 8 kHz reference caused by a PCM line failure, does not cause the VCO to shift in frequency excessively. A damping factor greater than 0.7 is desirable for stability. A damping factor under 0.7 is underdamped with zero being the limit before oscillations result. For stability analysis, the PLL can be modeled as shown in FIG. 18.

Figure 19A:
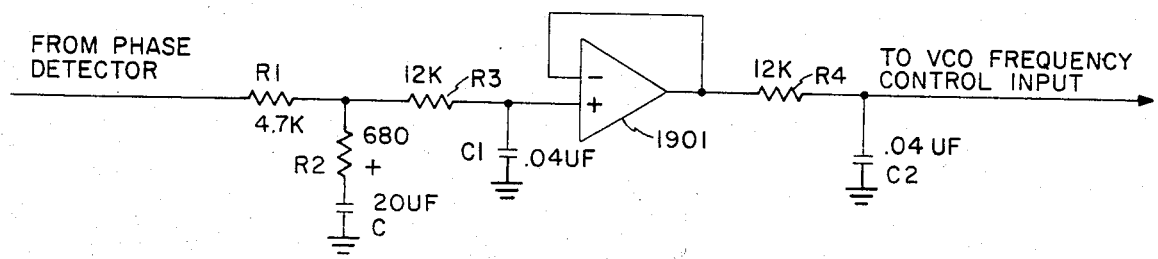
FIG. 19A is one embodiment of loop filter 1402 of FIG. 14.
Figure 19:
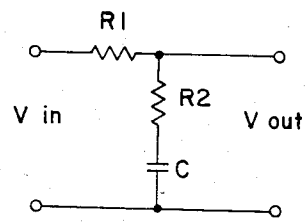
FIG. 19 is a basic loop filter circuit.

Using Laplace Transforms, it is possible to analyze the stability of the PLL. Using servo theory, $$\theta_o(s) = \frac{G(s)}{1 + G(s) H(s)} \theta_i(s)$$

where
$\theta o(s)$ = Output phase
$\theta i(s)$ = Input phase
$G(s)$ = Forward gain product = $K_O \times K_F \times K_V/s$
$H(s)$ = Feedback gain product = $1/N$ Three of the gain blocks ($K_o$, $K_v$, and N) are fixed. The transfer function of the loop filter is selectable. The loop filter of FIG. 19 is chosen for its great flexibility in determining both loop natural frequency ($\omega n$) and damping factor ($\zeta$).

$$\frac{V_{out}}{V_{in}} = \frac{SR_2C + 1}{s(R_1 + R_2)C + 1} \quad (2)$$

$$K_F = F_{(s)} = \frac{\tau_2 s + 1}{\tau_1 s + 1}$$

where $\tau_2 = R_2 C$ $\tau_1 = (R_1 + R_2)C$

Referencing FIG. 18, forward gain and reverse gain products are entered into Equation 1 and reduced to Equation 4.

$$\frac{\theta_o(s)}{\theta_i(s)} = \frac{K_\theta K_V(\tau_2 s + 1)/\tau_1}{s^2 + 2\zeta\omega_n s + \omega_n^2} \text{ where}$$

$$\omega_n = \sqrt{K_\theta K_V/\tau_1 N} \text{ rad/sec.} = \text{natural frequency of PLL and}$$

$$\zeta = \frac{1}{2}\left(\frac{1}{\tau_1\omega_n} + \omega_n\tau_2\right) = \text{damping factor of PLL}$$

Table 1 lists the values of the PLL parameters used to determine the loop damping factor ($\zeta$) and natural frequency ($\omega_n$).

TABLE 1—PLL GAIN PARAMETERS $K_V$ = 550 kHz/volt = 3.46 × 10⁶ rad/volt-sec.

$$K_0 = \frac{5V}{4\pi} \text{ volts/rad} = .398 \text{ volts/rad.}$$

$N = 512$ $$K_F = \frac{\tau_2 S + 1}{\tau_1 S + 1} \quad \tau_2 = 13.6 \text{ msec}; \tau_1 = 107.6 \text{ msec.}$$

These are used in Equation 4 to obtain the following:
$w_n = 158$ rad/sec. (25.1 Hz)
$\zeta = 1.09$
This indicates a PLL with a narrow loop bandwidth and is very stable since it is overdamped.

Figure 20:
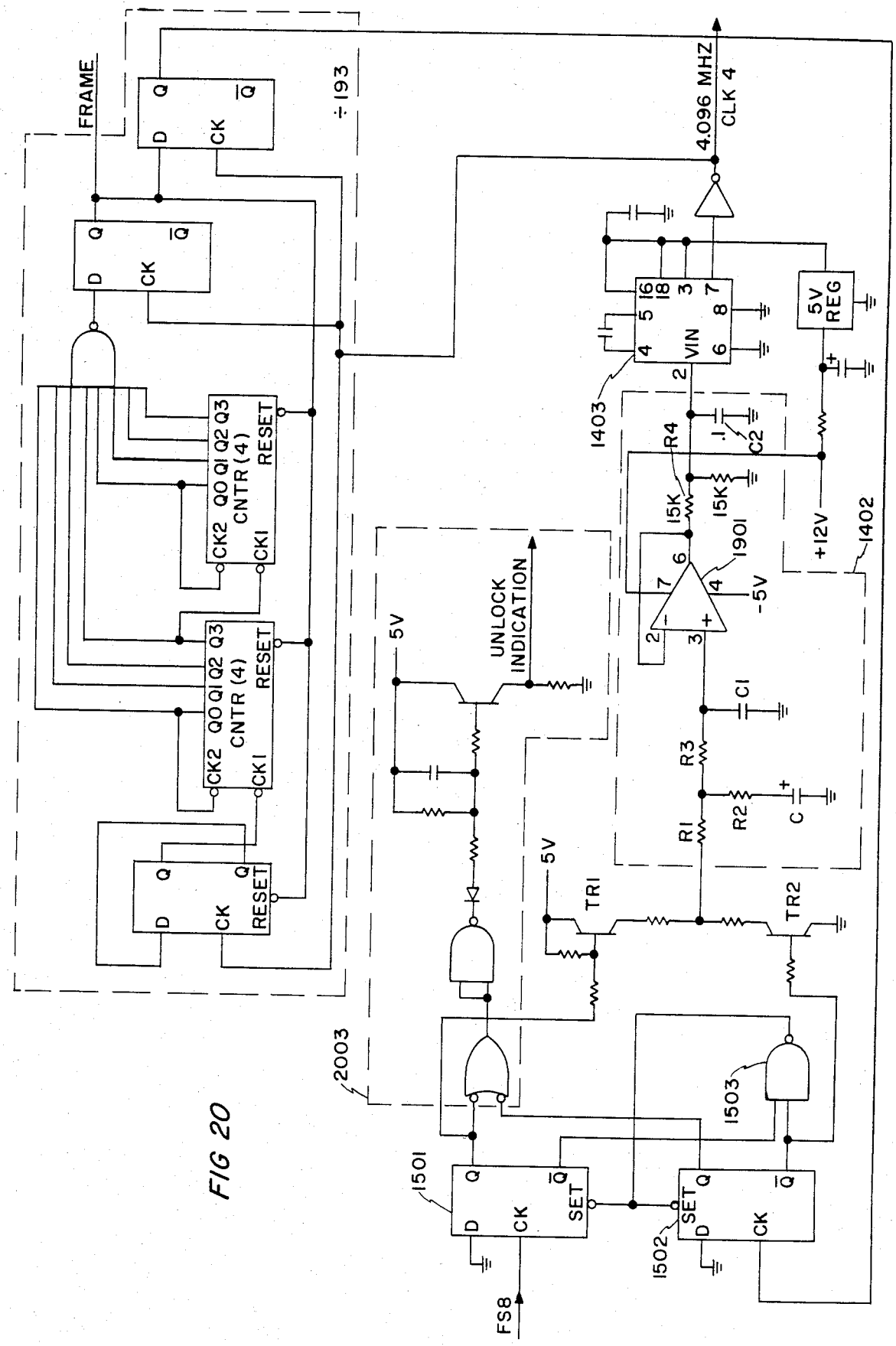
FIG. 20 is a schematic diagram partially in block form of the PLL 1207 of FIG. 12B.

Two low-pass sections were added to the basic loop filter shown in FIG. 19 in order to reduce the aberration caused by a PCM line failure. In addition, isolation is provided between the VCO and active loop filter circuitry at the VCO operating frequency of 4.096 mHz. Turning to FIG. 19A which illustrates the loop filter in simple form, the corner frequencies of the two low-pass filters R3, C1 and R4, C2 is more than an order of magnitude higher in frequency than the natural frequency of the PLL. Thus, the additional phase shift contributed by these filters is negligible and lowers the damping factor only slightly. A J-FET input op amp- 1901 is used to provide the low leakage required since the VCO has an input impedance under 100K ohms. FIG. 20 illustrates in detail the complete phase-locked loop circuit combining the circuits of FIGS. 15, 17 and 19A. An unlock indication circuit 2003 provides a signal indicating if the phase-locked loop fails to maintain a locking.

The choice of the VCO is often the most important part of the design of a phase-locked loop. However, in this application, the PLL characteristics that the VCO determine are not critical. This includes phase noise, voltage to frequency conversion linearity, temperature sensitivity, frequency range and spectral purity. Three different VCO's were investigated. All were IC designs available from multiple sources and all met the requirements necessary for this application. The MC4024 and 74LS124 are TTL multivibrator designs using an RC network to determine frequency. These parts have very similar performance with approximatly 4 nanoseconds of phase jitter at the phase detector. This correlates with the MC4024 specification of 120 Hz RMS (typical) frequency noise deviation at 4.096 mHz. The MC1648 VCO is an ECL IC oscillator design requiring an external varactor and coil. Because of the higher Q elements, it has superior phase noise and spectral purity. At 4.096 mHz, the RMS frequency deviation is specified at less than 20 Hz. This corresponds to a phase jitter at the phase detector of less than 1 nanosecond. With the test equipment available, no phase jitter could be detected.

Turning back to FIG. 12, the output of the PLL 1207 is coupled to a one shot 1209 which acts as a failure detector. If the PLL 1207 fails to be reset within 350 nanosec., it will set flip-flop 1210 and will provide a failure indication to the PLL controller 1250. Flip-flop 1210 will automatically operate the selector 1214 to switch to the phase-locked loop in the other line switch module, e.g., 1b of FIG. 2. The PLL controller 1250 must however switch the PCM line clock, e.g., CLKA, to the PLL 1207 in the other module without missing clock pulses. The 500 nanosec. delay 1208 permits switching to the other PLL without missing clock pulses since the delay 1208 provides clock pulses for 500 nanosec. after the first PLL 1207 has failed. The selectors 1212 and 1213 are also controlled by flip-flop 1210 to switch the source for SIG and FRAME to the other line switch module.

The PLL conroller 1250 includes a microcomputer 1251 and an interface circuit 1252. The microcomputer 1251 in the illustrative embodiment is an INTEL 8049 microcomputer. The interface comprises a protocol interface circuit (PIC) which will be described in greater detail in conjunction with the line group controller. The INTEL 8049 microcomputer is described in INTEL COMPONENT CATALOG 1979, INTEL CORPORATION, 1979, pp 8-27 to 8-30.

The system controller 5 selects which PCM line clock is to be initially selected as the master clock to which the line switch clock circuits are to be synchronized. The system controller 5 informs the line switch controllers 7 in the line switch of the initial selection. The line switch controllers 7 then direct the respective microcomputers 1251 to the initial selection. If one of the line module microcomputers 1215 detects a failure in the clock circuits, it arbitrarily switches to another line clock to be used as a master. The failure detecting microcomputer will send information back to the system controller 5 via line switch controller 7 identifying the newly selected PCM line clock. The system controller 5 will then transmit command information to the other module microcomputer 1251 via the respective line switch control 7 directing the other modules microcomputer to select the same PCM line clock as master. Thus, all modules within the line switch utilize the same PCM line clock to derive the internal line switch clocks.

5.0 LINE SWITCH CONTROLLER (FIGS. 9B, 9E to 9N, 10B 10C)

The line switch controller 7 communicates with the system controller 5 of FIG. 1 via the PCM lines PCMA, PCMB. The line switch controller 7 transmits and receives information over the common channeling signaling bits of the PCM lines PCMA, PCMB via the RX and TX rate converters. More specifically, turning to FIG. 9B, each time a common channel signaling bit appears on the PCM line, PCMA or PCMB, the associated clock lead FSA or FSB will provide a pulse. The clock pulse on the lead, e.g. FSA will cause the common channel signaling bit to be loaded into a buffer flip-flop 950A or 950B. The output of buffer flip-flop 950 or 950B is present to the line switch controller via lead CCRXA or CCRXB. Information from the line switch controller 7 is inserted into the common channel signaling bit portions on lines PCMA and PCMB under control of the clock leads FS8A, FS8B. Turning to FIG. 10B, common channel signaling information from the line switch controller 7 for PCM line PCMA is provided on lead CCTXA and for PCM line PCMB on lead CCTXB. Tri-state buffer gate 1086 is enabled by CLKA during the common channel signaling bit time and gates the data bit from line CCTXA into PCM line PCMA. Likewise, data from lead CCTXB is gated onto PCM line PCMB.

Figure 9E:
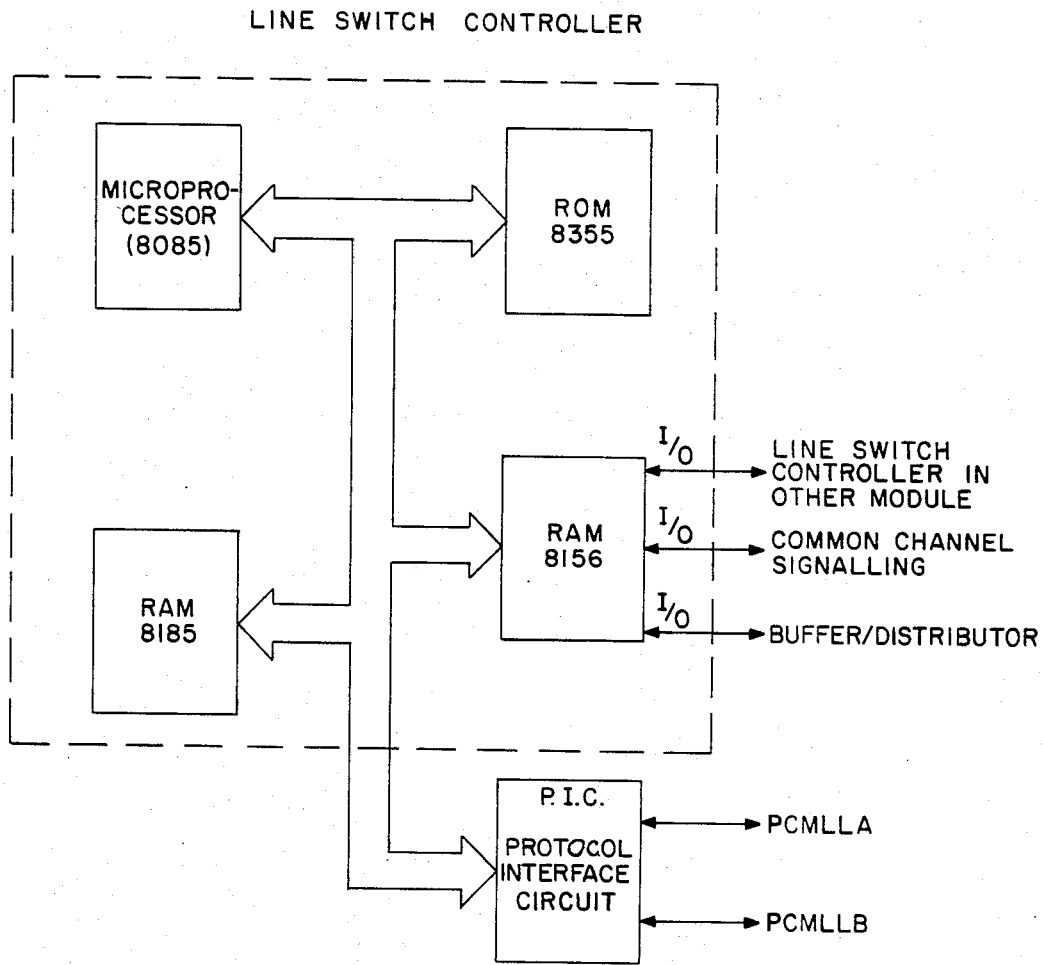
FIG. 9E illustrates in block diagram form the line switch controller of FIGS. 2 and 2A.

Turning now to FIG. 9E, the line switch controller is shown as comprising a Protocol interface circuit PIC and a microcomputer. The microcomputer utilized in the illustrative embodiment is the MCS-85 TM system available from INTEL CORPORATION which is described in *INTEL COMPONENT DATA CATALOG* 1979, Intel Corporation, 1979, 9-79 to 9-139. More specifically, the microcomputer configuration may be that shown in FIG. 1 at page 9-78 of the aforementioned Intel reference. The 8085 microprocessor, the 8156 RAM with I/O ports and timer, the 8355 ROM and the 8185 RAM shown are all described in detail in the aforementioned INTEL reference.

The protocol interface circuit PIC serve as a control data interface between the parallel data bus of the microcomputer and the high speed, bit serial PCM bus PCM4. The line switch controller 7 operates as the master in a master slave relationship with all other circuits connected to the PCM buses PCM4, PCMLCA, PCMLCB. More specifically, only the line switch controller 7 may transmit control word commands over the PCM buses. A circuit will transmit a control word response on the PCM buses ony after receiving a command addressing that cirucit. The convention established for the line switch control communication specifies that commands and responses must occur in pairs, only a line switch controller 7 can initiate a command, and the response to a command always occurs a fixed number of frames after the command.

Figure 9F:
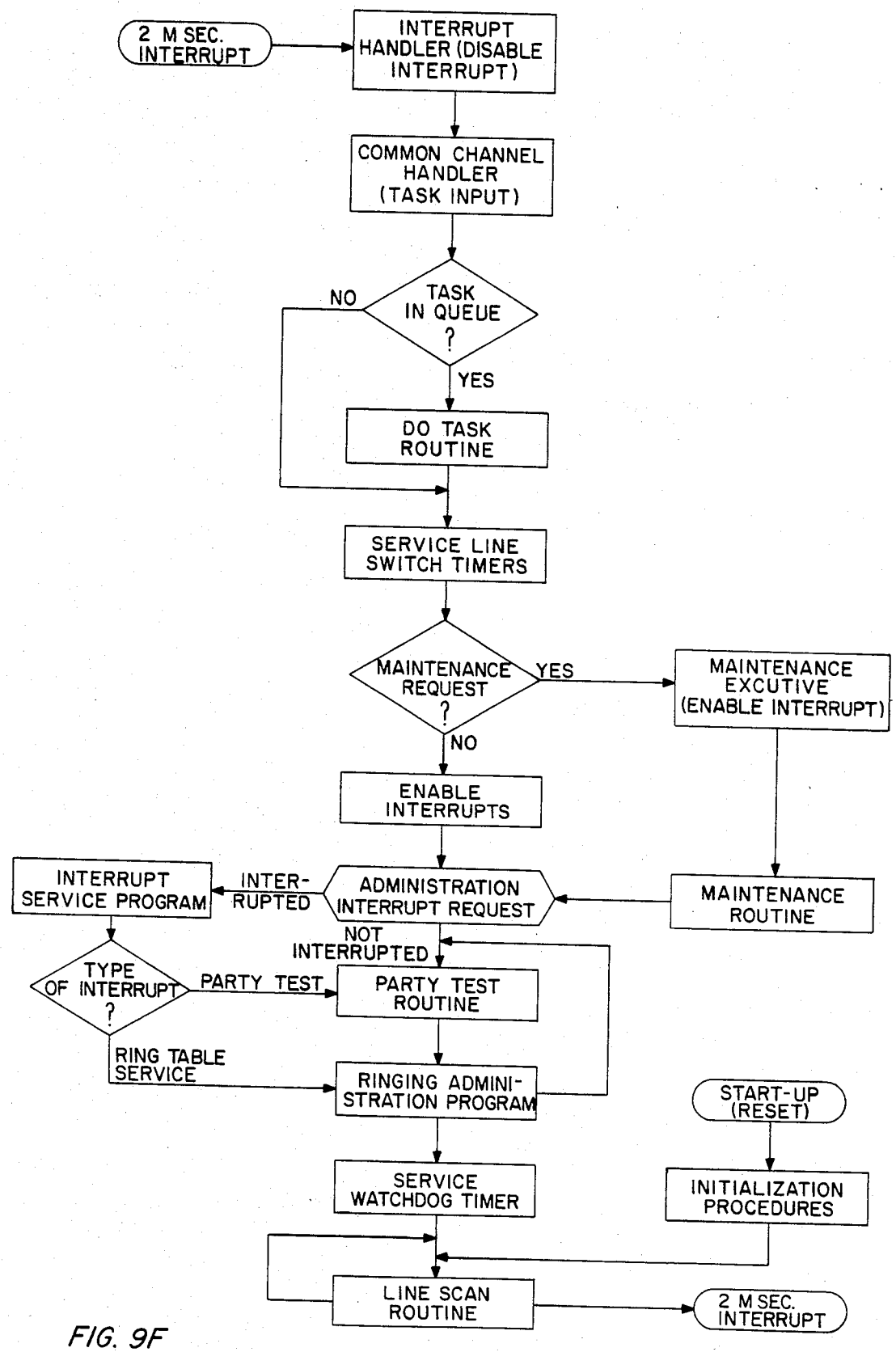
FIGS. 9F-9N are flow charts illustrating the operation of the line switch controller 7 of FIG. 9E.

FIG. 9F is a flow chart of the general software architecture of the line switch controller 7. Commands from the system control 5 of FIG. 1 are transmitted over the PCM lines PCMA, PCMB arriving at a rate of one byte (8 bits) every 2 msec. The line switch controller includes a 2 Msec. interrupt timer and when a 2 msec. interrupt occurs, an interrupt handler program calls a common channel data handler to process the received data byte. If the received data byte completes a command (each command may have 5 to 10 bytes), the previously received bytes for the command will be retrieved from a queue and the command will be executed. If the received byte does not complete a command, it will be stored in the queue. Typical of the tasks which the line switch controller 7 will be commanded to execute are: calling and called party channel assignments, initiating ringing, disconecting ringing, call disconnect maintenance, test, alarm and administrative functions. FIGS. 9G to 9N illustrate in greater detail the flow charts of various programs identified in FIG. 9F.

Figure 9G:
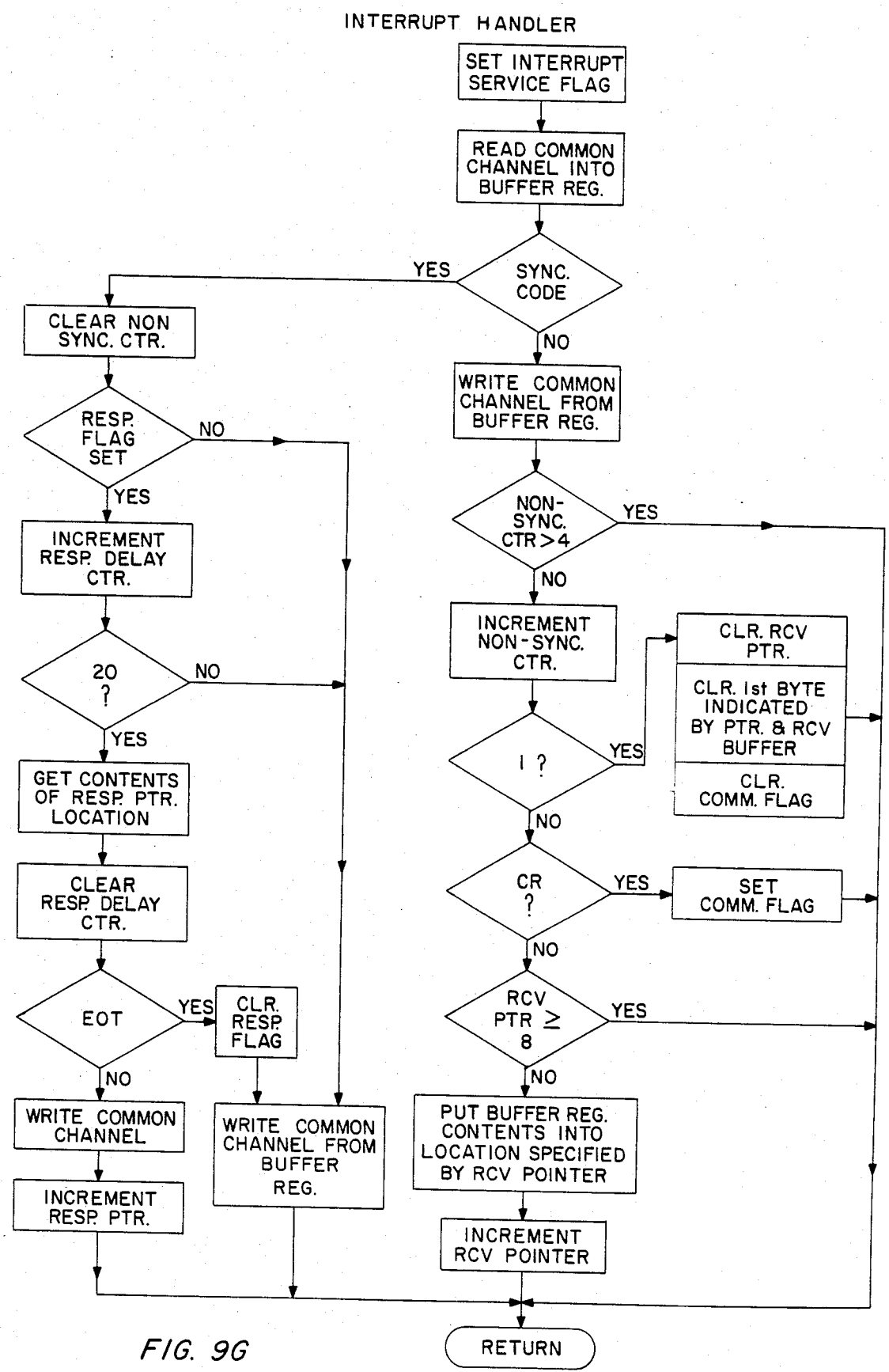
Figure 9H:
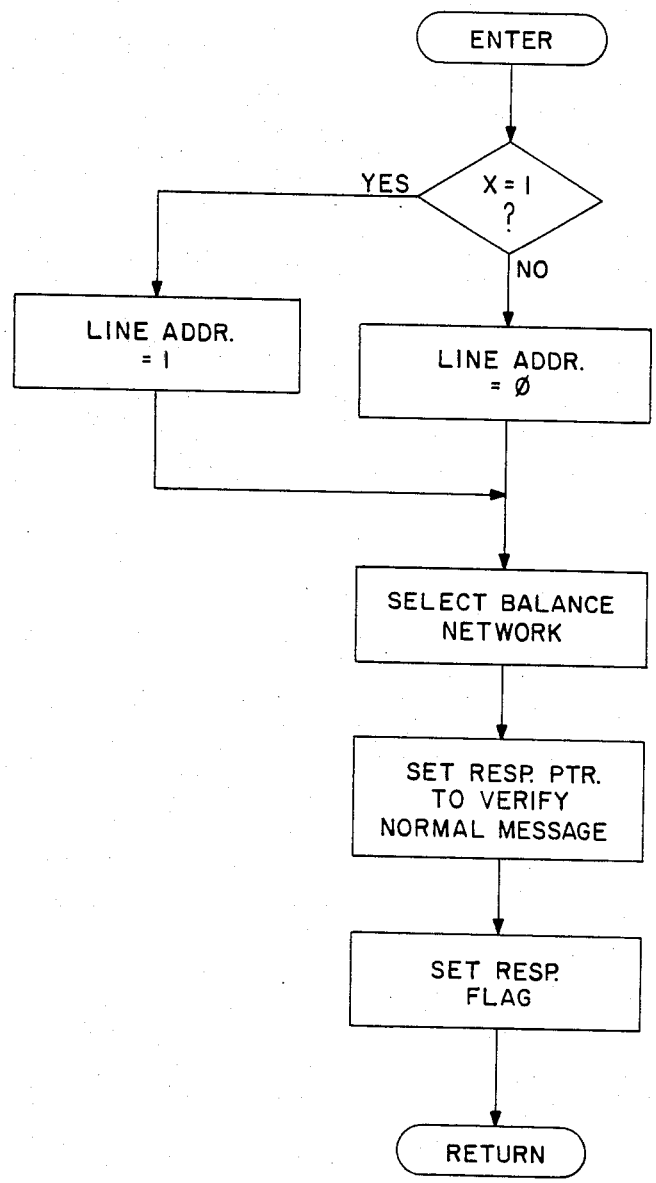
Figure 9I:
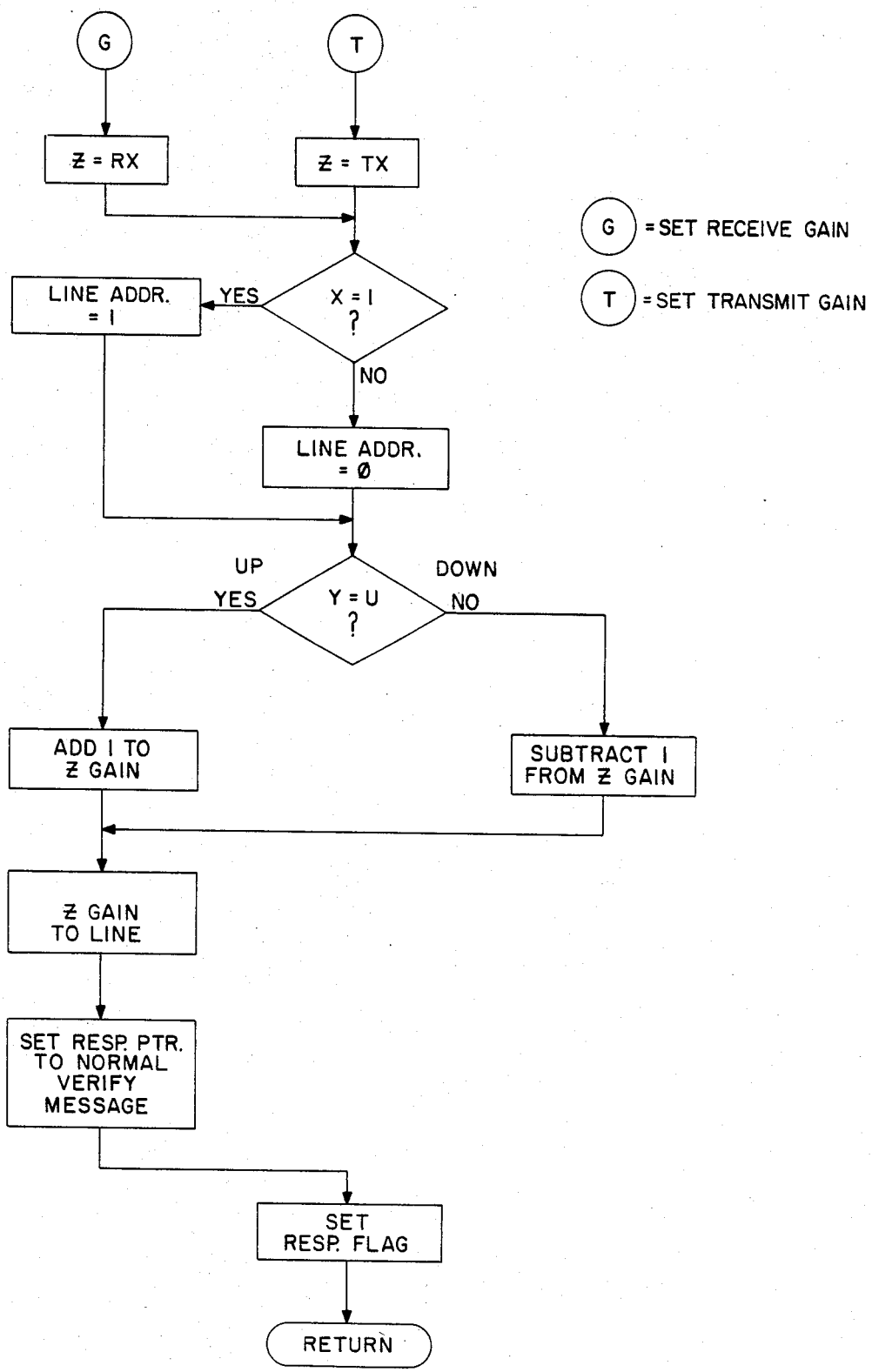
Figure 9J:
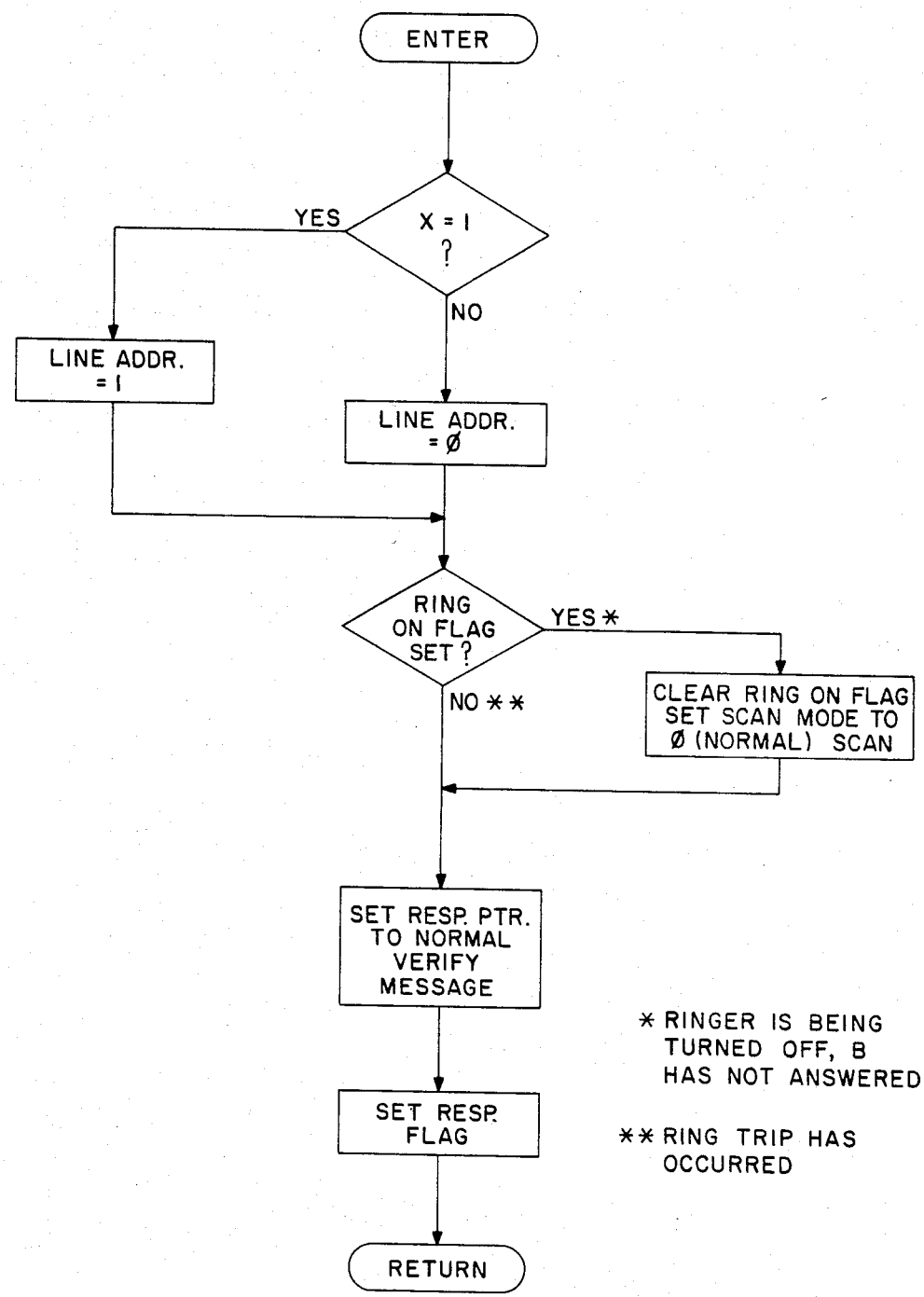
Figure 9K:
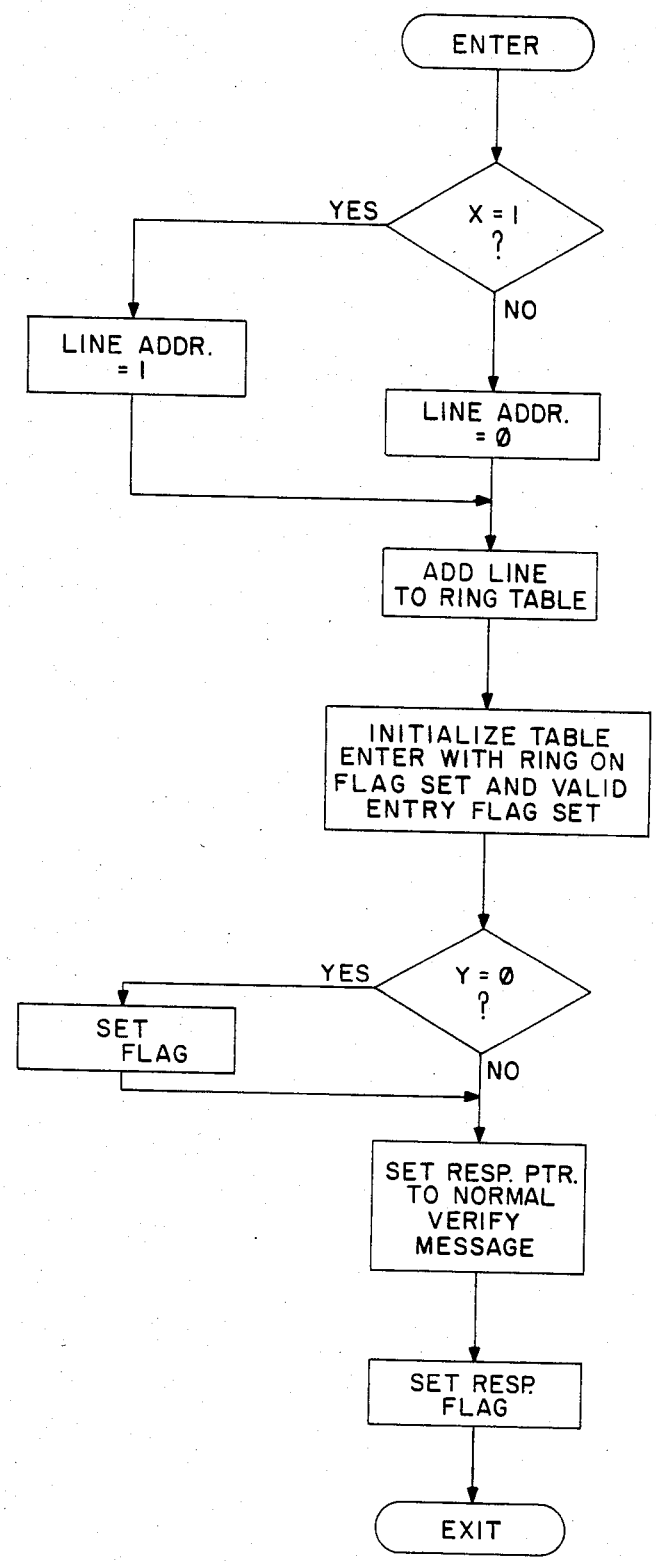
Figure 9L:
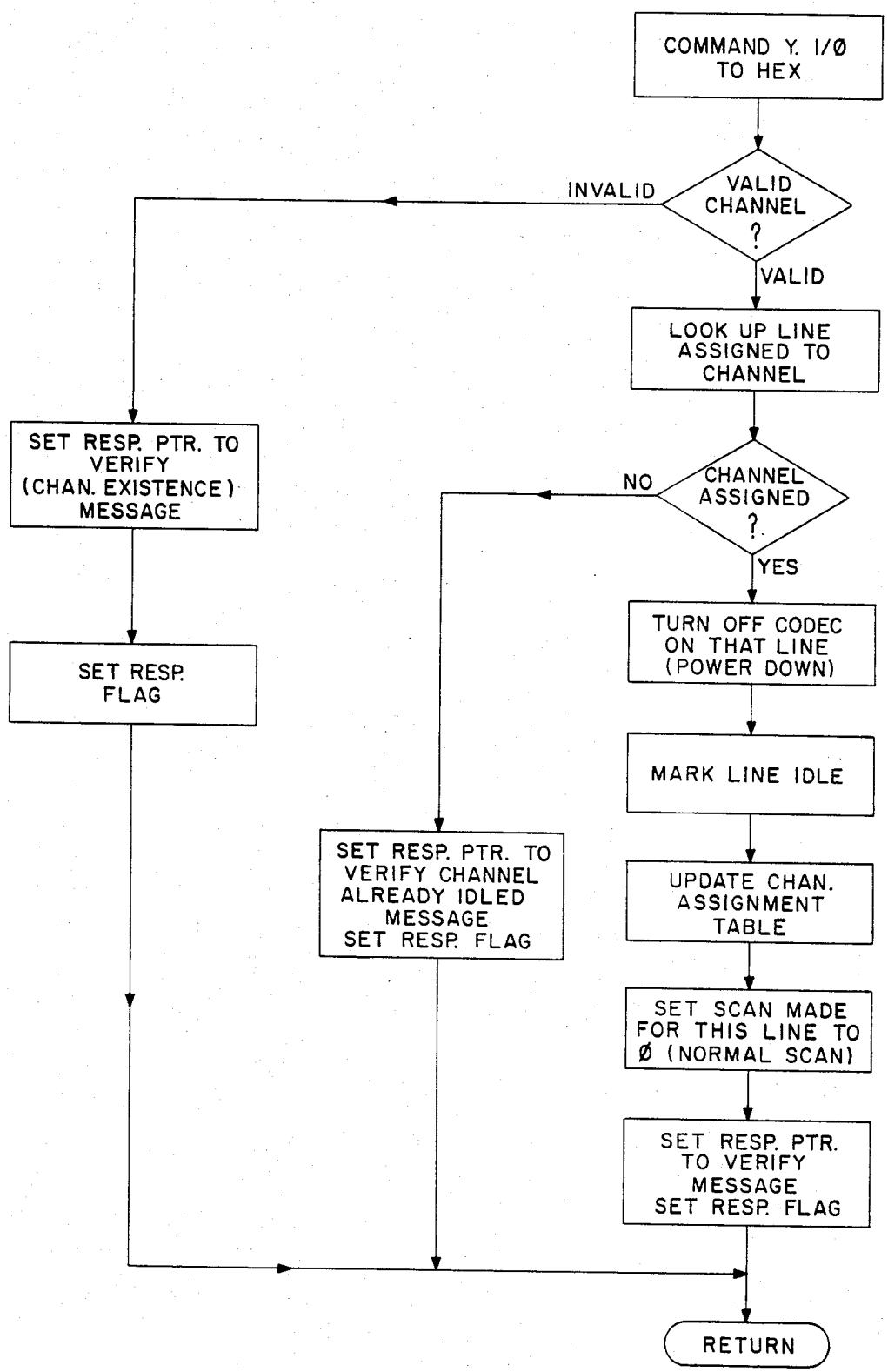

FIG. 9G illustrates the interrupt handler and common channel handle programs.

The following notes are appropriate to FIG. 9G.

EOT indicates end of test.

REV BUFF indicates receive buffer and is the first location of temporary storage for common channel commands.

RES PTR (response pointer) is set to the character in a command channel response or command.

RES Flag is set by the common channel routine when a response is to be sent.

RCU PTR is a receive pointer.

COMM FLAG indicates when a complete command has been received.

NON-SGAL CTR indicates when 5 consecutive non-signal codes have been received, this initializing resynchronization.

INTEL SERVFLAG indicates that a 2 millisec. interrupt has occurred.

RESP DLY CTR delays characters to 300 baud.

Figure 9M:
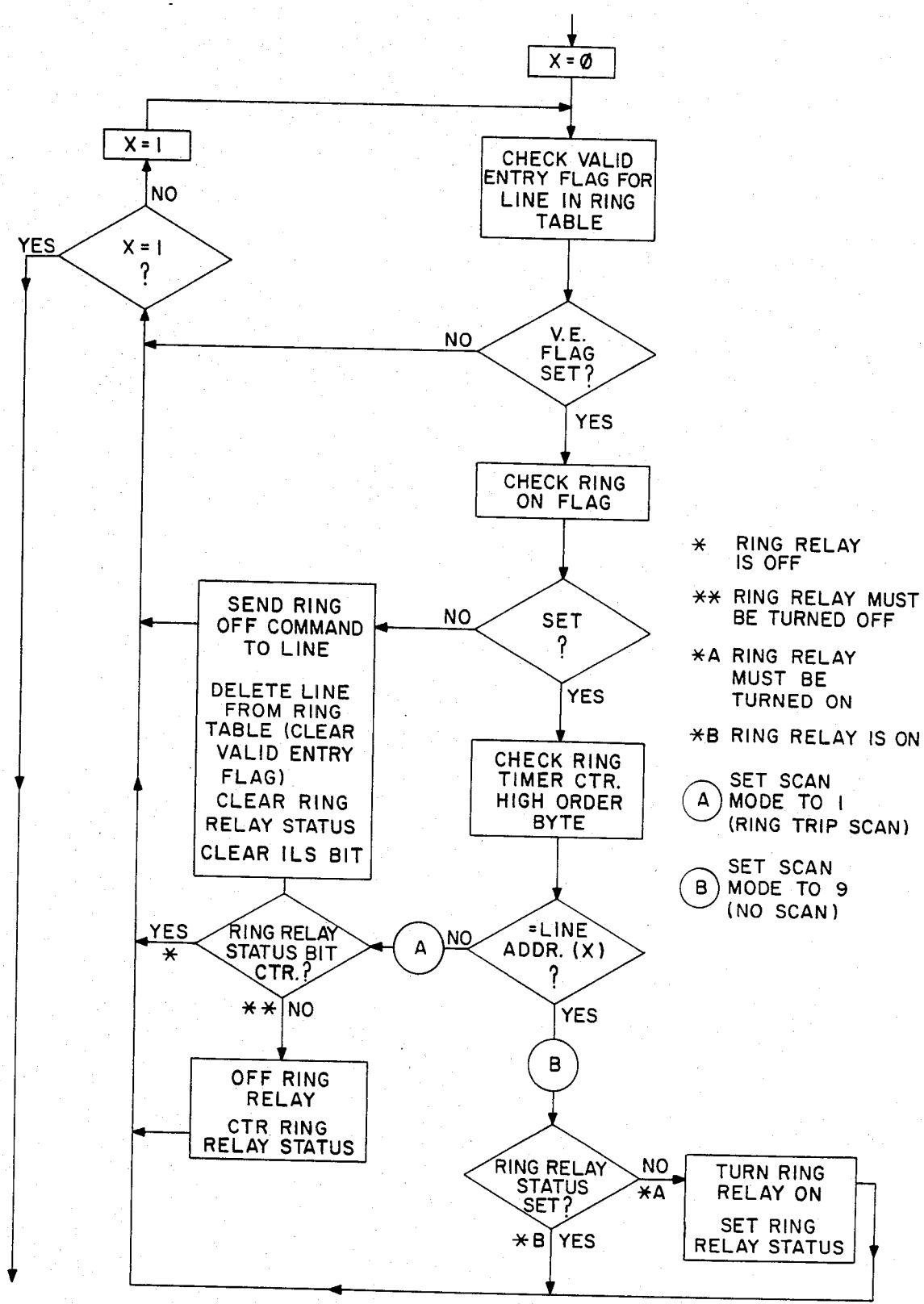
Figure 9N:
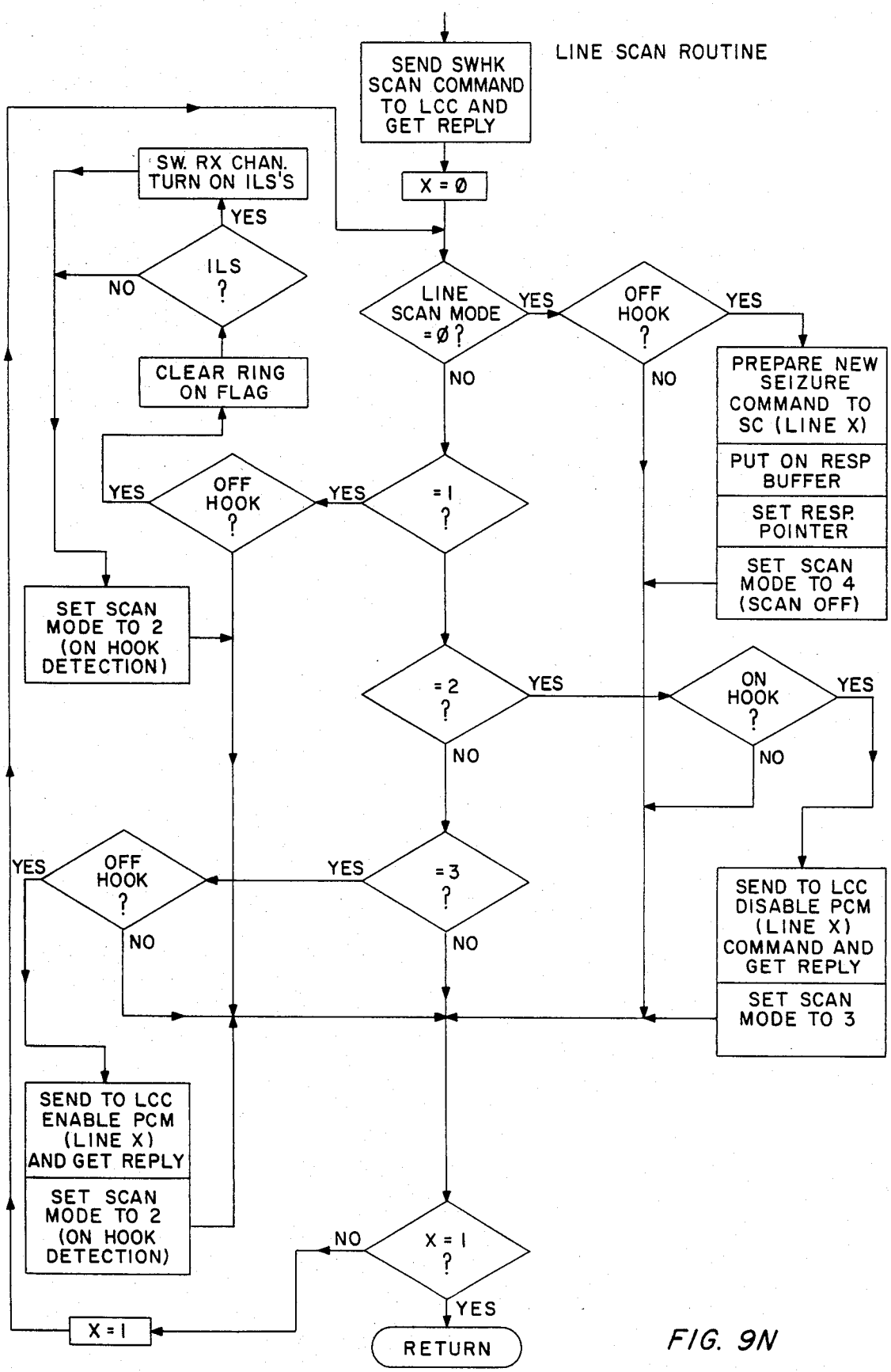

FIGS. 9H to 9L are flow charts for various task routines, FIG. 9M is a flow chart of the ringing administration program; FIG. 9N is a flow chart of the line scan routine.

6.0 BUFFER AND DISTRIBUTOR 9 (FIGS. 21, 22, 23)

Figure 21:
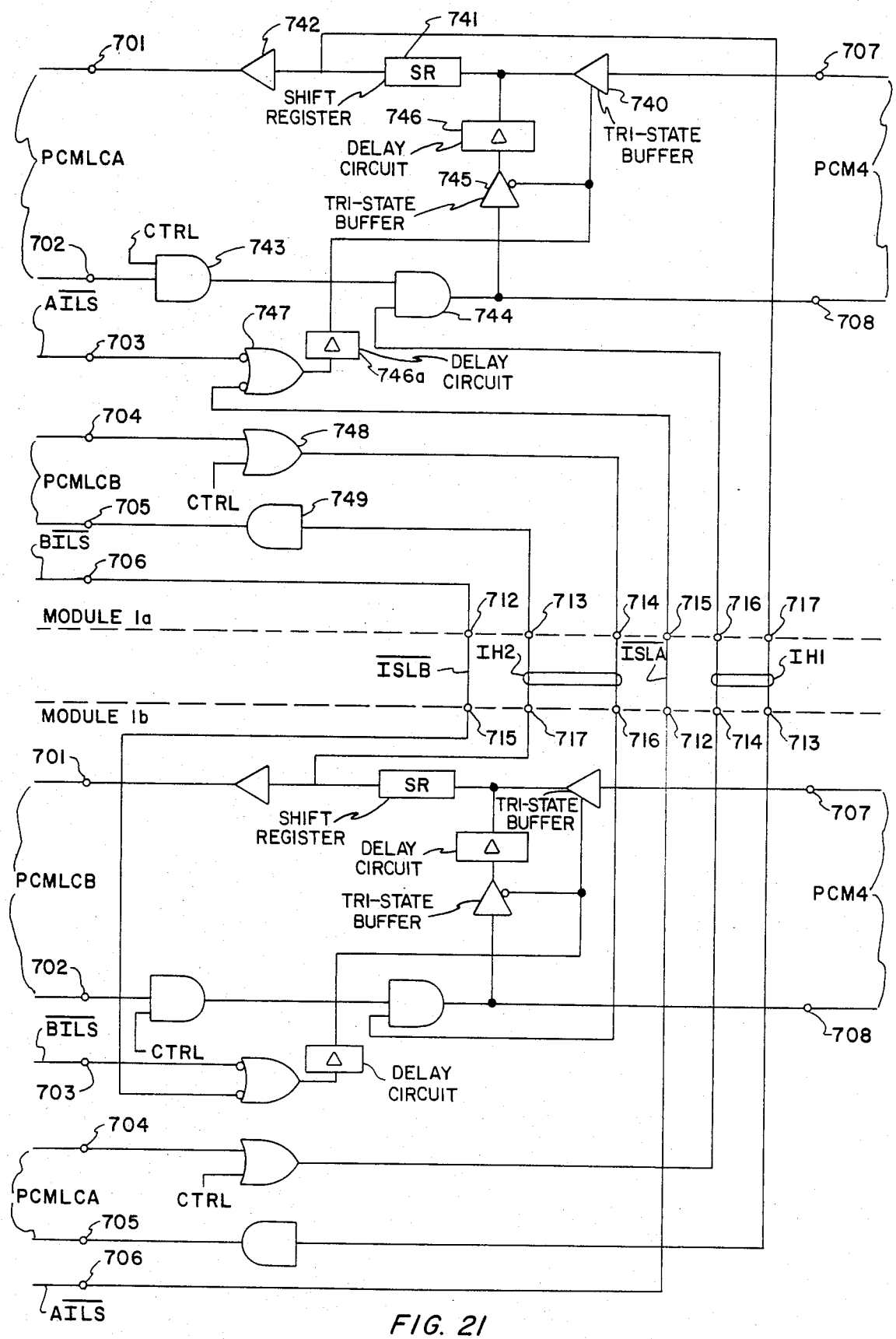
FIG. 21 illustrates in block diagram form one portion of the buffer and distributor 9 of FIGS. 2 and 2A.
Figure 22:
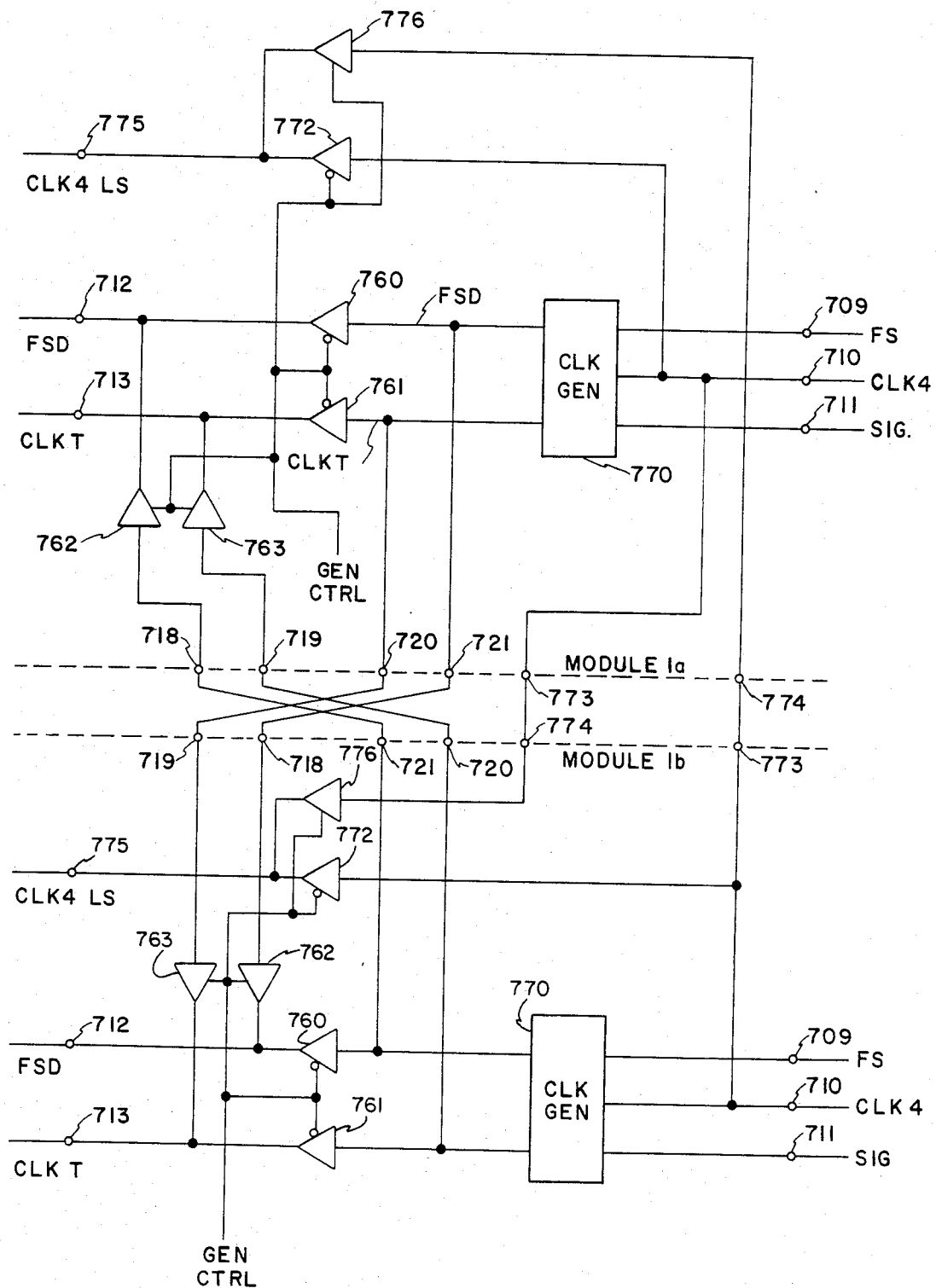
FIG. 22 illustrates in block diagram form another portion of the buffer annd distributor 9 of FIGS. 2 and 2A.

FIGS. 21 and 22 illustrate the buffer and distributor circuits 9 of FIG. 2 in greater detail. For purposes of clarity, only one buffer and distributor 9 for each line switch module 1a, 1b is shown in FIGS. 21 and 22. If in accordance with the aforementioned security block concept each line switch module 1a, 1b includes more than one buffer and distributor 9, then one buffer and distributor 9 of each line switch module 1a, 1b will include both the circuitry of FIGS. 21 and 22 and the other buffer and distributor 9 of each line switch module 1a, 1b will include only the circuitry of FIG. 21. The circuitry of the buffer and distributor 9 for each of the line switch modules 1a, 1b shown in FIGS. 21 and 22 are identical and corresponding terminals of the buffer distributor circuits have identical designations. FIG. 21 illustrates the circuitry associated with the PCM buses PCM4, PCMLCA, PCMLCB and FIG. 22 illustrates the clock distribution circuit.

Figure 23:
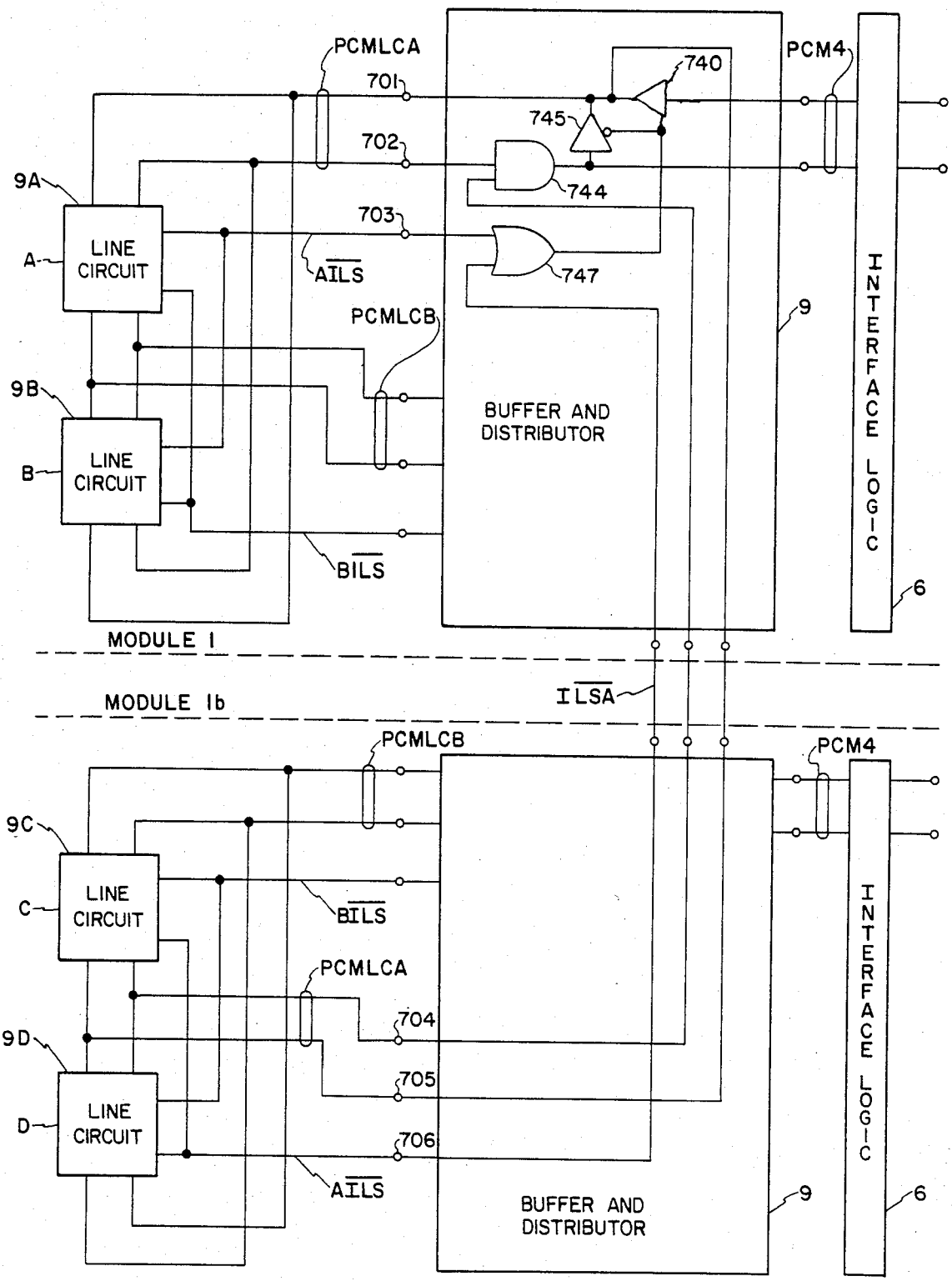
FIG. 23 is a block diagram illustrating the operation of the buffer and distributor 9 of FIGS. 2 and 2A.

6.1 BUFFER (FIGS. 21 and 23)

Line switch module 1a of FIG. 21 has terminals 707 and 708 connected to PCM bus PCM4, terminals 701 and 702 conected to PCM bus PCMLCA and terminals 704 and 705 connected to bus PCMLCB. Interposed between terminals 707 and terminal 701 are gate 740, shift register 741 and buffer gate 742. Interposed between terminals 702 and 708 are gates 743 and 744. A path is provided between the output of gate 744 to the lead between gate 740 and shift register 741 via gate 745 and delay circuit 746. Gates 740 and 745 are controlled by gate 747 through delay circuit 746a. Gate 747 has one input connected to terminal 703 and another input connected to terminal 715. Gates 740 and 745 are arranged such that gate 740 is normally closed and gate 745 is normally open, but when an appropriate signal state is present at terminals 703 or 715 gate 740 is open and gate 745 is closed. Together gates 740 and 745 operate as a crosspoint switch which is utilized for intra-line switch calls as described below.

Terminals 704 and 705 are respectively coupled to terminals 714 and 713 via gates 748 and 749. Terminal 706 is connected directly to terminal 712.

The two line switch modules 1a, 1b are interconnectd via intra-line switch highways 1H1 and 1H2 and leads $\overline{ILSB}$ and $\overline{ILSA}$. It should be noted that the gates 743 and 748 include an additional input CTRL which may be individually controlled in the event of a fault to inhibit PCM transmission.

When the system controller 5 (shown in FIG. 1) determines that a subscriber connected to a line circuit has requested a connection to another subscriber connected to a second line circuit within the same line switch, the system controller 5 forwards commands to line switch controller 7 shown in FIG. 2 indicating that an intra-line switch connection is required. The line switch controller 7, in turn, provides control signals to the line circuits of the originating and terminating parties thereby loading status bits in the respective line circuits. The status bits in turn provide gating of control signals AILS, BILS to the crosspoint switches 740, 745 of FIG. 21 associated with the originating and terminating line circuits. The respective AILS and BILS signals are active only during the time period when the transmit channels occur, which the line switch controller 7 has assigned to the originating and terminating line circuits.

Turning now to FIG. 23, the operation of switches 740, 745 is described. FIG. 23 shows the two line switch modules 1a, 1b each connected to the corresponding interface logic 6. In line module 1a, only two line circuits 9A and 9B are shown and in line module 6 only two line circuits 9C and 9D are shown. It should be understood that only two line circuits are shown in each line switch module 1a, 1b for purposes of clarity.

Two intra-line switch call operations will now be described, with reference to FIG. 23. First, assume that the subscriber A connected to line circuit 9A has requested a connection to a subscriber B connected to line circuit 9B, i.e., to a subscriber connected to the same line module. The system controller 5 of FIG. 1 provides control signals to line switch controller 7 of line switch module 1a, that an intra-line switch call between line circuits 9A and 9B has been requested. Line circuit controller 7 transmits commands to the line circuit groups containing line circuits 9A and 9B, indicating that an intra-line switch call connection is to be established, and that bus PCMLCA is to be used. The transmit and receive channels for the two subscribers A and B are also assigned. When the transmit channel for subscriber A occurs, line circuit 9A provides an active signal on lead $\overline{AILS}$ which closes switch 745 and opens switch 740. The transmit lead of PCM bus PCMLCA connected to terminal 702 is thus connected to the receive lead of PCM bus PCMLCA connected to terminal 701. Thus, a PCM sample from subscriber A transmitted by line circuit 9A on the transmit portion of bus PCMLCA is "looped back" to the receive portion of bus PCMLCA. The receive channel assigned to subscriber B line circuit 9B is assigned such that it corresponds to the transmit channel of subscriber A of line circuit 9A. Therefore line circuit 9B receives the PCM sample transmitted by the line circuit 9A. Likewise, when the transmit channel for line circuit 9B occurs, line circuit 9B will apply an active signal to line AILS. Switch 740 will again open and switch 745 will again close for the duration of the transmit channel. Thus, the PCM sample transmitted by line circuit 9B on the transmit portion of PCM bus PCLCA is "looped back" to receive portion of PCM bus PCMLCA. The receive channel assigned to line circuit 9A corresponds to the transmit channel assigned to line circuit 9B. Therefore, line circuit 9A will receive the PCM sample transmitted by line circuit 9B.

Second, assume that the subscriber A connected to line circuit 9A has requested a connection to a subscriber D connected to line circuit 9D, i.e., to a subscriber connected to a different line switch module within a line switch. The system control of FIG. 1 provides control signals to line switch controller 7 of FIG. 2 of the line switch module 1a that an intra-line switch call between line circuit 9A of line module 1a and line circuit 9D of line switch module has been requested and bus PCMLCA is to be used.

Line switch controller 7 of line switch module 1a assigns transmit and receive channels to line circuits 9A and 9D of FIG. 23. Again the assigned transmit channel of line circuit 9A will correspond to the receive channel of line circuit 9D and the assigned transmit channel of line circuit 9D will correspond to the receive channel of line circuit 9A. The crosspoint switches 740 and 745 are then operated in the same manner as described above, with the exception that line circuit 9D provides active signals to control the switches 740 and 745 instead of line circuit 9B.

Figure 24A:
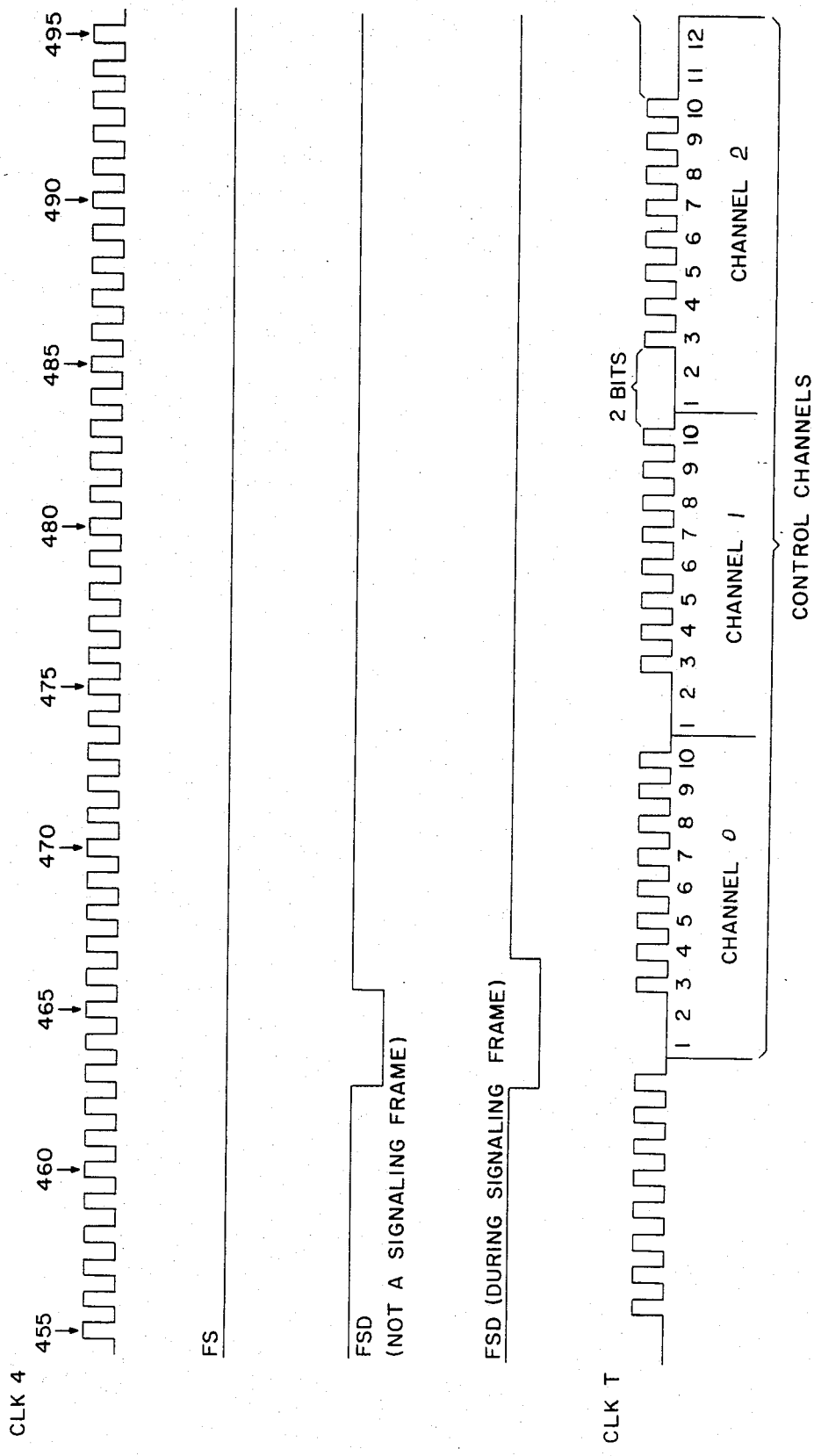

6.2 DISTRIBUTOR (FIGS. 22 and 24)

The clock distribution circuitry of the buffer and distributor circuits 9 for two line switch modules is shown in FIG. 22. Each buffer and distributor 9 has input terminals 709, 710, 711 connected to lines FS, CLK4, and SIG from a corresponding interface logic 6. A clock generator circuit 770 generates a CODEC clock signal CLKT and a frame clock signal FSD. The outputs FSD and CLKT are coupled to terminals 712 and 713 respectively via controlled switches 760 and 761 and are directly coupled to terminals 721 and 720. Input terminals 718 and 719 are coupled to terminals 712 and 713 respectively via controlled switches 762 and 763. Each of the switches 760, 761, 762, and 763 has a control input commony connected to lead GEN CTRL and operates such that when a signal having a first state is present on GEN CTRL, switches 760 and 761 are open and switches 762 and 763 are closed. When a signal having a second state is present on GEN CTRL switches 760 and 761 are closed and switches 762 and 763 are open. By means of the switches 760, 761, 762, 763, the FSD and CLKT signals for a line switch module may be supplied either by the clock generator 770 within the line switch module or by the clock generator in another line switch module. The GEN CTRL lead of a line switch module is connected to the line switch controller in the same line switch module.

Timing signal waveforms for the signals FS, CLK4, FSD and CLKT are shown in FIG. 24. A 9 stage counter within the clock generator 770 repetitively counts 512 4.096 mHz pulses before recycling.

The FS signal received from the interface logic 6 of FIG. 2 is a frame synchronization pulse which occurs every 125 microseconds. CLK4 is a 4.096 mHz clock signal from interface logic 6. SIG is likewise provided by interface logic 6 of FIG. 8 and indicates the occurrence of signaling frame, i.e., SIG is normally low and goes high the frame before a signaling frame. CLKT is CODEC clock which generally comprises bursts of eight pulses of a 4.096 mHz clock. The relationship of CLKT to the CODEC channels is shown. When a frame bit FSD occurs, the next 32 bits received over the PCM bus are control bits. More specifically, in a system with 10-bit channels, the next three channels are reserved for control data and channel three is extended by two bits. In a system with 8-bit channels, four channels are reserved for control.

FSD is a framing signal which will vary as shown depending on whether it occurs during a signaling frame or not.

Turning back to FIG. 22, the CLK4 lead coupled to terminal 710 is connected to output terminal 775 via switch gate 772 and is connected directly to output terminal 773. Input terminal 774 is coupled to output terminal 775 via switch gate 776. The terminal 774 is connected to terminal 773 of the other line module. The switch gates 772 and 776 operate in the same manner and under control of the same GEN CTRL signal as the aforementioned switch gates 760, 761, 762, 763 so that either CLK4 from line module 1a or 1b may be utilized as the source for 4.096 mHz clock signals on lead CLK4LS.

7.0 LINE CARD OR GROUP (FIG. 25)

Figure 25:
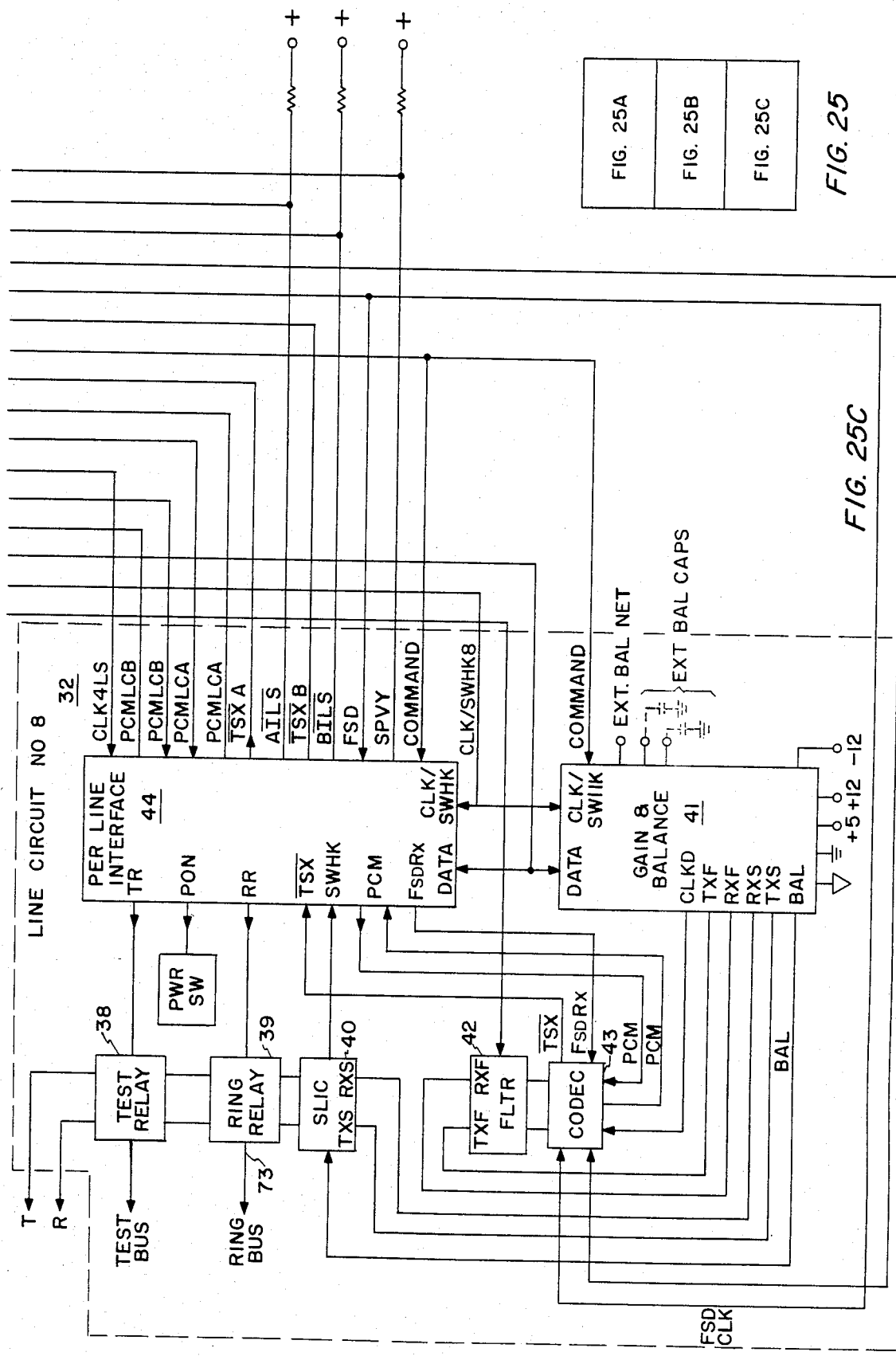
FIGS. 25A, 25B and 25C when arranged as shown in FIG. 25 illustrate in block diagram form a line circuit group in accordance with the principles of the present invention.
Figure 25A:
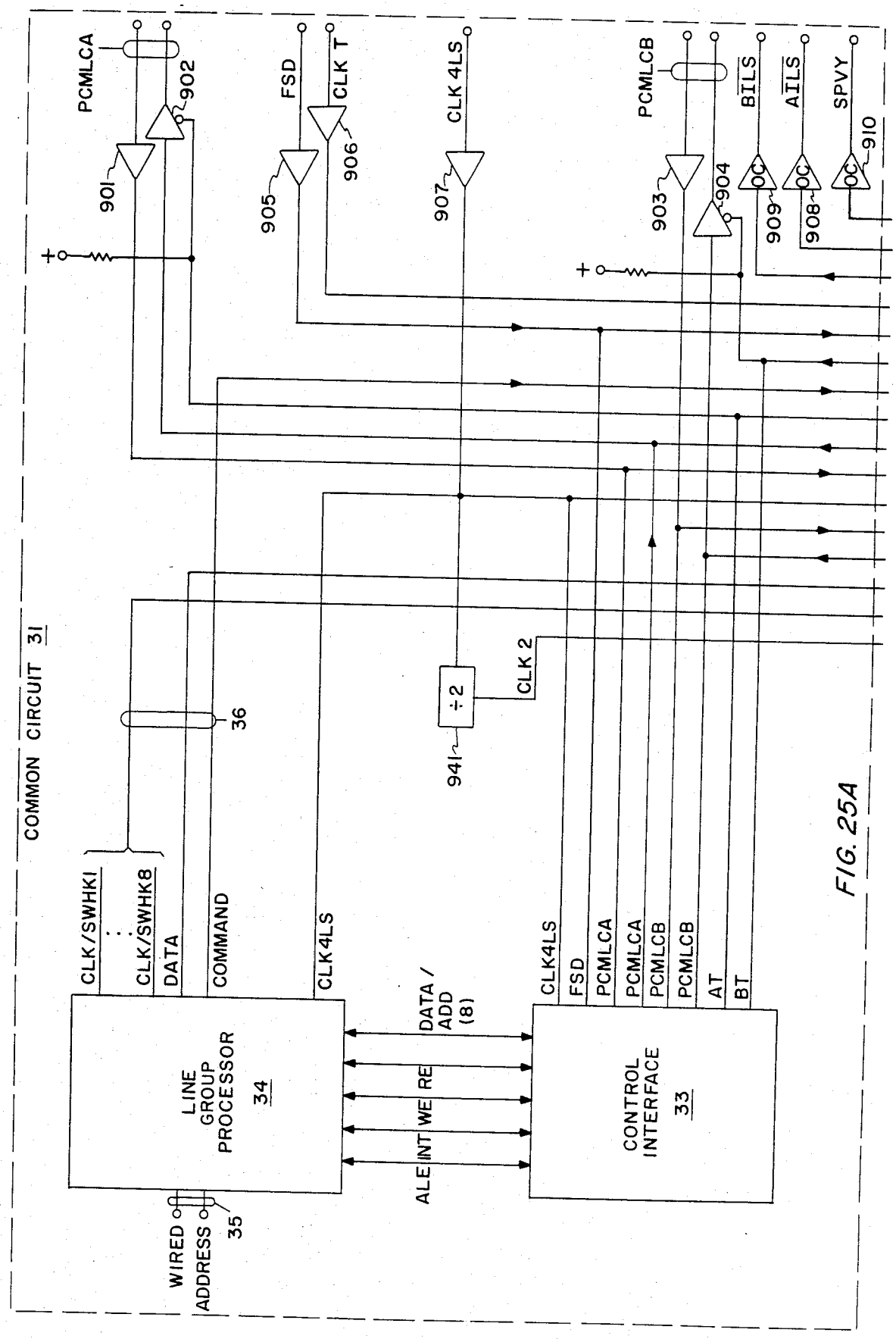
Figure 25B:
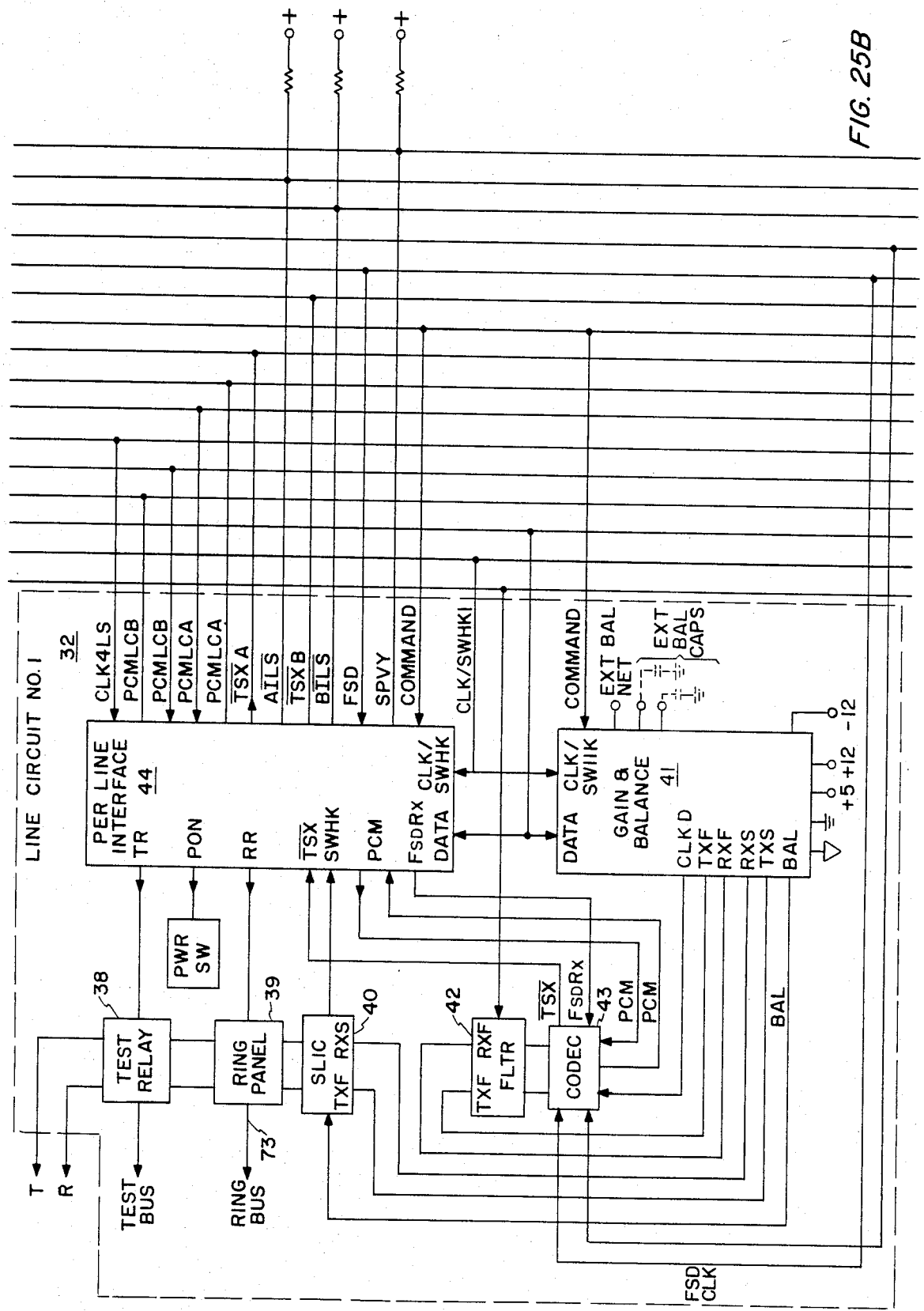

One of the line groups 11 of FIG. 2 is shown in detail in FIG. 25. Each line group includes a common circuit portion 31 and eight line circuits 32 in the illustrated embodiment. In other embodiments, the common circuit portion 31 may be on a separate circuit card and a line group may have more or less than eight line circuits. The common circuit portion includes a control interface 33 which is coupled to PCM bus PCMLCA via buffer 901 and switch gate 902, and to PCM bus PCMLCB via buffer 903 and switch gate 904. The control interface is also coupled to the FSD and CLKT leads via buffers 905 and 906, respectively. The interface 33 extracts and inserts control data bits which are transmitted and received over PCM buses PCMLCA and PCMLCB. Control data received over the buses are examined to determine if the address received matches the address of the line group. If the received address matches, an interrupt signal is sent via line INT to a line card processor 34 which may be a conventional microprocessor of a type well known in the art. It should be noted that the line group address, which the control interface 33 matches against is, in fact, supplied by the line group processor 34 and is stored by the control interface 33. The line group address is supplied to the processor 34 by leads 35 to provide a unique asddress to the line card.

Other control data are communicated between the processor 34 and the PCM buses PCMLCA, PCMLCB via the conrol interface 33, which acts as a data buffer. It should be noted that the control interface 33 is provided because the microprocessor 34 cannot operate at a high enough rate to handle 4.096 mbps serial rate on the PCM buses. In other applications, which do not utilize a high speed serial bus for control information, e.g., which control information is received in parallel, or at a slower rate, the control interface 33 may not be necessary. In other words, the microprocessor 34 may be directly coupled to the bus carrying the control information.

After the processor 34 determines that an operation is required within its associated line group, it will select the appropriate line circuit, as determined by portions of the control data received over PCM bus PCMLCA or PCMLCB.

The processor 34 is connected to the line circuits 32 via bus 36. Bus 36 includes ten separate leads, specifically, a separate clock lead CLK/SWHKn (n=1 to the number of circuits in a group) for each of the line circuits, a bidirectional data lead DATA, and an address latch enable lead COMMAND. Control and data information is transferred between the line group processor 34 and the per line control interfaces 44 over the common lead DATA. The information transfer is controlled by the COMMAND lead and the CLK/SWHKn leads.

Additional leads connected to the line group are CLK4LS, which is the 4.096 mHz clock signal, leads $\overline{AILS}$, $\overline{BILS}$, and SUPVY. The lead CLK4LS is distributed to the line circuits via a buffer gate 907. The per line control interface 44 of each of the eight line circuits 32 generates the signals $\overline{AILS}$, $\overline{BILS}$ and SUPVY. The $\overline{AILS}$ outputs of the line circuits are "wire-ored" to the input of buffer output gate 908. Likewise the $\overline{BILS}$ outputs are "wire-ored" to gate 909 and the SUPVY outputs are "wired-ored" to gate 910.

The 4.096 mHz clock ClK4LS is applied to a divide by two circuit 941 which provides a 2.048 mHz clock signal CLK2 for use by the line circuits.

7.1 LINE CIRCUIT (FIGS. 25, 26, 27)

Each line circuit 32 includes conventional line circuit transmission components: test and ring relays 38 and 39, a subscriber line interface circuit 40, a filter circuit 42 and a codec 43. The CODEC 43 is of a known type which is operable in a so called "microprocessor controlled mode" of operation, wherein the channel assigned by a line switch or system controller to the associated line circuit is stored by the CODEC and is used to determine when the CODEC will become active. The CODEC may be defined as "active" when the CODEC is transmitting or receiving over PCM buses. One such CODEC is commercially available from the INTEL Corporation and is identified as type number 2910A.

Each line circuit 32 further includes a per line control interface 44 which interfaces between the common circuit 31 and the line circuit transmission components. Control of portions of the per line control interface 44 is achieved by the processor 34 transmitting control words over bus 36. Each of these control words is 12 bits in length and arranged in format as shown in FIG. 26. Bit 0 determines whether the control operation is a read or write; bits 1-3 are address bits for the per line control interface 44; bit 4 is unused; bit 5 is set according to whether the line card is in a system using 8 bit or 10 bit PCM words on its buses; bits 6, 7 and 8 are used to control external components such as power control, device test relay, and ring relay; bit 9 enables the line circuit; bit 10 is used to signify intraline calls; and bit 11 selects which of the two PCM buses PCMLCA or PCMLCB will be utilized by the line circuit.

Figure 27A:
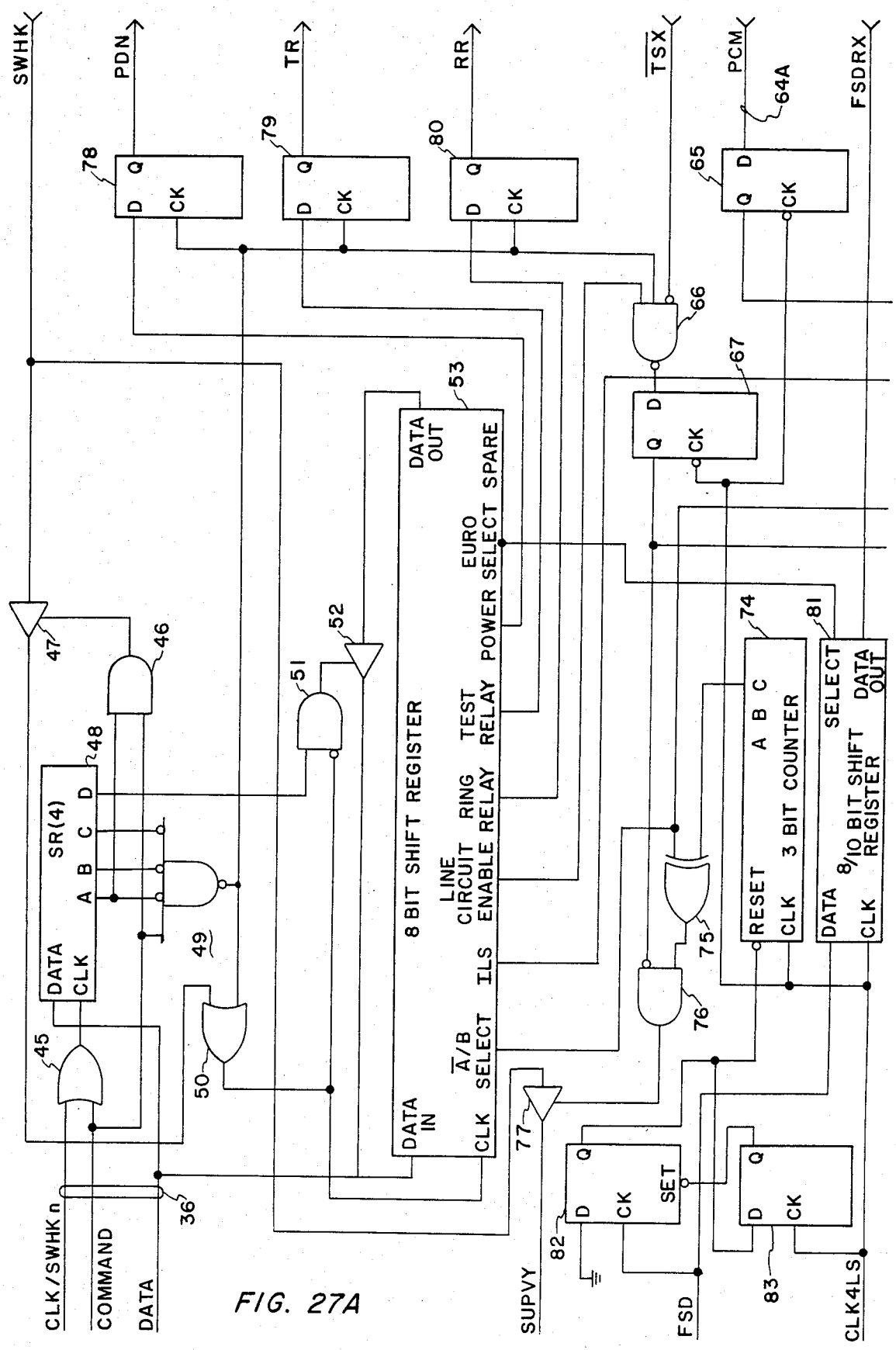

One of the per line interfaces 44 of FIG. 25 is shown in greater detail in FIG. 27. The CLK/SWHKn lead is a dual function lead. More specifically, one function of this lead is that of a normal clock lead to clock data into or out of the line interface circuits 44. The other function of the CLK/SWHKn lead is to return switch hook status to the line group microprocessor 34 of FIG. 25. The selection as to which of the above two functions is provided is determined by the state of the COMMAND lead and register 48. When the COMMAND lead is high, and when bit 0 of the control word indicates a read, then gate 46 enables tri-state buffer 47 thereby coupling the lead SWHKn, which is connected to the SLIC 40 of FIG. 25 and indicates current switch hook status, to the line card processor 34 of FIG. 25 via CLK/SWHKn lead. When the COMMAND head is low, gate 45 is enabled and control bits from the DATA lead of bus 36 are shifted into shift register 48. After the four control bits 0-3 are loaded in register 48, the COMMAND lead goes high disabling gate 45 thereby holding the control bits in register 48. Gates 49 and 50 form a decoder circuit to gate clock pulses from the CLK/SWHKn lead to shift register 53. Similarly, gates 51 and 52 determine whether data will be stored in or read from register 53. If data is to be stored in register 53, the next eight bits, i.e., bits 4-11 of the control word are shifted into the register 53 from the Data lead. The $\overline{A/B}$ select lead control gates 54, 55, 56, 58 to connect either bus PCMLCA, or PCMLCB to the coded PCM bus 64A, 64B. Flip-flop 65 provides buffer timing for the transmit PCM signal from bus 64A The $\overline{TSX}$ lead provides timing from the CODEC 43 of FIG. 25. Gate 66 controls gating of the $\overline{TSX}$ signal into buffer flip-flop 67. The Q output of flip-flop 67 is connected to gates 60 and 61 which are controlled by the A/B select bit to steer the TSX signal to leads $\overline{TSXA}$ or $\overline{TSXB}$. The Q output of flip-flop 67 is also coupled to gate 62 and 63 which are controlled by the $\overline{A/B}$ select bit and the ILS bit. The outputs of gates 62 and 63 are coupled respectively to leads $\overline{AILS}$ and $\overline{BILS}$.

In some applications it may be desirable to return switch hook information at a rate fast enough to detect dial pulsing without utilizing the A/B signaling bits of the PCM bus. To accomplish this, switch hook information from lead SWHK from the line circuit 32 is gated onto the supervisory lead SUPVY during one half of the channel time assigned to that circuit. The channel during which switch hook information is gated is determined by a signal on lead $\overline{TSX}$ from the CODEC 43 of FIG. 25.

A counter 74 divides each channel into two parts. Flip-flops 82, 83 provide synchronization for counter 74. The $\overline{A/B}$ select bit controls gate 75 to detrmine in which of the two parts of a channel the switch hook information is to be gated. Gates 76 and 77 gate the switch hook information from flip-flop 67 to supervisory lead SUPVY. The line circuit enable bit controls gating of the lead $\overline{TSX}$ at gate 66 for maintenance purposes, i.e., if it is determined that CODEC 43 of FIG. 25 is defective, the line circuit enable bit is utilized to prevent the CODEC 43 from interfering with the operation of the remainder of the system. The ring relay, test relay and power control flip-flops 80, 79, 78, respectively control the application of ringing signals from bus 73 of FIG. 14 control connections to a test bus and to apply power to the entire transmission circuit elements of FIG. 14. Register 81 delays the frame clock FSD from the buffer-distributor 9 of FIG. 22 by one channel time to provide a receive frame clock which is coupled to a CODEC 43 of FIG. 25 via lead FSDRX. The Euro Select bit, i.e., bit 5 of FIG. 26, determines whether the channel delay corresponds to 8 or 10 bits.

7.2 GAIN/BALANCE (FIGS. 25, 28, 29, 30, 31)

Turning back to FIG. 25, the gain/balance control circuit 41 provides software selection of transmit gain, receive gain and balance for the line circuit. Control of the gain/balance circuit 41 is achieved by the line card processor 34 transmitting control words over the serial data bus 36 in a manner similar to that described with respect to the per line controller interface circuit 44 hereinabove. The control words are illustrated in FIGS. 28 and 29. As shown in FIG. 28, a control word for the gain/balance operations comprises 28 bits arranged as follows: a read/write bit, three address bits, a clock control bit, three unused bits, four bits for line balance network selection and eight bits each for transmit and receive gain selection. As shown in FIG. 29, a control word for CODEC control comprises 12 bits which includes a read/write bit, three address bits, two mode bits and six channel assignment bits.

Figure 30A:
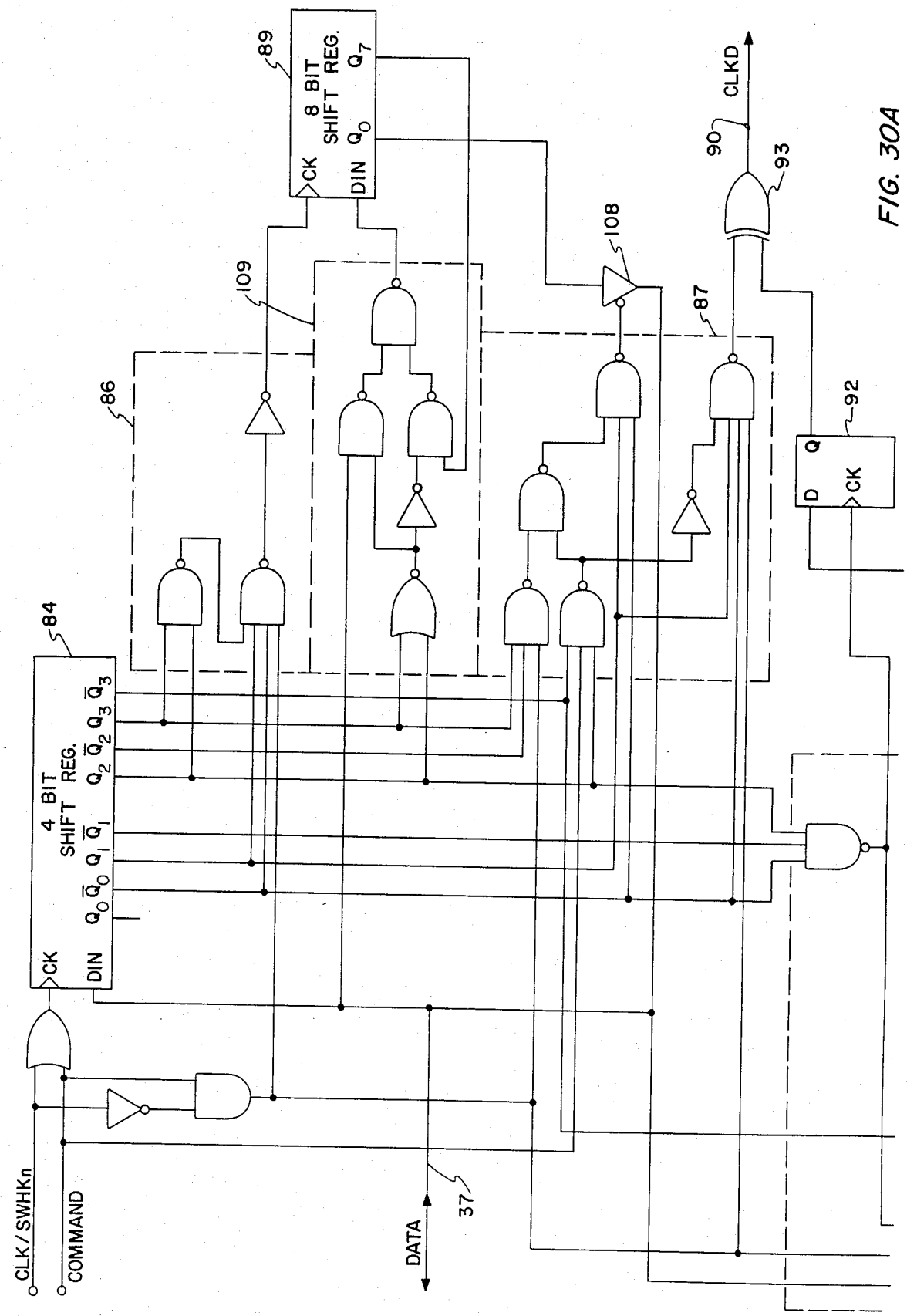

The gain/balance circuit 41 is shown in detail in FIG. 30. The first four bits of a control word are loaded into and stored by register 84 in the same manner as described for register 48 of FIG. 27. Address decoders 85, 86, 109 and 87 decode the contents of the register 84. Decoder 85 determines if the control word is to provide gain/balance settings to be stored in register 88. Decoder 86 permits loading of assigned channel information into a register 89. Decoder 87 controls the loading of channel assignment information from register 89 into the CODEC using data clock lead CLKD.

If the first four bits of the control word shown in FIG. 28 stored in register 84 as indicated above activate decoder 85, the next 24 bits are then stored in register 88. The clock control bit stored in bit Q23 of register 89 controls the state of flip-flop 92 which in turn is connected to EXCLUSIVE-OR gate 93 to determined whether the clock signal on lead CLKD is inverted or not. The four line balance network selection bits of shift register 88 control analog solid state switches 94 to selectively connect capacitors 95 and 96, network 97 and 98, to the SLIC circuit via the balance selection lead BAL. It should be noted that the capacitors 95 and 96 and resistor 98 may be replaced with other network components or with entire networks.

Gain control amplifiers 103 and 105 are connected such that they are interposed in the transmission path between the SLIC 40 and Filter 42 as shown in FIG. 25. More specifically, receive amplifier 103 has one input connected to lead RXF connected to the receive filter and an output lead RXS connected to the receive path of the SLIC. Amplifier 105 has one input connected to SLIC transmit lead TXS and an output connected to transmit filter lead TXF.

The eight receive gain control bits stored in register 88 control analog solid state switches 101 to selectively connect resistors 102 to one input of amplifier 103. Likewise the eight transmit gain control bits stored in register 88 control analog switches 104 to selectively connect registers 106 to one input of amplifier 105.

It is desirable to maintain closely controlled gain steps, e.g., less than 0.1 db, over a wide range of environmental conditions. Typically, gain circuits comprise a resistive ladder similar to that formed by resistors 106, each leg of the ladder having an analog switch connected in series with a resistor. The ladder in turn forms a resistive divider with another resistor 107. The analog switches have a finite impedance which will vary from unit to unit and with environmental changes. Typically, analog solid state switches have impedances of nominally 50 to 150 ohms in the on-state. The variation of the on-state impedance would thus contribute a significant change to the ratio of the dividers previously used.

This problem is significantly reduced in the gain control circuits shown in FIG. 30. Specifically, an amplifier having an extremely high input impedance such as a FET differential input amplifier, e.g. 103 or 105, is connected in the divider network. The resistance values may then be made relatively high, for example, in the order of tens of thousands of ohms, and accordingly, the impedance variations in analog switches, which are on the order of a hundred ohms, will have a negligible effect on the gain through the circuit.

The gates 91 are controlled by the read/write bit of the control word to determine whehter a portion of a control word is to be stored in register 88, or whether the contents of register 88 are to be read via the data bus 37.

A CODEC control word has two distinct addresses. One address (hereinafter first address) will result in either the register 89 being loaded or read by the line card processor 34, and the other address (hereinafter second address) will cause the contents of register 89 to be loaded into a CODEC 43. If the control word contains the first address and the read/write bit indicates a write operation, the mode and channel assignment portion of the control work is loaded into register 89 via decoder 86. If the control word contains the first address and the read/write bit indicated a read operation, the contents of reigster 89 are supplied to data bus 37 via gate 108, which is controlled by portion of the decoder 87. When the register 89 is read, the gates 109 will feed each bit, as read, back into the register such that after a read of the register 89, the contents of register 89 are unchanged.

If the control word contains the second address, the contents of register 89 are supplied to the CODEC over data bus 37 via gate 108. Gate 108 is controlled by portions of the decoder 87. Other portions of decoder 87, when enabled, supply clock pulses to a CODEC via gate 93 and line 90 to clock the data from bus 37 into the CODEC. The gates 109 will again operate to loop the data bits loaded into the CODEC from register 89 back into register 89.

As noted hereinabove the control words transmitted between the line groups and the line switch controller 7 of FIG. 2 over the buses PCMLCA and PCMLCB as shown in FIGS. 2 and 6 comprise 32 bits. FIG. 31 illustrates the format of these control words. Each control word transmitted from the line switch controller 7 of FIG. 2 comprises four eight bit bytes, indicated as Bytes 1–4. Byte 1 may include one parity bit which is calculated over the entire word, and includes seven address bits. Byte 2 includes five function bits which control the function that line card processor 34 is to perform, and three bits to designate which one of the eight line circuits on a line card is to be affected. Bytes 3 and 4 contain control data as required for the function specified by the function bits. After a control word is transmitted to the line card by the line switch controller 7, the processor 34 will respond by returning the same control word back to the line switch controller 7 if the control word indicates a write operation. If the control word indicates a read operation, the line card processor 34 will return bytes 1 and 2 as originally transmitted from the line switch controller 7 and will include respose data in Bytes 3 and 4.

7.3 PROTOCOL INTERFACE CIRCUIT/CONTROL INTERFACE 33 (FIGS. 25, 32)

Figures 32, 32A:
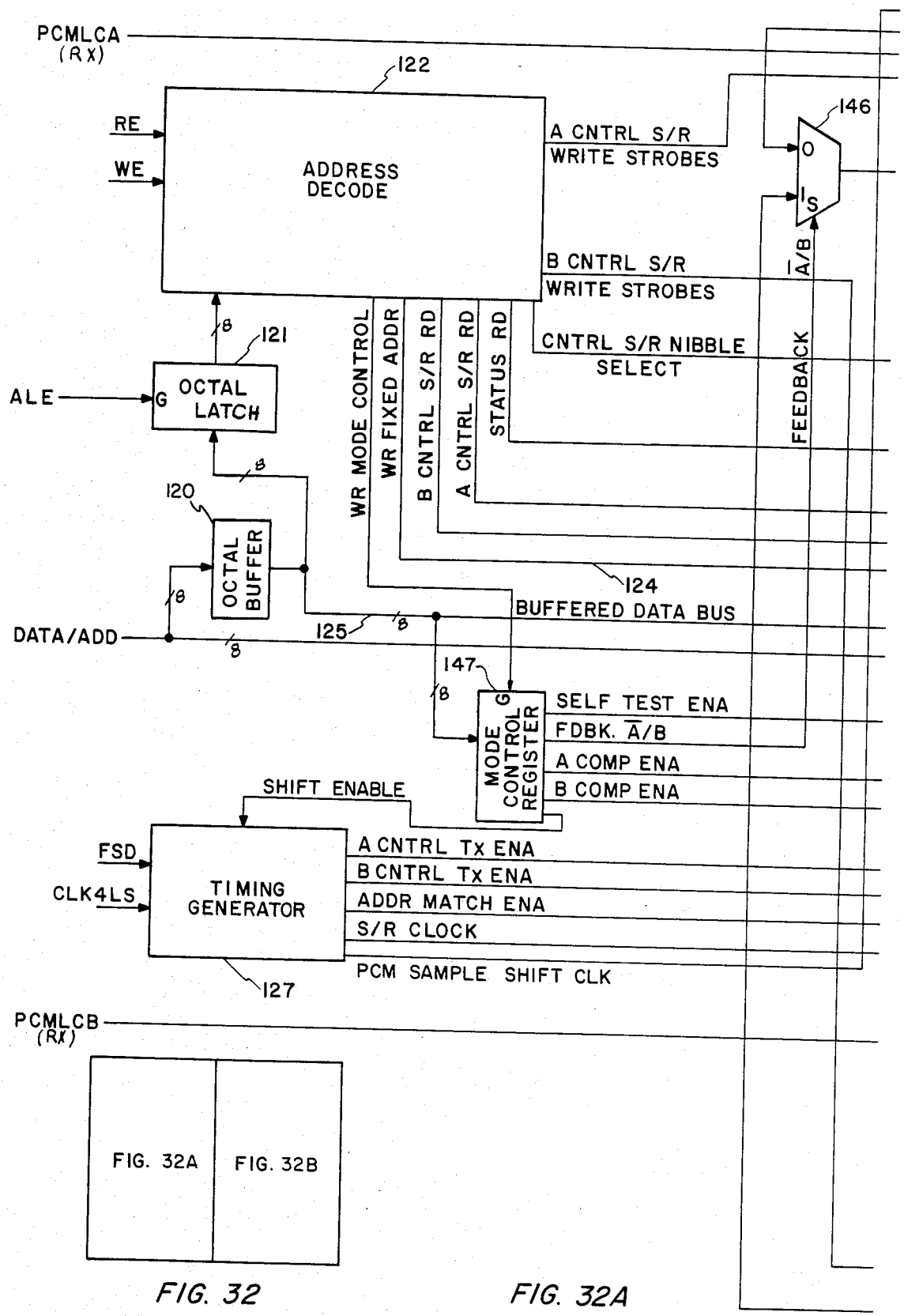
FIGS. 32A and 32B when arranged as shown in FIG. 32 illustrate in block diagram form the control interface 33 of FIG. 25A.
Figure 32B:
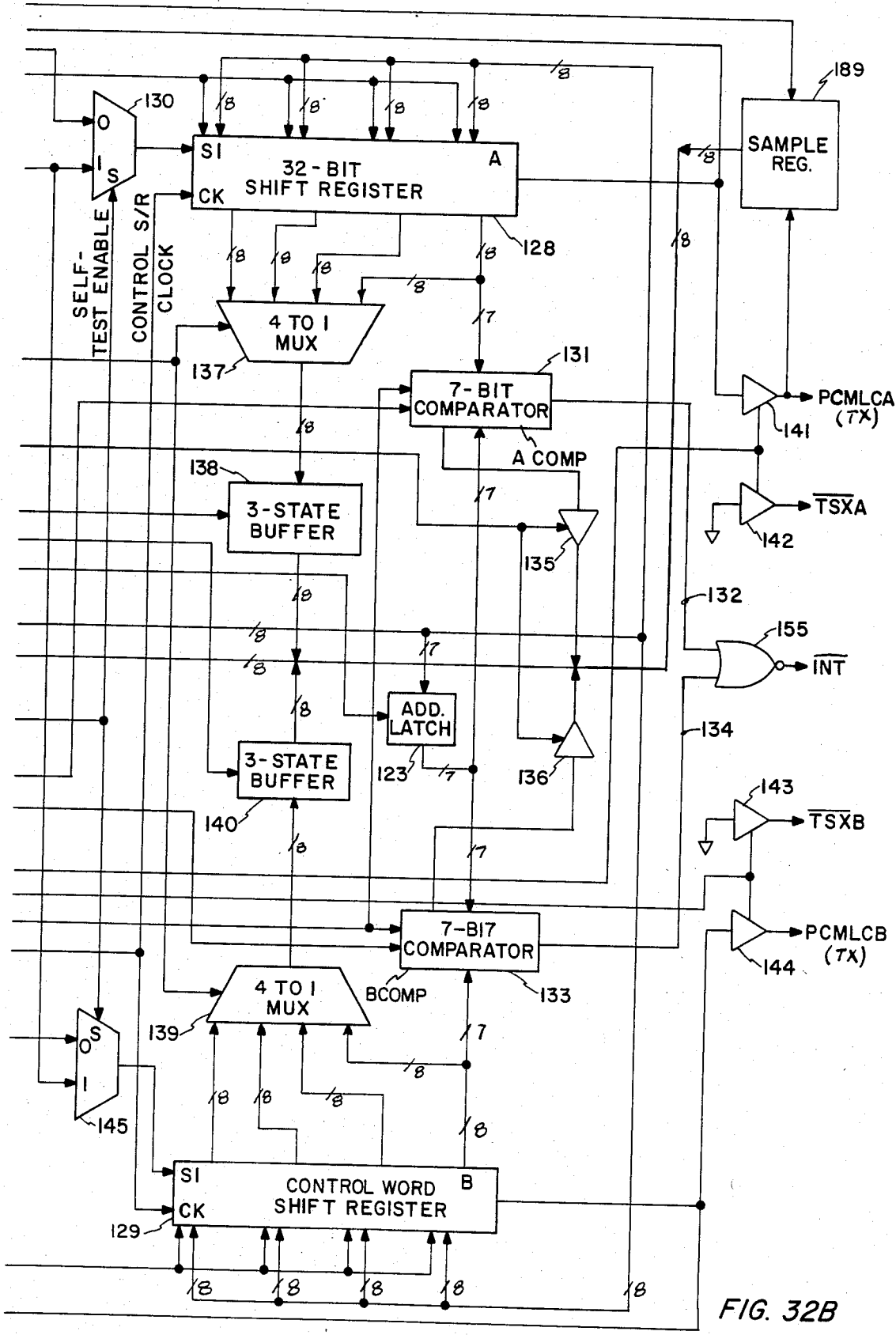

The control interface 33 of FIG. 25 comprises the protocol interface circuit PIC and as shown in detail block diagram form in FIG. 32 is connected to buses PCMLCA and PCMLCB. For purposes of clarity, single lines are used to represent multi-line buses and the number of lines in a bus is indicated at various points along the bus.

Initially, the line group processor 34 of FIG. 25 reads the line card address from leads 35 as shown in FIG. 25 and loads this address into the control interface latch 123 of FIG. 32 in the following manner. The processor 34 transmits the address to the latch 123 over the DATA/ADD lines to the control interface 33. This internal register address is buffered by buffer circuit 120 and is presented to the input of register 121. The line card processor 34 concurrently transmits a signal over the ALE lead which causes the internal register address to be stored in register 121. The internal register address decoder 122 decodes the address to apply an enable signal WR FIXED ADDR on lead 124. The line card processor 34 then transmits a data word which contains the line card wired address. The data word is applied to the input of register 123 via bus 125 and is gated therein via lead 124 by address decoder 122 upon receipt of a strobe signal from the processor on write enable lead WE. The register 123 then contains the wired address of the line card.

A timing generator circuit 127 receives the FSD and CLK4LS clock signals from the buffer distributor 9 of FIG. 21 and generates various timing signals for controlling the operation of the control interface 33. The FSD signal is used to control the timing of a clock signal on lead S/R clock. The clock signal on S/R clock controls the storing or transmitting of control words between bus PCMLCA and register 128 and between bus PCMLCB and register 129. Initially, a control word is received on one of the two buses e.g., PCMLCA. As the control word appears on bus PCMLCA in serial form it is gated via selector circuit 130 to shift register 128 using S/R clock. Registers 128 and 129 are 32 bit registers. After the proper number of clock pulses have been provided by S/R clock, a strobe signal is applied to the ADDR MATCH ENA lead thereby enabling a comparator 131 which compares the address portion of the control word in register 128 with the line group address stored in latch 123 and generates a signal on lead 132 if the addresses are the same. Similarly control word received on bus PCMLCB are stored in register 129 via selector 145 and the address portion thereof is compared to the line circuit address by comparator 133 which generates a signal on lead 134 if those addresses are the same. Gate 155 logically "or's" lead 132 and 134 and will provide a signal to the line group microprocessor 34 of FIG. 25 on its interrupt lead INT if an address match occurs for either bus PCMLCA or PCMLCB.

After the line group processor 34 is interrupted it will then obtain the control word by first transmitting an addres over the DATA/ADD bus. The address is stored in latch 121 and decoded by decoder 122 which, in turn activates the STATUS RD line. The STATUS RD line enables gates 135 and 136 which provide indications on the DATA/ADD bus as to which of the two comparators 131 or 133 detected the line card address.

The line group processor 34 will then, via a series of commands, obtain 24 bits of the control word from the appropriate one of the registers 128 or 129. If the control is obtained from register 128, then multiplexer 137 and buffer 138 are utilized. Similarly if the control word is to be obtained from register 129 then multiplexer 139 and buffer 140 are utilized.

Response data from the line group processor 34 may be returned to the line switch controller 7 via buses PCMLCA or PCMLCB.

Response data from the line group processor 34 is stored in a preselected one of the registers 128, 129 by a series of commands from the processor 34 which controls the gating of data through buffer 120 via bus 125 from register 128 or 129. The response data is witten into register 128 or 129 as eight bit parallel bytes. The response data is transmitted from the registers 128, 129 over the buses PCMLCA, PCMLCB respectively by the S/R clock signals in the following manner.

After the last byte of data is stored in the selected register 128, 129, the timing generator 127 will generate an enable signal at a predetermined time over leads A CONTRL or B CONTRL respectively. The outputs of gates 141 and 144 are connected to buses PCMLCA and PCMLCB respectively. The outputs of gates 142 and 143 are "wire-ored" with the leads $\overline{TSXA}$ and $\overline{TSXB}$ respectively from the line circuits. The S/R clock is used to shift the response data onto PCMLCA or PCMLCB. More specifically, the S/R clock provides pulses at a 4.096 mHz rate, with 42 pulses being supplied in a burst during one frame. The first 32 clock pulses of the 42 pulse burst are used to clock the response data from the registers 128 or 129 onto bus PCMLCA or PCMLCB.

The last 32 clock pulses of the 42 pulse burst are used to clock the control data from the bus PCMLCA or PCMLCB into the register 128 or 129. During the time when the middle 22 pulses are provided, control data is being written into registers 128 or 129 while simultaneously response data is being read from the register 128 or 129. This arrangement is provided because system timing constraints require a 10 bit skew between the receive PCM data bus and the transmit PCM data bus.

Selector 146 is provided for maintenance purposes. The register 147 is also provided for maintenance purposes and permits the processor 34 to disable either or both of the comparators 131, 133 and to control selectors 130, 145 and 146.

7.4 SELF TEST (FIGS. 32, 33, 34, 35)

One feature of the control interface 33 is that it includes a self-test mode of operation in which the serial output of one of the shift registers 128 or 129 is selected as the serial input data source for both of the registers 128 and 129. Selectors 145, 146 and 130 provide feedback paths for the registers 128, 129 during the self-test mode. In this test mode, the shift registers 128 and 29 are loaded with test data by the microprocessor and allowed to shift for several frames. Proper operation of the shifting function of the registers 128, 129 and the address decoder circuit 122 can thus be verified without affecting the PCM buses PCMLCA, PCMLCB.

A self-test program routine is executed during power-on initialization of the line switch. This self-test routine exercises the circuitry of the control interface 33 and produces a go/no-go result.

The test initialized the control interface by loading a code in the mode control register 147 which provides a signal on the SELF TEST ENA line to operate selector 130 and a signal on the FDBK A/B line operates selector 146 such that a feedback path for register 128 is enabled. A signal is provided to the timing generator 127 which responds to preventing transmission over the buses PCMLCA, PCMLCB, and by inhibiting the shifting of the registers 128, 129. The A comparator 131 and B comparator 133 are enabled.

Next, A register 128 is loaded with the following test data (in hexadecimal): byte 1=63, byte 2=C1, byte 3=F8, byte 4=ØF. The address latch 123 is loaded with F8, i.e., the same as byte 3 on register 128. After the A register and address latch 123 have been loaded, the A and B registers 128 and 129 are allowed to shift for eight PCM frames. FIG. 33 illustrates the contents of the A and B registers 128, 129 at the start of the self-test and after each frame of shifting. Note that the A and B registers 128 and 129 are clocked 42 times each frame as explained above. The A and B control registers are 32 bits long. Therefore, the test data in the A register 128 will be in effect rotated left (left being defined as toward the most significant bit position) a total of 10 (42 modulo 32) places after each 42 pulse clock burst. After eight frames of shifting the test data in the A and B registers 128 and 129 will have been rotated 16 (42×8 modulo 32) places left of the position of the test data at the start of the test. Since the address latch 123 contains F8 and the A and B address comparators 131 and 133 are enabled an address match should occur with both comparators only during the eighth frame of shifting. If both comparators 131 and 133 do not indicate a match condition during the eighth frame, a failure has occurred. If both comparators do indicate a match, the contents of both the A and B registers 120, 129 are compared with the following expected data: byte 1=F8, byte 2=OF, byte 3=63 and byte 4=Cl. Any mismatch of the data in the A and B registers 128 and 129 with the expected data indicates a failure.

FIGS. 34 and 35 are a program listing in MCS-48 assembly language code implementing the self-test operation for a line group controller.

7.5 AUTOMATIC GAIN SETTING (FIGS. 25, 30, 32, 36, 37 A-C)

The control interface 33 of FIG. 32 includes a voice channel data sampling register 189 which permits the microprocessor to monitor channel data appearing on one of the PCM buses PCMLCA. This channel sampling feature allows the line group processor to measure and thus provide automatic gain setting of the line circuits. Register 189 is an 8 bit shift register that is serially loaded every frame with data appearing on a predetermined channel of bus PCMLCA. The PCM SAMPLE SHIFT clock from timing generator 127 clocks the serial data from PCMLCA into the register 189. Between the 8-pulse clock bursts, data in register 189 can be read by the microprocessor sending an appropriate command to the control interface. Note that for clarity, the connection from the address decoder 122 to the register 189 has not been shown.

The above described variable gain circuit of FIG. 30 permits adjustment of the gain of the amplifiers 103 and 105 to a predetermined value without costly hand selection of parts. The analog switches 101, 104 respectively control portions of a resistance divider 102, 106 to change the gain of amplifiers 103, 105, respectively.

In the embodiment shown, the predetermined value for amplifier 103 is set such that the overall loss in the receive path of the line circuit is −0.25 dB (decibel). The predetermined value for amplifier 105 is set such that the overall gain in the transmit path of the line circuit is 0 dB. The accuracy of these settings is made to within ±0.1 dB. The incremental difference between adjacent steps of PCM representations representing the peak required signal levels (of around 0 dBm (decibal relative to a milliwatt test tone)) is approximately 0.4 dB for mu-law encoding. As shown below, it is possible to use the PCM representations to measure analog signals peaks with an accuracy greater than that of the PCM steps.

The frequency for a reference signal used in measuring the gain of the transmission circuit is chosen as 1.024 kHz sampling rate. By chosing the frequency of the reference signal in this manner, the reference signal will be sampled at or near its peak amplitude a predictable number of times over a predetermined number of cycles.

For a 1.024 kHz signal sampled at an 8 kHz rate, 16 cycles are required before the PCM representations are repeated. During a 16 cycle period, 125 PCM representations are generated.

From mu-law tables it can be determined that the maximum linear level of a signal that can be encoded is 8159 linear units and, by definition, corresponds to the peak of a signal having an rms (root means square) level of +3.17 dBm. The peak value of the 0 dBm reference signal can be calculated by reducing 8159 by 3.17 dB. In this manner, the peak value of 0 dBm signal is determined to be 5664.1785 linear units. From mu-law tables it can be determined that 5664.1785 linear units lies between level 118 which represents 5599 linear units and level 119 which represents 5855 linear units. It can be calculated that levels 118 and 119 are approximately 0.4 dB apart.

If 125 successive PCM samples are monitored and at least one sample corresponds to level 119 or a higher level, the signal represented by that group of 125 samples is greater than 0 dBm by more than 0.278 dB.

If all samples in a group of 125 successive PCM samples are less than level 118 then the signal represented is less than 0 dBm by more than 0.1 dB. For a 0 dBm signal, the number of samples N out of 125 successive PCM sample that are at level 118 either positive and negative polarity is determined as follows:

The reference signal may be represented as A sin ωt. If decision level 118 is represented by A' then $$A' = A \sin (\pi/2 - Q) \tag{1}$$

where $\pi/2 - Q$ represents the angular displacement from zero degree where the reference signal reaches level 118.

Solving equation (1) for Q yields $$Q = \pi/2 - \sin^{-1} A'/A \tag{2}$$

The probability that any one PCM sample in a group of 125 successive samples will be above level 118 is $$P = \frac{4Q}{2\pi} = \frac{2Q}{\pi} \qquad (3)$$

Substituting equation 2 in equation 3 yields $$P = \frac{2}{\pi}\left(\frac{\pi}{2} - \sin^{-1}\frac{A'}{A}\right) = 1 - \frac{2}{\pi}\sin^{-1}\frac{A'}{A} \qquad (4)$$

The number of PCM samples in a group of 125 successive samples which will be at level 118 for a 0 dBm signal is $$N = 125P \qquad (5)$$

For a 0 dBm signal
A=5664
A'=5599
and N may be calculated as 12.08.

Equations 1-5 may be used to determine the signal levels corresponding to the number of occurrences N of level 118 samples in a successive group of 125 PCM samples yielding the results shown in the table below:

TABLE

| N | A(dBm) | N | A(dBm) | N | A(dBm) |
|---|--------|----|--------|----|--------|
| 1 | −.0998 | 9  | −.0447 | 16 | +.0762 |
| 2 | −.0978 | 10 | −.032  | 17 | +.0992 |
| 3 | −.0944 | 11 | −.0173 | 18 | +.1236 |
| 4 | −.0896 | 12 | −.0014 | 19 | +.1494 |
| 5 | −.0834 | 13 | +.0159 | 20 | +.1767 |
| 6 | −.0758 | 14 | +.0346 | 21 | +.2055 |
| 7 | −.0669 | 15 | +.0547 | 22 | +.2357 |
| 8 | −.0565 |    |        |    |        |

In the illustrative embodiment, if 9 to 16 level 118 samples occur during 125 successive PCM samples, it is assumed that the samples represent a signal of 0 dBm. From the above table it is seen that this sample range represents 0 dBm over a range of −0.0447 dBm to +0.0762 dBm.

Advantageous use of the variable gain circuitry is made to permit automatic adjustment of the gain setting. Each line circuit shown in FIG. 25 is connected via a test relay 38 to a test bus. The test bus is multiplied to all the test relays of a line group and may also be multiplied to all line groups in a line switch module. Alternatively, the serial test buses may be utilized within a line switch module, each test bus being multiplied to one or more line groups. To set the TX gain of a line circuit, i.e., the gain of amplifier 105, the line switch controller will connect an analog milliwatt generator to the proper test bus.

Figure 36:
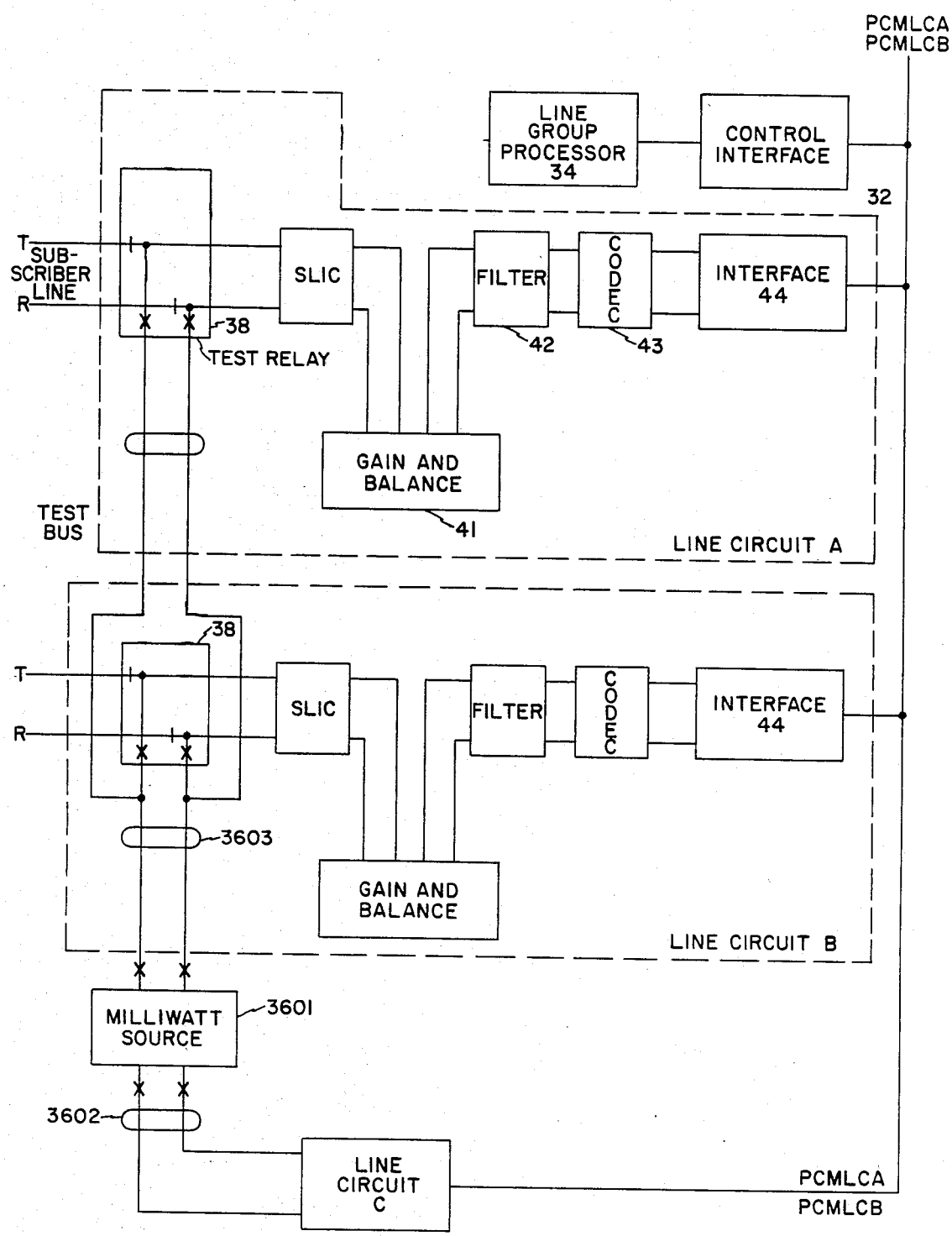
FIG. 36 illustrates in block diagram form an automatic gain setting feature in accordance with the principles of the present invention.

FIG. 36 illustrates the arrangement for setting the transmit gain in a line circuit, the line switch controller 7 will connect a milliwatt generator 3601 to the proper test bus. The line group processor 34 of the line circuit which is to have its transmit gain set will then actuate the test relay 38 of the line circuit. By means of the sample register 189 of the control interface 33 shown in FIG. 32, the line group processor will monitor the PCM output of the line circuit. The line group processor will then incrementally change the gain of the transmit amplifier 105 in FIG. 30 and balance circuit 41 by selectively actuating the analog switches 104 shown in FIG. 30. After each incremental change in the gain, the line group controller will monitor the PCM data. The iterative process will continue until the monitored PCM signals represent a signal of 0 dbm±0.1 dB. The line group processor 34 will then release the test relay 38 and signal the line switch controller 7 that the transmit gain has been set. The line switch controller 7 can then direct a line group processor 34 to set the transmit gain of other line circuits. To set the receive gain, i.e., that of amplifier 103 in FIG. 30, the line switch controller will cause a digital signal representing a signal 0.25 dB greater than 1 milliwatt to be applied on a PCM channel that can be used for testing. One way in which this may be done is for the line switch controller 7 to connect the milliwatt source 3601 providing a 0.25 dB signal to a test bus 3602 and direct the line group processor 34 to connect a line circuit, e.g., line C, which has had its transmit gain adjusted to the desired level connected to the test bus 3602. The line circuit C will then provide PCM signals representative of the milliwatt source on a predetermined channel of the PCM bus PCMLCA or PCMLCB. If it is assumed that line circuit A is to have its receive gain set, then line group processor 34 will actuate test relay 38 connecting the output of line circuit A to the test bus 3603. Another line circuit B which has previously had its transmit gain set will be connected to the same test bus 3603 by actuating its test relay 38. Thus, the analog output of line circuit A will be connected to the analog input of line circuit B. The line circuit B will be directed by the line group processor 34 to receive the PCM channel which is carrying the digital PCM tone signal from line circuit C.

The PCM output of the line circuit A will be monitored by its line group processor 34 again utilizing the sample register 189 of the control interface 33.

The line group processor will incrementally change the gain of the receive amplifier in line circuit A until the output is again 0dBm±0.1 dB. Thus the transmit gain of any circuit can be set to 0±1 db and the receive gain of any circuit can be set to 0.25 dB±0.1 dB.

Figure 37A:
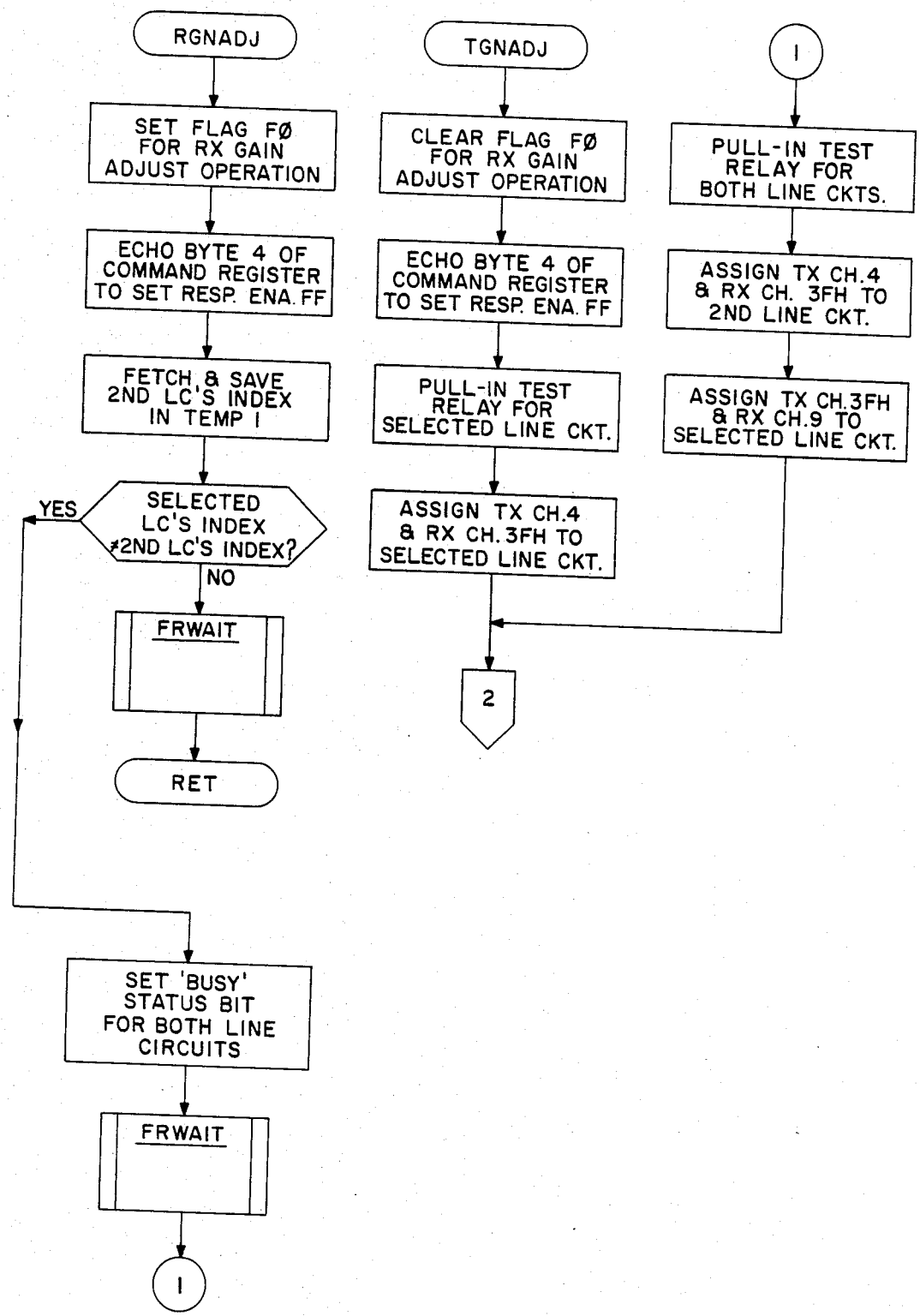
FIGS. 37A, 37B and 37C are flow charts of programs for automatic gain setting according to FIG. 36.
Figure 37B:
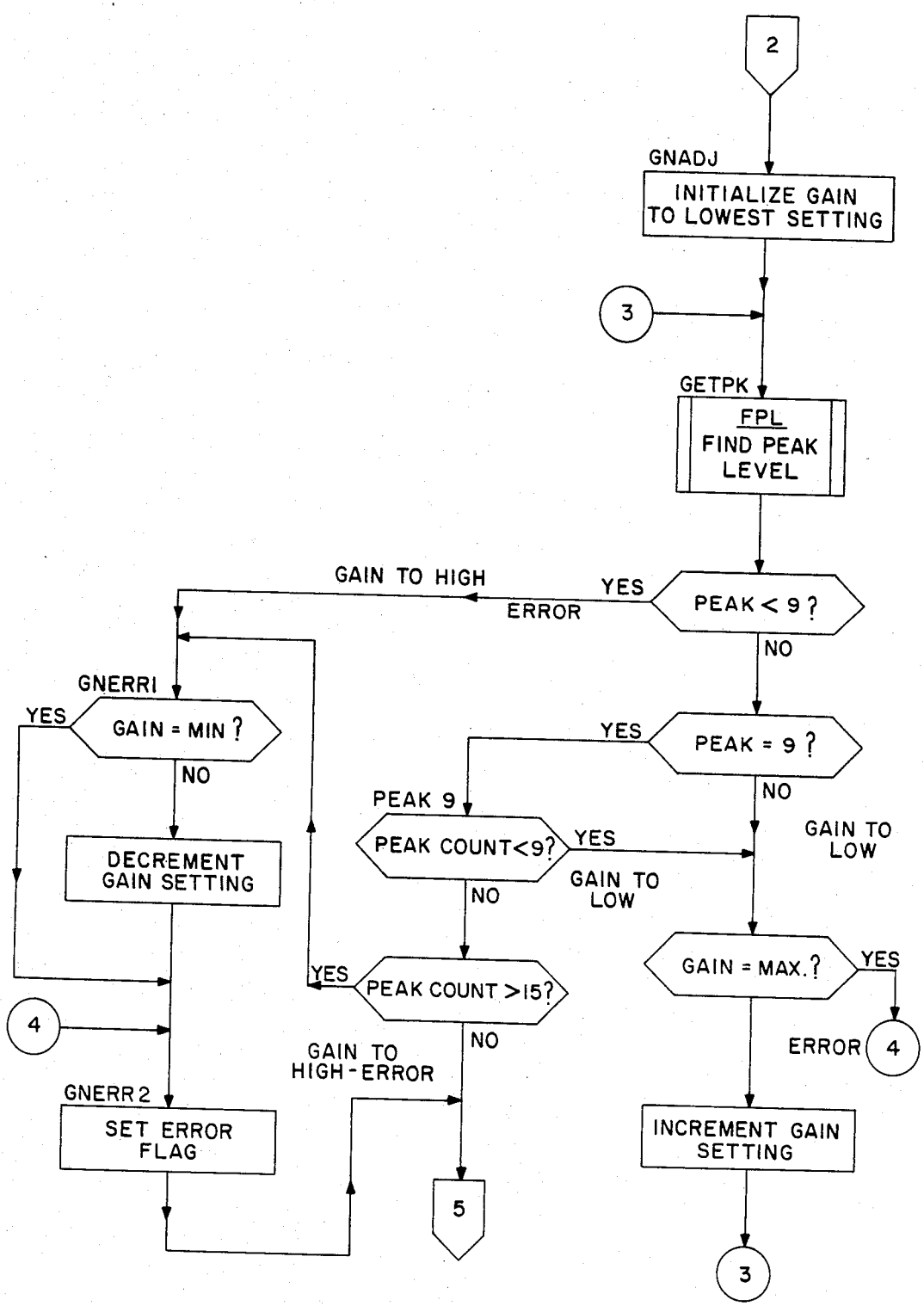
Figure 37C:
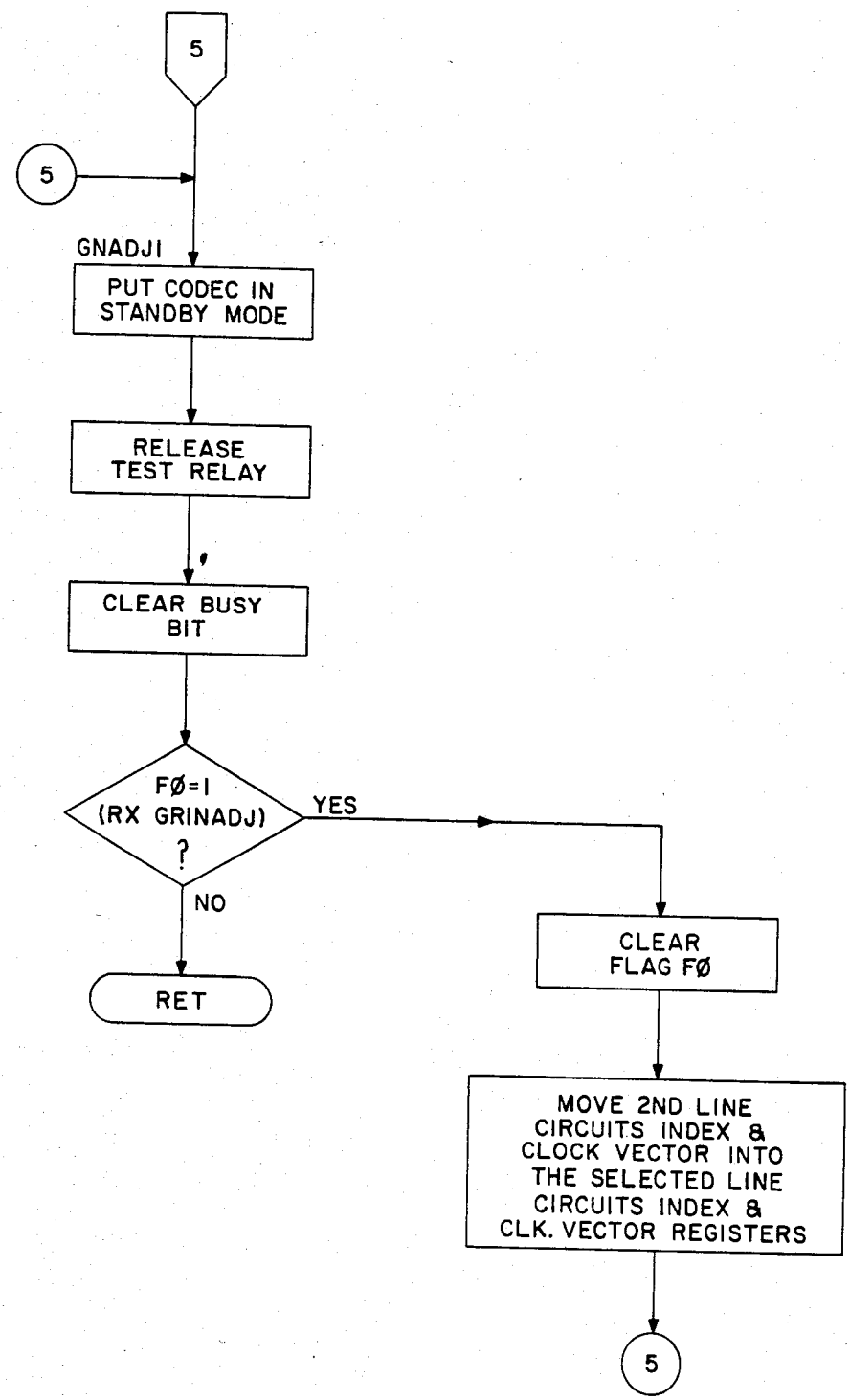

FIGS. 37 A, B and C illustrated in flow chart form the program for setting the transmit and receive gain.

8.0 OTHER LINE CARD ARRANGEMENTS (FIGS. 25, 38, 39 and 40)

Figure 38:
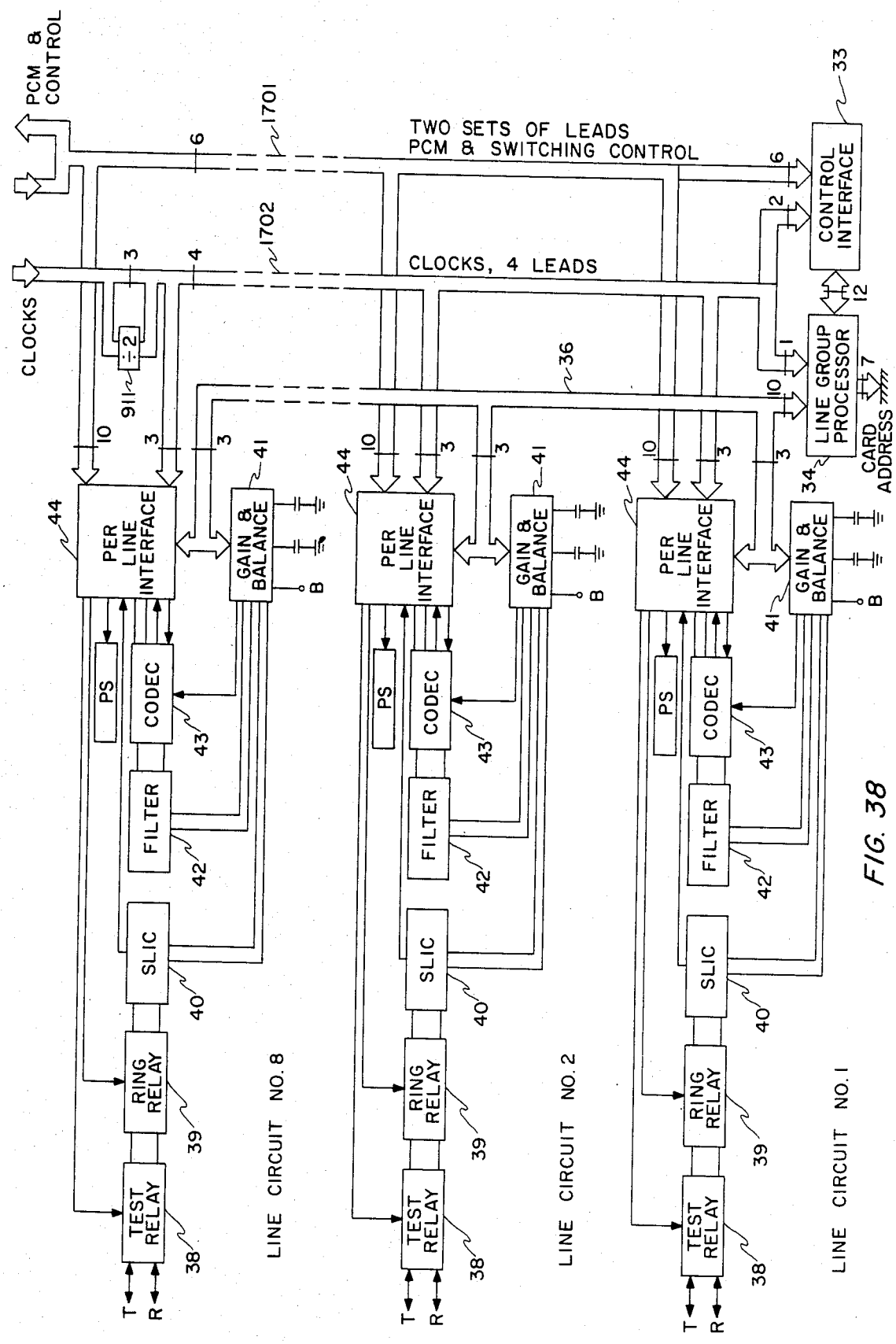
FIG. 38 is a general block diagram of the detailed drawing of FIG. 14.

The detailed drawing of FIG. 25 may be redrawn in general block diagram form with various leads grouped into buses as shown in FIG. 38. Bus 1701 includes PCMLCA, PCMLCB, $\overline{AILS}$, and $\overline{BILS}$. Bus 1702 includes CLK4LS, FSD, CLKT and CLK2.

The line card control interface 33 as described hereinabove interfaces between the line group processor 34 and the PCM buses PCMLCA and PCMLCB for the interchange of control information over the PCM buses.

Figure 39:
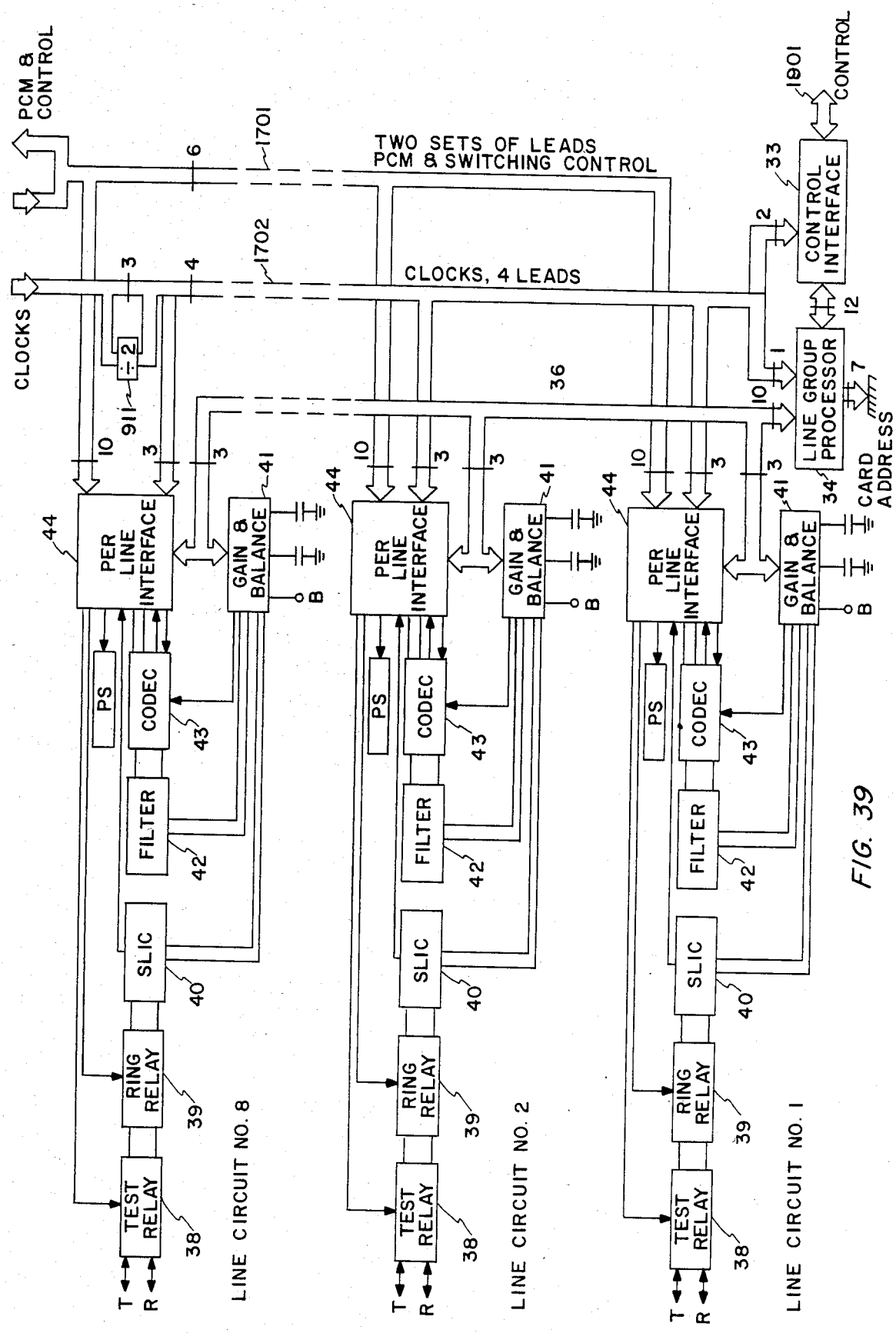
FIG. 39 is a general block diagram of another embodiment of FIG. 14.

In another embodiment of the invention shown in FIG. 39, a separate control bus 1801 is provided and the line group control interface 33 is not connected to the PCM bus 1701. In this arrangement, control information may be exchanged between the line card control interface 33 and a line switch control 7 in the system control 5 over a control bus 1801.

Figure 40:
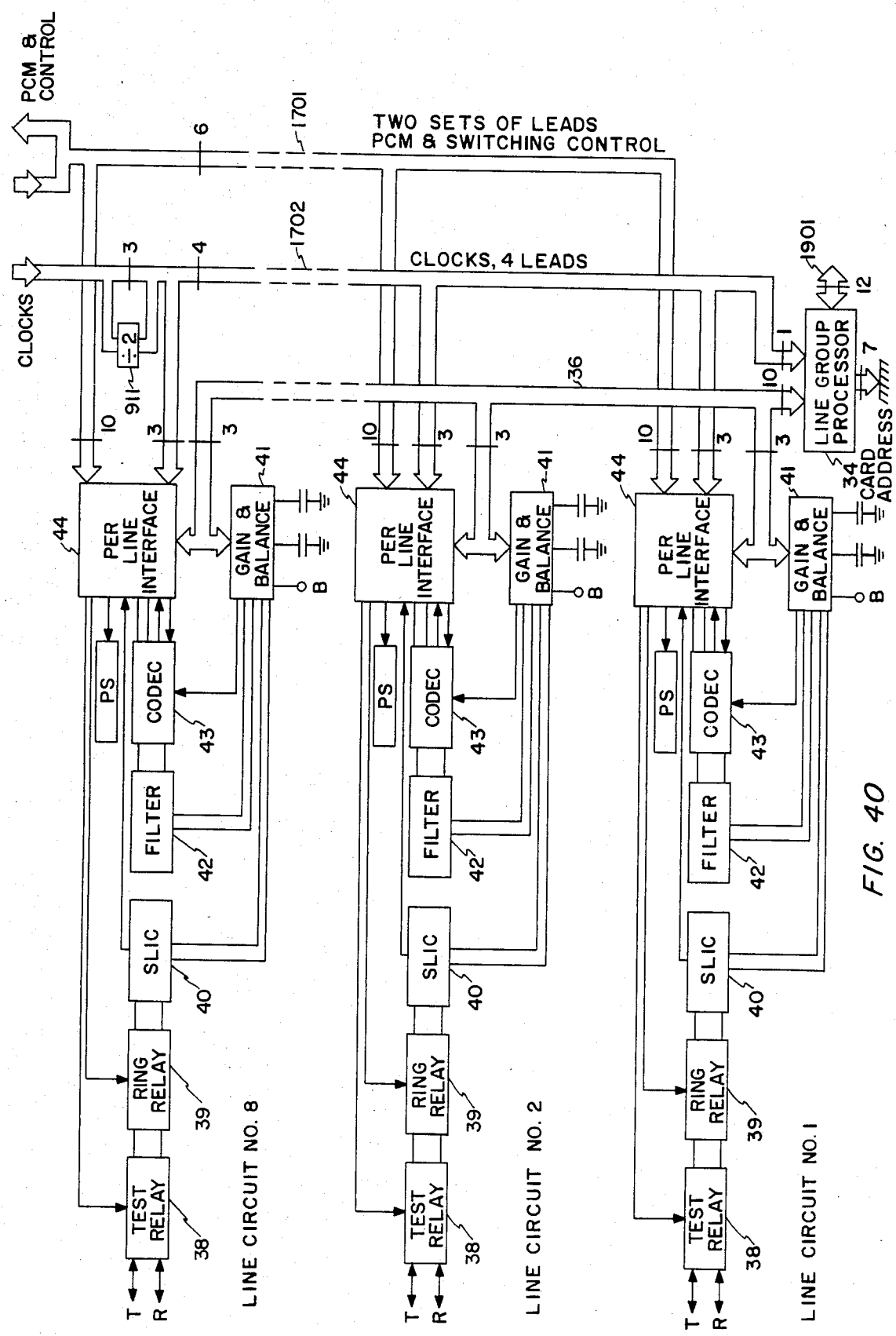
FIG. 40 is a general block diagram of a third embodiment of FIG. 14.

In yet another embodiment of the invention shown in FIG. 40, the line group processor 34 may directly communicate via bus 1901 with the line switch control 7 or the system control 5.

Figure 41:
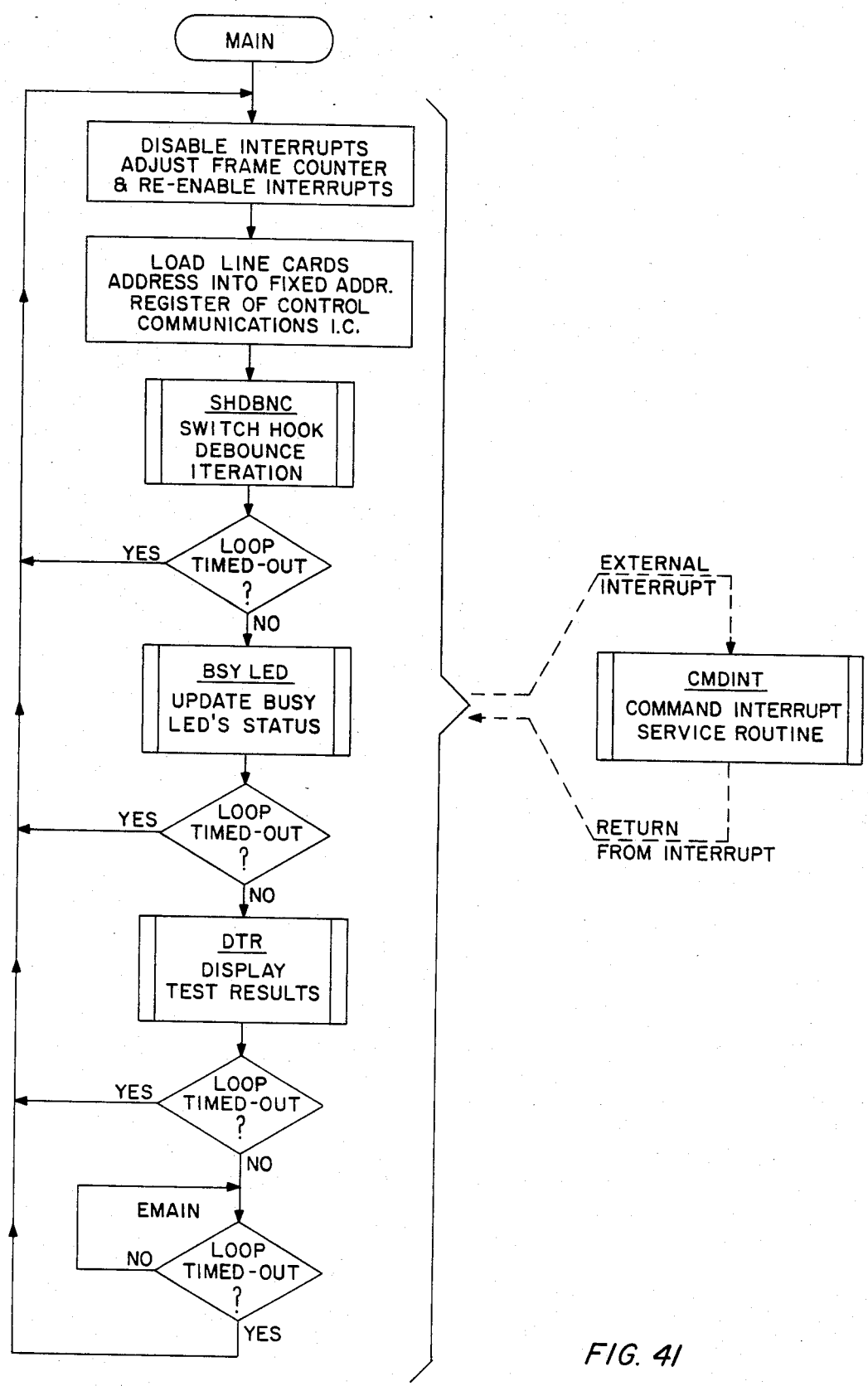
FIG. 41 is a flow chart of the software architecture of the line switch controller 7.
Figure 42B:
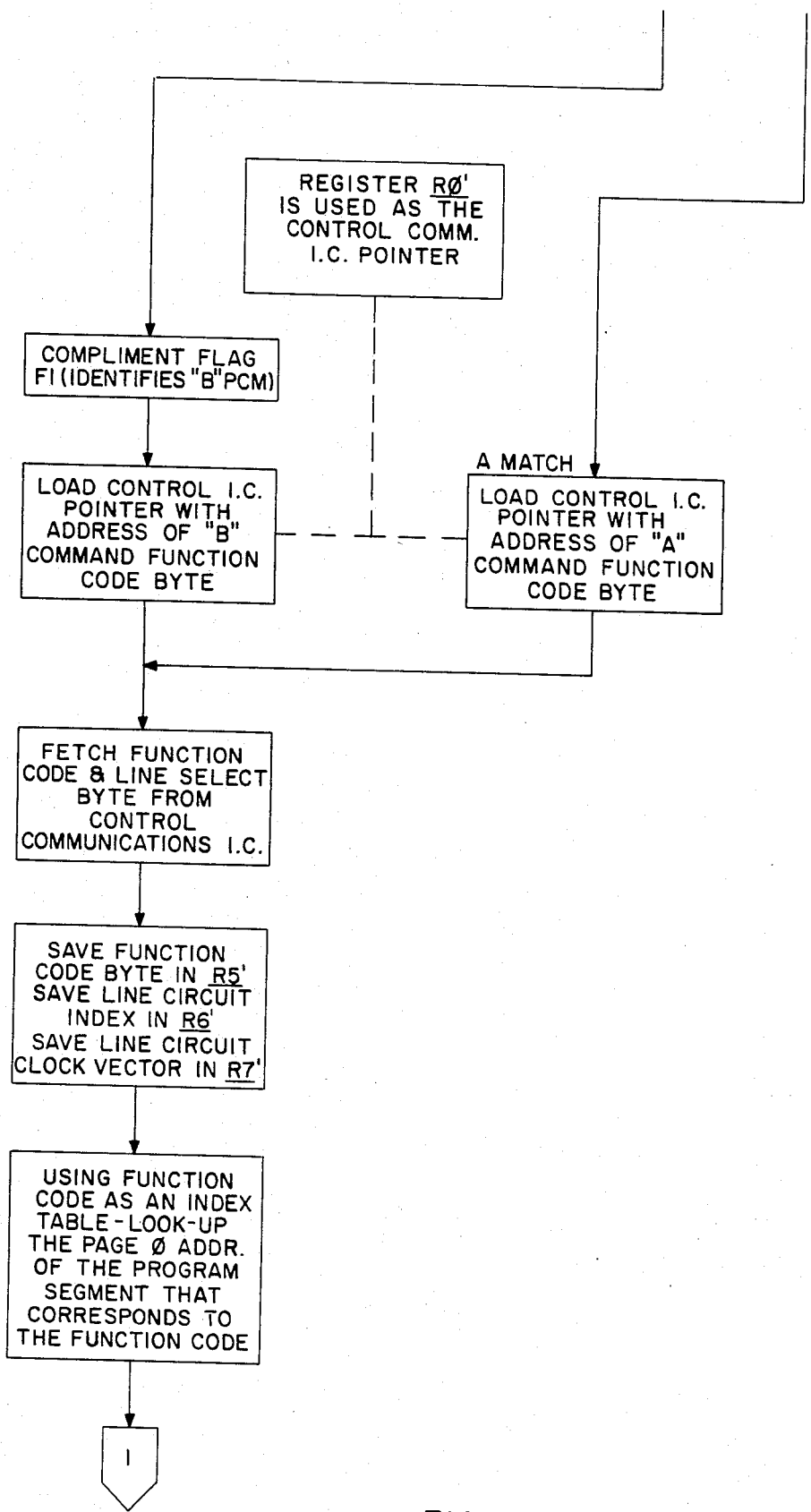
Figures 43, 43B:
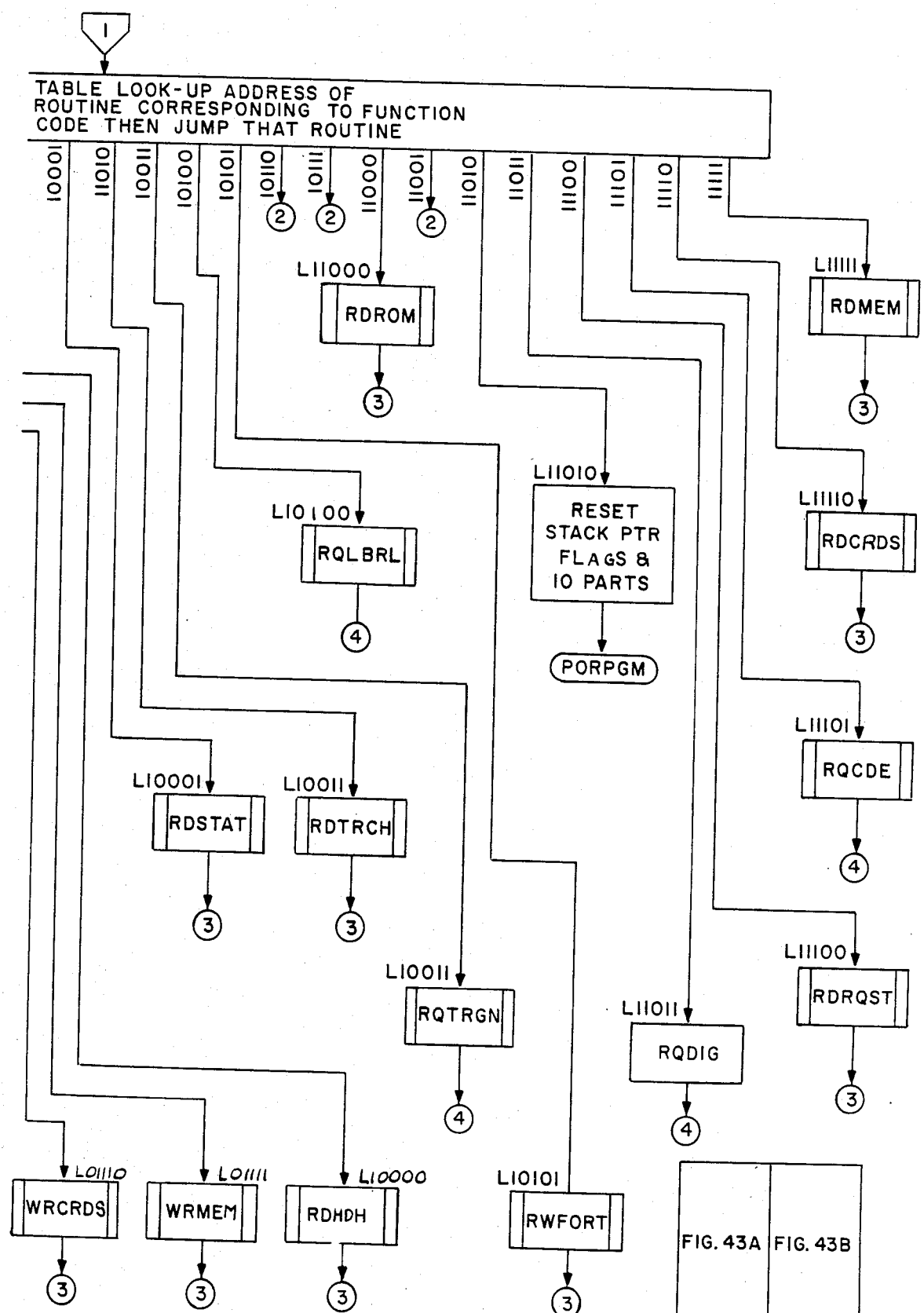
Figure 43A:
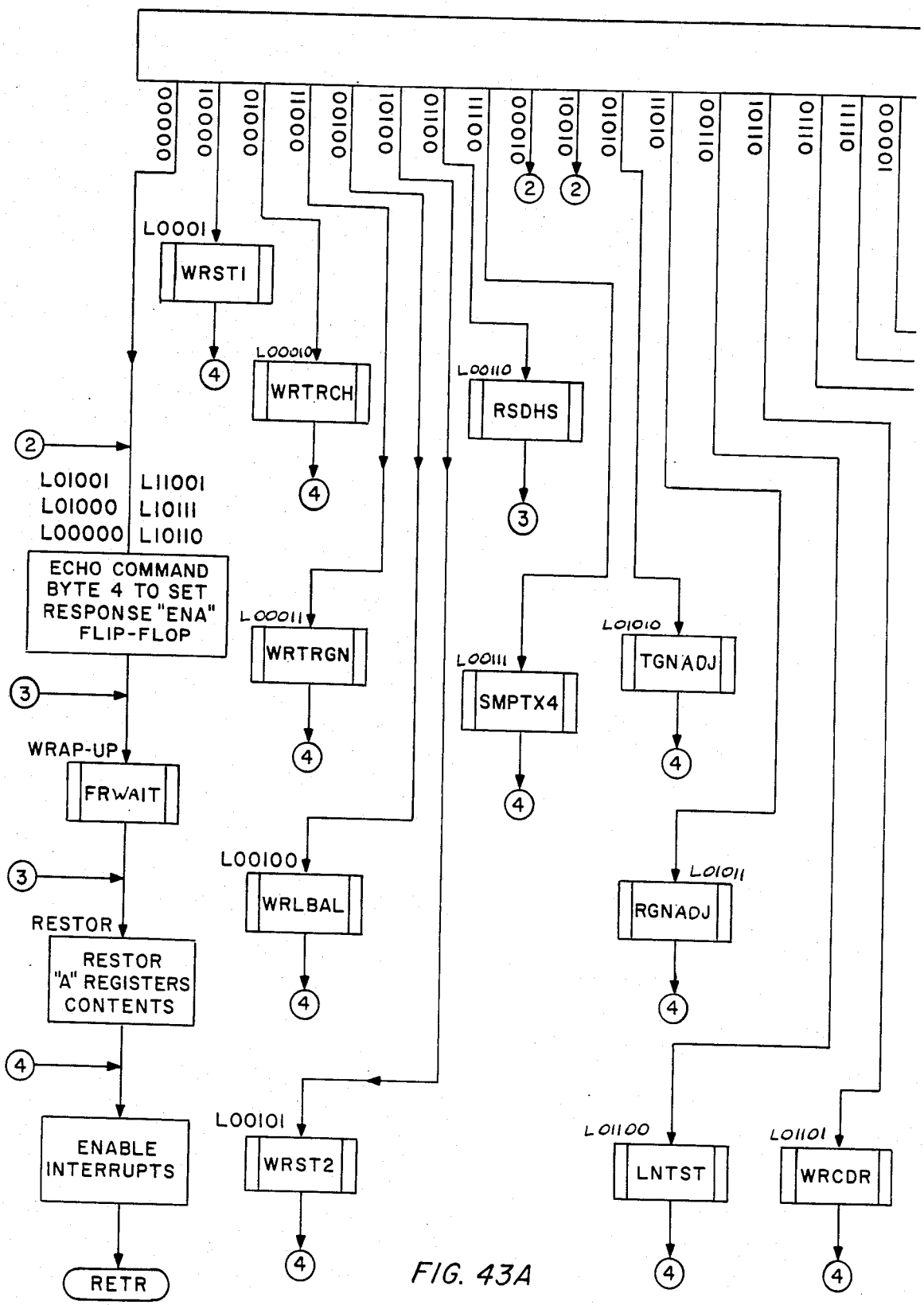

9.0 LINE GROUP PROCESSOR 34 (FIGS. 41, 42 and 43)

The line group processor 34 in the illustrative embodiment comprises an INTEL 8049 microprocessor which is described in the aforementioned INTEL reference at pages 8-31 to 8-35. FIG. 41 illustrates in flow chart form the main program loop of the software utilized in the illustrative embodiment. FIG. 42 illustrates the interrupt service routine of FIG. 41 in greater detail. FIG. 43 illustrates in flow chart form the table look-up addresses of various routines called by the command interrupt service routine. Program listings for the line group processor program are shown in the attached appendix.

CALL SET-UP (FIGS. 1, 2, 25)

When a subscriber line (A) goes off-hook, the line switch controller 7 of FIG. 2 transmits a common channel command to the system control 5 of FIG. 1 informing the system control 5 of a new sequence. The system control 5 responds by transmitting a common channel command to the line switch controller 7 assigning a PCM channel A and providing dial tone.

The line switch controller 7 transmits a channel assignment command (32 bit control word) to a line group processor 34 of FIG. 25. The line group processor 34 activates power to the line circuit for A, assigns transmit and receive channels at the CODEC for A, and updates the status of line circuit. The system control 5 will then monitor dial pulses from A.

When the system control 5 determines the called line (B), the system control 5 will transmit a common channel command to the line switch controller 7 of the line switch to which B is terminated. The line switch controller 7 will request the busy/idle status of B from the line group processor 34 associated with the group of lines including B. The line group processor 34 responds by transmitting B's busy/idle status to the line switch controller 7. If B is idle, the line switch controller 7 transmits the channel assignment to the line group processor 34. The line group processor 34 then enables power to B's line circuit, assigns the transmit and receive channels to B's CODEC, and updates the line circuit status.

9.1 RINGING AND CALL CONNECT (FIGS. 1, 2 and 25)

The system control 5 sends a common channel command to the second line switch controller 7 to connect ringing to B, and turns on a ring-back tone generator to provide ring-back tone to A. If A and B are both terminated at the same line switch, the system control 5 may also indicate an intra-line switch call. The second line switch controller 7 sends ring commands to a ring circuit B of FIG. 2 and to the line group processor 34 for B. The line group processor 34 begins a ringing routine.

When B answers, the system control 5 sends a stop ringing command to the line switch controller 7. The line switch controller 7 in turn sends ring terminate commands to the ring circuit 13 and line group processor 34. The line group processor 34 terminates the ring routine.

If the call is an intra-line switch call, the receive channels for A and B are switched upon commands from the line switch controller 7 to the line group processors 34.

9.2 CALL DISCONNECT (FIGS. 1, 2 and 25)

When A and B go on-hook, the system control 5 sends a common channel command to one of the line switch controllers 7 to release the line. The line switch controller in turn sends a disconnect command to the line group processor 34. The line group processor 34 removes power from the line circuit and updates the line circuit status. This procedure is repeated for the other party.

While we have described above the principles of our invention in connection with specific apparatus, it is to be clearly understood that this description is made only by way of example and not as a limitation to the scope of our invention as set forth in the objects thereof and in the accompanying claims.

APPENDIX

```
ISIS-II MCS-48/UPI-41 MACRO ASSEMBLER, V3.0
MASTER -- ALS OLC B/B FIRMWARE

LOC  OBJ         LINE     SOURCE STATEMENT

1 ;       NAME          MASTER
                   2
                   3 ;
                   4 ;
                   5 ;
                   6
                   7 ; MASTER -- SOFTWARE FOR THE ALS OCTAL LINE CARD CONTROLLER
                   8
                   9 $EJECT
                  10
                  11 ;       NAME          MEMMAP
                  12
                  13 ;
                  14 ;
                  15 ;
                  16
0020              17 LNCRDS  EQU   20H     ; ADDR. OF 'LINE CARD STATUS BYTE'
                  18
0021              19 HSW     EQU   21H     ; ADDR. OF 'HOOK SWITCH STATUS BYTE'
0022              20 DLTAHS  EQU   22H     ; ADDR. OF 'DELTA HOOK SWITCH STATUS BYTE'
0023              21 TMPDHS  EQU   23H     ; ADDR. OF 'TEMP. DLTA HOOK SWITCH'
0024              22 HSCNT   EQU   24H     ; ADDR. OF 'SWITCH HOOK DEBOUNCE ITERATION COUNTER'
                  23
0025              24 RQFNCD  EQU   25H
0026              25 RQBYT1  EQU   26H
0027              26 RQBYT2  EQU   27H
                  27
0028              28 RSPCNT  EQU   28H     ; ADDR. OF 'RESPONSE FRAME COUNT' BYTE
0029              29 ASAVE   EQU   29H     ; ADDR. OF 'A REG. SAVE AREA'
                  30
002A              31 TESTR   EQU   2AH     ; ADDR. OF 'TEST RESULTS' BYTE
002B              32 TESTRC  EQU   2BH     ; ADDR. OF 'CDR TEST RESULTS'
002C              33 TESTRD  EQU   2CH     ; ADDR. OF 'DIGITAL I.C. TEST RESULTS'
002D              34 TESTRA  EQU   2DH     ; ADDR. OF 'ANALOG I.C. TEST RESULTS'
002E              35 GDCNT   EQU   2EH     ; ADDR. OF 'GOOD BOARD LED BLINK COUNTER'
002F              36 BLINKC  EQU   2FH     ; ADDR. OF 'LED BLINK COUNTER'
                  37
0030              38 LCST1   EQU   30H     ; BASE ADDR. OF 'LINE CKT STATUS 1' BYTES
0038              39 LCST2   EQU   38H     ; BASE ADDR. OF 'LINE CKT STATUS 2' BYTES
0040              40 TXCH    EQU   40H     ; BASE ADDR. OF 'TX CHAN. ASSIGNMENTS'
0048              41 RXCH    EQU   48H     ; BASE ADDR. OF 'RX CHAN. ASSIGNMENTS'
0050              42 GNBAL   EQU   50H     ; BASE ADDR. OF GAIN & BALANCE SETTINGS
                  43
0068              44 RELAYD  EQU   68H
0069              45 GNDEL   EQU   69H
006A              46 SHDCNT  EQU   6AH
006B              47 TEMP1   EQU   6BH
                  48
                  49 $EJECT
```

```
LOC OBJ        LINE    SOURCE STATEMENT

50 ;****************************************
                51 ;  CONTROL COMMUNICATIONS I.C. INTERNAL REGISTERS
                52 ;****************************************
0001            53 ACRB2    EQU    01H    ; 'A PCM' CONTROL SHIFT REG. BYTE 2 ADDRESS
0005            54 BCRB2    EQU    05H    ; 'B PCM' CONTROL SHIFT REG. BYTE 2 ADDRESS
0008            55 CFXADD   EQU    08H    ; ADDR. OF 'FIXED ADDRESS' REGISTER
000C            56 CSTS     EQU    0CH    ; ADDR. OF CONTROL COMM. I.C.'S STATUS REG.
000D            57 CMODE    EQU    0DH    ; ADDR. OF CONTROL COMM. I.C.'S MODE REG.
000E            58 CRP      EQU    0EH    ; ADDR. OF 'CONTROL REG. POINTER'
000F            59 ATCRP    EQU    0FH    ; ADDR. OF CONTROL S/R BYTE POINTED TO BY 'CRP'
                60
                61 ;****************************************
                62 ;  LINE CIRCUIT COMMAND CODES (4-BIT CODE----BITS 7-4)
                63 ;****************************************
0000            64 WRDIG    EQU    00H    ; 'WRITE TO DIGITAL I.C. REG.' CODE (BITS 7-4)
0020            65 WRCDRC   EQU    20H    ; 'WRITE TO CODEC DATA REG.' CODE
0040            66 WRANA    EQU    40H    ; 'WRITE TO ANALOG I.C. REG.' CODE
0060            67 LDCODC   EQU    60H    ; 'LOAD CODEC' CODE
0080            68 RDDIG    EQU    80H    ; 'READ DIG. I.C. REG.' CODE
00A0            69 RDCDR    EQU    0A0H   ; 'READ CODEC DATA REG.' CODE
00C0            70 RDANA    EQU    0C0H   ; 'READ ANALOG I.C. REG.' CODE
                71
                72 ;****************************************
                73 ;                ; INITIALIZATION VALUES
                74 ;****************************************
0018            75 IDIG     EQU    18H
00FF            76 ICODEC   EQU    0FFH
0094            77 IANA1    EQU    94H
0000            78 IANA2    EQU    00H
0000            79 IANA3    EQU    00H
                80
                81 ;****************************************
                82 ; ADDRESS OF LAST BYTE OF 8049'S DATA MEMORY
                83 ;****************************************
007F            84 LSTBYT   EQU    7FH
                85
                86 ;***************
                87 ; RESPONSE DELAY
                88 ;***************
0008            89 RSPNCD   EQU    8      ; NUMBER OF FRAMES DELAY THAT RESPONSE
                90                        ;    FOLLOWS COMMAND.
                91
                92 $EJECT
                93
                94 ;        NAME          PORPGM
                95
                96 ;
                97 ;
                98 ;
                99
               100 ; PORPGM -- POWER-ON RESET PROGRAM
               101
               102 ; ENTERED AFTER A POWER-ON OR MANUAL RESET
               103
0000           104          ORG    0
```

| LOC OBJ | LINE | SOURCE STATEMENT | | |
|---|---|---|---|---|
| | 105 | RESET: | | |
| 0000 C5 | 106 | SEL | RB0 | ; REG. BANK 0 IS USED EVERYWHERE EXCEPT IN |
| 0001 6400 | 107 | JMP | PORPGM | ; INTERRUPT SERVICE ROUTINES. |
| | 108 | | | |
| 0300 | 109 | ORG | 300H | |
| | 110 | PORPGM: | | |
| 0300 15 | 111 | DIS | I | |
| | 112 | ; INITIALIZE ALL LINE CIRCUITS | | |
| 0301 54A6 | 113 | CALL | LINERS | |
| | 114 | | | |
| | 115 | ; IS SELF-TEST TO BE SKIPPED (P23=0)? | | |
| 0303 0A | 116 | IN | A,P2 | |
| 0304 7211 | 117 | JB3 | POR1 | |
| | 118 | | | |
| | 119 | ; SKIPPING SELF-TEST--------CLEAR TEST RESULTS BYTES | | |
| 0306 B820 | 120 | MOV | R0,#TESTR+3 | |
| 0308 B904 | 121 | MOV | R1,#4 | |
| 030A B000 | 122 | MOV | @R0,#0 | |
| 030C C8 | 123 | DEC | R0 | |
| 030D E90A | 124 | DJNZ | R1,$-3 | |
| 030F 6413 | 125 | JMP | STRET | ; RETURN TO PORPGM |
| | 126 | | | |
| | 127 | POR1: | | |
| | 128 | ; PERFORM SELF-TEST OF LINE CARD HARDWARE | | |
| 0311 C400 | 129 | JMP | SLFTST | |
| | 130 | STRET: | ; SELF-TEST ROUTINE'S RETURN ADDRESS | |
| | 131 | | | |
| | 132 | ; INITIALIZE DATA RAM | | |
| 0313 7445 | 133 | CALL | RAMRS | |
| | 134 | | | |
| | 135 | ; ENABLE RECEPTION OF COMMANDS FROM ALS CONTROLLER | | |
| 0315 748F | 136 | CALL | CNTLRS | |
| 0317 14D4 | 137 | CALL | CNTLEN | |
| | 138 | | | |
| | 139 | ; INITIALIZE FRAME COUNTER BEFORE ENTERING 'MAIN' | | |
| 0319 2318 | 140 | MOV | A,#18H | |
| 031B 65 | 141 | STOP | TCNT | |
| 031C 62 | 142 | MOV | T,A | |
| | 143 | ; ENTER MAIN LOOP | | |
| | 144 | | | |
| | 145 | ;*** END OF PORPGM *** | | |
| | 146 | $EJECT | | |
| | 147 | | | |
| | 148 | ; NAME | MAIN | |
| | 149 | | | |
| | 150 ; | | | |
| | 151 ; | | | |
| | 152 ; | | | |
| | 153 | | | |
| | 154 | MAIN: | | |
| 031D C5 | 155 | SEL | RB0 | |
| | 156 | | | |
| | 157 | ;################################################################ | | |
| 031E 15 | 158 | DIS | I | ; DISABLE INTERRUPT WHILE FRAME COUNTER |
| 031F 65 | 159 | STOP | TCNT | ; IS STOPPED |

```
LOC  OBJ       LINE    SOURCE STATEMENT 0320 42        160         MOV    A,T      ; READ CURRENT COUNTER VALUE AND SUBTRACT
               161                          ;   16 (DECIMAL) IN ORDER TO RESET THE
               162                          ;   COUNTER FOR THE 2 MILLISEC MAIN LOOP
               163                          ;   DELAY. (EQUIV. TO ADDING 0F0H MOD 256)
0321 03F0      164         ADD    A,#0F0H  ; (ADDING 0F0H IS EQUIV. TO SUBTRACTING 10H
               165                          ;   IN MODULO 256 ARITHMETIC)
0323 62        166         MOV    T,A      ; LOAD NEW VALUE INTO COUNTER
               167 ;################################################################
               168
0324 05        169         EN     I        ; RE-ENABLE INTERRUPTS NOW THAT COUNTER HAS
               170                          ;   BEEN RESTARTED.
0325 45        171         STRT   CNT      ; RESTART COUNTER
               172
               173 ; RE-LOAD LINE CARD'S FIXED ADDRESS INTO CONTROL COMM. I.C.
0326 9490      174         CALL   LDFXAD
               175
               176 ; PERFORM S/H DEBOUNCE ITERATION
0328 7490      177         CALL   SHDBNC
032A 7439      178         CALL   LOOPCK   ; CHECK FOR LOOP TIME-OUT
               179
               180 ; UPDATE LINE CARD 'BUSY INDICATION LED'
032C 7404      181         CALL   BSYLED
032E 7439      182         CALL   LOOPCK   ; CHECK FOR LOOP TIME-OUT
               183
               184 ; SCAN TEST RESULTS REGISTERS FOR HARDWARE MALFUNCTION
               185 ;   AND BLINK LED IF BOARD IS BAD.
0330 9454      186         CALL   DTR      ; DISPLAY TEST RESULTS SUBROUTINE
0332 7439      187         CALL   LOOPCK   ; CHECK FOR LOOP TIME-OUT
               188
               189 $EJECT
               190
               191
               192 ;     OTHER MAIN LOOP SUBROUTINES WILL BE INSERTED HERE
               193
               194 ; END OF MAIN LOOP
               195 ; WAIT UNTIL 2 MS HAS ELAPSED BEFORE RESTARTING MAIN LOOP
               196 EMAIN:
0334 45        197         STRT   CNT
0335 7439      198         CALL   LOOPCK   ; CHECK FOR LOOP TIME-OUT
               199
0337 6434      200         JMP    EMAIN
               201
               202 ; SUBROUTINE LOOPCK *****************************
               203 LOOPCK:
0339 42        204         MOV    A,T      ; READ FRAME COUNT
033A 03E8      205         ADD    A,#0E8H  ; HAS FRAME COUNT EXCEEDED 18H (LOOP TIME-OUT VALUE)?
033C F63F      206         JC     $+3      ; IF CARRY OCCURRED, THEN LOOP HAS TIMED-OUT.
033E 83        207         RET             ; LOOP HAS NOT TIMED OUT---PERFORM NEXT OPERATION
               208
               209 ; LOOP HAS TIMED OUT----RESET STACK POINTER & RESTART MAIN LOOP
033F C7        210         MOV    A,PSW
0340 53F8      211         ANL    A,#0F8H  ; CLEAR 'SP' BITS
0342 D7        212         MOV    PSW,A
0343 641D      213         JMP    MAIN
               214
```

| LOC OBJ | LINE | SOURCE STATEMENT | | |
|---|---|---|---|---|
| | 215 | ; END OFF SUBROUTINE LOOPCK ******************** | | |
| | 216 | | | |
| | 217 | ;*** END OF MAIN *** | | |
| | 218 | $EJECT | | |
| | 219 | | | |
| | 220 | ;    NAME    RAMRS | | |
| | 221 | | | |
| | 222 | ; | | |
| | 223 | ; | | |
| | 224 | ; | | |
| | 225 | | | |
| | 226 | ; RAMRS — INITIALIZES CONTENTS OF DATA RAM | | |
| | 227 | | | |
| | 228 | RAMRS: | | |
| | 229 | ; INITIALIZE UNUSED PORTION OF RAM TO ZERO | | |
| 0345 B87F | 230 | MOV | R0,#LSTBYT | ; ADDR. OF LAST BYTE OF DATA RAM |
| 0347 B918 | 231 | MOV | R1,#18H | ; (24 BYTES) |
| 0349 B000 | 232 | MOV | @R0,#0 | |
| 034B C8 | 233 | DEC | R0 | |
| 034C E949 | 234 | DJNZ | R1,$-3 | ; REPEAT LAST 3 INSTRUCTIONS UNTIL R1=0 |
| | 235 | | | |
| | 236 | ; INITIALIZE GAIN & BALANCE SETTINGS BYTES | | |
| 034E B908 | 237 | MOV | R1,#8 | |
| | 238 | | | |
| 0350 2304 | 239 | RAMRS3: MOV | A,#IANA1 | |
| 0352 A0 | 240 | MOV | @R0,A | |
| 0353 C8 | 241 | DEC | R0 | |
| 0354 2300 | 242 | MOV | A,#IANA2 | |
| 0356 A0 | 243 | MOV | @R0,A | |
| 0357 C8 | 244 | DEC | R0 | |
| 0358 2300 | 245 | MOV | A,#IANA3 | |
| 035A A0 | 246 | MOV | @R0,A | |
| 035B C8 | 247 | DEC | R0 | |
| 035C E950 | 248 | DJNZ | R1,RAMRS3 | |
| | 249 | | | |
| | 250 | ; INITIALIZE CHANNEL ASSIGNMENT BYTES | | |
| 035E B910 | 251 | MOV | R1,#10H | |
| 0360 B03F | 252 | RAMRS4: MOV | @R0,#3FH | |
| 0362 C8 | 253 | DEC | R0 | |
| 0363 E960 | 254 | DJNZ | R1,RAMRS4 | ; REPEAT LAST 3 INSTRUCTIONS UNTIL R1=0 |
| | 255 | | | |
| | 256 | ; INITIALIZE 'LC STATUS 2' BYTES TO 00000000B | | |
| 0365 B908 | 257 | MOV | R1,#8 | |
| | 258 | | | |
| 0367 B000 | 259 | RAMRS5: MOV | @R0,#0 | |
| 0369 C8 | 260 | DEC | R0 | |
| 036A E967 | 261 | DJNZ | R1,RAMRS5 | |
| | 262 | | | |
| | 263 | $EJECT | | |
| | 264 | ; INITIALIZE 'LC STATUS 1' BYTES TO 00011000B | | |
| 036C B908 | 265 | MOV | R1,#8 | |
| | 266 | | | |
| 036E B018 | 267 | RAMRS6: MOV | @R0,#IDIG | |
| 0370 C8 | 268 | DEC | R0 | |
| 0371 E96E | 269 | DJNZ | R1,RAMRS6 | |

```
LOC  OBJ         LINE      SOURCE STATEMENT 270
                 271 ; INITIALIZE 'GOOD BOARD LED BLINK COUNTER'
0373 B82E        272       MOV     R0,#GDCNT
0375 B002        273       MOV     @R0,#2
0377 B82F        274       MOV     R0,#BLINKC
0379 B000        275       MOV     @R0,#0
                 276
                 277 ; RESET 'LNCRDS', 'HSW', 'DLTAHS', ... , 'ASAVE' (20H-29H)
037B B829        278       MOV     R0,#29H
037D B90A        279       MOV     R1,#10
                 280
037F B000        281 RAMRS7: MOV   @R0,#0
0381 C8          282       DEC     R0
0382 E97F        283       DJNZ    R1,RAMRS7
                 284
                 285 ; INITIALIZE RELAY DEBOUNCE DELAY & GAIN SET DELAY BYTES
0384 B868        286       MOV     R0,#RELAYD
0386 B032        287       MOV     @R0,#50 ; 50 MILLISEC DEFAULT RELAY DEBOUNCE DELAY
0388 18          288       INC     R0
0389 B005        289       MOV     @R0,#5  ; 5 MILLISEC DEFAULT GAIN ADJ. DELAY
                 290
                 291 ; INITIALIZE S/H DEBOUNCE CYCLE ITERATION COUNT
038B 18          292       INC     R0
038C B014        293       MOV     @R0,#20 ; DEFAULTS TO 20 ITERATIONS
                 294
038E 83          295       RET
                 296
                 297 ;*** END OF RAMRS ***
                 298 $EJECT
                 299
                 300 ;     NAME            CNTLRS
                 301
                 302 ;
                 303 ;
                 304 ;
                 305
                 306
                 307 ; CNTLRS -- CONTROL PROTOCOL I.C. INITIALIZATION ROUTINE
                 308
                 309 ;  INITIALIZES MODE REG., CRP, & FIXED ADDR.
                 310
                 311 CNTLRS:
                 312 ; INITIALIZE MODE REGISTER
038F B80D        313       MOV     R0,#CMODE ; ADDR. OF MODE REG.
0391 2303        314       MOV     A,#03H    ; 'B COMP ENA' & 'A COMP ENA' = 1
0393 90          315       MOVX    @R0,A
                 316
                 317 ; CLEAR CRP (CONTROL REGISTER POINTER)
0394 B80E        318       MOV     R0,#CRP ; ADDR. OF 'CNTRL REG. POINTER'
0396 27          319       CLR     A
0397 90          320       MOVX    @R0,A
                 321
                 322 ; LOAD FIXED ADDRESS
0398 9480        323       CALL    LDFXAD
                 324
```

| LOC OBJ | LINE | SOURCE STATEMENT |
|---|---|---|

```
039A 83        325         RET
               326
               327 ;*** END OF CNTLRS ***
               328 $EJECT
               329
               330 ;      NAME          SHDBNC
               331
               332 ;
               333 ;
               334 ;
               335
               336 ; SHDBNC -- SWITCH-HOOK DEBOUNCE SUBROUTINE
               337
               338 SHDBNC:
               339 ; READ CURRENT S/H DEBOUNCE ITERATION COUNTER TO SEE IF
               340 ;    DEBOUNCING IS CURRENTLY IN PROGRESS.
039B B824      341         MOV    R0,#HSCNT
039D F0        342         MOV    A,@R0            ; READ 'HOOK STATUS COUNTER'
039E 96AF      343         JNZ    SHLOOP
               344
               345 ; TEST FOR ANY CHANGES OF S/H VALUES (COMPARED TO THE CURRENT
               346 ;    STORED VALUES OF 'HOOK SWITCH STATUS')
03A0 B921      347         MOV    R1,#HSW
03A2 09        348         IN     A,P1             ; READ S/H VECTOR FROM PORT 1
03A3 D1        349         XRL    A,@R1            ; 'TMPDHS'=S/H VECTOR 'XOR' HOOK STATUS
03A4 B923      350         MOV    R1,#TMPDHS
03A6 A1        351         MOV    @R1,A            ; STORE  TMPDHS
03A7 96AA      352         JNZ    SHNEW
03A9 93        353         RETR
               354
               355 SHNEW:
               356 ; AT LEAST ONE S/H LINE HAS CHANGED STATUS---START DEBOUNCING ITERATIONS
               357 ; INITIALIZE ITERATION COUNTER
03AA B96A      358         MOV    R1,#SHDCNT
03AC F1        359         MOV    A,@R1
03AD A0        360         MOV    @R0,A
03AE 93        361         RETR
               362
               363 SHLOOP:
               364 ; NORMAL S/H DEBOUNCE ITERATION SEQUENCE
03AF B921      365         MOV    R1,#HSW
03B1 09        366         IN     A,P1
03B2 D1        367         XRL    A,@R1   ; 'TMPDHS'=S/H VECTOR 'XOR' HOOK STATUS
               368
               369 ; 'AND' THE CURRENT VALUE OF 'TMPDHS' WITH THE LAST VALUE OF 'TMPDHS'
               370 ;    IF THE RESULT IS ZERO THEN ABORT THE DEBOUNCING
03B3 B923      371         MOV    R1,#TMPDHS
03B5 51        372         ANL    A,@R1
03B6 A1        373         MOV    @R1,A
03B7 AA        374         MOV    R2,A    ; SAVE 'TMPDHS' VALUE IN R2
03B8 C6C8      375         JZ     ABORT
               376
               377 $EJECT
               378 ; HAVE ALL ITERATIONS BEEN PERFORMED?
03BA F0        379         MOV    A,@R0
```

```
LOC  OBJ        LINE      SOURCE STATEMENT

03B8 07         380       DEC    A        ; DECREMENT ITERATION COUNTER & TEST FOR ZERO
03BC A8         381       MOV    @R0,A
03BD C6C3       382       JZ     DONE
03BF 93         383       RETR
                384
                385 ABORT:
                386 ; RESET S/H DEBOUNCE ITERATION COUNTER
03C0 B000       387       MOV    @R0,#0   ; RESET 'HSCNT' TO ZERO
03C2 93         388       RETR
                389
                390 DONE:
                391 ; UPDATE CURRENT VALUES OF 'HOOK SWITCH STATUS' & 'DELTA HOOK STATUS'
03C3 FA         392       MOV    A,R2     ; FETCH 'TMPDHS' VALUE
03C4 B921       393       MOV    R1,#HSW
03C6 D1         394       XRL    A,@R1    ; UPDATE &
03C7 A1         395       MOV    @R1,A    ;   SAVE HOOKSW
03C8 B922       396       MOV    R1,#DLTAHS
03CA FA         397       MOV    A,R2
03CB 41         398       ORL    A,@R1    ; UPDATE &
03CC A1         399       MOV    @R1,A    ;   SAVE DLTAHS
03CD B928       400       MOV    R1,#LNCRDS
03CF F1         401       MOV    A,@R1
03D0 4301       402       ORL    A,#01H   ; SET "OR'D DELTA H/S" BIT OF 'LNCRDS'
03D2 A1         403       MOV    @R1,A
                404
03D3 93         405       RETR
                406
                407 ;*** END OF SHDBNC ***
                408 $EJECT
                409
                410 ;      NAME          BSYLED
                411
                412 ;
                413 ;
                414 ;
                415
                416 ; BSYLED — LINE CARD 'BUSY INDICATE LED' UPDATE ROUTINE
                417
                418 BSYLED:
03D4 B838       419       MOV    R0,#LCST2 ; ADDR. OF 'LC STATUS 2' BYTE
03D6 BA08       420       MOV    R2,#8
                421
                422 ; IF ANY OF THE LINE CIRCUITS ARE BUSY TURN-ON 'BUSY LED'
                423
                424 BLED1:
03D8 F0         425       MOV    A,@R0
03D9 F2E1       426       JB7    BLED2
03DB 18         427       INC    R0
03DC EAD8       428       DJNZ   R2,BLED1 ; IF COUNT#0, CHECK NEXT LINE CKT BUSY STATUS
                429
                430 ; NO LINES BUSY ——— TURN-OFF 'BUSY LED'
                431
03DE 9AEF       432       ANL    P2,#0EFH ; TURN-OFF 'BUSY INDICATE LED' (P24)
                433                       ;  & RETURN TO MAIN LOOP
03E0 93         434       RETR
```

```
LOC  OBJ      LINE      SOURCE STATEMENT 435
              436 BLED2:
              437
              438 ;   AT LEAST ONE LINE IS BUSY ---- TURN-ON 'BUSY LED'
              439
03E1 8A10     440            ORL     P2,#10H    ; TURN-ON 'BUSY INDICATE LED' (P24)
              441                               ;    & RETURN TO MAIN LOOP
              442
03E3 93       443            RETR
              444
              445 ;*** END OF BSYLED ***
              446 $EJECT
              447
              448 ;      NAME          RTNSH
              449
              450 ;
              451 ;
              452 ;
              453
              454
              455 ;   RTNSH -- RETURN SWITCH HOOK: SENDS RETURN S/H COMMAND
              456 ;                   TO ALL LINE CIRCUITS ON THE CARD.
              457
              458 RTNSH:
03E4 8A40     459            ORL     P2,#40H    ; SET 'DATA' LINE TO 1
03E6 9A7F     460            ANL     P2,#07FH   ; SET 'CMD ENA BAR' TO 0
03E8 9900     461            ANL     P1,#0      ; PULSE CLOCK LINES LOW
03EA 89FF     462            ORL     P1,#0FFH   ;    THEN HIGH
03EC 8A80     463            ORL     P2,#80H    ; SET 'CMD ENA BAR' TO 1 TO RETURN S/H
              464 ;                                  ON CLK/SH(7:0)
              465
03EE 83       466            RET
              467
              468 ;*** END OF RTNSH ***
              469 $EJECT
              470
              471 ;      NAME          CLKVCT
              472
              473 ; CLKVCT -- CLOCK VECTOR LOOK-UP TABLE
              474
              475 CLKVCT:
03EF FE       476            DB      11111110B
03F0 FD       477            DB      11111101B
03F1 FB       478            DB      11111011B
03F2 F7       479            DB      11110111B
03F3 EF       480            DB      11101111B
03F4 DF       481            DB      11011111B
03F5 BF       482            DB      10111111B
03F6 7F       483            DB      01111111B
              484
              485
              486 ;*** END OF CLKVCT ***
              487 $EJECT
              488
              489 ;      NAME          TIMINT
```

```
LOC  OBJ        LINE         SOURCE STATEMENT 490
                491 ; TIMINT — TIMER INTERRUPT SERVICE ROUTINE
                492
0007            493          ORG     7
                494 TIMINT:
0007 93         495          RETR
0008 00         496          NOP
                497
                498 ;*** END OF TIMINT ***
                499 $EJECT
                500
                501 ;        NAME            CMDINT
                502
                503 ;
                504 ;
                505 ;
                506
                507 ; CMDINT — COMMAND INTERRUPT SERVICE ROUTINE
                508
0003            509          ORG     3
                510 CMDINT:
0003 D5         511          SEL     RB1
0004 45         512          STRT    CNT
0005 0409       513          JMP     ICONT   ; SKIP OVER 'TIMER INTERRUPT' VECTOR LOCATION (7-8)
                514
0009            515          ORG     9
                516 ICONT:
                517 ; SAVE 'A' REGISTER'S CONTENTS
0009 B929       518          MOV     R1,#ASAVE
000B A1         519          MOV     @R1,A   ; SAVE CONTENTS OF 'A' REG.
                520
                521 ; DISABLE COMMANDS RECEPTION
000C B82D       522          MOV     R0,#CMODE
000E 2303       523          MOV     A,#03H
0010 90         524          MOVX    @R0,A   ; DISABLE COMMANDS RECEPTION CIRCUITRY
                525
                526 ; CALCULATE AND SAVE 2'S COMPLEMENT OF RESPONSE FRAME COUNT.
0011 42         527          MOV     A,T
0012 0307       528          ADD     A,#(RSPNCD-1)
0014 37         529          CPL     A
0015 17         530          INC     A       ; 2'S COMP. IN A REG.
0016 C9         531          DEC     R1      ; R1 NOW POINTS TO 'RESPONSE COUNT' SAVE AREA
0017 A1         532          MOV     @R1,A
                533
                534 ; CLEAR FLAG F1 (ASSUME COMMAND RECEIVED OVER "A" PCM HIGHWAY)
                535 ; (F1 = A BAR/B)
0018 A5         536          CLR     F1
                537
0019 C8         538          DEC     R0      ; R0 POINTS TO CNTRL STATUS BYTE
001A 80         539          MOVX    A,@R0   ; FETCH STATUS INFO.
001B 1220       540          JB0     AMATCH
001D 3223       541          JB1     BMATCH
                542
                543 ; NEITHER ADDRESS COMPARATOR FLAG —
                544 ;       ***** CONTROL COMMUNICATONS I.C. HARDWARE ERROR *****
```

```
LOC  OBJ         LINE        SOURCE STATEMENT

001F D4C7        545              CALL    CFAIL
0021 84AF        546              JMP     RESTOR
                 547
                 548 $EJECT
                 549 BMATCH:
                 550 ; SET FLAG F1 (IDENTIFY "B" PCM HIGHWAY AS SOURCE OF COMMAND)
0023 B5          551              CPL     F1
0024 B885        552              MOV     R0,#BCRB2  ; LOAD R0 WITH ADDR. OFF "B" COMMAND BYTE 2
0026 042A        553              JMP     $+4        ; SKIP OVER NEXT INSTRUCTION
                 554
0028 B881        555 AMATCH: MOV  R0,#ACRB2  ; LOAD R0 WITH ADDR. OF "A" COMMAND BYTE 2
                 556
                 557 ; FETCH FUNCTION CODE & LINE SELECT BYTE FROM COMMAND REG.
                 558 ; AND SAVE IN R5.
002A 80          559              MOVX    A,@R0      ; FETCH FUNCTION CODE BYTE
002B AD          560              MOV     R5,A       ;    & SAVE IN R5
                 561
                 562 ; SAVE LINE CIRCUIT INDEX IN R6.
002C 5307        563              ANL     A,#07H     ; MASK OFF FUNCTIN BITS
002E AE          564              MOV     R6,A       ;    & SAVE 'LINE CKT. INDEX' IN R6
                 565
                 566 ; CALCULATE LINE CIRCUIT'S CLOCK VECTOR AND SAVE IN R7.
                 567 ;    ('CLOCK VECTOR' LOOK-UP TABLE RESIDES IN PROG. MEM. PAGE 3)
002F 03EF        568              ADD     A,#(LOW CLKVCT)
0031 E3          569              MOVP3   A,@A       ; TABLE LOOK-UP 'CLOCK VECTOR' &
0032 AF          570              MOV     R7,A       ;    SAVE 'CLOCK VECTOR' IN R7
                 571
                 572 ; INCREMENT POINTER TO POINT AT COMMAND/RESPONSE DATA BYTE 1
0033 18          573              INC     R0
                 574
                 575
                 576 ; DECODE 'FUNCTION CODE' BY USING 'FUNCTION CODE' AS AN INDEX TO
                 577 ;   THE 'FUNCTION CODE' JUMP TABLE
                 578
0034 FD          579              MOV     A,R5
0035 77          580              RR      A
0036 77          581              RR      A
0037 77          582              RR      A          ; FUNCTION CODE BITS IN LSB POSITIONS
0038 531F        583              ANL     A,#1FH     ; MASK OFF LINE CKT. SELECT BITS
003A 0384        584              ADD     A,#FNCODE  ; ADD FUNCTION CODE JUMP TABLE BASE ADDR
003C B3          585              JMPP    @A         ; JUMP TO FUNCTION CODE'S SERVICE ROUTINE
                 586
                 587 ; ASSIGNMENT OF WORKING REGISTERS AT THIS POINT IS:
                 588 ;    R0    POINTS TO BYTE 3 OF THE COMMAND/RESPONSE S/R
                 589 ;    R1    GEN. PURPOSE POINTER
                 590 ;    R2    GEN. PURPOSE
                 591 ;    R3    GEN. PURPOSE
                 592 ;    R4    GEN. PURPOSE
                 593 ;    R5    CONTAINS COMMAND FUNCTION CODE
                 594 ;    R6    CONTAINS LINE CKT. INDEX
                 595 ;    R7    CONTAINS LINE CKT. 'CLOCK VECTOR'
                 596 ;ZZZZZZZZZZZZZZZZZZZZZZZZZZZZZZZZZZZZZZZZZZZZZZZZZZZZZZZZZZZZ
                 597 $EJECT
003D 3400        598 L00001: CALL WRST1      ; 'WRITE LINE CIRCUIT STATUS 1'
003F 84AF        599              JMP     RESTOR
```

```
LOC  OBJ       LINE    SOURCE STATEMENT
               600
0041 343B      601 L00010: CALL    WRTRCH   ; 'WRITE TX & RX CHAN. ASSIGNMENTS'
0043 04AF      602         JMP     RESTOR
               603
0045 3486      604 L00011: CALL    WRTRGN   ; 'WRITE TX & RX GAIN SETTINGS'
0047 04AF      605         JMP     RESTOR
               606
0049 34AA      607 L00100: CALL    WRLBAL   ; 'WRITE LINE BALANCE SETTING BYTE'
004B 04AF      608         JMP     RESTOR
               609
004D 34B5      610 L00101: CALL    WRST2    ; 'WRITE LINE CIRCUIT STATUS 2'
004F 04AF      611         JMP     RESTOR
               612
0051 94AC      613 L00110: CALL    RSDHS    ; RESET 'DELTA HOOK STATUS' BIT
0053 04AD      614         JMP     WRAPUP
               615
0055 94B0      616 L00111: CALL    SMPTX4   ; SAMPLE TX CH. 4
0057 04AF      617         JMP     RESTOR
               618
0059 B442      619 L01010: CALL    TGNADJ   ; TX GAIN AUTOMATIC ADJUSTMENT
005B 04AF      620         JMP     RESTOR
               621
005D B400      622 L01011: CALL    RGNADJ   ; RX GAIN AUTOMATIC ADJUSTMENT
005F 04AF      623         JMP     RESTOR
               624
0061 9495      625 L01100: CALL    LNTST    ; TEST SPECIFIED LINE CKT.
0063 04AF      626         JMP     RESTOR
               627
0065 54BD      628 L01101: CALL    WRCDR    ; 'WRITE BYTE INTO CODEC CONTROL REG.'
0067 04AF      629         JMP     RESTOR
               630
0069 5418      631 L01110: CALL    WRCRDS   ; 'UPDATE SPECIFIED BITS OF LINE CARD STATUS'
006B 04AD      632         JMP     WRAPUP
               633
006D 5406      634 L01111: CALL    WRMEM    ; 'WRITE BYTE INTO DATA MEMORY'
006F 04AD      635         JMP     WRAPUP
               636
0071 542A      637 L10000: CALL    RDHDHS   ; 'READ "HOOK STATUS" & "DELTA HOOK STATUS"'
0073 04AD      638         JMP     WRAPUP
               639
0075 34EE      640 L10001: CALL    RDSTAT   ; 'READ LINE CIRCUIT STATUS BYTE'
0077 04AD      641         JMP     WRAPUP
               642
0079 5433      643 L10010: CALL    RDTRCH   ; 'READ TX & RX CHANNEL ASSIGNMENTS'
007B 04AD      644         JMP     WRAPUP   ; (AS STORED IN DATA MEMORY)
               645
007D 5441      646 L10011: CALL    RQTRGN   ; 'REQUEST TX & RX GAIN SETTINGS DATA'
007F 04AF      647         JMP     RESTOR
               648
               649 $EJECT
0081 5458      650 L10100: CALL    RQLBAL   ; 'REQUEST LINE BALANCE SETTING DATA'
0083 04AF      651         JMP     RESTOR
               652
0085 54E8      653 L10101: CALL    RWPORT   ; READ/WRITE I/O PORTS 1 & 2
0087 04AD      654         JMP     WRAPUP
```

```
LOC  OBJ        LINE       SOURCE STATEMENT
                655
0089 94CF       656 L11000: CALL    RDROM    ; 'READ BYTE OF PROGRAM MEMORY'
008B 04AD       657         JMP     WRAPUP
                658
008D 27         659 L11010: CLR     A        ; 'COMMAND RESET'----RESTARTS OLC CTR SOFTWARE
008E D7         660         MOV     PSW,A    ; RESET FLAGS & STACK POINTER
008F 65         661         STOP    TCNT
0090 E5         662         SEL     MB0
0091 37         663         CPL     A
0092 39         664         OUTL    P1,A
0093 3A         665         OUTL    P2,A
0094 0400       666         JMP     RESET
                667
0096 546E       668 L11011: CALL    RQDIG    ; 'REQUEST DIGITAL PER-LINE CHIP CONTENTS'
0098 04AF       669         JMP     RESTOR
                670
009A 5488       671 L11100: CALL    RDRQST   ; 'READ REQUESTED DATA'
009C 04AD       672         JMP     WRAPUP
                673
009E 548C       674 L11101: CALL    RQCDR    ; 'REQUEST CODEC DATA REG.' ROUTINE
00A0 04AF       675         JMP     RESTOR
                676
00A2 549E       677 L11110: CALL    RDCRDS   ; 'READ CARD STATUS' ROUTINE
00A4 04AD       678         JMP     WRAPUP
                679
00A6 5400       680 L11111: CALL    RDMEM    ; 'READ BYTE OF DATA MEMORY' ROUTINE
00A8 04AD       681         JMP     WRAPUP
                682 ;////////////////////////////////////////////////
                683 L00000:                  ; 'NO OPERATION COMMAND'
                684
                685 ; UNDEFINED FUNCTION CODES------TREATED AS NO-OPS
                686 L01000:
                687 L01001:
                688 L10110:
                689 L10111:
                690 L11001:
00AA 18         691         INC     R0       ; FUNCTION CODE IS UNDEFINED----ECHO BYTE 4
00AB 80         692         MOVX    A,@R0    ;   TO SET 'RESPONSE ENA' FLIP-FLOP
00AC 90         693         MOVX    @R0,A
                694
                695 $EJECT
                696
                697 WRAPUP:
                698 ; WAIT FOR FRAME COUNT TO REACH RESPONSE FRAME COUNT-1
00AD 14E4       699         CALL    FRWAIT
                700 RESTOR:
                701 ; RESTORE 'A' REGISTER'S CONTENTS
00AF B929       702         MOV     R1,#ASAVE
00B1 F1         703         MOV     A,@R1    ; RESTORE 'A' REG. CONTENTS
                704
                705 ; RE-ENABLE INTERRUPTS
00B2 05         706         EN      I
                707
                708 ; RETURN TO INTERRUPTED ROUTINE AT THE POINT WHERE
                709 ; INTERRUPTED AFTER RESTORING STATUS (CARRY FLAG, AUX. CARRY,
```

```
LOC  OBJ        LINE      SOURCE STATEMENT

710 ; FLAG F0, REG. BANK SELECT)
0083 93         711       RETR
                712
                713 ;*** END OF CMDINT ***
                714 $EJECT
                715
                716 ;     NAME            FNCODE
                717
                718 ; FNCODE -- FUNCTION CODE SERVICE ROUTINE ADDRESS LOOK-UP TABLE
                719
                720 FNCODE:
0084 AA         721       DB        L00000, L00001, L00010, L00011
0085 3D
0086 41
0087 45
0088 49         722       DB        L00100, L00101, L00110, L00111
0089 4D
008A 51
008B 55
008C AA         723       DB        L01000, L01001, L01010, L01011
008D AA
008E 59
008F 5D
00C0 61         724       DB        L01100, L01101, L01110, L01111
00C1 65
00C2 69
00C3 6D
00C4 71         725       DB        L10000, L10001, L10010, L10011
00C5 75
00C6 79
00C7 7D
00C8 81         726       DB        L10100, L10101, L10110, L10111
00C9 85
00CA AA
00CB AA
00CC 89         727       DB        L11000, L11001, L11010, L11011
00CD AA
00CE 8D
00CF 96
00D0 9A         728       DB        L11100, L11101, L11110, L11111
00D1 9E
00D2 A2
00D3 A6
                729
                730 ;*** END OF FNCODE ***
                731 $EJECT
                732
                733 ;     NAME            CNTLEN
                734
                735 ;
                736 ;
                737 ;
                738
                739 ; CNTLEN -- ENABLE CUSTOM CONTROL COMM. I.C. FOR COMMANDS RECEPTION
                740
```

```
LOC  OBJ        LINE      SOURCE STATEMENT
                741 CNTLEN:
                742 ; WAIT UNTIL 'CONTROL WINDOW' HAS PASSED
00D4 45         743        STRT    CNT      ; START FRAME COUNTER
00D5 42         744        MOV     A,T
00D6 37         745        CPL     A
00D7 07         746        DEC     A        ; 2'S COMPLEMENT OF STARTING FRAME COUNT
00D8 A9         747        MOV     R1,A
                748
00D9 42         749 CNTLE1: MOV    A,T
00DA 69         750        ADD     A,R1
00DB 96D9       751        JNZ     CNTLE1   ; LOOP UNTIL STARTING FRAME BEGINS
                752
                753 ; ENABLE COMMANDS RECEPTION
00DD B9D0       754        MOV     R1,#CMODE
00DF 81         755        MOVX    A,@R1
00E0 4304       756        ORL     A,#04H   ; SET 'CNTRL RX ENA'
00E2 91         757        MOVX    @R1,A
00E3 83         758        RET
                759
                760 FRWAIT:
                761 ; CHECK TO SEE IF FRAME COUNT HAS REACHED OR EXCEEDED THE
                762 ; RESPONSE FRAME COUNT.
00E4 B928       763        MOV     R1,#RSPCNT
00E6 F1         764        MOV     A,@R1    ; FETCH RESPONSE COUNT REFERENCE BYTE
00E7 A9         765        MOV     R1,A     ; & PUT IN R1
00E8 42         766        MOV     A,T
00E9 69         767        ADD     A,R1
00EA F6EE       768        JC      TOOLAT
00EC 04D9       769        JMP     CNTLE1
                770
                771 TOOLAT:
                772 ; RESET 'RESPONSE ENABLE FLIP-FLOP' IN CONTROL COMM. I.C.
00EE B9D0       773        MOV     R1,#CMODE
00F0 81         774        MOVX    A,@R1
00F1 4308       775        ORL     A,#08H   ; PULSE 'RESP. ENA FLIP-FLOP RESET' HIGH
00F3 91         776        MOVX    @R1,A
00F4 53F7       777        ANL     A,#0F7H  ;   THEN LOW AGAIN.
00F6 91         778        MOVX    @R1,A
00F7 04D4       779        JMP     CNTLEN   ; RE-ENABLE COMMANDS RECEPTION
                780
                781 ;*** END OF CNTLEN ***
                782 $EJECT
                783
                784 ;       NAME            WRST1
                785
                786 ;
                787 ;
                788 ;
                789
                790 ; WRST1 -- WRITE LINE CIRCUIT STATUS 1 (SELECTED BITS)
                791 ;           COMMAND DATA BYTE 1 CONTAINS 'NEW STATUS DATA'
                792 ;           COMMAND DATA BYTE 2 CONTAINS 'CHANGE MASK'
                793
0100            794        ORG     100H
                795 WRST1:
```

| LOC OBJ | LINE | SOURCE STATEMENT | | |
|---|---|---|---|---|
| 0100 80 | 796 | MOVX | A,@R0 | ; FETCH NEW STATUS BYTE |
| 0101 AA | 797 | MOV | R2,A | ;   AND SAVE IN R2 |
|  | 798 |  |  |  |
| 0102 85 | 799 | CLR | F0 |  |
| 0103 B206 | 800 | JB5 | $+3 | ; SKIP NEXT INSTRUCTION IF 'PWR' BIT=1 |
| 0105 95 | 801 | CPL | F0 | ; SET F0 IF 'PWR' BIT = 0 (F0='PWR BAR') |
|  | 802 |  |  |  |
|  | 803 | ; F0 = 'PWR BAR' | | |
| 0106 2330 | 804 | MOV | A,#LCST1 |  |
| 0108 6E | 805 | ADD | A,R6 | ; ADD 'LC INDEX' TO 'LINE CKT STAT' BASE ADDR. |
| 0109 A9 | 806 | MOV | R1,A |  |
|  | 807 |  |  |  |
| 010A 18 | 808 | INC | R0 |  |
| 010B 80 | 809 | MOVX | A,@R0 | ; FETCH STATUS WRITE MASK |
|  | 810 |  |  |  |
| 010C B20F | 811 | JB5 | $+3 | ; SKIP NEXT INSTR. IF 'PWR MASK' = 1 |
| 010E 85 | 812 | CLR | F0 |  |
|  | 813 |  |  |  |
|  | 814 | ; F0 = ('PWR BAR' AND 'PWR MASK') | | |
| 010F 2A | 815 | XCH | A,R2 | ; EXCHANGE PLACES WITH 'NEW STATUS' BYTE |
| 0110 5A | 816 | ANL | A,R2 | ; CLR 'NEW STATUS' BYTE BIT POSITIONS NOT CHANGING |
| 0111 2A | 817 | XCH | A,R2 |  |
| 0112 37 | 818 | CPL | A | ; COMPLEMENT STATUS WRITE MASK |
| 0113 51 | 819 | ANL | A,@R1 | ; CLEAR BIT POSITIONS WHICH ARE TO BE MODIFIED |
| 0114 4A | 820 | ORL | A,R2 | ; NEW STATUS BYTE |
| 0115 A1 | 821 | MOV | @R1,A |  |
| 0116 C8 | 822 | DEC | R0 |  |
| 0117 90 | 823 | MOVX | @R0,A | ; PUT UPDATED STATUS BYTE IN RESPONSE REG. |
| 0118 AA | 824 | MOV | R2,A | ;   & SAVE IN R2 |
|  | 825 |  |  |  |
| 0119 18 | 826 | INC | R0 |  |
| 011A 34F5 | 827 | CALL | RDST2 | ; PUT CURRENT 'STATUS 2' BYTE IN RESPONSE REG. |
|  | 828 |  |  |  |
|  | 829 | ; ENABLE RESPONSE TRANSMISSION | | |
| 011C 14E4 | 830 | CALL | FRWAIT |  |
|  | 831 |  |  |  |
|  | 832 | $EJECT |  |  |
|  | 833 | ; CHECK TO SEE IF LINE CIRCUIT IS BEING POWERED-DOWN | | |
| 011E 95 | 834 | CPL | F0 |  |
| 011F B631 | 835 | JF0 | NOPDWN |  |
|  | 836 |  |  |  |
|  | 837 | PDWN: |  |  |
|  | 838 | ; LINE CIRCUIT IS BEING POWERED-DOWN----PUT CODEC IN 'STAND-BY' MODE | | |
| 0121 23FF | 839 | MOV | A,#0FFH |  |
| 0123 942F | 840 | CALL | CODEC |  |
| 0125 2340 | 841 | MOV | A,#TXCH |  |
| 0127 6E | 842 | ADD | A,R6 |  |
| 0128 A9 | 843 | MOV | R1,A |  |
| 0129 B13F | 844 | MOV | @R1,#3FH | ; RESET TX CHAN. ASSIGN. BYTE IN DATA MEM. |
| 012B 2348 | 845 | MOV | A,#RXCH |  |
| 012D 6E | 846 | ADD | A,R6 |  |
| 012E A9 | 847 | MOV | R1,A |  |
| 012F B13F | 848 | MOV | @R1,#3FH | ; RESET RX CHAN. ASSIGN. BYTE IN DATA MEM. |
|  | 849 |  |  |  |
|  | 850 | NOPDWN: |  |  |

```
LOC  OBJ        LINE       SOURCE STATEMENT
                851 ; TRANSMIT MODIFIED STATUS TO DIGITAL PER-LINE CUSTOM I.C.
0131 2300       852 LDDIG:     MOV     A,#WRDIG
0133 9400       853            CALL    XMIT4
0135 FA         854            MOV     A,R2        ; UPDATED STATUS IN 'A' REG.
0136 9406       855            CALL    XMIT8       ; SEND MODIFIED STATUS TO LINE CKT.
                856
                857 ; RETURN S/H VECTOR ON PORT 1 INPUTS
0138 74E4       858            CALL    RTNSH
                859
013A 83         860            RET
                861
                862 ;*** END OF WRST1 ***
                863 $EJECT
                864
                865 ;       NAME            WRTRCH
                866
                867 ;
                868 ;
                869 ;
                870
                871 ; WRTRCH -- WRITE TX & RX CHANNEL ASSIGNMENTS INTO DATA MEMORY
                872 ;            AND TO THE CODEC.
                873
                874 WRTRCH:
                875 ; READ TX CHANNEL ASSIGNMENT AND STORE IN DATA MEMORY.
013B 2340       876            MOV     A,#TXCH
013D 6E         877            ADD     A,R6        ; ADD LC INDEX TO TX CHAN. BASE ADDR.
013E A9         878            MOV     R1,A
                879
013F 80         880            MOVX    A,@R0       ; FETCH NEW TX CHANNEL ASSIGNMENT
0140 A1         881            MOV     @R1,A       ; STORE NEW TX CHAN. ASSIGNMENT IN RAM
0141 533F       882            ANL     A,#3FH      ; MASK OFF 2 MSB'S
                883
                884 ; FORMAT TX CHANNEL ASSIGNMENT FOR CODEC
0143 85         885            CLR     F0
0144 95         886            CPL     F0          ; SET F0 (ASSUME ODD CHAN.)
0145 97         887            CLR     C
0146 67         888            RRC     A           ; ROTATE LSB INTO CARRY FLAG
0147 F64B       889            JC      WTRCH1      ; SKIP NEXT TWO INSTRUCTIONS IF ODD
                890
0149 85         891            CLR     F0          ; CLEAR F0 & DECREMENT ACCUMULATOR TWICE
014A 07         892            DEC     A           ;   IF EVEN TX CHAN.
                893
014B 07         894 WTRCH1:    DEC     A
014C 4340       895            ORL     A,#40H      ; APPEND '01' PREFIX TO 'TX CHAN.'
014E AC         896            MOV     R4,A        ;  & SAVE IN R4
                897
                898 ; READ RX CHANNEL ASSIGNMENT AND STORE IN DATA MEMORY.
014F 2348       899            MOV     A,#RXCH
0151 6E         900            ADD     A,R6
0152 A9         901            MOV     R1,A
0153 18         902            INC     R0          ; R0 NOW POINTS TO COMMAND REG. BYTE 4
                903
0154 80         904            MOVX    A,@R0       ; FETCH NEW RX CHAN. ASSIGNMENT
0155 90         905            MOVX    @R0,A       ; ECHO BYTE 4 TO SET RESPONSE ENA FF
```

| LOC OBJ | LINE | SOURCE STATEMENT | | |
|---------|------|------|------|------|
| 0156 A1 | 906 | MOV | @R1,A | ; STORE NEW RX CHAN. ASSIGNMENT IN RAM |
| 0157 533F | 907 | ANL | A,#3FH | ; MASK OFF 2 MSB'S |
| | 908 | | | |
| | 909 | ; FORMAT RX CHANNEL ASSIGNMENT FOR CODEC | | |
| 0159 4380 | 910 | ORL | A,#80H | ; PREFIX CHAN. WITH '10' CODEC FUNCTION BITS |
| 015B AD | 911 | MOV | R5,A | ; & SAVE IN R5 |
| | 912 | | | |
| | 913 | $EJECT | | |
| | 914 | ; UPDATE LINE STATUS 'EVEN BAR/ODD', 'POWER', & 'LC ENA' BITS | | |
| 015C 2330 | 915 | MOV | A,#LCST1 | |
| 015E 6E | 916 | ADD | A,R6 | |
| 015F A8 | 917 | MOV | R0,A | |
| | 918 | | | |
| 0160 F0 | 919 | MOV | A,@R0 | ; FETCH 'LINE CIRCUIT STATUS' BYTE |
| 0161 43A4 | 920 | ORL | A,#0A4H | ; SET 'EVEN BAR/ODD', 'POWER', & 'LC ENA' BITS |
| 0163 B667 | 921 | JF0 | $+4 | ; SKIP NEXT INSTRUCTION IF ODD |
| | 922 | | | |
| 0165 537F | 923 | ANL | A,#7FH | ; CLEAR 'EVEN BAR/ODD' BIT IF EVEN |
| | 924 | | | |
| 0167 A0 | 925 | MOV | @R0,A | ; STORE UPDATED 'LINE CKT STATUS' BYTE |
| | 926 | | | |
| | 927 | ; SET LINE CIRCUIT'S 'BUSY' BIT | | |
| 0168 2338 | 928 | MOV | A,#LCST2 | |
| 016A 6E | 929 | ADD | A,R6 | |
| 016B A9 | 930 | MOV | R1,A | ; ADD 'LC INDEX' TO 'HW STATUS' BASE ADDR. |
| | 931 | | | |
| 016C F1 | 932 | MOV | A,@R1 | |
| 016D 4380 | 933 | ORL | A,#80H | ; SET 'BUSY' BIT |
| 016F A1 | 934 | MOV | @R1,A | |
| | 935 | | | |
| | 936 | ; CLEAR 'DELTA HOOK STATUS' BIT FOR THIS LINE CKT. | | |
| 0170 94AC | 937 | CALL | RSDHS | |
| | 938 | | | |
| | 939 | ; ENABLE RESPONSE TRANSMISSION. THEN CONTINUE WRITING CHANNEL | | |
| | 940 | ; ASSIGNMENTS TO CODEC. | | |
| 0172 14E4 | 941 | CALL | FRWAIT | |
| | 942 | | | |
| | 943 | ; SEND NEW 'LC STATUS 2' DATA TO PER-LINE DIG. CUSTOM I.C. | | |
| 0174 2300 | 944 | MOV | A,#WRDIG | |
| 0176 9400 | 945 | CALL | XMIT4 | ; PUT DIGITAL CUSTOM I.C. IN WRITE MODE |
| 0178 2330 | 946 | MOV | A,#LCST1 | |
| 017A 6E | 947 | ADD | A,R6 | |
| 017B A9 | 948 | MOV | R1,A | |
| 017C F1 | 949 | MOV | A,@R1 | ; FETCH 'LCST1' BYTE |
| 017D 9406 | 950 | CALL | XMIT8 | |
| | 951 | | | |
| | 952 | ; SEND TX CHANNEL ASSIGNMENT TO CODEC | | |
| 017F FC | 953 | MOV | A,R4 | |
| 0180 942F | 954 | CALL | CODEC | |
| | 955 | | | |
| | 956 | ; SEND RX CHANNEL ASSIGNMENT TO CODEC | | |
| 0182 FD | 957 | MOV | A,R5 | |
| 0183 942F | 958 | CALL | CODEC | |
| | 959 | | | |

```
LOC  OBJ        LINE         SOURCE STATEMENT 0185 83         960              RET
                961
                962 ;*** END OFF WRTRCH ***
                963 $EJECT
                964
                965 ;      NAME         WRTRGN
                966
                967 ;
                968 ;
                969 ;
                970
                971 ; WRTRGN -- WRITE NEW TX & RX GAIN SETTINGS INTO SELECTED
                972 ;           LINE CKT'S CUSTOM ANALOG I.C.
                973
                974 WRTRGN:
                975 ; SET UP R1 AS THE DATA MEMORY POINTER FOR GAIN & BAL SETTINGS
0186 54E1       976              CALL   RGNADD
0188 C9         977              DEC    R1      ; R1 POINTS TO TX GAIN SETTING BYTE
                978
                979 ; FETCH & SAVE NEW TX GAIN SETTING
0189 80         980              MOVX   A,@R0
018A A1         981              MOV    @R1,A
018B 18         982              INC    R0
                983
                984 ; FETCH & SAVE NEW RX GAIN SETTING
018C 19         985              INC    R1      ; R1 POINTS TO RX GAIN SETTING BYTE
018D 80         986              MOVX   A,@R0
018E 90         987              MOVX   @R0,A   ; ECHO BYTE 4 TO SET 'RESPONSE ENA' FF
018F A1         988              MOV    @R1,A
                989
                990 ; ENABLE RESPONSE TRANSMISSION, THEN CONTINUE WRITING GAIN SETTINGS.
0190 14E4       991              CALL   FRWAIT
                992
                993 ; WRITE GAIN & BALANCE SETTINGS INTO ANALOG CUSTOM I.C.
0192 2340       994 LDGAIN: MOV  A,#WRANA
0194 9400       995              CALL   XMIT4
                996
0196 54E1       997              CALL   RGNADD
0198 19         998              INC    R1      ; R1 POINTS TO CURRENT LINE BAL BYTE
0199 F1         999              MOV    A,@R1
019A 9406       1000             CALL   XMIT8   ; RE-WRITE CURRENT LINE BAL INTO I.C.
                1001
019C 54E1       1002             CALL   RGNADD  ; R1 POINTS TO RX GAIN BYTE
019E F1         1003             MOV    A,@R1
019F 9406       1004             CALL   XMIT8   ; WRITE NEW RX GAIN SETTING
                1005
01A1 54E1       1006             CALL   RGNADD
01A3 C9         1007             DEC    R1      ; R1 POINTS TO TX GAIN BYTE
01A4 F1         1008             MOV    A,@R1
01A5 9406       1009             CALL   XMIT8   ; WRITE NEW TX GAIN SETTING
                1010
                1011 ; RETURN S/H VECTOR ON PORT 1 INPUTS
```

```
LOC  OBJ        LINE      SOURCE STATEMENT

01A7 74E4       1012          CALL    RTNSH
                1013
01A9 83         1014          RET
                1015 ;*** END OF WRTRGN ***
                1016 $EJECT
                1017
                1018 ;       NAME            WRLBAL
                1019
                1020 ;
                1021 ;
                1022 ;
                1023
                1024 ;  WRLBAL -- WRITE NEW LINE BALANCE SETTING INTO THE SELECTED
                1025 ;             LINE CKT'S CUSTOM ANALOG I.C.
                1026
                1027 WRLBAL:
                1028 ; SET UP R1 TO POINT TO LINE BAL. DATA MEMORY BYTE
01AA 54E1       1029          CALL    RGNADD
01AC 19         1030          INC     R1      ; R1 POINTS TO LINE BAL. BYTE
                1031
                1032 ; READ & ECHO NEW LINE BALANCE SETTING
01AD 18         1033          INC     R0      ; R0 POINTS TO BYTE 4 OF COMMAND REG.
01AE 80         1034          MOVX    A,@R0
01AF 90         1035          MOVX    @R0,A
01B0 A1         1036          MOV     @R1,A   ; SAVE NEW LINE BAL. SETTING IN RAM
                1037
                1038 ; ENABLE RESPONSE TRANSMISSION, THEN CONTINUE WRITING LINE BALANCE
01B1 14E4       1039          CALL    FRWAIT
                1040
                1041 ; WRITE NEW LINE BALANCE SETTING INTO BYTE 1 OF ANALOG I.C.'S
                1042 ;   24-BIT CONTROL REGISTER
01B3 2492       1043          JMP     LDGAIN  ; (LDGAIN IS LOCATED IN WRTRGN)
                1044
                1045 ;*** END OF WRLBAL ***
                1046 $EJECT
                1047
                1048 ;       NAME            WRST2
                1049
                1050 ;
                1051 ;
                1052 ;
                1053
                1054 ;  WRST2 -- WRITE STATUS 2 TO THE SELECTED LINE CKT.
                1055
                1056 ; BIT POSITION ASSIGNMENTS
                1057 ;       BIT 7 = 'BUSY'  (LINE BUSY)
                1058 ;       BIT 6 = 'LK'    (LOCKOUT)
                1059 ;       BIT 5 = 'RV'    (REVERTIVE CALL)
                1060 ;       BIT 4 = N/A     (NOT ASSIGNED)
                1061 ;       BIT 3 = N/A
                1062 ;       BIT 2 = N/A
                1063 ;       BIT 1 = N/A
                1064 ;       BIT 0 = N/A
                1065
```

```
LOC  OBJ       LINE        SOURCE STATEMENT

1066 ;    COMMAND WORD DATA BYTE 1 = 'NEW STATUS DATA'
              1067 ;    COMMAND WORD DATA BYTE 2 = 'CHANGE MASK'
              1068
              1069 ;    ONLY THE BITS INDICATED BY '1' IN THE 'CHANGE MASK' ARE
              1070 ;    TO BE AFFECTED BY THIS COMMAND.
              1071
              1072 ;    LINE CIRCUIT IS POWERED-DOWN IF 'BUSY' STATUS IS CLEARED.
              1073
              1074 WRST2:
01B5 80       1075        MOVX   A,@R0    ; FETCH NEW STATUS BYTE
01B6 AA       1076        MOV    R2,A     ;   & SAVE IN R2
              1077
01B7 85       1078        CLR    F0
01B8 F2BB     1079        JB7    $+3      ; SET FLAG F0 TO 'BUSY BAR'
01BA 95       1080        CPL    F0
              1081
              1082 ; F0 = 'BUSY BAR'
01BB 2338     1083        MOV    A,#LCST2
01BD 6E       1084        ADD    A,R6
01BE A9       1085        MOV    R1,A     ; R1 NOW POINTS TO 'LC STATUS 2' BYTE
              1086
01BF 18       1087        INC    R0
01C0 80       1088        MOVX   A,@R0    ; FETCH 'LINE STATUS 2' WRITE MASK
              1089
01C1 F2C4     1090        JB7    $+3
01C3 85       1091        CLR    F0       ; CLEAR F0 IF 'BUSY MASK' = 0
              1092
              1093 $EJECT
              1094 ; F0 = ('BUSY BAR' AND 'BUSY MASK')
01C4 2A       1095        XCH    A,R2     ; EXCHANGE PLACES WITH 'NEW STATUS' BYTE
01C5 5A       1096        ANL    A,R2     ; CLEAR BIT POSITIONS WHICH ARE NOT BEING CHANGED
01C6 2A       1097        XCH    A,R2
01C7 37       1098        CPL    A        ; COMPLEMENT WRITE MASK
01C8 51       1099        ANL    A,@R1    ; CLEAR BIT POSITIONS WHICH ARE TO BE CHANGED
01C9 4A       1100        ORL    A,R2     ; NEW STATUS BYTE
01CA A1       1101        MOV    @R1,A
              1102
01CB C8       1103        DEC    R0
01CC 34EE     1104        CALL   RDSTAT
              1105
              1106 ; WAIT FOR RESPONSE FRAME
01CE 14E4     1107        CALL   FRWAIT
              1108
01D0 B6D3     1109        JF0    PDWN2
              1110
01D2 83       1111 NOPD2: RET
              1112
01D3 23FF     1113 PDWN2: MOV    A,#0FFH
01D5 942F     1114        CALL   CODEC    ; PUT CODEC IN STANDBY MODE
01D7 2340     1115        MOV    A,#TXCH
01D9 6E       1116        ADD    A,R6
01DA A9       1117        MOV    R1,A
01DB B13F     1118        MOV    @R1,#3FH ; RESET TX CHAN. BYTE
```

| LOC OBJ | LINE | SOURCE STATEMENT | | |
|---|---|---|---|---|
| 01DD 2348 | 1119 | MOV | A,#RXCH | |
| 01DF 6E | 1120 | ADD | A,R6 | |
| 01E0 A9 | 1121 | MOV | R1,A | |
| 01E1 B13F | 1122 | MOV | @R1,#3FH | ; RESET RX CHAN. BYTE |
| 01E3 2338 | 1123 | MOV | A,#LCST1 | |
| 01E5 6E | 1124 | ADD | A,R6 | |
| 01E6 A9 | 1125 | MOV | R1,A | |
| 01E7 2318 | 1126 | MOV | A,#IDIG | |
| 01E9 A1 | 1127 | MOV | @R1,A | ; RESET 'LC STATUS 1' BYTE |
| 01EA AA | 1128 | MOV | R2,A | ; AND |
| 01EB 3431 | 1129 | CALL | LDDIG | ; DIGITAL PER-LINE CUSTOM I.C. |
| | 1130 | | | |
| 01ED 83 | 1131 | RET | | |

1132
1133 ;* END OF WRST2 *
1134 $EJECT
1135
1136 ;        NAME            RDSTAT
1137
1138 ;
1139 ;
1140 ;
1141
1142 ; RDSTAT -- READ LINE CIRCUIT STATUS WORD
1143
1144 RDSTAT:

| 01EE 2338 | 1145 | MOV | A,#LCST1 | ; ADDR. OF 'LC STATUS 1' |
|---|---|---|---|---|
| 01F0 6E | 1146 | ADD | A,R6 | ; ADD LINE CIRCUIT INDEX |
| 01F1 A9 | 1147 | MOV | R1,A | ; TO LINE CKT. INDEX AND PUT IN R1 |
| | 1148 | | | |
| 01F2 F1 | 1149 | MOV | A,@R1 | ; FETCH 'LC STATUS 1' BYTE |
| 01F3 90 | 1150 | MOVX | @R0,A | |
| 01F4 18 | 1151 | INC | R0 | |

1152
1153
1154 ; RDHWS -- READ 'HW STATUS'
1155
1156 RDST2:

| 01F5 2338 | 1157 | MOV | A,#LCST2 | |
|---|---|---|---|---|
| 01F7 6E | 1158 | ADD | A,R6 | |
| 01F8 A9 | 1159 | MOV | R1,A | |
| | 1160 | | | |
| 01F9 F1 | 1161 | MOV | A,@R1 | ; FETCH 'LC STATUS 2' BYTE |
| 01FA 90 | 1162 | MOVX | @R0,A | ; PUT 'LC STATUS 2' IN RESPONSE REG. |
| | 1163 | | | |
| 01FB 83 | 1164 | RET | | |

1165
1166 ;* END OF RDSTAT *
1167 $EJECT
1168
1169 ;        NAME            RDMEM
1170
1171 ;

```
LOC  OBJ        LINE      SOURCE STATEMENT

1172 ;
                1173 ;
                1174
                1175 ;    RDMEM — READ ONE BYTE OF DATA MEMORY
                1176
                1177 ;    R0 POINTS TO ADDRESS BYTE (BYTE 3)
                1178
0200            1179      ORG       200H
                1180 RDMEM:
0200 80         1181      MOVX      A,@R0    ; FETCH ADDRESS
0201 18         1182      INC       R0
0202 A9         1183      MOV       R1,A
0203 F1         1184      MOV       A,@R1    ; DATA IN 'A' REG
0204 90         1185      MOVX      @R0,A    ; WRITE DATA INTO CONTROL REG. BYTE 3
                1186
0205 83         1187      RET
                1188
                1189 ;*** END OF RDMEM ***
                1190 $EJECT
                1191
                1192 ;    NAME      WRMEM
                1193
                1194 ;
                1195 ;
                1196 ;
                1197
                1198 ;    WRMEM — WRITE ONE BYTE INTO DATA MEMORY
                1199
                1200 ;    R0 POINTS TO ADDRESS BYTE (BYTE 3)
                1201 ;    BYTE 4 CONTAINS DATA TO BE WRITTEN INTO DATA MEMORY
                1202
                1203 WRMEM:
0206 80         1204      MOVX      A,@R0    ; FETCH ADDRESS
0207 18         1205      INC       R0
0208 A9         1206      MOV       R1,A
0209 80         1207      MOVX      A,@R0    ; FETCH DATA
020A A1         1208      MOV       @R1,A    ;   AND WRITE INTO DATA MEMORY
020B 90         1209      MOVX      @R0,A    ; SET RESPONSE ENABLE FLIP-FLOP BY
                1210                         ;   WRITING INTO CONTROL REG. BYTE 4
020C 83         1211      RET
                1212
                1213 ;*** END OF WRMEM ***
                1214 $EJECT
                1215
                1216 ;    NAME      WRCDR
                1217
                1218 ;
                1219 ;
                1220 ;
                1221
                1222 ;    WRCDR — WRITE CONTROL DATA INTO CODEC
                1223
                1224 WRCDR:
```

```
LOC  OBJ        LINE        SOURCE STATEMENT

1225 ; FETCH CODEC CONTROL BYTE FROM COMMAND REG. BYTE 3
020D 80         1226        MOVX    A,@R0
020E AC         1227        MOV     R4,A
                1228
                1229 ; ECHO COMMAND REG. BYTE 4 TO SET 'RESPONSE ENABLE' FLIP-FLOP
020F 18         1230        INC     R0
0210 80         1231        MOVX    A,@R0
0211 90         1232        MOVX    @R0,A
                1233
                1234 ; WAIT FOR RESPONSE FRAME
0212 14E4       1235        CALL    FRWAIT
                1236
                1237 ; SEND CONTROL BYTE TO CODEC
0214 FC         1238        MOV     A,R4
0215 942F       1239        CALL    CODEC
                1240
0217 83         1241        RET
                1242
                1243 ;*** END OF WRCDR ***
                1244 $EJECT
                1245
                1246 ;       NAME            WRCRDS
                1247
                1248 ;
                1249 ;
                1250 ;
                1251
                1252 ; WRCRDS -- WRITE NEW DATA INTO LINE CARD STATUS BYTE FROM
                1253 ;          LINE SWITCH CONTROLLER.  THE FIRST COMMAND
                1254 ;          WORD DATA BYTE CONTAINS THE NEW DATA;  THE
                1255 ;          SECOND COMMAND DATA BYTE CONTAINS THE CHANGE
                1256 ;          MASK IN WHICH A '1' INDICATES THAT THAT BIT
                1257 ;          POSITION(S) IN THE CURRENTLY STORED LINE CARD
                1258 ;          STATUS BYTE IS(ARE) TO BE UPDATED TO THE VALUES
                1259 ;          IN THE FIRST COMMAND DATA BYTE.
                1260
                1261 ;          NOTE THAT IF ALL BITS OF THE 'CHANGE MASK' ARE
                1262 ;          '0' THEN THE COMMAND IS EQUIVALENT TO A READ
                1263 ;          OF THE CURRENT LINE CARD STATUS BYTE.
                1264
                1265 WRCRDS:
0218 80         1266        MOVX    A,@R0   ; FETCH NEW DATA WORD &
0219 AB         1267        MOV     R3,A    ;   SAVE IN R3
021A 18         1268        INC     R0
021B 80         1269        MOVX    A,@R0   ; FETCH DATA CHANGE MASK
021C AA         1270        MOV     R2,A    ;   & SAVE IN R2
021D 5B         1271        ANL     A,R3    ; 'AND' MASK WITH NEW DATA BYTE &
021E AB         1272        MOV     R3,A    ;   SAVE 'MASKED NEW DATA BITS' IN R3
                1273
021F B920       1274        MOV     R1,#LNCRDS
0221 FA         1275        MOV     A,R2
0222 37         1276        CPL     A       ; COMPLEMENT 'CHANGE MASK' (ONE'S IN BIT
```

| LOC OBJ | LINE | SOURCE STATEMENT | | |
|---|---|---|---|---|
| | 1277 | | | ; POSITIONS NOT TO BE UPDATED) |
| 0223 51 | 1278 | ANL | A,@R1 | ; ZERO BIT POSITIONS OF CURRENT CARD STATUS |
| | 1279 | | | ; BYTE WHICH ARE NOT TO CHANGE |
| 0224 4B | 1280 | ORL | A,R3 | ; UPDATED LINE CARD STATUS BYTE |
| 0225 A1 | 1281 | MOV | @R1,A | |
| | 1282 | | | |
| | 1283 | ; LOAD 'CARD STATUS' & 'S/H VECTOR' INTO RESPONSE REGISTER | | |
| 0226 C8 | 1284 | DEC | R0 | |
| 0227 549E | 1285 | CALL | RDCRDS | |
| | 1286 | | | |
| 0229 83 | 1287 | RET | | |
| | 1288 | | | |
| | 1289 | ;*** END OF WRCRDS *** | | |
| | 1290 | $EJECT | | |
| | 1291 | | | |
| | 1292 | ; NAME | RDHDHS | |
| | 1293 | | | |
| | 1294 | ; | | |
| | 1295 | ; | | |
| | 1296 | ; | | |
| | 1297 | | | |
| | 1298 | ; RDHDHS — READ 'HOOK STATUS VECTOR' & 'DELTA HOOK STATUS VECTOR' | | |
| | 1299 | ; THEN RESET 'DELTA HOOK STATUS VECTOR' & "OR'D DLTA HS" | | |
| | 1300 | | | |
| | 1301 | RDHDHS: | | |
| 022A B921 | 1302 | MOV | R1,#HSW | ; ADDR. OF 'HOOK SWITCH STATUS VECTOR' |
| 022C F1 | 1303 | MOV | A,@R1 | |
| 022D 90 | 1304 | MOVX | @R0,A | ; WRITE 'HOOK STATUS VECTOR' INTO BYTE 3 |
| 022E 18 | 1305 | INC | R0 | |
| 022F 19 | 1306 | INC | R1 | |
| 0230 F1 | 1307 | MOV | A,@R1 | |
| 0231 90 | 1308 | MOVX | @R0,A | ; WRITE 'DELTA HS VECTOR' INTO BYTE 4 |
| | 1309 | | | |
| 0232 83 | 1310 | RET | | |
| | 1311 | | | |
| | 1312 | ;*** END OF RDHDHS *** | | |
| | 1313 | $EJECT | | |
| | 1314 | | | |
| | 1315 | ; NAME | RDTRCH | |
| | 1316 | | | |
| | 1317 | ; | | |
| | 1318 | ; | | |
| | 1319 | ; | | |
| | 1320 | | | |
| | 1321 | ; RDTRCH — READ MOST RECENT TX & RX CHANNEL ASSIGNMENTS | | |
| | 1322 | ; FOR THE SPECIFIED LINE CIRCUIT. | | |
| | 1323 | | | |
| | 1324 | RDTRCH: | | |
| 0233 2340 | 1325 | MOV | A,#TXCH | |
| 0235 6E | 1326 | ADD | A,R6 | ; ADD LC INDEX TO TX CHAN. BASE ADDR. |
| 0236 A9 | 1327 | MOV | R1,A | ; AND MOVE INTO POINTER REG. R1 |
| | 1328 | | | |

```
LOC  OBJ        LINE       SOURCE STATEMENT

0237 F1         1329           MOV    A,@R1    ; FETCH STORED TX CHANNEL ASSIGNMENT
0238 90         1330           MOVX   @R0,A    ;   AND MOVE TX CHAN. INTO CNTRL. S/R BYTE 3
0239 18         1331           INC    R0
                1332
023A 2348       1333           MOV    A,#RXCH
023C 6E         1334           ADD    A,R6      ; ADD LC INDEX TO RX CHAN. BASE ADDR.
023D A9         1335           MOV    R1,A
                1336
023E F1         1337           MOV    A,@R1    ; FETCH STORED RX CHANNEL ASSIGNMENT
023F 90         1338           MOVX   @R0,A    ;   AND MOVE RX CHAN. INTO CNTRL S/R BYTE 4
                1339                            ;   (WHICH ALSO SETS RESPONSE ENA FLIP-FLOP)
                1340
0240 83         1341           RET
                1342
                1343 ;*** END OF RDTRCH ***
                1344 $EJECT
                1345
                1346 ;     NAME           RQTRGN
                1347
                1348 ;
                1349 ;
                1350 ;
                1351
                1352 ; RQTRGN -- REQUEST CURRENT TX & RX GAIN SETTINGS FOR THE
                1353 ;              SELECTED LINE CIRCUIT.
                1354
                1355 RQTRGN:
0241 9440       1356           CALL   RQST     ; 'REQUEST' COMMAND PRELIMINARY TASKS
                1357
0243 23C0       1358           MOV    A,#RDAHA
0245 9400       1359           CALL   XMIT4
                1360
                1361 ; ENABLE RESPONSE TRANSMISSION, THEN FETCH REQUESTED DATA
0247 14E4       1362           CALL   FRWAIT
                1363
                1364 ; SKIP OVER LINE BALANCE BYTE IN ANALOG PER-LINE I.C.
0249 54C7       1365           CALL   CKBRST
                1366
                1367 ; FETCH RX GAIN SETTING
024B 941C       1368           CALL   RCV8
024D B927       1369           MOV    R1,#RQBYT2
024F A1         1370           MOV    @R1,A    ; 'RQBYT2' = RX GAIN SETTING
                1371
                1372 ; FETCH TX GAIN SETTING
0250 941C       1373           CALL   RCV8
0252 B926       1374           MOV    R1,#RQBYT1
0254 A1         1375           MOV    @R1,A    ; 'RQBYT1' = TX GAIN SETTING
                1376
                1377 ; RETURN S/H VECTOR ON PORT 1 INPUTS
0255 74E4       1378           CALL   RTNSH
                1379
0257 83         1380           RET
                1381
```

```
LOC  OBJ        LINE        SOURCE STATEMENT
                1382 ;*** END OFF RQTRGN ***
                1383 $EJECT
                1384
                1385 ;      NAME           RQLBAL
                1386
                1387 ;
                1388 ;
                1389 ;
                1390
                1391 ;  RQLBAL -- REQUEST CURRENT LINE BALANCE SETTING
                1392
                1393 RQLBAL:
                1394 ; 'REQUEST' COMMAND PRELIMINARY OPERATIONS
0258 9440       1395         CALL    RQST
                1396
025A 23C0       1397         MOV     A,#RDANA  ; SET ANALOG CHIP FOR READ MODE
025C 9400       1398         CALL    XMIT4
                1399
                1400 ; ENABLE RESPONSE TRANSMISSION, THEN CONTINUE TO FETCH REQUESTED DATA
025E 14E4       1401         CALL    FRWAIT
                1402
                1403 ; FETCH LINE BALANCE SETTING BYTE FROM ANALOG PER-LINE I.C.
0260 941C       1404         CALL    RCV8
0262 B926       1405         MOV     R1,#RQBYT1
0264 A1         1406         MOV     @R1,A  ; 'RQBYT1' = 'LINE BALANCE BYTE'
                1407
0265 19         1408         INC     R1
0266 A1         1409         MOV     @R1,A  ; 'RQBYT2' = 'RQBYT1'
                1410
                1411 ; SKIP OVER RX & TX GAIN SETTINGS
0267 54C7       1412         CALL    CKBRST
0269 54C7       1413         CALL    CKBRST
                1414
                1415 ; RETURN S/H VECTOR ON PORT 1 INPUTS
026B 74E4       1416         CALL    RTNSH
                1417
026D 83         1418         RET
                1419
                1420 ;*** END OF RQLBAL ***
                1421 $EJECT
                1422
                1423 ;      NAME           RQDIG
                1424
                1425 ;
                1426 ;
                1427 ;
                1428
                1429 ; RQDIG -- REQUEST DIGITAL PER-LINE CUSTOM I.C.'S CONTENTS
                1430
                1431 RQDIG:
                1432 ; 'REQUEST' COMMAND PRELIMINARY OPERATIONS
026E 9440       1433         CALL    RQST
                1434
```

| LOC OBJ | LINE | SOURCE STATEMENT | | |
|---|---|---|---|---|
| | 1435 ; | SEND 'READ DIGITAL I.C.' COMMAND TO LINE CIRCUITS | | |
| 0270 2388 | 1436 | MOV | A,#RDDIG | |
| 0272 9400 | 1437 | CALL | XMIT4 | |
| | 1438 | | | |
| | 1439 ; | ENABLE RESPONSE TRANSMISSION, THEN CONTINUE TO FETCH REQUESTED DATA | | |
| 0274 14E4 | 1440 | CALL | FRWAIT | |
| | 1441 | | | |
| | 1442 ; | FETCH CONTENTS OF DIGITAL PER-LINE I.C. | | |
| 0276 941C | 1443 | CALL | RCV8 | |
| 0278 B926 | 1444 | MOV | R1,#RQBYT1 | |
| 027A A1 | 1445 | MOV | @R1,A | ; 'RQBYT1' = DIGITAL I.C.'S CONTENTS |
| | 1446 | | | |
| 027B 19 | 1447 | INC | R1 | |
| 027C A1 | 1448 | MOV | @R1,A | ; 'RQBYT2' = 'RQBYT1' |
| | 1449 | | | |
| | 1450 ; | RETURN S/H VECTOR ON PORT 1 INPUTS | | |
| 027D 74E4 | 1451 | CALL | RTNSH | |
| | 1452 | | | |
| 027F 83 | 1453 | RET | | |
| | 1454 | | | |
| | 1455 ;*** END OF RQDIG *** | | | |
| | 1456 $EJECT | | | |
| | 1457 | | | |
| | 1458 ; | NAME | RDRQST | |
| | 1459 | | | |
| | 1460 ; | | | |
| | 1461 ; | | | |
| | 1462 ; | | | |
| | 1463 | | | |
| | 1464 ; RDRQST -- READ DATA CURRENTLY IN THE 'REQUESTED DATA' | | | |
| | 1465 ; | LOCATIONS OF DATA MEMORY. ONE BYTE RETURNED | | |
| | 1466 ; | WILL BE THE FUNCTION CODE BYTE WHICH LAST | | |
| | 1467 ; | REQUESTED DATA AND THE REMAINING TWO BYTES | | |
| | 1468 ; | ARE THE ACTUAL REQUESTED DATA BYTES. | | |
| | 1469 | | | |
| | 1470 RDRQST: | | | |
| 0280 C8 | 1471 | DEC | R0 | |
| 0281 B925 | 1472 | MOV | R1,#RQFNCD | ; LOCATION WHERE 'RQST FUNCTION CODE' |
| | 1473 | | ; | IS STORED. |
| 0283 BA03 | 1474 | MOV | R2,#3 | ; 3 BYTES TO BE MOVED |
| 0285 F1 | 1475 RQNEXT: MOV | A,@R1 | | |
| 0286 90 | 1476 | MOVX | @R0,A | |
| 0287 18 | 1477 | INC | R0 | |
| 0288 19 | 1478 | INC | R1 | |
| 0289 EA85 | 1479 | DJNZ | R2,RQNEXT | |
| | 1480 | | | |
| 028B 83 | 1481 | RET | | |
| | 1482 | | | |
| | 1483 ;*** END OF RDRQST *** | | | |
| | 1484 $EJECT | | | |
| | 1485 | | | |
| | 1486 ; | NAME | RQCDR | |
| | 1487 | | | |
| | 1488 ; | | | |
| | 1489 ; | | | |

```
LOC  OBJ         LINE       SOURCE STATEMENT

1490 ;
                 1491
                 1492 ;   RQCDR -- REQUEST CODEC DATA REGISTER CONTENTS
                 1493
                 1494
                 1495 RQCDR:
                 1496 ;   'REQUEST' COMMAND PRELIMINARY OPERATIONS
028C 9440        1497           CALL    RQST
                 1498
                 1499 ;   SEND 'READ CODEC DATA REG.' COMMAND TO PER-LINE I.C.'S
028E 23A0        1500           MOV     A,#RDCDR
0290 9400        1501           CALL    XMIT4
                 1502
                 1503 ;   ENABLE RESPONSE TRANSMISSION, THEN CONTINUE TO FETCH REQUESTED DATA
0292 14E4        1504           CALL    FRWAIT
                 1505
                 1506 ;   FETCH CODEC DATA REGISTER CONTENTS
0294 941C        1507           CALL    RCV8
0296 B926        1508           MOV     R1,#RQBYT1 ; RQBYT1='CODEC DATA REG.' CONTENTS
0298 A1          1509           MOV     @R1,A
0299 19          1510           INC     R1
029A A1          1511           MOV     @R1,A  ; 'RQBYT2' = 'RQBYT1'
                 1512
                 1513 ;   RETURN S/H VECTOR ON PORT 1 INPUTS
029B 74E4        1514           CALL    RTNSH
                 1515
029D 83          1516           RET
                 1517
                 1518 ;*** END OF RQCDR ***
                 1519 $EJECT
                 1520
                 1521 ;       NAME            RDCRDS
                 1522
                 1523 ;
                 1524 ;
                 1525 ;
                 1526
                 1527 ;   RDCRDS -- READ LINE CARD STATUS
                 1528
                 1529 RDCRDS:
                 1530 ;   FETCH CURRENT LINE CARD STATUS BYTE FROM DATA MEMORY
                 1531 ;   AND MOVE INTO RESPONSE REG. BYTE 3
                 1532
029E B920        1533           MOV     R1,#LNCRDS
02A0 F1          1534           MOV     A,@R1
02A1 90          1535           MOVX    @R0,A
                 1536
                 1537 ;   PUT S/H VECTOR INTO RESPONSE REG. BYTE 4
                 1538
02A2 18          1539           INC     R0
02A3 09          1540           IN      A,P1   ; READ S/H VECTOR
02A4 90          1541           MOVX    @R0,A
                 1542
02A5 83          1543           RET
                 1544
```

```
LOC  OBJ          LINE       SOURCE STATEMENT

1545 ;*** END OF RDCRDS ***
                  1546 $EJECT
                  1547
                  1548 ;     NAME          LINERS
                  1549
                  1550 ;
                  1551 ;
                  1552 ;
                  1553
                  1554 ;   LINE -- RESET ALL LINE CIRCUITS ON LINE CARD
                  1555
                  1556 ; DIGITAL PER-LINE CUSTOM I.C.'S INITIALIZATION VALUES
                  1557 ;BIT 7  EVEN BAR/ODD=   0 (EVEN 4 MHZ CHAN.)
                  1558 ;BIT 6  EURO SEL=       0 (NON-EUROPEAN FORMAT)
                  1559 ;BIT 5  POWER=          0 (LINE CKT. POWERED DOWN)
                  1560 ;BIT 4  TR=             1 (TEST RELAY OPEN)
                  1561 ;BIT 3  RR=             1 (RING RELAY OPEN)
                  1562 ;BIT 2  LC EN=          0 (LINE CKT'S PCM DRIVERS IN HI-Z STATE)
                  1563 ;BIT 1  ILS=            0 (ILS NOT SELECTED)
                  1564 ;BIT 0  A BAR/B SEL=    0 (DEFAULTS TO 'A' PCM)
                  1565
                  1566 ;  CODEC IS PUT IN 'STANDBY' MODE
                  1567
                  1568 ; ANALOG PER-LINE CUSTOM I.C.'S INITIALIZATION VALUES
                  1569 ;      'CLKC +BAR/-'  IS SET TO 1
                  1570 ;      'LINE BAL'     IS SET TO 'STD BAL SETTING' (4H)
                  1571 ;      'RX GAIN'      IS SET TO 'STD RX GN SETTING' (20H)
                  1572 ;      'TX GAIN'      IS SET TO 'STD TX GAIN SETTING' (20H)
                  1573
                  1574 LINERS:
                  1575 ; WRITE TO DIGITAL PER-LINE CHIPS
02A6 BF00         1576       MOV   R7,#0    ; CLOCK VECTOR FOR ALL LINE CKTS
02A8 2300         1577       MOV   A,#WRDIG ; 'WRITE TO DIGITAL CHIP' CODE
02AA 9400         1578       CALL  XMIT4
02AC 2318         1579       MOV   A,#IDIG  ; INIT. DIG. CHIP CONTENTS TO 00011000B
02AE 9406         1580       CALL  XMIT8
                  1581
                  1582 ; WRITE TO CODECS
02B0 23FF         1583       MOV   A,#ICODEC
02B2 942F         1584       CALL  CODEC    ; PUT CODECS IN 'STANDBY' MODE
                  1585
                  1586 ; WRITE TO ANALOG PER-LINE CHIP
02B4 2340         1587       MOV   A,#WRANA ; 'WRITE TO ANALOG CHIP' CODE
02B6 9400         1588       CALL  XMIT4
02B8 2384         1589       MOV   A,#IANA1 ; INITIAL 'CLKC' & 'LINE BAL' SETTINGS
02BA 9406         1590       CALL  XMIT8
02BC 2300         1591       MOV   A,#IANA2 ; INITIAL 'RX GAIN SETTING'
02BE 9406         1592       CALL  XMIT8
02C0 2300         1593       MOV   A,#IANA3 ; INITIAL 'TX GAIN SETTING'
02C2 9406         1594       CALL  XMIT8
                  1595
                  1596 ; RETURN S/H ON PORT 1
02C4 74E4         1597       CALL  RTNSH
02C6 83           1598       RET
                  1599 ;*** END OF LINERS ***
```

```
LOC  OBJ        LINE        SOURCE STATEMENT

1600 $EJECT
                1601
                1602 ;      NAME            CKBRST
                1603
                1604 ;
                1605 ;
                1606 ;
                1607
                1608
                1609 ;  CKBRST -- PULSES CLOCK LINE 8 TIMES AT MAX. RATE
                1610
                1611 ;  R7 CONTAINS CLOCK VECTOR UPON ENTRY
                1612 ;
                1613
                1614 CKBRST:
02C7 FF         1615        MOV     A,R7      ; MOVE CLOCK VECTOR INTO A
02C8 39         1616        OUTL    P1,A
02C9 89FF       1617        ORL     P1,#0FFH
02CB 39         1618        OUTL    P1,A
02CC 89FF       1619        ORL     P1,#0FFH
02CE 39         1620        OUTL    P1,A
02CF 89FF       1621        ORL     P1,#0FFH
02D1 39         1622        OUTL    P1,A
02D2 89FF       1623        ORL     P1,#0FFH
02D4 39         1624        OUTL    P1,A
02D5 89FF       1625        ORL     P1,#0FFH
02D7 39         1626        OUTL    P1,A
02D8 89FF       1627        ORL     P1,#0FFH
02DA 39         1628        OUTL    P1,A
02DB 89FF       1629        ORL     P1,#0FFH
02DD 39         1630        OUTL    P1,A
02DE 89FF       1631        ORL     P1,#0FFH
                1632
02E0 83         1633        RET
                1634
                1635 ;*** END OF CKBRST ***
                1636 $EJECT
                1637
                1638 ;      NAME            RGNADD
                1639
                1640 ;
                1641 ;
                1642 ;
                1643
                1644 ;  RGNADD -- LOADS REG. R1 WITH THE ADDRESS OF THE RX GAIN SETTING
                1645 ;           BYTE FOR THE SELECTED LINE CKT.
                1646
                1647 RGNADD:
02E1 FE         1648        MOV     A,R6
02E2 E7         1649        RL      A
02E3 6E         1650        ADD     A,R6            ; 3 * 'LC INDEX'
02E4 0351       1651        ADD     A,#(GNBAL+1)    ; ADD BASE ADDR. OF RX GAIN SETTING BYTE
02E6 A9         1652        MOV     R1,A
                1653
02E7 83         1654        RET
```

```
LOC  OBJ        LINE       SOURCE STATEMENT
                1655
                1656 ;*** END OF RGNADD ***
                1657 $EJECT
                1658
                1659 ;       NAME          RWPORT
                1660
                1661 ;
                1662 ;
                1663 ;
                1664
                1665 ; RWPORT -- READ/WRITE DATA FROM/TO I/O PORTS 1 & 2
                1666
                1667 ; BIT 1 OF FUNCTION CODE BYTE (COMMAND BYTE 2) = R/W BAR PORT 1
                1668 ;  "  2 "     "     "    "    (  "       "   ") = R/W BAR PORT 2
                1669
                1670 RWPORT:
                1671 ; TEST IF READ OR WRITE OPERATION ON PORT 1
02E8 FD         1672        MOV    A,R5      ; FETCH FUNCTION CODE BYTE
02E9 32ED       1673        JB1    $+4       ; SKIP NEXT TWO INSTRUCTIONS IF READ COMMAND
02EB 80         1674        MOVX   A,@R0     ; FETCH NEW PORT 1 DATA
02EC 39         1675        OUTL   P1,A      ;   & WRITE INTO PORT 1
02ED 09         1676        IN     A,P1      ; READ PORT 1
02EE 90         1677        MOVX   @R0,A     ;   & RETURN IN RESPONSE BYTE 3
                1678
                1679 ; TEST IF READ OR WRITE OPERATION ON PORT 2
02EF 18         1680        INC    R0
02F0 FD         1681        MOV    A,R5
02F1 12F5       1682        JB0    $+4       ; SKIP NEXT TWO INSTRUCTIONS IF READ COMMAND
02F3 80         1683        MOVX   A,@R0     ; FETCH NEW PORT 2 DATA
02F4 3A         1684        OUTL   P2,A      ;   & WRITE INTO PORT 2
02F5 0A         1685        IN     A,P2      ; READ PORT 2
02F6 90         1686        MOVX   @R0,A     ;   & RETURN IN RESPONSE BYTE 4
                1687
02F7 83         1688        RET
                1689
                1690 ;*** END OF RWPORT ***
                1691 $EJECT
                1692
                1693 ;       NAME          XMIT
                1694
                1695 ;
                1696 ;
                1697 ;
                1698
                1699 ;       XMIT -- TRANSMIT DATA TO LINE CIRCUIT
                1700
                1701 ;       ASSUMED CONTENTS OF REGISTERS UPON ENTRY:
                1702 ;           R7     CLOCK VECTOR(I.E. BIT CORRESPONDING
                1703 ;                           TO SELECTED LINE CKT IS A LOGIC
                1704 ;                           '0', ALL OTHER BITS MUST BE '1')
                1705 ;           A      DATA TO SENT TO LINE CKT. (MSB 1ST)
                1706 ;           R1     BIT COUNTER: NUMBER OF BITS TO BE SENT
                1707 ;                           (NORMALLY 1-8)
                1708
                1709 ;           R3     HOLDS INTERMEDIATE RESULTS
```

```
LOC  OBJ       LINE      SOURCE STATEMENT

1710 ;              P26    DATA LINE TO LINE CIRCUITS
               1711 ;              P27    'CMD ENA BAR' LINE TO LINE CIRCUITS
               1712 ;              P1     PORT 1 IS THE CLOCK/SH VECTOR INTERFACE
               1713 ;                     TO THE LINE CIRCUITS(BIT 0 GOES
               1714 ;                     TO LC #1, BIT 1 TO LC #2, ETC.)
               1715
               1716
0400           1717      ORG       400H
               1718 XMIT4:
0400 B904      1719      MOV       R1,#4
0402 9A7F      1720      ANL       P2,#7FH ; 'CMD ENA BAR' = 0
0404 8408      1721      JMP       XMIT
               1722
0406 B908      1723 XMIT8: MOV     R1,#8
               1724
               1725 XMIT:
0408 AB        1726      MOV       R3,A
0409 F20F      1727      JB7       XMIT1  ; IS '0' OR '1' TO BE SENT NEXT?
040B 9ABF      1728 XMIT0: ANL     P2,#0BFH       ; SET DATA LINE TO 0
040D 8411      1729      JMP       CKPSL
               1730
040F 8A40      1731 XMIT1: ORL     P2,#40H ; SET DATA LINE TO 1
0411 FF        1732 CKPSL: MOV     A,R7   ; LOAD CLOCK VECTOR INTO A
0412 39        1733      OUTL      P1,A   ;  PULSE CLOCK LINE LOW
0413 89FF      1734      ORL       P1,#0FFH ;    THEN HIGH
               1735
0415 FB        1736      MOV       A,R3   ; HAVE ALL BITS BEEN TRANSMITTED?
0416 E7        1737      RL        A
0417 E908      1738      DJNZ      R1,XMIT
               1739
0419 8AC0      1740      ORL       P2,#0C0H       ; SET 'CMD ENA BAR' AND 'DATA' TO 1
041B 83        1741      RET
               1742
               1743 ;*** END OF XMIT ***
               1744 $EJECT
               1745
               1746 ;    NAME            RCV
               1747
               1748 ;
               1749 ;
               1750 ;
               1751
               1752 ; RCV — RECEIVE 1 TO 8 BITS OF DATA FROM THE LINE CIRCUIT
               1753 ;      SPECIFIED BY THE CLOCK VECTOR STORED IN R2 UPON ENTRY.
               1754
               1755 ; ENTRY POINT 'RCV8' RECEIVES 8 BITS OF DATA RETURNED IN 'A' REG
               1756
               1757 RCV8:
041C B908      1758      MOV       R1,#8
               1759 RCV:
041E FF        1760      MOV       A,R7   ; MOVE CLOCK VECTOR INTO A
041F 39        1761      OUTL      P1,A   ; 'CLOCK LINE' = 0
0420 0A        1762      IN        A,P2   ; READ IN NEXT BIT OF DATA
0421 89FF      1763      ORL       P1,#0FFH ; 'CLOCK LINE' = 1
0423 97        1764      CLR       C      ; CLEAR CARRY FLAG (ASSUME DATA = 0)
```

```
LOC  OBJ         LINE        SOURCE STATEMENT 0424 37          1765            CPL     A
0425 D228        1766            JB6     RD0       ; SKIP NEXT INSTR. IF 'DATA' = 0
0427 A7          1767 RD1:       CPL     C         ; SET CARRY FLAG (SINCE DATA = 1)
0428 FB          1768 RD0:       MOV     A,R3
0429 F7          1769            RLC     A         ; MOVE NEXT DATA BIT INTO LSB
042A AB          1770            MOV     R3,A      ;   POSITION OF R3
                 1771
042B E91E        1772            DJNZ    R1,RCV    ; HAVE ALL BITS BEEN RECEIVED?
                 1773
042D FB          1774            MOV     A,R3      ; LOAD 'A' WITH RECEIVED DATA AND RETURN
                 1775                              ;   TO CALLING ROUTINE.
042E 83          1776            RET
                 1777
                 1778 ;*** END OF RCV ***
                 1779 $EJECT
                 1780
                 1781 ;       NAME            CODEC
                 1782
                 1783 ;
                 1784 ;
                 1785 ;
                 1786
                 1787 ; CODEC -- THE DATA CONTAINED IN THE 'A' REG. UPON ENTRY
                 1788 ;          IS TRANSMITTED TO THE SELECTED LINE CIRCUIT'S
                 1789 ;          CODEC.
                 1790
                 1791 ; ASSUMED REG. CONTENTS UPON ENTRY:
                 1792 ;    R7=CLOCK VECTOR
                 1793 ;    A=CODEC CONTROL DATA
                 1794
                 1795 CODEC:
042F AC          1796            MOV     R4,A      ; SAVE CODEC CONTROL DATA
0430 2320        1797            MOV     A,#WRCDRC
0432 9400        1798            CALL    XMIT4     ; PUT ANALOG CUSTOM I.C. IN 'WRITE TO CDR' MODE
0434 FC          1799            MOV     A,R4
0435 9406        1800            CALL    XMIT8     ; LOAD DATA INTO CODEC DATA REG.
                 1801
0437 2360        1802            MOV     A,#LDCODC
0439 9400        1803            CALL    XMIT4     ; PUT DIG. I.C. IN 'LOAD CODEC' MODE
043B 54C7        1804            CALL    CKBRST    ; LOAD DATA INTO CODEC
                 1805
043D 74E4        1806            CALL    RTNSH     ; PUT CUSTOM I.C. IN 'RETURN S/H' MODE
                 1807
043F 83          1808            RET
                 1809
                 1810 ;*** END OF CODEC ***
                 1811 $EJECT
                 1812
                 1813 ;       NAME            RQST
                 1814
                 1815 ;
                 1816 ;
                 1817 ;
                 1818
                 1819 ; RQST -- PERFORM THE PRELIMINARY STUFF THAT'S COMMON TO
```

| LOC OBJ | LINE | SOURCE STATEMENT |
|---|---|---|
| | 1820 ; | ALL 'RQXXXX' SUBROUTINES. |
| | 1821 | |
| | 1822 RQST: | |
| | 1823 ; ECHO COMMAND BYTE 4 TO SET 'RESPONSE ENABLE' FLIP-FLOP | |
| 0440 18 | 1824 | INC R0 |
| 0441 80 | 1825 | MOVX A,@R0 |
| 0442 90 | 1826 | MOVX @R0,A |
| | 1827 | |
| | 1828 ; MOVE FUNCTION CODE BYTE OF REQUEST COMMAND INTO 'RQFNCD' | |
| 0443 B925 | 1829 | MOV R1,#RQFNCD |
| 0445 FD | 1830 | MOV A,R5 |
| 0446 A1 | 1831 | MOV @R1,A |
| | 1832 | |
| | 1833 ; SET 'RQST A BAR/B' TO THE VALUE OF FLAG F1 | |
| 0447 B920 | 1834 | MOV R1,#LNCRDS ; ADDR. OF LINE CARD STATUS BYTE |
| 0449 F1 | 1835 | MOV A,@R1 |
| 044A 7650 | 1836 | JF1 $+6 ; SKIP NEXT 3 INSTRUCTIONS IF 'F1' = 1 |
| | 1837 | |
| | 1838 ; REQUEST COMMAND WAS RECEIVED OVER 'A' PCM HIGHWAY | |
| 044C 53FB | 1839 | ANL A,#0FBH ; CLEAR 'RQST A BAR/B' (BIT 2) |
| 044E A1 | 1840 | MOV @R1,A |
| 044F 83 | 1841 | RET |
| | 1842 | |
| | 1843 ; REQUEST COMMAND WAS RECEIVED OVER 'B' PCM HIGHWAY | |
| 0450 4304 | 1844 | ORL A,#04H ; SET 'RQST A BAR/B' (BIT 2) |
| 0452 A1 | 1845 | MOV @R1,A |
| 0453 83 | 1846 | RET |
| | 1847 | |
| | 1848 ;*** END OF RQST *** | |
| | 1849 $EJECT | |
| | 1850 | |
| | 1851 ; NAME DTR | |
| | 1852 | |
| | 1853 ; | |
| | 1854 ; | |
| | 1855 ; | |
| | 1856 | |
| | 1857 ; DTR -- DISPLAY SELF-TEST RESULTS AND FLASH THE 'BUSY INDICATE' | |
| | 1858 ; LED IF A HARDWARE FAILURE WAS DETECTED | |
| | 1859 | |
| 0454 BA04 | 1860 DTR: | MOV R2,#4 |
| 0456 B82A | 1861 | MOV R0,#TESTR |
| 0458 27 | 1862 | CLR A |
| 0459 40 | 1863 DTR2: | ORL A,@R0 ; READ NEXT 'TEST RESULTS' BYTE |
| 045A 9671 | 1864 | JNZ BADB ; JUMP TO BADB IF ANY ERROR WAS DETECTED |
| 045C 18 | 1865 | INC R0 |
| 045D EA59 | 1866 | DJNZ R2,DTR2 ; REPEAT FOR ALL TEST RESULTS BYTES |
| | 1867 | |
| | 1868 ; BOARD GOOD -- NO ERRORS WERE DETECTED BY SELF-TEST SOFTWARE | |
| 045F F0 | 1869 | MOV A,@R0 ; READ 'GOOD BOARD' DOWN COUNTER |
| 0460 9663 | 1870 | JNZ $+3 ; SKIP NEXT INSTR. IF DOWN COUNT NON ZERO |
| 0462 93 | 1871 | RETR |
| 0463 18 | 1872 | INC R0 ; ADDR. OF 'BLINK COUNTER' |
| 0464 10 | 1873 | INC @R0 ; INCREMENT 'BLINK COUNTER' |
| 0465 F0 | 1874 | MOV A,@R0 |

```
LOC  OBJ       LINE      SOURCE STATEMENT

0466 C66C      1875          JZ      DTR3
0468 F270      1876          JB7     BLNK1   ; SLOW BLINK FOR A GOOD BOARD
046A 947A      1877          JMP     BLNK0
               1878 DTR3:
               1879 ; IF 'BLINK COUNTER' = 0, THEN DECREMENT 'GOOD BOARD' DOWN COUNTER
046C C8        1880          DEC     R0
046D F0        1881          MOV     A,@R0
046E 07        1882          DEC     A
046F A0        1883          MOV     @R0,A
0470 93        1884          RETR
               1885
               1886 BADB:
               1887 ; BOARD BAD — SELF-TEST SOFTWARE DETECTED A HARDWARE MALFUNCTION
0471 B82F      1888          MOV     R0,#BLINKC
0473 10        1889          INC     @R0     ; INCREMENT 'BLINK COUNTER'
0474 F0        1890          MOV     A,@R0
0475 F278      1891          JB7     BLNKX   ; BLINK ONLY HALF THE TIME, DISPLAY 'BUSY' STATUS
0477 93        1892          RETR            ;   THE OTHER HALF.
0478 927D      1893 BLNKX:   JB4     BLNK1   ; FAST BLINK FOR BAD BOARD
               1894
047A 9AEF      1895 BLNK0:   ANL     P2,#0EFH ; TURN-OFF LED
047C 93        1896          RETR
               1897
047D 8A10      1898 BLNK1:   ORL     P2,#10H  ; TURN-ON LED
047F 93        1899          RETR
               1900 ;*** END OF DTR ***
               1901 $EJECT
               1902
               1903 ;        NAME             LDFXAD
               1904
               1905 ;
               1906 ;
               1907 ;
               1908
               1909 ; LDFXAD — LOAD LINE CARD'S FIXED ADDRESS INTO CONTROL COMM. I.C.'S
               1910 ;              EXPECTED ADDRESS REG.
               1911
               1912 LDFXAD:
               1913 ; CLEAR 'LOAD BAR' & 'CLK' INPUTS OF 'FIXED ADDRESS' SHIFT REG
0480 9ADE      1914          ANL     P2,#0DEH
               1915
               1916 ; SET 'LOAD BAR' INPUT OF 'FIXED ADDR.' S/R
0482 8A01      1917          ORL     P2,#01H
               1918
               1919 ; INITIALIZE BIT COUNTER
0484 B808      1920          MOV     R0,#8
               1921
0486 97        1922 LFA1:    CLR     C       ; CLEAR C FLAG
0487 268A      1923          JNT0    $+3
0489 A7        1924          CPL     C       ; SET C IF NEXT BIT=1
               1925
               1926 ; C = NEXT BIT OF FIXED ADDR.
048A F7        1927          RLC     A       ; MOVE NEXT BIT INTO LSB OF ACCUMULATOR
               1928
               1929 ; PULSE CLOCK LINE
```

```
LOC  OBJ        LINE       SOURCE STATEMENT 048B 4A20       1930            ORL    P2,#20H
048D 5ADF       1931            ANL    P2,#0DFH
                1932
048F E886       1933            DJNZ   R0,LFA1
                1934
0491 B808       1935            MOV    R0,#CFXADD
0493 90         1936            MOVX   @R0,A    ; LOAD 'FIXED ADDRESS' INTO CONTROL COMM. I.C.
                1937
0494 83         1938            RET
                1939
                1940 ;*** END OF LDFXAD ***
                1941 $EJECT
                1942
                1943 ;      NAME           LNTST
                1944
                1945 ;
                1946 ;
                1947 ;
                1948
                1949 ; LNTST -- LINE TEST ROUTINE
                1950
                1951 LNTST:
0495 18         1952            INC    R0
0496 80         1953            MOVX   A,@R0
0497 90         1954            MOVX   @R0,A
0498 14E4       1955            CALL   FRWAIT  ; ECHO COMMAND AS RESPONSE
                1956
                1957 ; TEST DIGITAL PER-LINE CUSTOM I.C.
049A F400       1958            CALL   DIGICT
                1959
                1960 ; TEST ANALOG PER-LINE CUSTOM I.C.
049C F44D       1961            CALL   ANAICT
                1962
                1963 ; PERFORM CHECKSUM TEST OF PROGRAM MEMORY
049E 94D8       1964            CALL   ROMT
                1965
                1966 ; RETURN S/H DATA ON PORT 1 INPUTS
04A0 74E4       1967            CALL   RTNSH
                1968
04A2 83         1969            RET
                1970
                1971 ;*** END OF LNTST ***
                1972 $EJECT
                1973
                1974 ;      NAME           DELAY
                1975
                1976 ;
                1977 ;
                1978 ;
                1979
                1980 ; DELAY -- DELAY SUBROUTINE, THE CONTENTS OF THE 'A' REG. AT ENTRY
                1981 ;          IS THE DELAY IN MILLISECONDS.
                1982
                1983 DELAY:
04A3 AA         1984            MOV    R2,A
```

```
LOC  OBJ        LINE      SOURCE STATEMENT

04A4 235A       1985          MOV    A,#90    ; 90 @ 4.096 MHZ, 132 @ 6 MHZ,
                1986                           ; 180 @ 8.192 MHZ, 242 @ 11 MHZ
04A6 07         1987          DEC    A
04A7 96A6       1988          JNZ    $-1
04A9 EAA4       1989          DJNZ   R2,$-5
04AB 83         1990          RET
                1991
                1992 ;*** END OF DELAY ***
                1993 $EJECT
                1994
                1995 ;      NAME        RSDHS
                1996
                1997 ;
                1998 ;
                1999 ;
                2000
                2001 ; RSDHS — RESET 'DELTA HOOK STATUS' BIT OF THE SPECIFIED LINE CKT.
                2002
                2003 RSDHS:
                2004 ; ECHO COMMAND BYTE 4 TO SET 'RESPONSE ENA' FF
04AC 18         2005          INC    R0
04AD 80         2006          MOVX   A,@R0
04AE 90         2007          MOVX   @R0,A
                2008
                2009 ; CLEAR SELECTED LINE CIRCUIT'S 'DELTA H/S' BIT
04AF B922       2010          MOV    R1,#DLTAHS
04B1 F1         2011          MOV    A,@R1
04B2 5F         2012          ANL    A,R7     ; CLEAR BIT OF 'DLTAHS' CORRESPONDING TO
04B3 A1         2013          MOV    @R1,A    ;   SPECIFIED LINE CKT.
04B4 96BC       2014          JNZ    RSDHS1
                2015
                2016 ; ALL 'DLTAHS' BITS ARE ZERO, CLEAR "OR'D DELTA H/S" BIT OF 'LNCRDS'
04B6 B920       2017          MOV    R1,#LNCRDS
04B8 F1         2018          MOV    A,@R1
04B9 53FE       2019          ANL    A,#0FEH
04BB A1         2020          MOV    @R1,A
                2021
04BC 83         2022 RSDHS1: RET
                2023
                2024 ;*** END OF RSDHS ***
                2025 $EJECT
                2026
                2027 ;      NAME        SMPTX4
                2028
                2029 ;
                2030 ;
                2031 ;
                2032
                2033 ; SMPTX4 — SAMPLES TX PCM CHANNEL 4 AND COUNTS THE NUMBER OF OCCURRANCES
                2034 ;          OF THE PCM VALUE CORRESPONDING TO THE ABSOLUTE PEAK AMPLITUDE
                2035 ;          OF THE SIGNAL ON CHAN. 4.  THE NUMBER OF SAMPLES TAKEN IS
                2036 ;          SPECIFIED IN COMMAND BYTE 3 (THE MIN. NUMBER OF SAMPLES IS 1,
                2037 ;          THE MAX. IS 256 (0).)
                2038
                2039 SMPTX4:
```

```
LOC  OBJ       LINE       SOURCE STATEMENT

04BD 9440      2040            CALL    RQST
04BF C8        2041            DEC     R0
04C0 80        2042            MOVX    A,@R0   ; FETCH NO. OF SAMPLES TO BE EXAMINED
04C1 AA        2043            MOV     R2,A
               2044
               2045 ; WAIT FOR RESPONSE FRAME, RETURN RESPONSE, THEN CONTINUE
04C2 14E4      2046            CALL    FRWAIT
               2047
               2048 ; SAMPLE TX CHAN. 4 (R2) TIMES
04C4 B4C7      2049            CALL    FPL     ; TAKE THE NUMBER OF SAMPLES SPECIFIED IN R2
               2050                            ;   (ABSOLUTE PEAK PCM VALUE RETURNED IN R4,
               2051                            ;    NUMBER OF OCCURANCES IS RETURNED IN R3)
               2052
               2053 ; PUT PEAK VALUE & NO. OF OCCURANCES IN REQUESTED DATA BYTES
04C6 B926      2054            MOV     R1,#RQBYT1
04C8 FC        2055            MOV     A,R4
04C9 A1        2056            MOV     @R1,A   ; FETCH PEAK VALUE AND PUT IN 'RQBYT1'
04CA 19        2057            INC     R1
04CB FB        2058            MOV     A,R3
04CC A1        2059            MOV     @R1,A   ; FETCH NO. OF OCCURANCES AND PUT IN 'RQBYT2'
               2060
               2061 ; JUMP INTO GNADJ SUBROUTINE TO FINISH UP
04CD A4B2      2062            JMP     ENDADJ
               2063
               2064 ;*** END OF SMPTX4 ***
               2065 $EJECT
               2066
               2067 ;       NAME            RDROM
               2068
               2069 ;
               2070 ;
               2071 ;
               2072
               2073 ; RDROM -- READ BYTE OF PROGRAM MEMORY SPECIFIED BY BITS (2-0) OF FUNCTION
               2074 ;         CODE BYTE AND BITS (7-0) OF COMMAND BYTE 3 TO FORM AN
               2075 ;         ELEVEN-BIT ADDRESS (FUNCTION CODE BITS (2-0) ARE MOST SIGNIFICANT)
               2076
               2077 RDROM:
04CF FE        2078            MOV     A,R6
04D0 AA        2079            MOV     R2,A    ; PAGE SELECT
04D1 80        2080            MOVX    A,@R0
04D2 AB        2081            MOV     R3,A    ; BYTE SELECT
04D3 18        2082            INC     R0
04D4 F4DD      2083            CALL    GETROM
04D6 90        2084            MOVX    @R0,A   ; PUT FETCHED DATA IN RESPONSE REG. BYTE 4
04D7 83        2085            RET
               2086
               2087 ;*** END OF RDROM ***
               2088 $EJECT
               2089
               2090 ;       NAME            RQMT
               2091
               2092 ;
               2093 ;
               2094 ;
```

```
LOC  OBJ        LINE       SOURCE STATEMENT 2095
                2096 ; ROMT — CHECKSUM TEST OF PROGRAM MEMORY
                2097
                2098 ROMT:
                2099 ; CLEAR 'ROM TEST FAILED' FLAG
04D8 B92A       2100        MOV    R1,#TESTR
04DA F1         2101        MOV    A,@R1
04DB 53FD       2102        ANL    A,#0FDH
04DD A1         2103        MOV    @R1,A
                2104
                2105 ; INITIALIZE CHECKSUM BYTE AND ADDRESS POINTERS
04DE BC00       2106        MOV    R4,#0   ; CHECKSUM BYTE
04E0 BB00       2107        MOV    R3,#0   ; BYTE POINTER
04E2 BA08       2108        MOV    R2,#8   ; PAGE POINTER
                2109
                2110 ; SUM ALL BYTES OF PROGRAM MEMORY
04E4 F4DD       2111        CALL   GETROM
04E6 6C         2112        ADD    A,R4
04E7 AC         2113        MOV    R4,A
04E8 EBE4       2114        DJNZ   R3,$-4  ; HAVE ALL BYTES OF THIS PAGE BEEN SUMMED?
04EA EAE4       2115        DJNZ   R2,$-6  ; HAVE ALL PAGES BEEN SUMMED?
                2116
                2117 ; TEST CHECK SUM FOR ZERO
04EC 96EF       2118        JNZ    ROMF    ; TEST FAILS IF CHECKSUM NOT ZERO
04EE 83         2119        RET
                2120
                2121 ROMF:
                2122 ; CHECKSUM NOT ZERO----SET 'ROM TEST FAILED' FLAG
04EF F1         2123        MOV    A,@R1
04F0 4302       2124        ORL    A,#2
04F2 A1         2125        MOV    @R1,A
04F3 83         2126        RET
                2127
                2128 ;*** END OF ROMT ***
                2129 $EJECT
                2130
                2131 ;       NAME        RGNADJ
                2132
                2133 ;
                2134 ;
                2135 ;
                2136
                2137 ; RGNADJ — RX GAIN AUTO-ADJUST ROUTINE
                2138
0500            2139        ORG    500H
                2140 RGNADJ:
                2141 ; SET FLAG F0 (RX GAIN ADJ. OPERATION)
0500 85         2142        CLR    F0
0501 95         2143        CPL    F0
                2144
                2145 ; SAVE 2ND LINE CIRCUIT'S 'INDEX' IN TEMP1
0502 B96B       2146        MOV    R1,#TEMP1
0504 80         2147        MOVX   A,@R0
0505 5307       2148        ANL    A,#7
0507 A1         2149        MOV    @R1,A
```

```
LOC  OBJ      LINE       SOURCE STATEMENT 2150
              2151 ; ECHO COMMAND BYTE 4 TO SET 'RESPONSE ENA' FF
0508 18       2152           INC    R0
0509 80       2153           MOVX   A,@R0
050A 90       2154           MOVX   @R0,A
              2155
              2156 ; WAIT FOR RESPONSE FRAME
050B 14E4     2157           CALL   FRWAIT
              2158
              2159 ; ARE 2ND LINE CKT'S 'INDEX' & SELECTED LINT CKT'S 'INDEX' EQUAL?
050D B96B     2160           MOV    R1,#TEMP1
050F F1       2161           MOV    A,@R1
0510 DE       2162           XRL    A,R6
0511 9614     2163           JNZ    RGA1
              2164
              2165 ; INDICES ARE EQUAL----TEST CANNOT BE PERFORMED
0513 83       2166           RET
              2167
              2168 RGA1:
              2169 ; PULL-IN 'TEST RELAY', ETC. FOR SELECTED LINE CKT.
              2170 ; EVEN BAR/ODD = 1, EURO SEL = 0, POWER = 1, TR BAR = 0,
              2171 ; RR BAR = 1, LC ENA = 0, ILS = 0, A BAR/B PCM SEL = 0
0514 BAA8     2172           MOV    R2,#0A8H
0516 3431     2173           CALL   LDDIG  ; LOAD DIGITAL I.C. & RETURN WITH LINE CKT. IN
              2174                          ;     'RETURN S/H' MODE
              2175
              2176 $EJECT
              2177 ; PULL-IN 'TEST RELAY', ETC. FOR 2ND LINE CKT.
0518 B96B     2178           MOV    R1,#TEMP1
051A 2E       2179           XCH    A,R6
051B 21       2180           XCH    A,@R1
051C AE       2181           MOV    R6,A
051D 23EF     2182           MOV    A,#(CLKVCT-(100H*(CLKVCT/100H)))
051F 6E       2183           ADD    A,R6
0520 E3       2184           MOVP3  A,@A   ; TABLE LOOK-UP 2ND LINE CKT'S 'CLK VECTOR'
0521 AF       2185           MOV    R7,A
              2186
              2187 ; EVEN BAR/ODD = 0, EURO SEL = 0, POWER = 1, TR BAR = 0, RR BAR = 1,
              2188 ; LC ENA = 1, ILS = 0, A BAR/B PCM SEL = 0
0522 BA2C     2189           MOV    R2,#2CH
0524 3431     2190           CALL   LDDIG  ; LOAD DIGITAL I.C. & RETURN WITH LINE CIRCUIT
              2191                          ;     IN 'RETURN S/H' MODE
              2192
              2193 ; ASSIGN 2ND LINE CKT'S TX & RX CHANNELS
0526 2340     2194           MOV    A,#40H ; TX PCM CH. 4 ===> CODEC TX CH. 0
0528 942F     2195           CALL   CODEC
052A 238A     2196           MOV    A,#0AH ; RX PCM NOT USED ===> CODEC RX CH. 0AH
052C 942F     2197           CALL   CODEC  ; CODEC SUBROUTINE RETURNS WITH LINE CKT.
              2198                          ;     IN 'RETURN S/H' MODE
              2199
              2200 ; ASSIGN SELECTED LINE CKT'S TX & RX CHANNELS
052E B96B     2201           MOV    R1,#TEMP1
0530 2E       2202           XCH    A,R6
0531 21       2203           XCH    A,@R1
0532 AE       2204           MOV    R6,A
```

```
LOC  OBJ       LINE      SOURCE STATEMENT 0533 23EF      2205          MOV    A,#(CLKVCT-(100H*(CLKVCT/100H)))
0535 6E        2206          ADD    A,R6
0536 E3        2207          MOVP3  A,@A         ; TABLE LOOK-UP SELECTED LINE CKT'S 'CLK VECT'
0537 AF        2208          MOV    R7,A
               2209
0538 2340      2210          MOV    A,#40H       ; NOT INTERESTED IN SELECTED LINE CKT'S TX PCM
053A 942F      2211          CALL   CODEC
053C 2389      2212          MOV    A,#89H       ; RECEIVE 'DIGITAL MILLIWATT' ON RX PCM CH. 9
053E 942F      2213          CALL   CODEC
               2214
0540 A454      2215          JMP    GNADJ
               2216
               2217 ;*** END OF RGNADJ ***
               2218 $EJECT
               2219
               2220 ;          NAME          TGNADJ
               2221
               2222 ;
               2223 ;
               2224 ;
               2225
               2226 ; TGNADJ -- TX GAIN AUTO-ADJUST ROUTINE
               2227
               2228 TGNADJ:
               2229 ; CLEAR FLAG F0 (TX GAIN ADJ. OPERATION)
0542 85        2230          CLR    F0
               2231
               2232 ; ECHO COMMAND BYTE 4 TO SET 'RESPONSE ENA' FF
0543 18        2233          INC    R0
0544 80        2234          MOVX   A,@R0
0545 90        2235          MOVX   @R0,A
               2236
               2237 ; WAIT FOR RESPONSE FRAME
0546 14E4      2238          CALL   FRWAIT
               2239
               2240 ; PULL-IN 'TEST RELAY', ETC.
               2241 ; EVEN BAR/ODD = 0, EURO SEL = 0, POWER = 1, TR BAR = 0,
               2242 ; RR BAR = 1, LC ENA = 1, ILS = 0, A BAR/B PCM SEL = 0
0548 BA2C      2243          MOV    R2,#2CH
054A 3431      2244          CALL   LDDIG
               2245
               2246 ; ASSIGN TX & RX CHANNELS
054C 2340      2247          MOV    A,#40H       ; TX PCM CH. 4 ==> CODEC TX CH. 0
054E 942F      2248          CALL   CODEC
0550 233A      2249          MOV    A,#03AH      ; RX PCM NOT NEEDED FOR TEST
0552 942F      2250          CALL   CODEC        ; CODEC SUBROUTINE RETURNS WITH LINE CIRCUIT
               2251                              ;  IN 'RETURN S/H' MODE
               2252
               2253 ; ENTER 'GNADJ'
               2254
               2255 ;*** END OF TGNADJ ***
               2256 $EJECT
               2257
               2258 ;          NAME          GNADJ
               2259
```

```
LOC  OBJ        LINE    SOURCE STATEMENT

2260  ;
                2261  ;
                2262  ;
                2263
                2264  ; GNADJ -- GAIN AUTO-ADJUST ROUTINE (CONTINUATION OF RGNADJ & TGNADJ)
                2265
                2266  GNADJ:
                2267  ; WAIT FOR RELAY CONTACT BOUNCE TO STOP.
0554 B868       2268          MOV     R0,#RELAYD
0556 F0         2269          MOV     A,@R0     ; GET RELAY DEBOUNCE DELAY VALUE
0557 94A3       2270          CALL    DELAY
                2271
                2272  ; INITIALIZE SELECTED LINE CKT'S GAIN SETTING (TX GAIN IF F0=0,
                2273  ;   RX GAIN IF F0=1)
0559 54E1       2274          CALL    RGNADD
055B B65E       2275          JF0     $+3       ; SKIP NEXT INSTR. IF RX GAIN ADJ.
055D C9         2276          DEC     R1        ; ADJUST R1 TO POINT TO 'TX GAIN' BYTE
055E B100       2277          MOV     @R1,#0
0560 3492       2278          CALL    LDGAIN    ; LOAD GAIN SETTING INTO ANALOG I.C.
                2279
                2280  GETPK:
                2281  ; WAIT FOR TEST SIGNAL TO STABLIZE AFTER GAIN CHANGE
0562 B869       2282          MOV     R0,#GNDEL
0564 F0         2283          MOV     A,@R0     ; GET GAIN ADJUST DELAY VALUE
0565 94A3       2284          CALL    DELAY
                2285
                2286  ; FIND PEAK PCM LEVEL (RETURNS 'PEAK LEVEL' IN R4, 'PEAK COUNT' IN R3)
0567 B4C7       2287          CALL    FPL
                2288
                2289  ; IS 'PEAK LEVEL' < 8 (GAIN TOO HIGH) ?
0569 FC         2290          MOV     A,R4
056A 03F8       2291          ADD     A,#0F8H   ; ADD 2'S COMPLEMENT OF 8 TO 'PEAK LEVEL' VALUE
                2292                            ; CARRY FLAG WILL BE SET IF 'PEAK LEVEL')=8
056C E690       2293          JNC     GNERR1    ; GAIN TOO HIGH---HARDWARE ERROR
056E 9681       2294          JNZ     GNLO
                2295
                2296  ; 'PEAK LEVEL' VALUE = 8 OR 9
                2297  ; IS 'PEAK COUNT' < 9 (GAIN TOO LOW) ?
0570 FB         2298          MOV     A,R3
0571 03F7       2299          ADD     A,#0F7H   ; ADD 2'S COMPLEMENT OF 9 TO 'PEAK COUNT'
                2300                            ; CARRY FLAG WILL BE SET IF 'PEAK COUNT'<9
0573 E681       2301          JNC     GNLO
                2302
                2303  ; IS 'PEAK COUNT' >= 16 (GAIN TOO HIGH) ?
0575 FB         2304          MOV     A,R3
0576 03F0       2305          ADD     A,#0F0H   ; ADD 2'S COMPL. OF 16 TO 'PEAK COUNT'
0578 F690       2306          JC      GNERR1    ; IF CARRY FLAG SET, 'PEAK COUNT')=16 WHICH
                2307                            ; MEANS THAT GAIN CANNOT BE ADJUSTED WITHIN
                2308                            ; THE REQUIRED BAND---HARDWARE ERROR
                2309
                2310  $EJECT
                2311  ; GAIN IS SET WITHIN TOLERANCE---CLEAR 'ANALOG I.C. FAILED' BIT OF 'TESTRA'
057A B92D       2312          MOV     R1,#TESTRA
057C F1         2313          MOV     A,@R1
057D 5F         2314          ANL     A,R7
```

```
LOC  OBJ        LINE       SOURCE STATEMENT

057E A1         2315           MOV     @R1,A
057F A4A2       2316           JMP     GNADJ1
                2317
                2318 GNLO:
                2319 ; GAIN SETTING TOO LOW----INCREMENT PRESENT SETTING BY ONE
0581 54E1       2320           CALL    RGNADD
0583 B686       2321           JF0     $+3     ; SKIP NEXT INSTR. IF RX GAIN ADJ.
0585 C9         2322           DEC     R1
0586 F1         2323           MOV     A,@R1
0587 D31F       2324           XRL     A,#1FH  ; IS GAIN ALREADY AT MAX. VALUE?
0589 C69C       2325           JZ      GNERR2  ; IF ALREADY AT MAX. GAIN SETTING, THEN
                2326 ;                                 MAX. GAIN TOO LOW----HARDWARE ERROR
058B 11         2327           INC     @R1     ; INCREMENT 'GAIN' BYTE IN MEMORY
058C 3492       2328           CALL    LDGAIN  ; LOAD NEW GAIN SETTING INTO ANALOG I.C.
058E A462       2329           JMP     GETPK
                2330
                2331 GNERR1:
                2332 ; DECREMENT GAIN SETTING BY ONE (IF NOT AT MIN.)
0590 54E1       2333           CALL    RGNADD
0592 B695       2334           JF0     $+3     ; SKIP NEXT INSTR. IF RX GAIN ADJ.
0594 C9         2335           DEC     R1
0595 F1         2336           MOV     A,@R1
0596 C69C       2337           JZ      GNERR2  ; CHECK IF ALREADY ZERO
0598 07         2338           DEC     A
0599 A1         2339           MOV     @R1,A
059A 3492       2340           CALL    LDGAIN
                2341
                2342 GNERR2:
                2343 ; SET 'FAILED TEST' BIT OF 'TESTRA' FOR SELECTED LINE CKT.
059C B92D       2344           MOV     R1,#TESTRA
059E FF         2345           MOV     A,R7
059F 37         2346           CPL     A
05A0 41         2347           ORL     A,@R1
05A1 A1         2348           MOV     @R1,A
                2349
                2350 GNADJ1:
                2351 ; PUT CODEC IN 'STANDBY' MODE
05A2 23FF       2352           MOV     A,#0FFH
05A4 942F       2353           CALL    CODEC
                2354
                2355 ; RELEASE 'TEST RELAY', ETC.
05A6 2330       2356           MOV     A,#LCST1
05A8 6E         2357           ADD     A,R6
05A9 A9         2358           MOV     R1,A
05AA B118       2359           MOV     @R1,#IDIG
05AC BA18       2360           MOV     R2,#IDIG
05AE 3431       2361           CALL    LDDIG
                2362 $EJECT
                2363 ; REPEAT FOR 2ND LINE CKT. IF RX GAIN ADJ.
05B0 B6BA       2364           JF0     GNADJ2
                2365
                2366 ENDADJ:
                2367 ; RESET FRAME COUNTER TO INITIALIZATION VALUE
05B2 65         2368           STOP    TCNT
```

```
LOC  OBJ        LINE       SOURCE STATEMENT

05B3 2318       2369            MOV     A,#18H
05B5 62         2370            MOV     T,A
05B6 45         2371            STRT    CNT
05B7 16BA       2372            JTF     $+3         ; RESET TIMER FLAG
05B9 83         2373            RET
                2374
                2375 GNADJ2:
                2376 ; PUT 2ND LINE CKT'S 'INDEX' & 'CLOCK VECTOR' INTO THE SELECTED
                2377 ;   LINE CIRCUIT'S 'INDEX' & 'CLOCK VECTOR' REGISTERS.
05BA 85         2378            CLR     F0
05BB B96B       2379            MOV     R1,#TEMP1
05BD 2E         2380            XCH     A,R6
05BE 21         2381            XCH     A,@R1
05BF AE         2382            MOV     R6,A        ; 2ND LINE CKT'S 'INDEX' IN R6
05C0 23EF       2383            MOV     A,#(CLKVCT-(100H*(CLKVCT/100H)))
05C2 6E         2384            ADD     A,R6
05C3 E3         2385            MOVP3   A,@A
05C4 AF         2386            MOV     R7,A        ; 2ND LINE CKT'S 'CLOCK VECTOR' IN R7
05C5 A4A2       2387            JMP     GNADJ1
                2388
                2389 ;*** END OF GNADJ ***
                2390 $EJECT
                2391
                2392 ;       NAME        FPL
                2393
                2394 ;
                2395 ;
                2396 ;
                2397
                2398 ; FPL -- FIND PEAK PCM LEVEL SUBROUTINE
                2399
                2400 FPL:
05C7 BA7D       2401            MOV     R2,#125     ; INITIALIZE SAMPLE COUNTER
05C9 B809       2402            MOV     R0,#9       ; ADDR. OF PCM SAMPLING REG.
05CB BB00       2403            MOV     R3,#0       ; INITIALIZE PEAK COUNTER
05CD BC7F       2404            MOV     R4,#7FH     ; INITIALIZE PEAK LEVEL BYTE
                2405
05CF 45         2406            STRT    CNT
05D0 42         2407            MOV     A,T
05D1 37         2408            CPL     A
05D2 07         2409            DEC     A           ; 2'S COMPL. OF STARTING FRAME COUNT
05D3 A9         2410            MOV     R1,A
                2411
05D4 42         2412 NXTSMP:    MOV     A,T
05D5 69         2413            ADD     A,R1
05D6 96D4       2414            JNZ     NXTSMP      ; WAIT UNTIL NEXT SAMPLE'S FRAME BEGINS
05D8 00         2415            NOP
05D9 00         2416            NOP                 ; WILL WORK AS-IS UP TO 8.192 MHZ
05DA 00         2417            NOP                 ; TWO MORE NO-OP'S ARE NEEDED FOR RELIABLE
                2418                                ;    OPERATION AT 11 MHZ.
05DB 80         2419            MOVX    A,@R0       ; FETCH NEXT PCM SAMPLE
05DC C9         2420            DEC     R1
05DD 537E       2421            ANL     A,#7EH      ; MASK OFF SIGN BIT & LSB
05DF AD         2422            MOV     R5,A        ; TEMP. SAVE IN R5
                2423
```

```
LOC  OBJ        LINE        SOURCE STATEMENT

05E0 37         2424            CPL     A
05E1 17         2425            INC     A       ; 2'S COMPL OF SAMPLE
05E2 6C         2426            ADD     A,R4    ; CARRY SET IF SAMPLE <= CURRENT PEAK VALUE
05E3 E6E8       2427            JNC     NOPEAK
05E5 96EB       2428            JNZ     NEWPK
05E7 1B         2429            INC     R3      ; SAMPLE=CURRENT PEAK VALUE, INCREMENT PEAK CNT.
05E8 EAD4       2430 NOPEAK:    DJNZ    R2,NXTSMP ; ANY MORE SAMPLES?
05EA 83         2431            RET
                2432
05EB FD         2433 NEWPK:     MOV     A,R5
05EC AC         2434            MOV     R4,A    ; SAMPLE VALUE BECOMES NEW PEAK VALUE
05ED BB01       2435            MOV     R3,#1   ; RESET PEAK COUNTER
05EF EAD4       2436            DJNZ    R2,NXTSMP ; ANY MORE SAMPLES?
05F1 83         2437            RET
                2438
                2439 ;*** END OF FPL ***
                2440 $EJECT
                2441
                2442 ;       NAME            SLFTST
                2443
                2444 ;
                2445 ;
                2446 ;
                2447
                2448 ;  SLFTST -- LINE CARD SELF-TEST ROUTINE
                2449
0600            2450            ORG     600H
                2451 SLFTST:
                2452 ; CHECK DATA MEMORY
0600 E48A       2453            JMP     RAMT
                2454 RAMRET:
                2455 ; INITIALIZE TEST RESULTS BYTES
0602 B82D       2456            MOV     R0,#TESTR+3
0604 B903       2457            MOV     R1,#3
0606 B000       2458            MOV     @R0,#0
0608 C8         2459            DEC     R0
0609 E906       2460            DJNZ    R1,$-3
                2461
                2462 ; CHECK PROGRAM MEMORY
060B 94D8       2463            CALL    ROMT
                2464
                2465 ; CHECK PER-CARD CUSTOM CONTROL COMMUNICATIONS I.C.
060D D424       2466            CALL    COMICT
                2467
                2468 ; CHECK DIGITAL & ANALOG PER-LINE CUSTOM I.C.'S
060F 7445       2469            CALL    RAMRS
                2470 ;##################################################################
0611 BE02       2471            MOV     R6,#2   ;
0613 BFFD       2472            MOV     R7,#0FDH ;
                2473 ;##################################################################
0615 CE         2474 ST1:       DEC     R6      ; NEXT LINE CKT. TO BE TESTED
0616 F400       2475            CALL    DIGICT  ; TEST DIGITAL PER-LINE CUSTOM I.C.
0618 F44D       2476            CALL    ANAICT  ; TEST ANALOG PER-LINE CUSTOM I.C.
061A FF         2477            MOV     A,R7
061B 77         2478            RR      A
```

```
LOC  OBJ       LINE      SOURCE STATEMENT

061C AF        2479          MOV     R7,A      ; NEXT LINE CKT'S CLOCK VECTOR
061D FE        2480          MOV     A,R6
061E 9615      2481          JNZ     ST1       ; HAVE ALL LINE CKTS. BEEN TESTED?
               2482
               2483 ; RETURN S/H ON PORT 1
0620 74E4      2484          CALL    RTNSH
               2485
               2486 ; RETURN TO POWER-ON RESET SEQUENCE
0622 6413      2487          JMP     STRET     ; SELF TEST ROUTINE'S RETURN ADDRESS
               2488
               2489 ;*** END OF SLFTST ***
               2490 $EJECT
               2491
               2492 ;        NAME          COMICT
               2493
               2494 ;
               2495 ;
               2496 ;
               2497
               2498 ; COMICT -- TEST ROUTINE FOR THE PER-CARD CUSTOM CONTROL
               2499 ;              COMMUNICATIONS I.C.
               2500
               2501 COMICT:
0624 15        2502          DIS     I
               2503
               2504 ; RESET 'COM I.C. FAILED' BIT OF TESTR
0625 B92A      2505          MOV     R1,#TESTR
0627 F1        2506          MOV     A,@R1
0628 53FB      2507          ANL     A,#0FBH
062A A1        2508          MOV     @R1,A
               2509
               2510 ; CHECK OPERATION OF MODE REGISTER (WALKING 1/0 TEST)
               2511 ;   WALKING 1'S TEST
062B B900      2512          MOV     R1,#CMODE
062D BC00      2513          MOV     R4,#0     ; INITIALIZE TEST DATA BYTE
062F BA08      2514          MOV     R2,#8     ; INITIALIZE TEST COUNTER
               2515 WALK1:
0631 FC        2516          MOV     A,R4
0632 91        2517          MOVX    @R1,A
0633 81        2518          MOVX    A,@R1     ; WRITE THEN READ BACK NEXT TEST BYTE
0634 DC        2519          XRL     A,R4      ; COMPARE WITH EXPECTED DATA
0635 96C7      2520          JNZ     CFAIL
0637 FC        2521          MOV     A,R4
0638 97        2522          CLR     C
0639 A7        2523          CPL     C         ; SET C
063A F7        2524          RLC     A
063B AC        2525          MOV     R4,A      ; PUT NEXT TEST DATA BYTE INTO R4
063C EA31      2526          DJNZ    R2,WALK1
               2527
               2528 ;   WALKING 0'S TEST
063E BA08      2529          MOV     R2,#8
               2530 WALK0:
0640 FC        2531          MOV     A,R4
0641 91        2532          MOVX    @R1,A
0642 81        2533          MOVX    A,@R1
```

```
LOC  OBJ        LINE       SOURCE STATEMENT

0643 DC         2534            XRL    A,R4     ; COMPARE WITH EXPECTED DATA
0644 96C7       2535            JNZ    CFAIL
0646 FC         2536            MOV    A,R4
0647 97         2537            CLR    C        ; CLEAR C
0648 F7         2538            RLC    A
0649 AC         2539            MOV    R4,A
064A EA40       2540            DJNZ   R2,WALK0
                2541
                2542  $EJECT
                2543
                2544  ; SET UP MODE CONTROL REG. FOR TEST
064C 2383       2545            MOV    A,#083H  ; 'A' SHIFT REG. FEEDBACK SELECTED
064E 91         2546            MOVX   @R1,A
                2547
                2548  ; SET UP TEST DATA IN REGS 2,3,4,&5
064F BD63       2549            MOV    R5,#63H  ; BYTE 1
0651 BCC1       2550            MOV    R4,#0C1H ; BYTE 2
0653 BBF8       2551            MOV    R3,#0F8H ; BYTE 3
0655 BA0F       2552            MOV    R2,#0FH  ; BYTE 4
                2553
                2554  ; LOAD S/R'S WITH TEST DATA AND VERIFY
0657 BE02       2555            MOV    R6,#2
0659 B80E       2556            MOV    R0,#0EH
065B 27         2557            CLR    A
065C 90         2558  COM00:    MOVX   @R0,A
065D 18         2559            INC    R0
065E B905       2560            MOV    R1,#5    ; INIT. TEST DATA POINTER
0660 BF04       2561            MOV    R7,#4    ; INIT. BYTE COUNTER
                2562  COM01:
0662 F1         2563            MOV    A,@R1
0663 37         2564            CPL    A        ; INVERT TEST DATA
0664 90         2565            MOVX   @R0,A    ; & WRITE INTO S/R
0665 C9         2566            DEC    R1
0666 EF62       2567            DJNZ   R7,COM01
                2568
                2569  ;   LOAD OTHER S/R WITH TEST DATA
0668 B905       2570            MOV    R1,#5
066A BF04       2571            MOV    R7,#4
                2572  COM02:
066C F1         2573            MOV    A,@R1
066D 90         2574            MOVX   @R0,A    ; WRITE TEST DATA INTO S/R
066E C9         2575            DEC    R1
066F EF6C       2576            DJNZ   R7,COM02
                2577
                2578  ;   VERIFY INVERTED TEST DATA IN S/R
0671 B905       2579            MOV    R1,#5
0673 BF04       2580            MOV    R7,#4
                2581  COM03:
0675 80         2582            MOVX   A,@R0    ; FETCH NEXT BYTE FROM S/R
0676 37         2583            CPL    A        ; & INVERT
0677 61         2584            XRL    A,@R1    ; COMPARE WITH EXPECTED DATA
0678 96C7       2585            JNZ    CFAIL
067A C9         2586            DEC    R1
067B EF75       2587            DJNZ   R7,COM03
                2588
                2589  $EJECT
```

```
LOC  OBJ      LINE      SOURCE STATEMENT

2590 ; VERIFY DATA IN OTHER S/R
067D B905     2591           MOV     R1,#5
067F BF04     2592           MOV     R7,#4
              2593 COM04:
0681 80       2594           MOVX    A,@R0    ; FETCH NEXT BYTE FROM S/R
0682 D1       2595           XRL     A,@R1    ;   & COMPARE WITH EXPECTED DATA
0683 96C7     2596           JNZ     CFAIL
0685 C9       2597           DEC     R1
0686 EF81     2598           DJNZ    R7,COM04
              2599
              2600 ; REPEAT ONLY INVERTING THE DATA WRITTEN EACH S/R
0688 B80E     2601           MOV     R0,#0EH
068A 2304     2602           MOV     A,#4
068C 90       2603           MOVX    @R0,A
068D EE8C     2604           DJNZ    R6,COM00
              2605
              2606 ; LOAD 'FIXED ADDRESS' REGISTER
068F B809     2607           MOV     R0,#CFXADD
0691 FB       2608           MOV     A,R3
0692 90       2609           MOVX    @R0,A
              2610
              2611 ; INITIALIZE FRAME COUNTER FOR TEST
0693 65       2612           STOP    TCNT
0694 23F6     2613           MOV     A,#0F6H  ; (-10 DECIMAL)
0696 62       2614           MOV     T,A
0697 1699     2615           JTF     $+2      ; RESETS 'TIMER FLAG'
0699 B908     2616           MOV     R1,#8
069B 45       2617           STRT    CNT
              2618
              2619 ; BEGIN TEST OF THE DYNAMIC OPERATION OF THE I.C.
069C 14D9     2620           CALL    CNTLE1   ; SYNCHRONIZES SOFTWARE TO FRAME CLOCK, THEN
              2621                            ;   ENABLES CONTROL S/R SHIFTING
069E B80D     2622           MOV     R0,#CMODE
06A0 B90C     2623           MOV     R1,#CSTS
              2624
              2625 ; WAIT UNTIL FRAME COUNTER OVERFLOWS
06A2 16A6     2626 LC005:    JTF     CCNT     ; EXIT LOOP IF TERMINAL COUNT IS REACHED
06A4 C4A2     2627           JMP     LC005    ; REPEAT LOOP
              2628
06A6 81       2629 CCNT:     MOVX    A,@R1
06A7 92A6     2630           JB4     CCNT     ; LOOP UNTIL 'CNTRL WINDOW' = 0
06A9 65       2631           STOP    TCNT     ; HALT FRAME COUNTER
06AA 27       2632           CLR     A        ;     &
06AB 90       2633           MOVX    @R0,A    ;     SHIFTING
              2634
              2635 $EJECT
              2636 ; VERIFY THAT BOTH ADDR. MATCH FLAGS ARE SET AND THAT THE FRAME
              2637 ;    COUNT IS CORRECT.
06AC 81       2638           MOVX    A,@R1
06AD 37       2639           CPL     A
06AE 12C7     2640           JB0     CFAIL    ; TEST 'A' ADDR. MATCH FLAG
06B0 32C7     2641           JB1     CFAIL    ;   "   'B'  "      "    "
              2642
              2643 ; LOAD EXPECTED DATA INTO REGS. R5, R4, R3, & R2
06B2 BDF8     2644           MOV     R5,#0F8H
```

```
LOC  OBJ        LINE    SOURCE STATEMENT

06B4 BC0F       2645            MOV     R4,#0FH
06B6 BB63       2646            MOV     R3,#63H
06B8 BAC1       2647            MOV     R2,#0C1H
                2648
                2649 ; VERIFY THE CONTENTS OF BOTH SHIFT REGISTERS
06BA D4D0       2650            CALL    DATCHK
06BC B804       2651            MOV     R0,#4
06BE D4D2       2652            CALL    DATCHK+2
06C0 748F       2653            CALL    CNTLRS  ; RESET COMM. I.C.
06C2 83         2654            RET
                2655
06C3 C7         2656 CFAIL1: MOV        A,PSW
06C4 0307       2657            ADD     A,#7    ; MODULO 8 DECREMENT OF STACK POINTER
06C6 D7         2658            MOV     PSW,A
06C7 B82A       2659 CFAIL:  MOV        R0,#TESTR
06C9 F0         2660            MOV     A,@R0
06CA 4304       2661            ORL     A,#04H  ; SET 'CTEST FAILED' FLAG
06CC A0         2662            MOV     @R0,A
06CD 748F       2663            CALL    CNTLRS  ; RESET COMM. I.C.
06CF 83         2664            RET
                2665
                2666 ; SUBROUTINE DATCHK ****************************************
06D0 B800       2667 DATCHK: MOV        R0,#0   ; R0 POINTS TO BYTE 1 OF 'A' S/R
06D2 BF04       2668            MOV     R7,#4   ; INIT. BYTE COUNTER
06D4 B905       2669            MOV     R1,#5   ; INIT. TEST DATA POINTER
                2670
06D6 80         2671 LC008:  MOVX       A,@R0   ; READ NEXT BYTE OUT OF S/R
06D7 D1         2672            XRL     A,@R1   ;   & COMPARE WITH THE EXPECTED VALUE
06D8 96C3       2673            JNZ     CFAIL1
06DA 18         2674            INC     R0      ; ADJUST R0 TO POINT TO NEXT BYTE
06DB C9         2675            DEC     R1      ; ADJUST R1 TO POINT TO NEXT EXPECTED BYTE
06DC EFD6       2676            DJNZ    R7,LC008 ; REPEAT UNTIL ALL 4 BYTES OF S/R ARE CHECKED
                2677
06DE 83         2678            RET
                2679 ; END OF DATCHK ***************************************
                2680
                2681
                2682 ;*** END OF COMICT ***
                2683 $EJECT
                2684
                2685 ;       NAME            DIGICT
                2686
                2687 ;
                2688 ;
                2689 ;
                2690
                2691 ; DIGICT -- CHECKS DIGITAL PER-LINE CUSTOM I.C.'S
                2692
0700            2693            ORG     700H
                2694 DIGICT:
                2695 ; INITIALIZE 'TEST FAILED' BITS FOR DIGITAL PER-LINE CUSTOM I.C.
0700 B82C       2696            MOV     R0,#TESTRD
0702 F0         2697            MOV     A,@R0
0703 5F         2698            ANL     A,R7    ; INITIALIZE LINE CKT'S 'TESTRD' BIT
0704 A0         2699            MOV     @R0,A
```

| LOC OBJ | LINE | SOURCE STATEMENT | | |
|---|---|---|---|---|
| | 2700 | | | |
| 0705 B82B | 2701 | MOV | R0,#TESTRC | |
| 0707 F0 | 2702 | MOV | A,@R0 | |
| 0708 5F | 2703 | ANL | A,R7 | ; INITIALIZE LINE CKT'S 'TESTRC' BIT |
| 0709 A0 | 2704 | MOV | @R0,A | |
| | 2705 | | | |
| | 2706 | ; SET UP FOR DIGITAL I.C. STATUS REG. TEST | | |
| 070A BC00 | 2707 | MOV | R4,#WRDIG | |
| 070C BD90 | 2708 | MOV | R5,#RDDIG | |
| 070E 85 | 2709 | CLR | F0 | ; DIG. TEST—F0=0, CDR TEST—F0=1 |
| | 2710 | | | |
| 070F BA02 | 2711 DIG1: | MOV | R2,#2 | ; INIT. TEST COUNTER |
| 0711 B94B | 2712 | MOV | R0,#(LOW DTDATA) | ; INITIALIZE TEST DATA POINTER |
| | 2713 | | | |
| | 2714 | ; LOAD TEST DATA INTO CUSTOM I.C.'S REG. | | |
| 0713 FC | 2715 DIG2: | MOV | A,R4 | |
| 0714 9400 | 2716 | CALL | XMIT4 | |
| 0716 F8 | 2717 | MOV | A,R0 | |
| 0717 A3 | 2718 | MOVP | A,@A | ; LOAD TEST DATA INTO CUSTOM I.C. REG |
| 0718 9406 | 2719 | CALL | XMIT8 | |
| | 2720 | | | |
| | 2721 | ; VERIFY THAT DATA WERE WRITTEN CORRECTLY | | |
| 071A FD | 2722 | MOV | A,R5 | |
| 071B 9400 | 2723 | CALL | XMIT4 | |
| 071D 941C | 2724 | CALL | RCV8 | |
| 071F A9 | 2725 | MOV | R1,A | |
| 0720 F8 | 2726 | MOV | A,R0 | |
| 0721 A3 | 2727 | MOVP | A,@A | |
| 0722 D9 | 2728 | XRL | A,R1 | ; COMPARE READ DATA WITH TEST DATA |
| 0723 C62F | 2729 | JZ | NXTDIG | |
| | 2730 | | | |
| | 2731 | $EJECT | | |
| | 2732 | ; DATA DO NOT MATCH — ERROR DETECTED | | |
| 0725 B92B | 2733 | MOV | R1,#TESTRC | |
| 0727 B62B | 2734 | JF0 | CDRF | |
| 0729 B92C | 2735 | MOV | R1,#TESTRD | |
| 072B FF | 2736 CDRF: | MOV | A,R7 | |
| 072C 37 | 2737 | CPL | A | |
| 072D 41 | 2738 | ORL | A,@R1 | ; SET BIT CORRESPONDING TO THIS LINE CKT. |
| 072E A1 | 2739 | MOV | @R1,A | |
| | 2740 | | | |
| | 2741 NXTDIG: | | | |
| 072F 18 | 2742 | INC | R0 | ; ADJUST TEST DATA POINTER FOR NEXT TEST ITER. |
| 0730 EA13 | 2743 | DJNZ | R2,DIG2 | |
| | 2744 | | | |
| 0732 FC | 2745 | MOV | A,R4 | |
| 0733 9400 | 2746 | CALL | XMIT4 | |
| 0735 23FF | 2747 | MOV | A,#ICODEC | |
| 0737 B63E | 2748 | JF0 | CINIT | |
| 0739 2330 | 2749 | MOV | A,#LCST1 | |
| 073B 6E | 2750 | ADD | A,R6 | |
| 073C A9 | 2751 | MOV | R1,A | |
| 073D F1 | 2752 | MOV | A,@R1 | |
| | 2753 | | | |
| 073E 9406 | 2754 CINIT: | CALL | XMIT8 | ; RESORE CONTENTS OF REGISTER |

```
LOC  OBJ         LINE       SOURCE STATEMENT
                 2755
0740 B64A        2756            JF0     DIGEND  ; HAS CDR TEST BEEN PERFORMED?
                 2757
                 2758 ; SET UP FOR CDR TEST
0742 BC20        2759            MOV     R4,#WRCDRC
0744 BDA0        2760            MOV     R5,#RDCDR
0746 85          2761            CLR     F0
0747 95          2762            CPL     F0      ; SET F0 (INDICATES CDR TEST PHASE)
0748 E40F        2763            JMP     DIG1
                 2764
                 2765 ; DIGITAL I.C. TEST COMPLETED
074A 83          2766 DIGEND: RET
                 2767
                 2768 ; DIGITAL I.C. TEST DATA
                 2769 ;++++++++++++++++++++++++++++++++++++++++
074B 63          2770 DTDATA: DB      063H    ; TEST DATA BYTE 1
074C 9C          2771            DB      09CH    ;  "    "    "   2
                 2772 ;++++++++++++++++++++++++++++++++++++++++
                 2773
                 2774 ;*** END OF DIGICT ***
                 2775 $EJECT
                 2776
                 2777 ;       NAME            ANAICT
                 2778
                 2779 ;
                 2780 ;
                 2781 ;
                 2782
                 2783 ; ANAICT -- CHECKS ANALOG PER-LINE CUSTOM I.C.'S
                 2784
                 2785 ANAICT:
                 2786 ; RESET LINE CKT'S 'TESTRA' BIT
074D B82D        2787            MOV     R0,#TESTRA
074F F0          2788            MOV     A,@R0
0750 5F          2789            ANL     A,R7
0751 A0          2790            MOV     @R0,A
                 2791
0752 B884        2792            MOV     R0,#(LOW ATDATA)  ; INITIALIZE TEST DATA POINTER
0754 BA02        2793            MOV     R2,#2             ; INITIALIZE TEST DATA COUNTER
                 2794
                 2795 ; LOAD TEST DATA INTO ANALOG I.C.'S REG
0756 2340        2796 ANA3:   MOV     A,#WRANA
0758 9400        2797            CALL    XMIT4
075A BC03        2798            MOV     R4,#3   ; INIT. BYTE COUNTER
                 2799
075C F8          2800 ANA35:  MOV     A,R0
075D A3          2801            MOVP    A,@A    ; FETCH NEXT TEST DATA BYTE
075E 9406        2802            CALL    XMIT8   ; LOAD NEXT BYTE OF TEST DATA INTO ANA REG
0760 18          2803            INC     R0      ; INCREMENT TEST DATA POINTER
0761 EC5C        2804            DJNZ    R4,ANA35
                 2805
                 2806 ; VERIFY THAT DATA WERE WRITTEN CORRECTLY
0763 C8          2807            DEC     R0
0764 C8          2808            DEC     R0
0765 C8          2809            DEC     R0
```

| LOC OBJ | LINE | SOURCE STATEMENT | | |
|---|---|---|---|---|
| 0766 23C0 | 2810 | | MOV | A,#RDANA |
| 0768 9400 | 2811 | | CALL | XMIT4 |
| | 2812 | | | |
| 076A BC03 | 2813 | | MOV | R4,#3 ; INIT. BYTE COUNTER |
| | 2814 | | | |
| 076C 941C | 2815 ANA4: | CALL | RCV8 ; VERIFY NEXT BYTE |
| 076E A9 | 2816 | | MOV | R1,A |
| 076F F8 | 2817 | | MOV | A,R0 |
| 0770 A3 | 2818 | | MOVP | A,@A |
| 0771 D9 | 2819 | | XRL | A,R1 |
| 0772 18 | 2820 | | INC | R0 |
| 0773 967C | 2821 | | JNZ | ANAF |
| 0775 EC6C | 2822 | | DJNZ | R4,ANA4 |
| | 2823 | | | |
| 0777 EA56 | 2824 | | DJNZ | R2,ANA3 |
| | 2825 | | | |
| | 2826 $EJECT | | | |
| | 2827 ANA5: | | | |
| | 2828 ; TEST COMPLETED----RELOAD ANALOG REG. WITH DATA STORED IN RAM | | | |
| 0779 3492 | 2829 | | CALL | LDGAIN |
| 077B 83 | 2830 | | RET | |
| | 2831 | | | |
| | 2832 ANAF: | | | |
| | 2833 ; ERROR WAS DETECTED | | | |
| 077C B82D | 2834 | | MOV | R0,#TESTRA |
| 077E FF | 2835 | | MOV | A,R7 |
| 077F 37 | 2836 | | CPL | A |
| 0780 40 | 2837 | | ORL | A,@R0 ; SET 'ANA I.C. FAILS' FLAG |
| 0781 A0 | 2838 | | MOV | @R0,A |
| 0782 E479 | 2839 | | JMP | ANA5 |
| | 2840 | | | |
| | 2841 ; ANALOG I.C. TEST DATA | | | |
| | 2842 ;++++++++++++++++++++++++++++++++++++++++++++++++++++++++ | | | |
| 0784 63 | 2843 ATDATA: DB | 063H, 0C1H, 0F8H ; TEST DATA TRIPLET 1 | | |
| 0785 C1 | | | | |
| 0786 F8 | | | | |
| 0787 9C | 2844 | | DB | 09CH, 03EH, 007H ;  "    "    "   2 |
| 0788 3E | | | | |
| 0789 07 | | | | |
| | 2845 ;++++++++++++++++++++++++++++++++++++++++++++++++++++++++ | | | |
| | 2846 | | | |
| | 2847 ;*** END OF ANAICT *** | | | |
| | 2848 $EJECT | | | |
| | 2849 | | | |
| | 2850 ; | NAME | RAMT |
| | 2851 | | | |
| | 2852 ; | | | |
| | 2853 ; | | | |
| | 2854 ; | | | |
| | 2855 | | | |
| | 2856 ; RAMT — CHECKS 8049'S DATA MEMORY | | | |
| | 2857 | | | |
| | 2858 RAMT: | | | |
| | 2859 ; LOAD DATA MEMORY WITH TEST PATTERN 1 (EVEN BYTES=55H, ODD BYTES=AAH) | | | |
| 078A B87F | 2860 | | MOV | R0,#LSTBYT |

```
LOC  OBJ        LINE        SOURCE STATEMENT 078C 23AA       2861            MOV     A,#0AAH
078E A0         2862 RAMT1:     MOV     @R0,A
078F 37         2863            CPL     A
0790 E88E       2864            DJNZ    R0,RAMT1
                2865
                2866 ; VERIFY TEST PATTERN 1
0792 B87F       2867            MOV     R0,#LSTBYT      ; (7FH IN THE 8049)
0794 B93F       2868            MOV     R1,#(LSTBYT-1)/2 ; (3FH)
0796 F0         2869 RAMT2:     MOV     A,@R0
0797 D3AA       2870            XRL     A,#0AAH
0799 96C4       2871            JNZ     RAMF
079B C8         2872            DEC     R0
079C F0         2873            MOV     A,@R0
079D D355       2874            XRL     A,#55H
079F 96C4       2875            JNZ     RAMF
07A1 C8         2876            DEC     R0
07A2 E996       2877            DJNZ    R1,RAMT2
                2878
                2879 ; LOAD DATA MEMORY WITH TEST PATTERN 2 (EVEN BYTES=AAH, ODD BYTES=55H)
07A4 B87F       2880            MOV     R0,#LSTBYT
07A6 2355       2881            MOV     A,#55H
07A8 A0         2882 RAMT3:     MOV     @R0,A
07A9 37         2883            CPL     A
07AA E8A9       2884            DJNZ    R0,RAMT3
                2885
                2886 $EJECT
                2887 ; VERIFY TEST PATTERN 2
07AC B87F       2888            MOV     R0,#LSTBYT      ; (7FH)
07AE B93F       2889            MOV     R1,#(LSTBYT-1)/2 ; (3FH)
07B0 F0         2890 RAMT4:     MOV     A,@R0
07B1 D355       2891            XRL     A,#55H
07B3 96C4       2892            JNZ     RAMF
07B5 C8         2893            DEC     R0
07B6 F0         2894            MOV     A,@R0
07B7 D3AA       2895            XRL     A,#0AAH
07B9 96C4       2896            JNZ     RAMF
07BB C8         2897            DEC     R0
07BC E9B0       2898            DJNZ    R1,RAMT4
                2899
                2900 ; RAM TEST PASSED----CLEAR 'RAM TEST FAILED' BIT OF 'TESTR'
07BE B82A       2901            MOV     R0,#TESTR
07C0 B000       2902            MOV     @R0,#0          ; RESET 'TEST RESULTS' BYTE
                2903
                2904 ; RETURN TO SLFTST
07C2 C402       2905            JMP     RAMRET          ; RAM TEST ROUTINE'S RETURN ADDRESS
                2906
                2907 RAMF:
                2908 ; RAM TEST FAILED----SET 'RAM TEST FAILED' BIT OF 'TESTR'
07C4 B82A       2909            MOV     R0,#TESTR
07C6 B001       2910            MOV     @R0,#01H        ; SET 'RAM TEST FAILED' BIT
                2911
                2912 ; RETURN TO SLFTST
07C8 C402       2913            JMP     RAMRET
                2914
                2915 ;*** END OF RAMT ***
```

```
LOC  OBJ        LINE        SOURCE STATEMENT

2916 $EJECT
                2917
                2918 ;      NAME            GETROM
                2919
                2920 ;
                2921 ;
                2922 ;
                2923
                2924 ; GETROM -- FETCH BYTE OF PROGRAM MEMORY
                2925
                2926 ;      R2 = PAGE ADDRESS (0 - 7)
                2927 ;      R3 = BYTE ADDRESS (0 TO 0FFH)
                2928
07D0            2929        ORG     7D0H
                2930 GETROM:
07D0 FA         2931        MOV     A,R2    ; FETCH PAGE ADDRESS
07DE 5307       2932        ANL     A,#7
07E0 03E3       2933        ADD     A,#(LOW ROMTBL)
07E2 B3         2934        JMPP    @A
                2935
                2936 ROMTBL:
                2937 ; PROGRAM MEMORY PAGE JUMP TABLE
07E3 EB         2938        DB      (LOW ($+8))
07E4 ED         2939        DB      (LOW ($+9))
07E5 EF         2940        DB      (LOW ($+10))
07E6 F1         2941        DB      (LOW ($+11))
07E7 F3         2942        DB      (LOW ($+12))
07E8 F5         2943        DB      (LOW ($+13))
07E9 F7         2944        DB      (LOW ($+14))
07EA F9         2945        DB      (LOW RDPG7)
                2946
07EB 04FD       2947        JMP     RDPG0
07ED 24FD       2948        JMP     RDPG1
07EF 44FD       2949        JMP     RDPG2
07F1 64FD       2950        JMP     RDPG3
07F3 84FD       2951        JMP     RDPG4
07F5 A4FD       2952        JMP     RDPG5
07F7 C4FD       2953        JMP     RDPG6
07F9 FB         2954 RDPG7: MOV     A,R3    ; FETCH BYTE ADDRESS
07FA A3         2955        MOVP    A,@A    ; FETCH ROM DATA BYTE
07FB 83         2956        RET
                2957
                2958 ;++++++++++++++++++++++++
                2959 ; ROM TEST CHECKSUM BYTE
07FC 00         2960        DB      0
                2961 ;++++++++++++++++++++++++
                2962 $EJECT
                2963 ; ROMT---PAGE 0
00FD            2964        ORG     0FDH
00FD FB         2965 RDPG0: MOV     A,R3    ; FETCH BYTE ADDRESS
00FE A3         2966        MOVP    A,@A    ; FETCH ROM DATA BYTE
00FF 83         2967        RET
                2968
                2969 ; ROMT---PAGE 1
01FD            2970        ORG     1FDH
```

```
LOC  OBJ      LINE        SOURCE STATEMENT

01FD FB       2971 RDPG1:  MOV    A,R3
01FE A3       2972         MOVP   A,@A
01FF 83       2973         RET
              2974
              2975 ; ROMT---PAGE 2
02FD          2976         ORG    2FDH
02FD FB       2977 RDPG2:  MOV    A,R3
02FE A3       2978         MOVP   A,@A
02FF 83       2979         RET
              2980
              2981 ; ROMT---PAGE 3
03FD          2982         ORG    3FDH
03FD FB       2983 RDPG3:  MOV    A,R3
03FE A3       2984         MOVP   A,@A
03FF 83       2985         RET
              2986
              2987 ; ROMT---PAGE 4
04FD          2988         ORG    4FDH
04FD FB       2989 RDPG4:  MOV    A,R3
04FE A3       2990         MOVP   A,@A
04FF 83       2991         RET
              2992
              2993 ; ROMT---PAGE 5
05FD          2994         ORG    5FDH
05FD FB       2995 RDPG5:  MOV    A,R3
05FE A3       2996         MOVP   A,@A
05FF 83       2997         RET
              2998
              2999 ; ROMT---PAGE 6
06FD          3000         ORG    6FDH
06FD FB       3001 RDPG6:  MOV    A,R3
06FE A3       3002         MOVP   A,@A
06FF 83       3003         RET
              3004
              3005 ;*** END OF GETROM ***
              3006 $EJECT
```

What is claimed is:

1. An interface circuit arrangement interfacing a processor to one or more time division multiplexed buses carrying PCM information and control information, said processor having a bidirectional data bus, an interrupt input, and control outputs, said interface circuit comprising:

a first set of terminals coupled to one of said time division multiplexed buses;

a first clock terminal for receiving bit clock signals;

a second clock terminal for receiving framing clock signals;

a data terminal coupled to said data bus;

an interrupt terminal coupled to said interrupt input;

control terminals coupled to said control outputs;

first timing means coupled to said first and second clock terminals for generating first control signals in response to said framing clock signals and said bit clock signals;

first register means coupled to said first set of terminals and responsive to said first control signals for storing said control information;

address match means coupled to said first register means for comparing said stored control information to a predetermined address information and coupled to said interrupt terminal for generating an interrupt signal when said stored control information corresponds to said predetermined address information; and means responsive to first predetermined control signals at said control terminals and first predetermined command information at said data terminal for coupling said first register means to said data terminal whereby said stored control information is transmitted to said processor.

2. An arrangement in accordance with claim 1 comprising:

means responsive to control signals at said control terminals and second predetermined command information received at said data terminal for coupling said first register means to said data terminal for receiving and storing information subsequently received at said data terminal; and means for coupling said first register means to said first set of terminals for transmitting said stored information over said one time division multiplexed bus.

3. An arrangement in accordance with claim 2 wherein said time division multiplexed bus each include:

a first path for carrying PCM information and control information to said interface circuit and a second path for carrying PCM and control information from said interface circuit, said arrangement further comprising means for controlling said first register means whereby said first register means receives and stores said control information from said first path while concurrently transmitting said stored information over said second path.

4. An arrangement in accordance with claim 3 wherein said controlling means controls said first register means such that a portion of said stored information is transmitted prior to receiving and storing said control information.

5. An arrangement in accordance with claim 4 wherein said first register means comprises a shift register, and said controlling means provides clock pulses to said shift register.

6. An arrangement in accordance with claim 5 wherein said control information comprises "x" bits of data, said stored information comprises "x" bits of data, and said shift register includes "x" storage cells and wherein said controlling means provides a burst of y clock pulses, and $y = x + n$;

said shift register being responsive to the first x clock pulses of said burst of y clock pulses for transmitting said x bits of stored information, and responsive after the first n clock pulses of said burst of y clock pulses for receiving and storing said control information.

7. An arrangement in accordance with claim 1 comprising a second set of terminals coupled to a second one of said time division multiplexed buses; and second register means coupled to said second set of terminals and responsive to said first control signals for storing said control information;

said address match means coupled to said second register means for comparing said control information stored in said second register means to said predetermined address information and for generating said interrupt signal when said control information stored in said second register means corresponds to said predetermined address information; and means responsive to said first predetermined control signals and second predetermined command information at said data terminal for coupling said second register means to said data terminal whereby said control information stored in said second register means is transmitted to said processor.

8. An arrangement in accordance with claim 7 comprising:

means responsive to control signals at said control terminals and second predetermined command information received at said data terminal for coupling one or the other of said first and second register means to said data terminal for receiving and storing information subsequently received at said data terminal; and means for coupling said first register means to said first set of terminals for transmitting said information stored in said first register means over said one time division multiplexed bus;

and for coupling said second register means to said second set of terminals for transmitting said information stored in said second register means over said second time division multiplexed bus.

9. An arrangement in accordance with claim 8 wherein said one and said second time division multiplexed buses each include a first path for carrying PCM information and control information to said interface circuit and a second path for carrying PCM information and control information from said interface circuit, said arrangement further comprises means for controlling said first and second register means such that said first register means receives and stores said control information from said first path of said one time division multiplexed bus while concurrently transmitting said information stored in said first register means over said second path of said one time division multiplexed bus and such that said second register means receives and stores said control information from said first paths of said second time division multiplexed bus while concurrently transmitting said information stored in said second register means over said second path of said second time-division multiplexed bus.

10. An arrangement in accordance with claim 9 wherein said controlling means controls said first register means such that a portion of said first register stored information is transmitted prior to receiving and storing said control information from said first time-division multiplexed bus and controls said second register means such that a portion of said second register stored information is transmitted prior to receiving and storing said control information from said second time-division multiplexed bus.

11. An arrangement in accordance with claim 10 wherein said first and second register means each comprises a shift register, and said controlling means provides clock pulses to said first and second shift registers.

12. An arrangement in accordance with claim 11 wherein said control information comprises "x" data bits, said information comprises "x" data bits, and said first and second shift registers each comprise "x" storage cells, and wherein said controlling means provides bursts of clock pulses each comprising "y" pulses where "y" = "x" + "n" and "n" is less than "x", said first shift register being responsive to the first "x" clock pulses of each of said bursts for transmitting x bits of information stored in said first shift register and responsive to said clock pulses after "n" clock pulses of said burst for receiving and storing said control information received at said first set of terminals, said second shift register being responsive to said first "x" clock pulses for transmitting x bits of information stored in said second shift register and responsive to said clock pulses after "n" clock pulses of said burst for receiving and storing said control information received at said second set of terminals.

13. An arrangement in accordance with claims 1, 2, 3, 4, 5, 6, 7, 8, 9, 10, 11 or 12 comprising feedback means responsive to control signals at said control terminals and third predetermined command information received at said data terminal for providing a feedback path for said first register means whereby said stored control information is concurrently transmitted from said first register means over said feedback path and is restored in said first register means.

14. An arrangement in accordance with claims 7, 8, 9, 10, 11 or 12 comprising feedback means responsive to control signals at said control terminals and third predetermined command information received at said data terminal such that a selected one of said first or second register means has an output selectively coupled to the input of either or both of said first and second register means whereby information stored in said selected one register is transmitted through said feedback means and is received and stored in said either or both of said first or second register means.

15. In a line switch,
one or more time division multiplexed buses carrying PCM information and control information;
a plurality of processors, each of said processors having a bidirectional data bus, in interrupt input, and control outputs,
a plurality of interface circuits, each of said interface circuits coupling a corresponding one of said plurality of processors to all of said one or more time division multiplexed buses whereby said plurality of processors exchange control information over said one or more time division multiplexed buses;
each of said interface circuits comprising:
a first set of terminals coupled to one of said time division multiplexed buses;
a first clock terminal for receiving bit clock signals;
a second clock terminal for receiving framing clock signals;
a data terminal coupled to said data bus;
an interrupt terminal coupled to said interrupt input;
control terminals coupled to said control outputs
first timing means coupled to said first and second clock terminals for generating first control signals in response to said framing clock signals and said bit clock signals;
first register means coupled to said first set of terminals and responsive to said first control signals for storing said control information;
address match means coupled to said first register means for comparing said stored control information to a predetermined address information and coupled to said interrupt terminal for generating an interrupt signal when said stored control information corresponds to said predetermined address information;
means responsive to first predetermined control signals at said control terminals and first predetermined command information at said data terminal for coupling said first register means to said data terminal whereby said stored control information is transmitted to said processor.

16. A line switch in accordance with claim 15 comprising:
means responsive to control signals at said control terminals and second predetermined command information received at said data terminal for coupling said first register means to said data terminal for receiving and storing information subsequently received at said data terminal; and
means for coupling said first register means to said first set of terminals for transmitting said stored information over said one time division multiplexed bus.

17. A line switch in accordance with claim 16 wherein said time division multiplexed bus each include:
a first path for carrying PCM information and control information to said interface circuit and a second path for carrying PCM and control information from said interface circuit,
said arrangement further comprising means for controlling said first register means whereby said first register means receives and stores said control information from said first path while concurrently transmitting said stored information over said second path.

18. A line switch in accordance with claim 17 wherein said controlling means controls said first register means such that a portion of said stored informtion is transmitted prior to receiving and storing said control information.

19. A line switch in accordance with claim 18 wherein said first register means comprises a shift register, and said controlling means provides clock pulses to said shift register.

20. A line switch in accordance with claim 19 wherein said control information comprises "x" bits of data, said stored information comprises "x" bits of data, and said shift register includes "x" storage cells and wherein said controlling means provides a burst of y clock pulses, and y=x+n;
said shift register being responsive to the first x clock pulses of said burst of y clock pulses for transmitting said x bits of stored information, and responsive after the first n clock pulses of said burst of y clock pulses for receiving and storing said control information.

21. A line switch in accordance with claim 15 comprising a second set of terminals coupled to a second one of said time division multiplexed buses; and
second register means coupled to said second set of terminals and responsive to said first control signals for storing said control information;
said address match means coupled to said second register means for comparing said control information stored in said second register means to said predetermined address information and for generating said interrupt signal when said control information stored in said second register means corresponds to said predetermined address information; and
means responsive to said first predetermined control signals and second predetermined command information at said data terminal for coupling said second register means to said data terminal whereby said control information stored in said second register means is transmitted to said processor.

22. A line switch in accordance with claim 21 comprising:
means responsive to control signals at said control terminals and second predetermined command information received at said data terminal for coupling one or the other of said first and second register means to said data terminal for receiving and storing information subsequently received at said data terminal; and
means for coupling said first register means to said first set of terminals for transmitting said information stored in said first register means over said one time division multiplexed bus;

and for coupling said second register means to said second set of terminals for transmitting said information stored in said second register means over said second time division multiplexed bus.

23. A line switch in accordance with claim 22 wherein said one and said second time division multiplexed buses each include a first path for carrying PCM information and control information to said interface circuit and a second path for carrying PCM information and control information from said interface circuit, said arrangement further comprises means for controlling said first and second register means such that said first register means receives and stores said control information from said first path of said one time-division multiplexed bus while concurrently transmitting said information stored in said first register means over said second path of said one time division multiplexed bus and such that said second register means receives and stores said control information from said first paths of said second time division multiplexed bus while concurrently transmitting said information stored in said second register means over said second path of said second time division multipled bus.

24. A line switch in accordance with claim 23 wherein said controlling means controls said first register means such that a portion of said first register stored information is transmitted prior to receiving and storing said control information from said first time-division multiplexed bus and controls said second register means such that a portion of said second register stored information is transmitted prior to receiving and storing said control information from said second time-division multiplexed bus.

25. A line switch in accordance with claim 24 wherein said first and second register means each comprises a shift register, and said controlling means provides clock pulses to said first and second shift registers.

26. A line switch in accordance with claim 25 wherein said control information comprises "x" data bits, said information comprises "x" data bits, and said first and second shift registers each comprise "x" storage cells, and wherein said controlling means provides bursts of clock pulses each comprising "y" pulses where "y"="x"+"n" and "n" is less than "x", said first shift register being responsive to the first "x" clock pulses of each of said bursts for transmitting x bits of information stored in said first shift register and responsive to said clock pulses after "n" clock pulses of said burst for receiving and storing said control information received at said first set of terminals, said second shift register being responsive to said first "x" clock pulses for transmitting x bits of information stored in said second shift register and responsive to said clock pulses after "n" clock pulses of said burst for receiving and storing said control information received at said second set of terminals.

27. A line switch in accordance with claims 15, 16, 17, 18, 19, 20, 21, 22, 23, 24, 25 or 26 comprising feedback means responsive to control signals at said control terminals and third predetermined command information received at said data terminal for providing a feedback path for said first register means whereby said stored control information is concurrently transmitted from said first register means over said feedback path and is restored in said first register means.

28. A line switch in accordance with claims 21, 22, 23, 24, 25 or 26 comprising feedback means responsive to control signals at said control terminals and third predetermined command information received at said data terminal such that a selected one of said first or second register means has an output selectively coupled to the input of either or both of said first and second register means whereby information stored in said selected one register is transmitted through said feedback means and is received and stored in said either or both of said first or second register means.

29. A line switch in accordance with claims 15, 16, 17, 18, 19, 20, 21, 22, 23, 24, 25 or 26 comprising:

a plurality of groups of line circuits each of said line circuits being coupleable to said one or more time division multiplexed buses, each of said groups of line circuits being coupled to one corresponding processor of said plurality of processors, whereby all the line circuits in one group are controlled by one processor.

* * * * *